(12) United States Patent
Kusukame et al.

(10) Patent No.: US 10,641,511 B2
(45) Date of Patent: May 5, 2020

(54) RADIATION RECEIVING SENSOR AND AIR CONDITIONER, ELECTRONIC COOKER, AND TRANSPORT DEVICE INCLUDING THE SAME

(71) Applicant: PANASONIC INTELLECTUAL PROPERTY MANAGEMENT CO., LTD., Osaka (JP)

(72) Inventors: Koichi Kusukame, Nara (JP); Nawatt Silawan, Osaka (JP); Shinichi Shikii, Nara (JP); Aki Yoneda, Hyogo (JP); Kazuki Funase, Osaka (JP); Takahiro Fukunishi, Shiga (JP); Toshimitsu Koda, Shiga (JP); Norimasa Ishikawa, Shiga (JP); Hiroshi Yamanaka, Fukui (JP); Takanori Sugiyama, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/287,636

(22) Filed: Feb. 27, 2019

(65) Prior Publication Data

US 2019/0195521 A1 Jun. 27, 2019

Related U.S. Application Data

(63) Continuation of application No. 15/154,950, filed on May 14, 2016, now Pat. No. 10,309,670.

(30) Foreign Application Priority Data

May 20, 2015 (JP) ................................. 2015-103181

(51) Int. Cl.
*G01J 5/00* (2006.01)
*F24F 11/30* (2018.01)
(Continued)

(52) U.S. Cl.
CPC .............. *F24F 11/30* (2018.01); *F24F 11/00* (2013.01); *G01J 5/00* (2013.01); *G01J 5/02* (2013.01);
(Continued)

(58) Field of Classification Search
CPC ........ F24F 11/30; F24F 11/00; F24F 2120/10; F24F 2120/00; G01J 5/00; G01J 2005/0077; G01J 5/02; G01J 5/025
See application file for complete search history.

(56) References Cited

U.S. PATENT DOCUMENTS 5,264,916 A * 11/1993 Bushman .................. G01J 4/00
250/330
5,602,380 A * 2/1997 Bishay ............... G06K 7/10881
235/462.46
(Continued)

FOREIGN PATENT DOCUMENTS

| JP | 2001-027701 A | 1/2001 |
| JP | 2010-133692 | 6/2010 |
| JP | 2010-216688 | 9/2010 |

*Primary Examiner* — Kiho Kim
(74) *Attorney, Agent, or Firm* — Greenblum & Bernstein, P.L.C.

(57) ABSTRACT

A radiation receiving sensor includes an infrared receiver including a plurality of infrared receiving devices that receive infrared radiation, a lens that allows infrared radiation to enter the infrared receiver, a rotator that rotates the infrared receiver and the lens about a part of the lens, and a cover member that faces the infrared receiver through the lens and that has translucency.

14 Claims, 75 Drawing Sheets

(51) Int. Cl.
*G01J 5/02* (2006.01)
*F24F 11/00* (2018.01)
F24F 120/00 (2018.01)
F24F 120/10 (2018.01)

(52) U.S. Cl.
CPC ........... *G01J 5/025* (2013.01); *F24F 2120/00* (2018.01); *F24F 2120/10* (2018.01); *G01J 2005/0077* (2013.01)

(56) References Cited

U.S. PATENT DOCUMENTS

| | | |
|---|---|---|
| 9,118,792 B2 | 8/2015 | Wiyamoto |
| 9,358,857 B2 | 6/2016 | Lee |
| 2015/0036126 A1* | 2/2015 | Kawasaki ............. G01J 1/4228 356/222 |
| 2015/0198547 A1 | 7/2015 | Isakov |

* cited by examiner

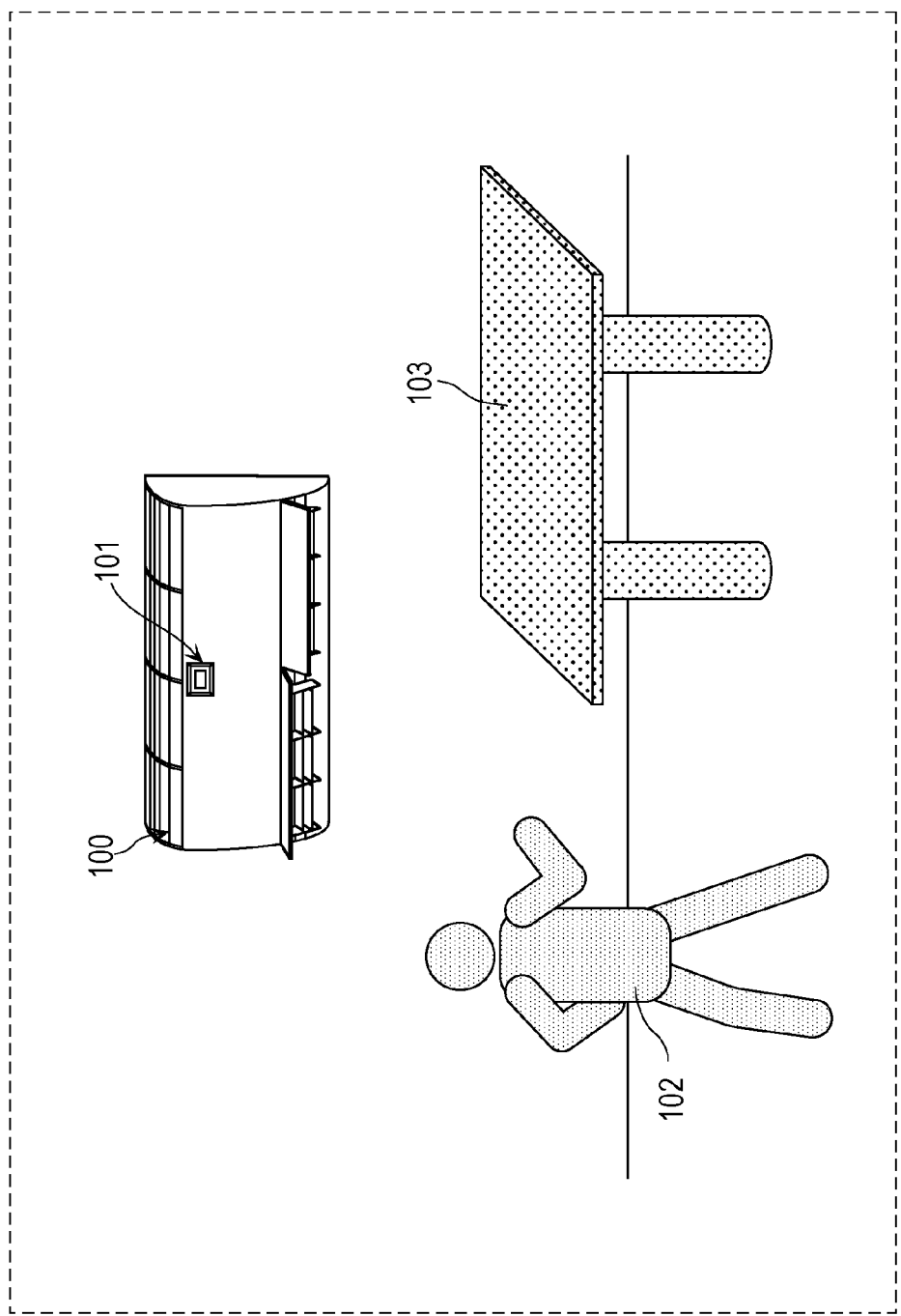

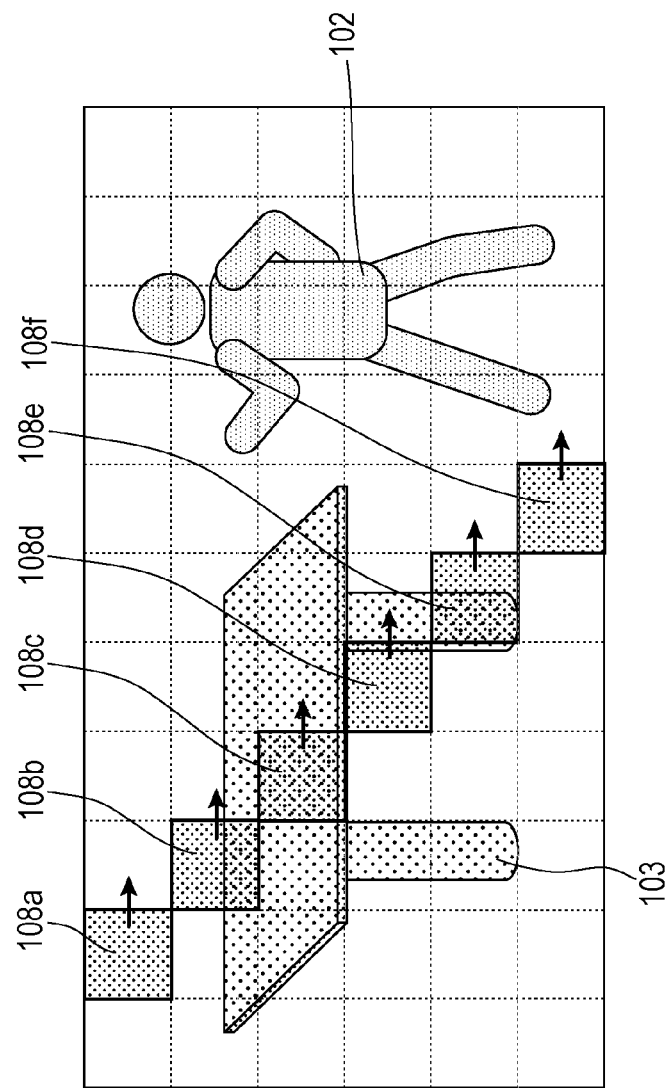

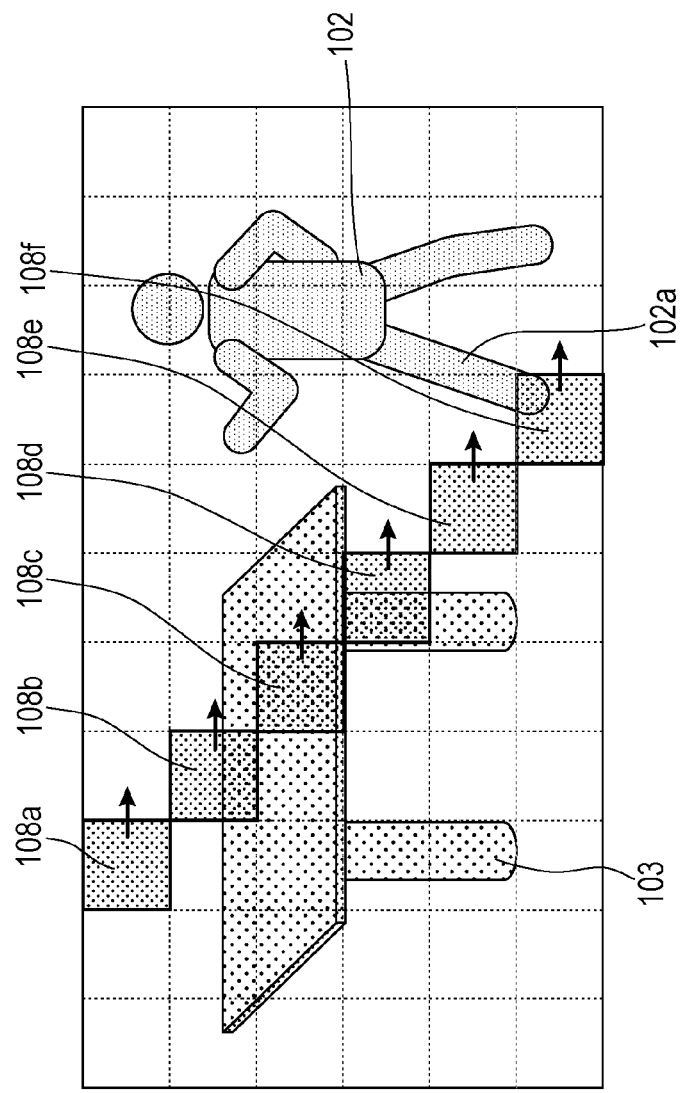

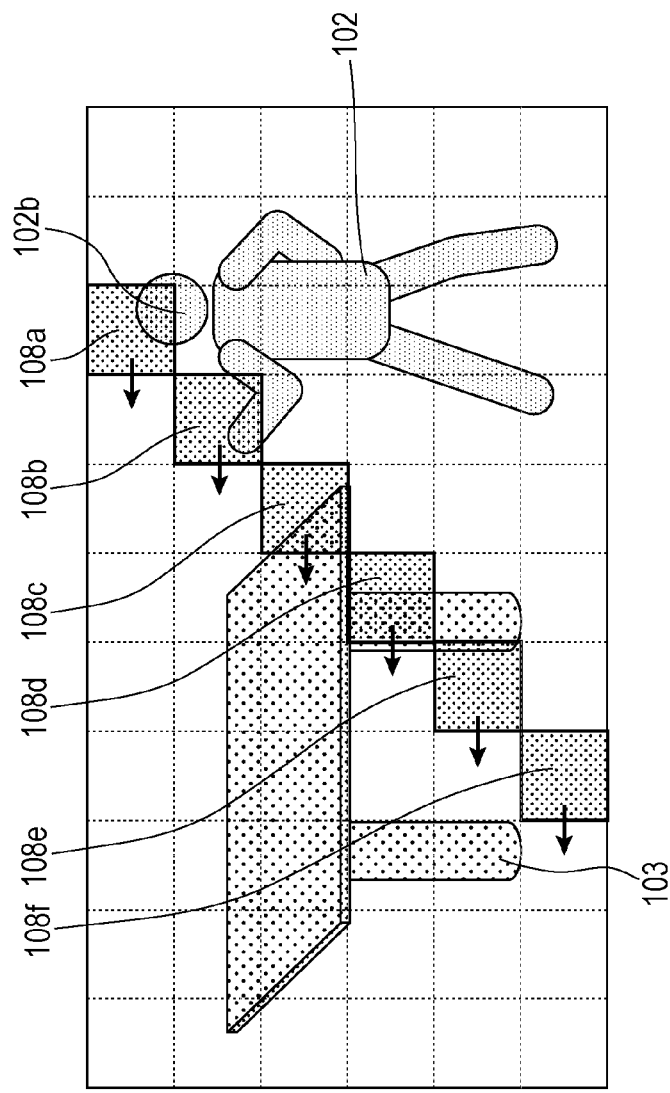

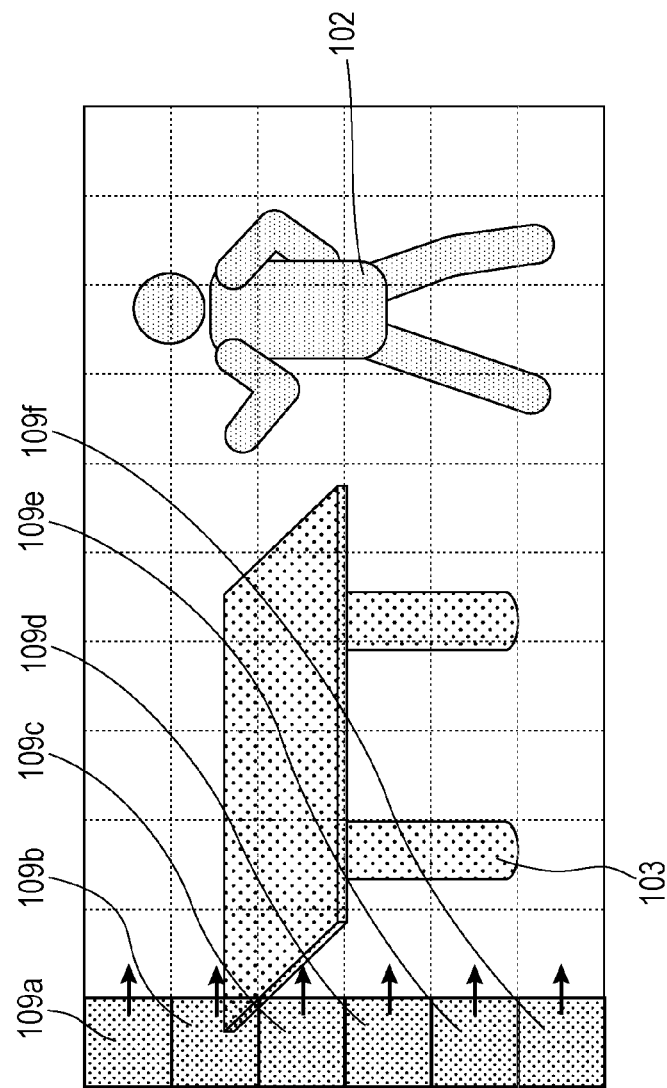

AREA C

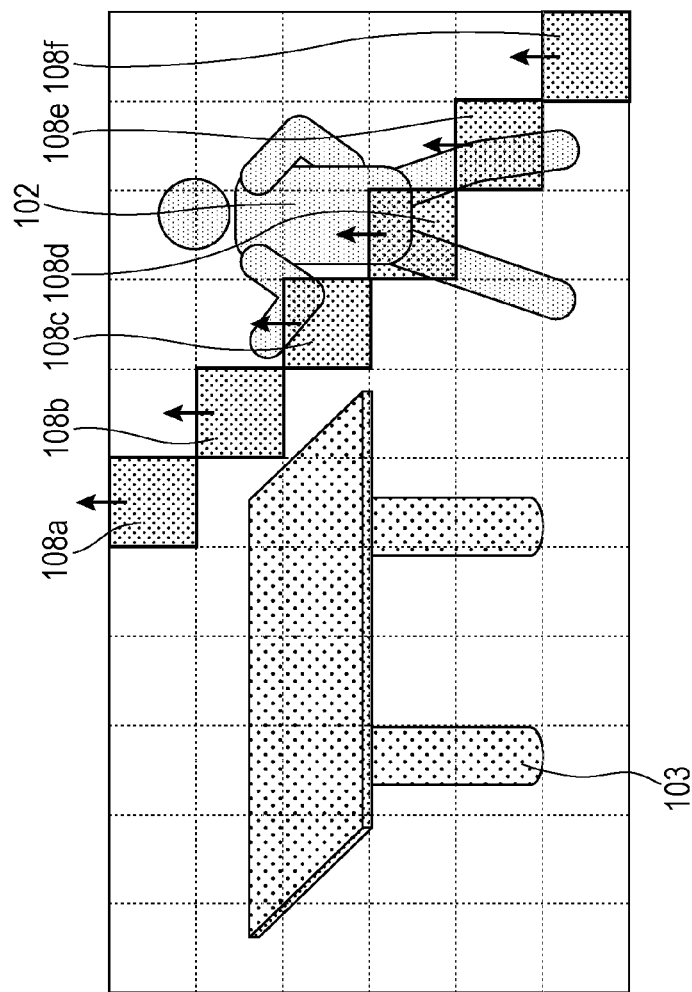

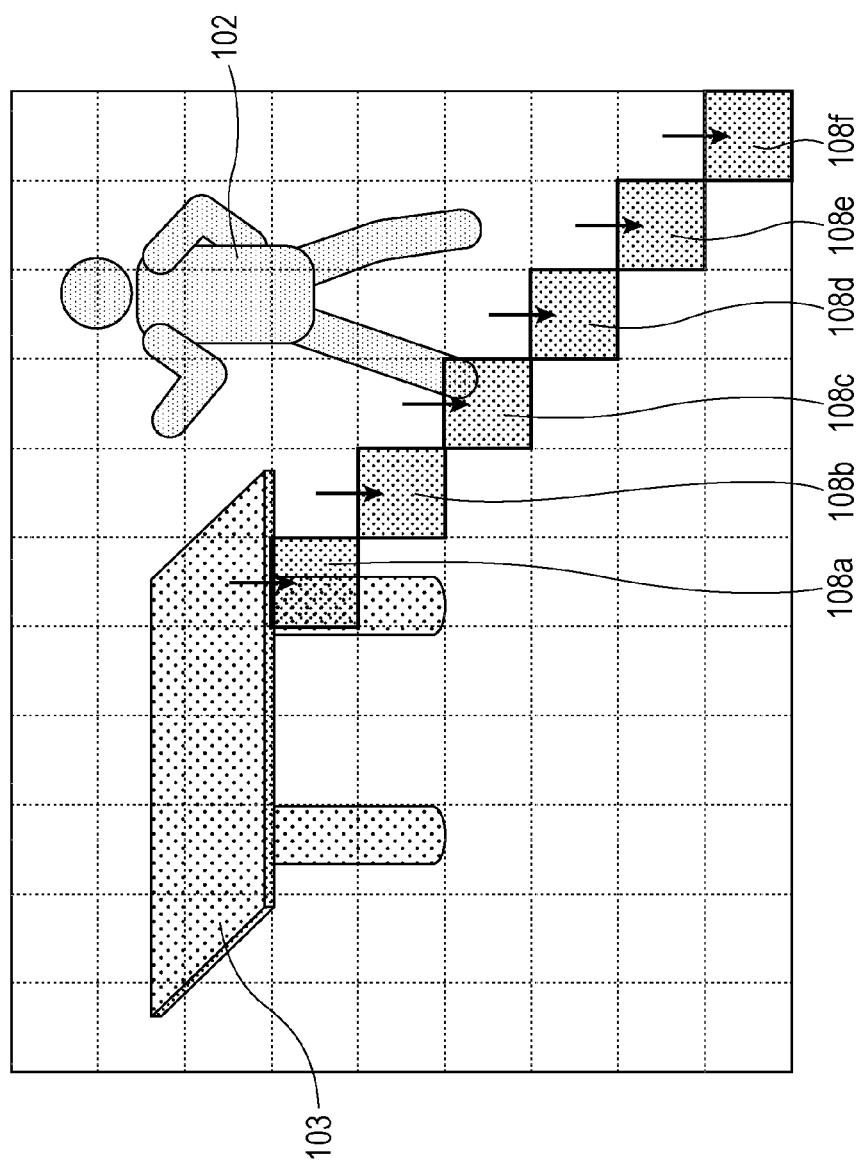

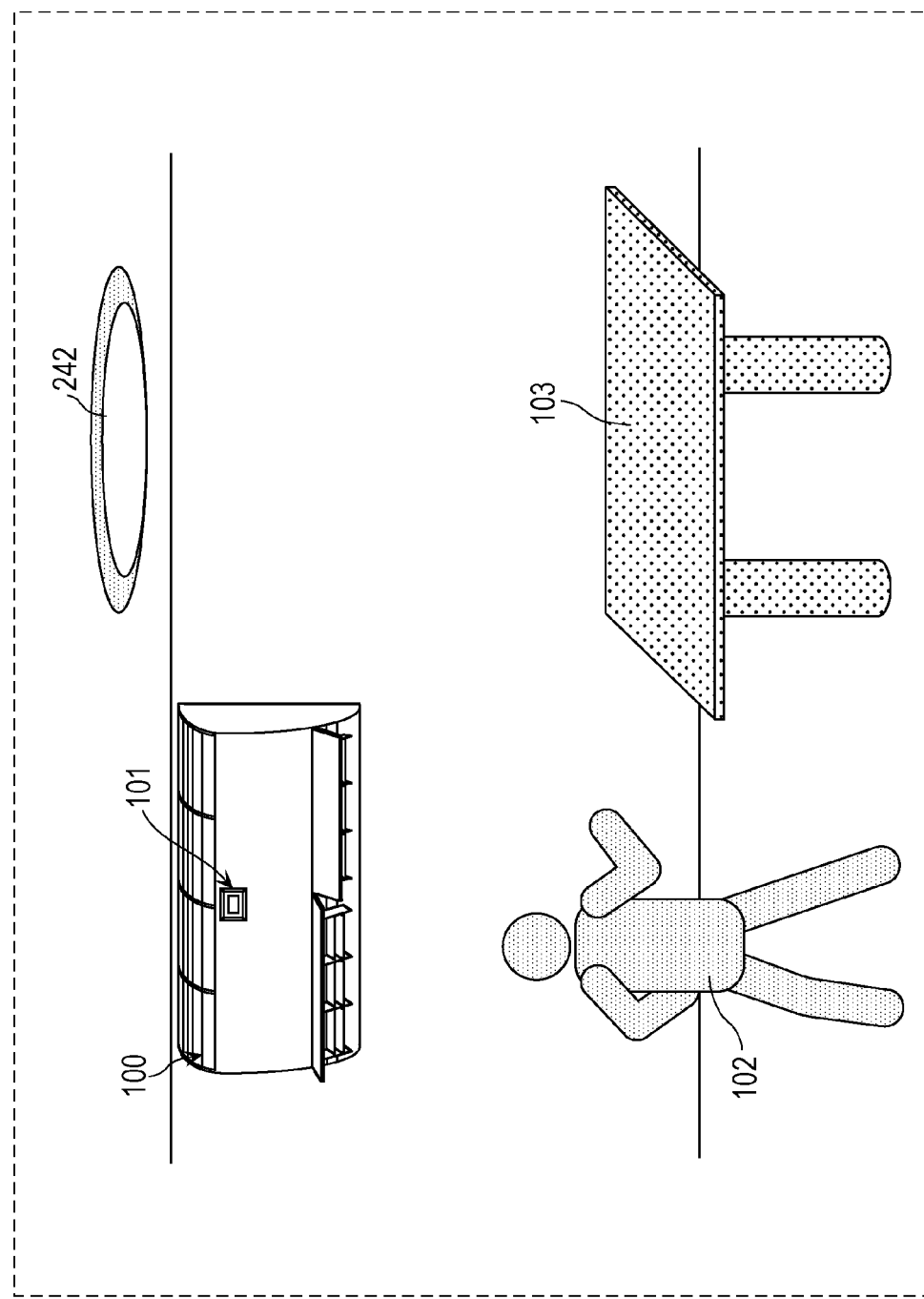

RADIATION RECEIVING SENSOR AND AIR CONDITIONER, ELECTRONIC COOKER, AND TRANSPORT DEVICE INCLUDING THE SAME

CROSS REFERENCE TO RELATED APPLICATION

This is a continuation application of U.S. patent application Ser. No. 15/154,950, filed May 14, 2016, which claims the benefit of Japanese Patent Application No. 2015-103181, filed May 20, 2015, the disclosure of which is expressly incorporated herein by reference in their entireties.

BACKGROUND

1. Technical Field

The present disclosure relates to a radiation receiving sensor (also referred to as a "thermal image sensor" or an "infrared detector") used in an air conditioning apparatus, an electronic cooker, or the like.

2. Description of the Related Art

During these years, various apparatuses that obtain data regarding surrounding environments using various detectors and that perform control on the basis of the obtained data have been developed.

These apparatuses achieve more comfortable environments using the data regarding the environments.

In the case of an air conditioning apparatus, for example, a configuration is known in which a thermometer measures a temperature of air taken into the air conditioning apparatus and the measured temperature is fed back to the air conditioning apparatus. Such an air conditioning apparatus adjusts wind volume or the like on the basis of the measured temperature to adjust a temperature of a room.

In addition, an air conditioning apparatus has also been disclosed that measures the amount of movement of a person in a room using an infrared detector and that performs air conditioning using the measured data to offer improved comfort (e.g., refer to Japanese Unexamined Patent Application Publication No. 2010-133692 and Japanese Unexamined Patent Application Publication No. 2010-216688).

SUMMARY

In one general aspect, the techniques disclosed here feature a radiation receiving sensor (thermal image sensor) including an infrared receiver including a plurality of infrared receiving devices that receive infrared radiation, a lens that allows infrared radiation to enter the infrared receiver, a rotator that rotates the infrared receiver and the lens about a part of the lens, and a cover member that faces the infrared receiver through the lens and that has translucency. The lens allows infrared radiation that has passed through the cover member to enter the infrared receiver. The cover member includes a first area having a first infrared transmittance and a second area having a second infrared transmittance, which is lower than the first infrared transmittance. A minimum value of a distance between a position at which infrared radiation that has entered the second area goes out and a rotation center of the lens is larger than a distance between a position at which infrared radiation that has entered the first area goes out and the rotation center of the lens, and a minimum value of an optical length, in the second area, of infrared radiation that passes through the second area and the rotation center of the lens is larger than an optical length, in the first area, of infrared radiation that passes through the first area and the rotation center of the lens.

According to the aspect of the present disclosure, a thermal image sensor suitable to measure the amount of movement is achieved.

It should be noted that general or specific embodiments may be implemented as a system, a method, an integrated circuit, a computer program, a storage medium such as a compact disc read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 51 is a schematic diagram illustrating a room in which an air conditioning apparatus including an infrared detector according to a fourth embodiment is installed;

FIG. 53B is a conceptual diagram illustrating the detection areas of the infrared detection devices according to the fourth embodiment;

FIG. 53C is a conceptual diagram illustrating the detection areas of the infrared detection devices according to the fourth embodiment;

FIG. 53E is a conceptual diagram illustrating the detection areas of the infrared detection devices according to the fourth embodiment;

FIG. 55A is a conceptual diagram illustrating detection areas of the infrared detection devices illustrated in FIG. 54;

FIG. 66A is a conceptual diagram illustrating detection areas in scanning in the vertical direction;

FIG. 66C is a conceptual diagram illustrating the detection areas in the scanning in the vertical direction;

FIG. 67 is a diagram illustrating an example in which a lighting device is a detection target;

DETAILED DESCRIPTION

Figure 1:
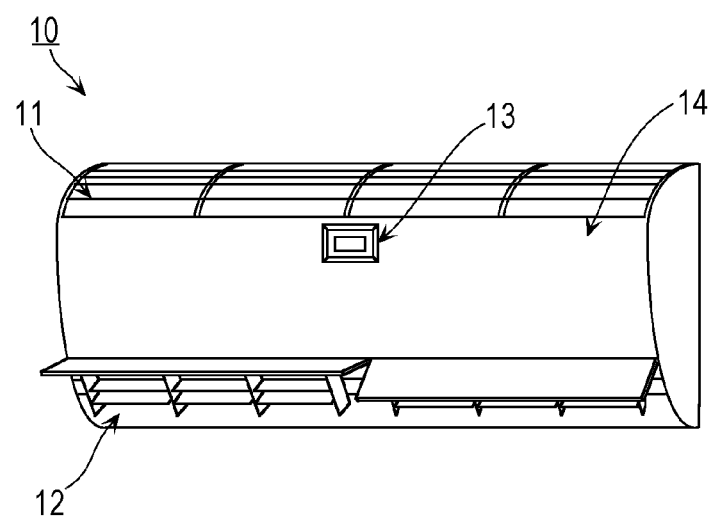
FIG. 1 illustrates an appearance of an air conditioning apparatus including a thermal image sensor.

The configuration of a radiation receiving sensor in an example of the related art can stand improvement.

A radiation receiving sensor (thermal image sensor) according to an aspect of the present disclosure includes an infrared receiver including a plurality of infrared receiving devices that receive infrared radiation, a lens that allows infrared radiation to enter the infrared receiver, a rotator that rotates the infrared receiver and the lens about a part of the lens, and a cover member that faces the infrared receiver through the lens and that has translucency. The lens allows infrared radiation that has passed through the cover member to enter the infrared receiver. The cover member includes a first area having a first infrared transmittance and a second area having a second infrared transmittance, which is lower than the first infrared transmittance. A minimum value of a distance between a position at which infrared radiation that has entered the second area goes out and a rotation center of the lens is larger than a distance between a position at which infrared radiation that has entered the first area goes out and the rotation center of the lens, and a minimum value of an optical length, in the second area, of infrared radiation that passes through the second area and the rotation center of the lens is larger than an optical length, in the first area, of infrared radiation that passes through the first area and the rotation center of the lens.

According to the aspect of the present disclosure, a thermal image sensor suitable to measure the amount of movement can be achieved.

In addition, for example, the part of the lens may be a pole of the lens. The rotator may rotate the infrared receiver and the lens about a straight line through the lens as a rotation axis.

The second area and the first area of the cover member may be composed of the same material. The second area of the cover member may be thicker than the first area of the cover member.

In addition, for example, the cover member may have a flat shape or a curved shape and may be a translucent member having a shape whose radius of curvature is larger than a radius of curvature of the lens.

In addition, for example, a radiation receiving sensor (thermal image sensor) according to an aspect of the present disclosure includes an infrared receiver including a plurality of infrared receiving devices that receive infrared radiation, a lens that allows infrared radiation to enter the infrared receiver, a rotator that rotates the infrared receiver and the lens about a part of the lens, and a cover member that faces the infrared receiver through the lens and that has translucency. The lens allows infrared radiation that has passed through the cover member to enter the infrared receiver. The cover member includes a first area having a first infrared transmittance and a second area having a second infrared transmittance, which is lower than the first infrared transmittance. The first area of the cover member is a first member having the first infrared transmittance. The second area of the cover member includes the first member and a second member that is arranged on the first member and that absorbs infrared radiation.

In addition, for example, the rotator need not rotate the cover member but may rotate the infrared receiver and the lens about the rotation center.

In addition, for example, the rotator may rotate the infrared receiver and the lens at a first rotational speed while infrared radiation that has passed through the first area is entering the infrared receiver and at a second rotational speed while infrared radiation that has passed through the second area is entering the infrared receiver, the first rotational speed and the second rotational speed being different from each other.

Here, for example, the second rotational speed may be lower than the first rotational speed.

In addition, an air conditioner may include the radiation receiving sensor (thermal image sensor).

In addition, an electronic cooker may include the radiation receiving sensor.

In addition, a transport device may include the radiation receiving sensor.

Here, the electronic cooker may further include a ceiling, and a platform on which an object that is a cooking target is placed. The radiation receiving sensor may be mounted on the ceiling. A rotation axis used by the rotator may be substantially parallel to the ceiling.

In addition, for example, the electronic cooker may further include a controller that controls an operation of the electronic cooker. If a temperature of the cooking target identified on the basis of an infrared image obtained from the radiation receiving sensor reaches a certain value, the controller may end the operation.

In addition, for example, the electronic cooker may further include a controller that controls an operation of the electronic cooker. If it is determined that there are two or more cooking targets on the platform on the basis of an infrared image obtained from the radiation receiving sensor, the controller may control the operation using, among a plurality of operation methods for heating the two or more cooking targets, a first operation method in which power used for heating is smallest.

In addition, for example, the electronic cooker may further include a controller that controls an operation of the electronic cooker, and a radiator that emits infrared radiation to the cooking target. The controller may control the radiator such that the radiator emits infrared radiation to a position of the cooking target identified on the basis of an infrared image obtained from the radiation receiving sensor.

In addition, for example, if a rate of increase in a temperature of the cooking target identified on the basis of an infrared image obtained from the radiation receiving sensor is equal to or lower than a certain value, the controller may control the radiator such that the radiator emits infrared radiation to the position of the cooking target.

It should be noted that general or specific aspects may be implemented as a system, a method, an integrated circuit, a computer program, a storage medium such as a computer-readable compact disc read-only memory (CD-ROM), or any selective combination thereof.

Embodiments will be specifically described hereinafter with reference to the drawings.

The following embodiments are general or specific examples. Values, shapes, materials, components, arrangement positions and connection modes of the components, steps, order of the steps, and the like are examples, and do not limit the present disclosure. Among the components described in the following embodiments, ones not described in the independent claims, which define broadest concepts, will be described as arbitrary components.

The drawings are schematic diagrams and do not necessarily illustrate components specifically. In the drawings, substantially the same components are given the same reference numerals, and redundant description thereof might be omitted or simplified.

First Embodiment

Underlying Knowledge Forming Basis of First Embodiment

First, underlying knowledge forming a basis of an air conditioning apparatus according to a first embodiment will be described.

An air conditioning apparatus disclosed in Japanese Unexamined Patent Application Publication No. 2010-133692 includes a human body detection unit that roughly estimates positions of a person's face and feet on the basis of an obtained thermal image.

In Japanese Unexamined Patent Application Publication No. 2010-133692, however, a specific method for estimating positions of a person's face and feet is not disclosed, and a sufficient examination is not conducted. In an air conditioning apparatus disclosed in Japanese Unexamined Patent Application Publication No. 2010-216688, a state of a user and an activity state are not taken into consideration at all.

That is, it is difficult for the air conditioning apparatus disclosed in Japanese Unexamined Patent Application Publication No. 2010-216688 to achieve optimal air conditioning based on the state of the user such as an active state, a stationary state, or a sleep state. In addition, although a method for obtaining high-resolution two-dimensional thermal image data is disclosed in Japanese Unexamined Patent Application Publication No. 2010-216688, how to use obtained data for air conditioning is not examined.

In the first embodiment, an air conditioning apparatus that includes a thermal image sensor and performs optimal control on the basis of the state of the user will be described.

Configuration

The air conditioning apparatus according to the first embodiment will be described hereinafter. FIG. 1 illustrates an appearance of the air conditioning apparatus including the thermal image sensor. The thermal image sensor will also be referred to as a "radiation receiving sensor" or an "infrared detector".

An air conditioning apparatus 10 illustrated in FIG. 1 includes an inlet port 11 through which air in a room is taken in, an outlet port 12 through which conditioned air is blown, and a substantially box-shaped body 14 including a thermal image sensor 13 that obtains thermal image data.

First, the air conditioning apparatus 10 will be described. Air taken into the body 14 through the inlet port 11 is heated or cooled in a heating unit or a cooling unit (not illustrated) inside the body 14 and returns to the room through the outlet port 12.

In order to take in air in the room and blows the air, a blower unit (not illustrated) such as a fan is usually provided inside the body 14. The blower unit makes it possible to heat or cool more air in a short period of time.

In addition, in order to heat or cool air, a radiator (not illustrated) such as a fin is usually provided inside the body 14. The radiator makes it possible to heat or cool air more efficiently.

In addition, in order to heat or cool the radiator, a heat exchanger (not illustrated) such as a compressor or a Peltier element is provided for the air conditioning apparatus 10. The heat exchanger may be provided outdoors, instead. In this case, the size of a part of the air conditioning apparatus 10 provided inside the room can be reduced, and heat generated by the heat exchanger when air inside the room is cooled is not discharged into the room. As a result, the air inside the room can be efficiently cooled. In addition, in this case, the heat exchanger and the radiator are desirably connected through a heat pipe or a refrigerant pipe whose thermal resistance is low. In this case, air can be heated or cooled more efficiently.

Next, the thermal image sensor 13 will be described. A thermal image sensor 20 or 30 that will be described hereinafter may be used as the thermal image sensor 13 of the air conditioning apparatus 10.

Figure 2:
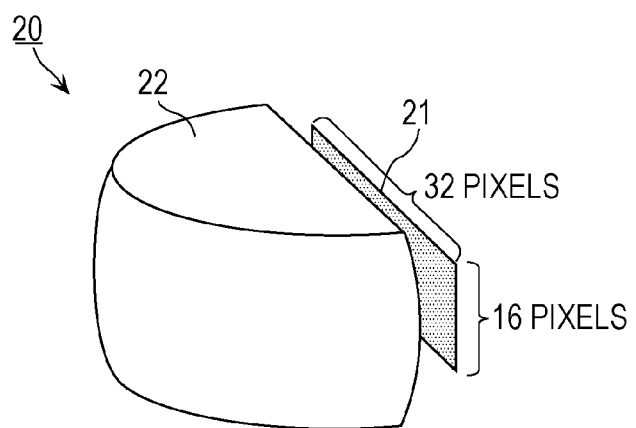
FIG. 2 is a diagram illustrating an example of a thermal image sensor in which infrared receiving devices are arranged in a matrix.

FIG. 2 is a diagram illustrating the thermal image sensor 20, which is an example of the thermal image sensor 13. As illustrated in FIG. 2, the thermal image sensor 20 includes a two-dimensional radiation receiving sensor 21, in which infrared receiving devices are arranged in a matrix, and a lens 22.

As the two-dimensional radiation receiving sensor 21, a thermopile, which uses thermal electromotive force, a bolometer, which uses changes in resistance depending on temperature, a non-contact radiation thermometer such as a pyroelectric sensor, which uses pyroelectric effects, or the like is used. In the two-dimensional radiation receiving sensor 21 of the thermal image sensor 20, 512 (16 pixels in a vertical direction and 32 pixels in a horizontal direction) infrared receiving devices (hereinafter also referred to as radiation receiving devices) are arranged in a matrix.

As the lens 22, a lens composed of silicon or ZnS, which transmits infrared radiation well, is used. The lens 22 is designed such that infrared radiation incident on the lens 22 in various directions enters different radiation receiving devices.

Figure 3:
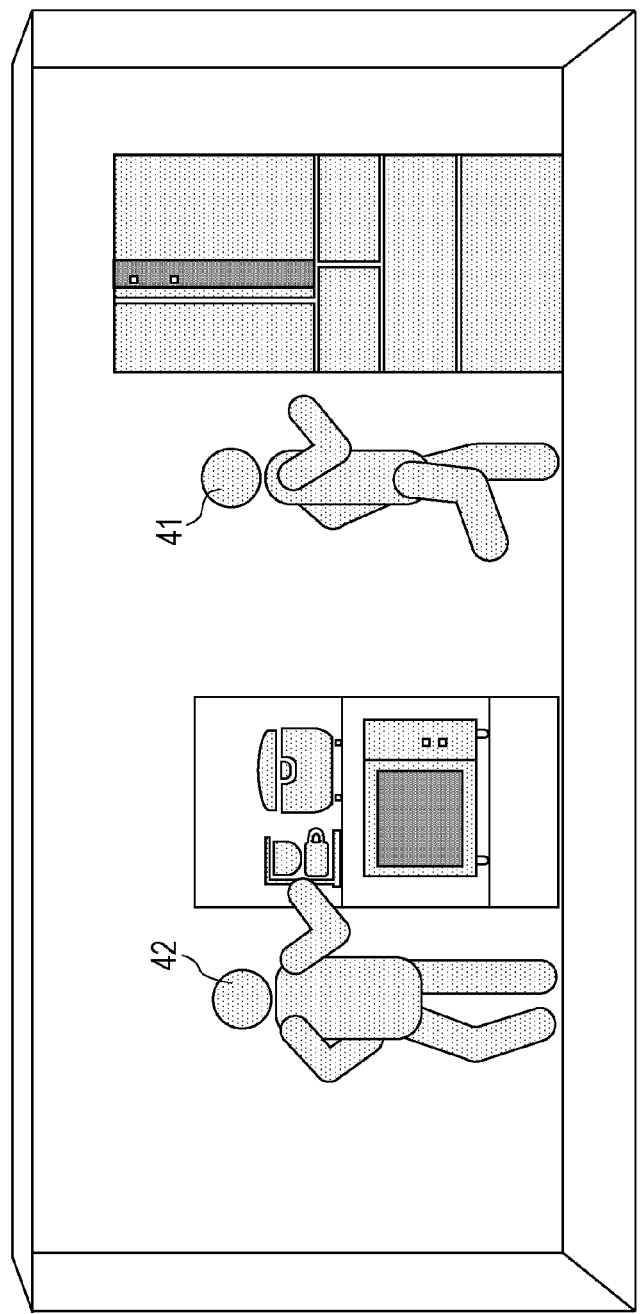
FIG. 3 is a schematic diagram illustrating a room to be detected by the thermal image sensor.
Figure 4:
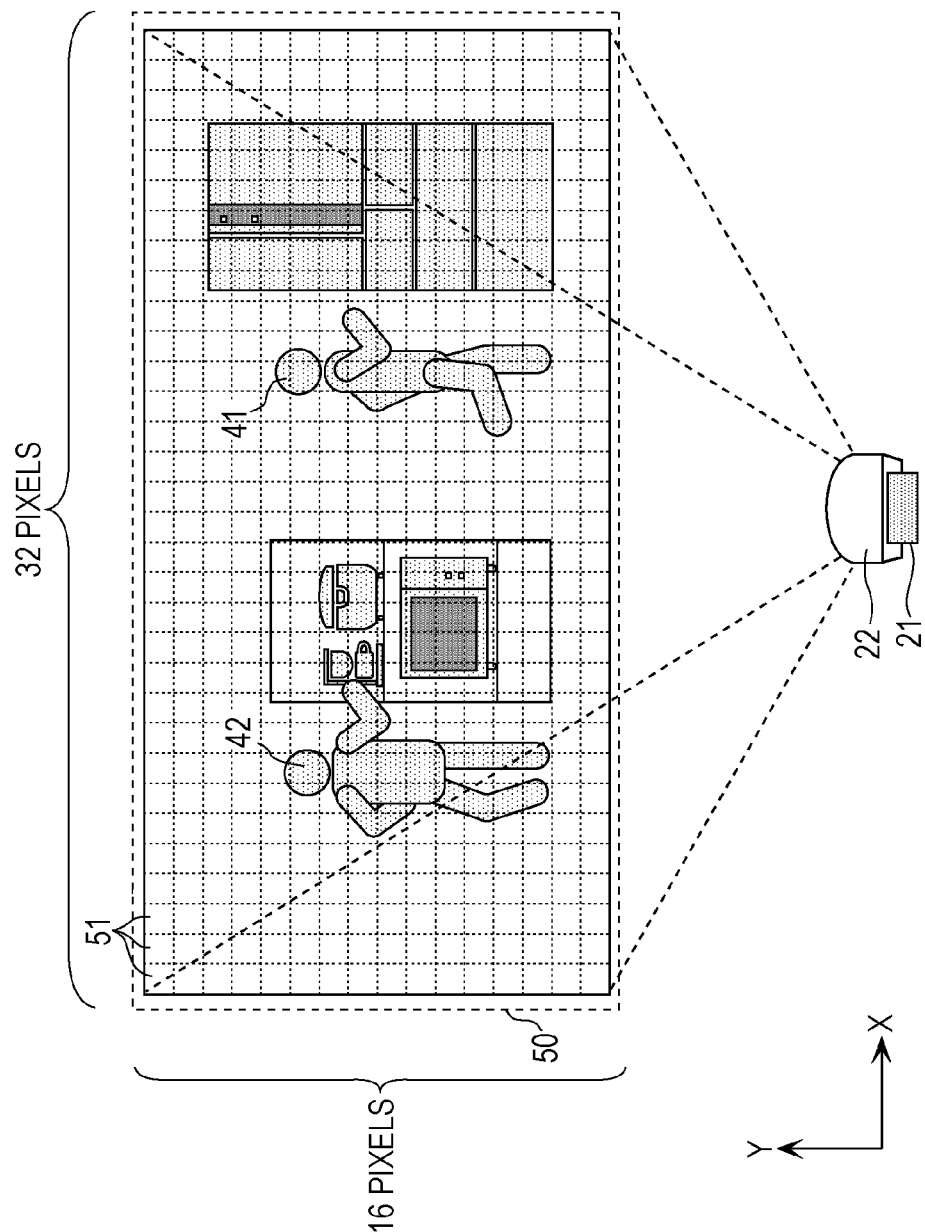
FIG. 4 is a diagram illustrating a method for measuring a temperature distribution used by the thermal image sensor in which infrared receiving devices are arranged in a matrix.

A method for measuring a temperature distribution in the room used by the thermal image sensor 20 will be described hereinafter. FIG. 3 is a schematic diagram illustrating a room (observation area) to be detected by the thermal image sensor 20. FIG. 4 is a diagram illustrating the method for measuring a temperature distribution used by the thermal image sensor 20.

If the air conditioning apparatus 10 is installed in a room in which users 41 and 42 are present as illustrated in FIG. 3, for example, infrared radiation from each observation pixel 51 enters one of the radiation receiving devices of the two-dimensional radiation receiving sensor 21 as illustrated in FIG. 4. Each observation pixel 51 refers to an area in the room from which infrared radiation enters one of the radiation receiving devices.

As a temperature of an object present in each observation pixel 51 becomes higher, the amount of infrared radiation becomes larger, and the amount of infrared radiation that enters the corresponding radiation receiving device becomes larger. That is, a temperature distribution around the air conditioning apparatus 10 is calculated on the basis of the amount of infrared radiation that has entered the radiation receiving devices of the two-dimensional radiation receiving sensor 21.

Since the radiation receiving devices are arranged in a matrix in the two-dimensional radiation receiving sensor 21, the two-dimensional radiation receiving sensor 21 constantly (one frame in each sampling period) measures temperatures (thermal image data) of the observation pixels 51 in an observation area 50. Since the 512 radiation receiving devices are arranged in a matrix in the present embodiment, the observation area 50 is divided into 512 (16×32) observation pixels 51. Timings at which thermal image data is obtained need not be one frame in each sampling period. Thermal image data may be obtained at timings specified by the user.

Figure 5:
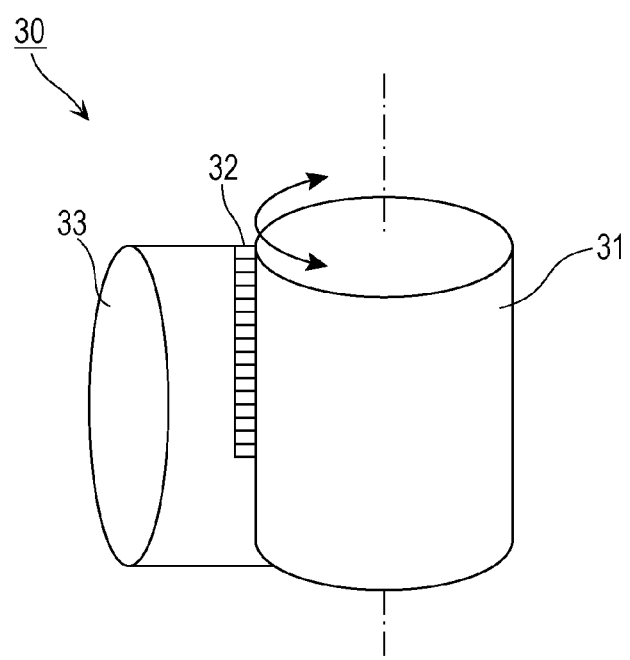
FIG. 5 is a diagram illustrating an example of a thermal image sensor in which infrared receiving devices are arranged in a line.

Next, another example of the thermal image sensor 13 will be described. FIG. 5 is a diagram illustrating the thermal image sensor 30, which is another example of the thermal image sensor 13. As illustrated in FIG. 5, the thermal image sensor 30 includes a rotation unit 31, a one-dimensional radiation receiving sensor 32, in which radiation receiving devices are arranged in a line, and a lens 33.

As the rotation unit 31, a stepping motor, a servomotor, or the like is used. The rotation unit 31 need not necessarily be used in the thermal image sensor 30, and another driving mechanism may be used, instead, insofar as the driving mechanism is movement means (movement unit) that changes a direction of the radiation receiving devices. The size of the rotation unit 31 can be reduced more easily than ones of other driving mechanisms.

As with the two-dimensional radiation receiving sensor 21, a thermopile, which uses thermal electromotive force, a bolometer, which uses changes in resistance depending on temperature, a non-contact radiation thermometer such as a pyroelectric sensor, which uses pyroelectric effects, or the like is used as the one-dimensional radiation receiving sensor 32. In the one-dimensional radiation receiving sensor 32, 16 (1×16) radiation receiving devices are provided.

As with the lens 22, a lens composed of silicon or ZnS, which transmits infrared radiation well, is used as the lens 33.

Figure 6:
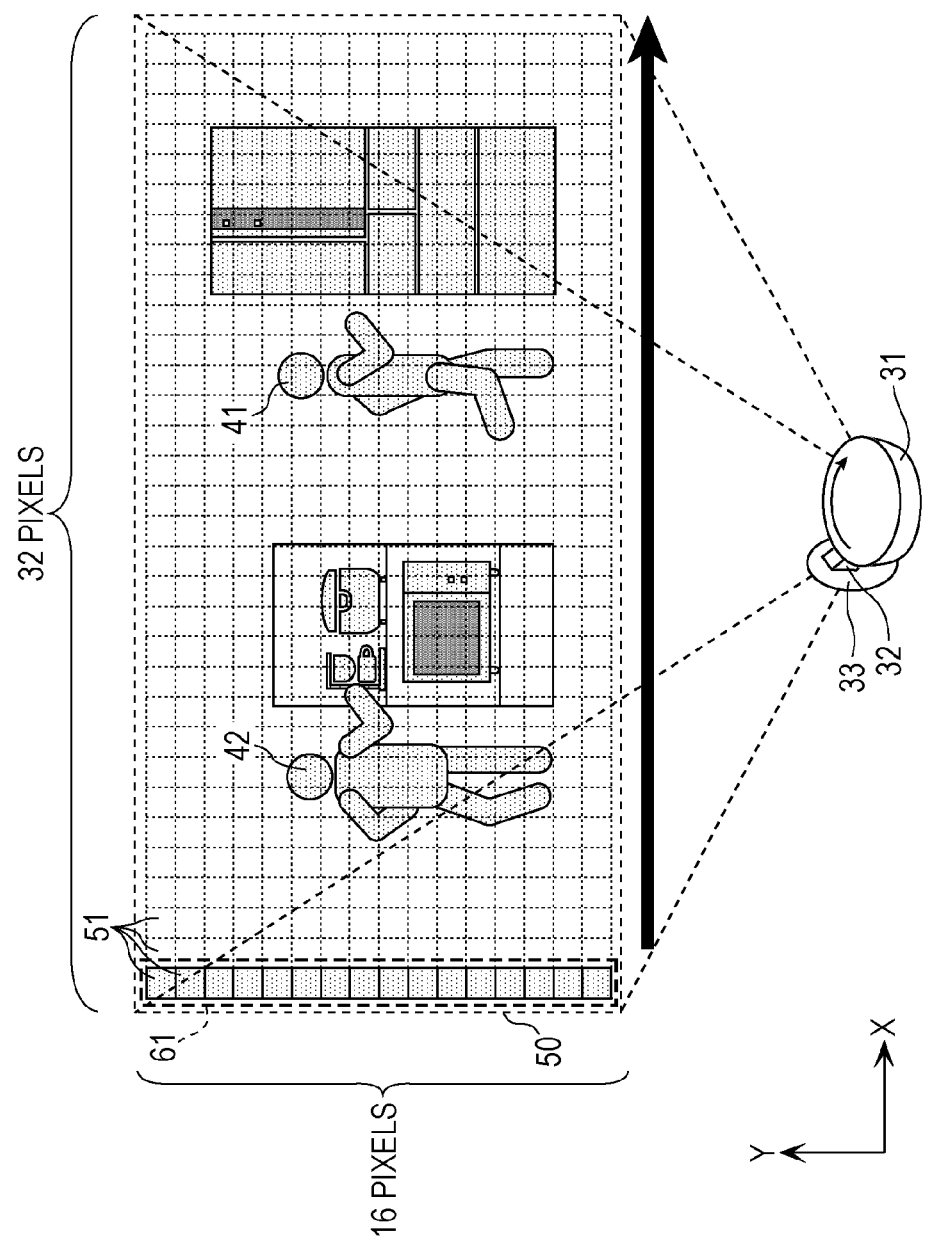
FIG. 6 is a diagram illustrating a method for measuring a temperature distribution used by the thermal image sensor in which infrared receiving devices are arranged in a line.

A method for measuring a temperature distribution in the room used by the thermal image sensor 30 will be described hereinafter. FIG. 6 is a diagram illustrating the method for measuring a temperature distribution used by the thermal image sensor 30.

Since the one-dimensional radiation receiving sensor 32 is used in the thermal image sensor 30, temperatures of observation pixels 51 in a line observation area 61 illustrated in FIG. 6 are measured in one measurement operation. By using the rotation unit 31, however, the line observation area 61 moves in a direction (hereinafter also referred to as a "movement direction" or an "X direction") perpendicular to a line axis direction (Y direction in FIG. 6), and thermal image data over the observation area 50 around the air conditioning apparatus 10 can be obtained as in the case of the thermal image sensor 20. By rotating the one-dimensional radiation receiving sensor 32, which includes 1×16 pixels, 32 steps by an arbitrary angle at a time using the rotation unit 31, for example, thermal image data in 512 (16×32) pixels, namely the observation area 50, can be obtained. If the one-dimensional radiation receiving sensor 32 rotates by 5 degrees per step, a width of the observation area 50 in the X direction is 160 degrees.

In the case of the thermal image sensor 30, the temperature of each observation pixel 51 is measured while the rotation unit 31 is rotating the one-dimensional radiation receiving sensor 32. A time (frame period) taken for the thermal image sensor 30 to obtain thermal image data over the observation area 50 is therefore longer than when the thermal image sensor 20 obtains thermal image data over the observation area 50.

Although the radiation receiving devices arranged in a line in the Y direction moves (rotates) in the X direction in the thermal image sensor 30, radiation receiving devices arranged in a line in the X direction may move (rotate) in the Y direction, instead.

Photodiodes are desirably used for the two-dimensional radiation receiving sensor 21 or the one-dimensional radiation receiving sensor 32. By using the photodiodes, thermal image data can be rapidly obtained.

Regardless of whether the two-dimensional radiation receiving sensor 21 or the one-dimensional radiation receiving sensor 32 includes photodiodes or not, means (heating unit) for heating the radiation receiving sensor is desirably provided. By providing the means for heating the radiation receiving sensor, a signal-to-noise (S/N) ratio of thermal image data can be increased. A heater or a Peltier element is used as the heating unit.

If the heating unit is provided and photodiodes are used for the radiation receiving sensor, the photodiodes are desirably composed of indium antimonide. In this case, concentrations of constituents ($CO_2$, $CO$, and $H_2O$) of the air in the room can be detected as well as thermal image data. If the thermal image sensor 13 detects that the concentration of $CO_2$ or $CO$ is high, the user can be prompted to ventilate the room. The air conditioning apparatus 10 desirably includes audio notification means (notification unit) as means for prompting the user to ventilate the room.

In addition, the air conditioning apparatus 10 desirably includes a ventilation unit that ventilates the room. In this case, if the concentration of $CO_2$ or $CO$ is high, the room can be automatically ventilated (the user need not open windows). More specifically, the ventilation unit is a ventilation window that can be opened and closed from the air conditioning apparatus 10 and desirably includes a filter. In this case, the amount of pollen that enters the room during ventilation can be reduced.

The thermal image sensor 13 desirably performs two-dimensional scanning using a plurality of rotation units. The rotation units are desirably capable of rotating the thermal image sensor 13 in pan and tilt (roll) directions. In this case, a high-performance thermal image sensor 13 can be fabricated at lower cost.

Figure 7:
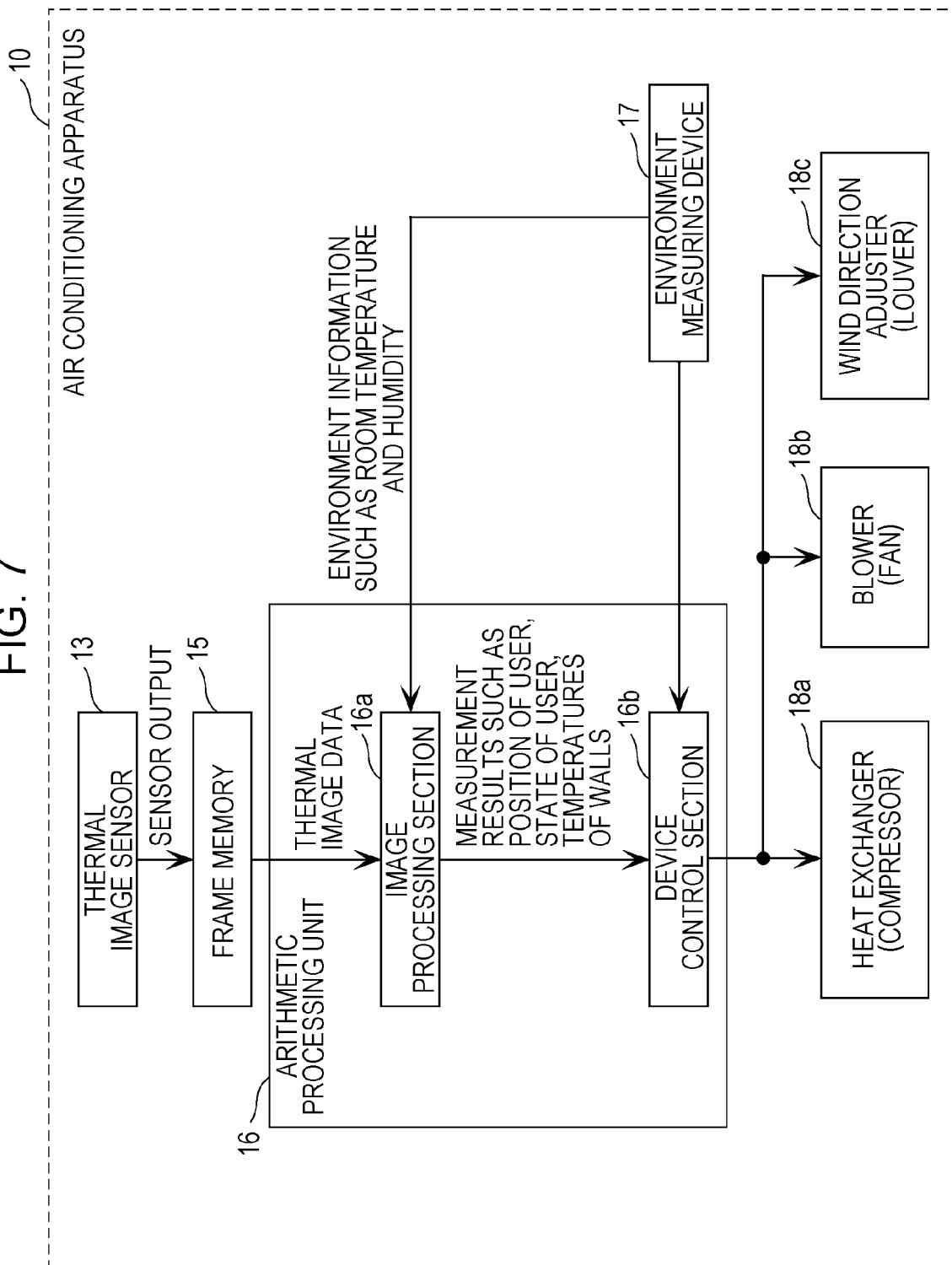
FIG. 7 is a block diagram illustrating the system configuration of an air conditioning apparatus including the thermal image sensor.

Next, the system configuration of the air conditioning apparatus 10 including the thermal image sensor 13 will be described. FIG. 7 is a block diagram illustrating the system configuration of the air conditioning apparatus 10.

As illustrated in FIG. 7, the air conditioning apparatus 10 includes a frame memory 15, an arithmetic processing unit 16, an environment measuring device 17, a heat exchanger 18a, a blower 18b, and a wind direction adjuster 18c as well as the thermal image sensor 13. The arithmetic processing unit 16 includes an image processing section 16a and a device control section 16b. The above components are not mandatory components of the air conditioning apparatus 10, and the air conditioning apparatus 10 may lack one or more of the above components.

Processes performed by the components of the air conditioning apparatus 10 will be described hereinafter.

First, the thermal image sensor 13 obtains electric signals (thermal electromotive force in the case of a thermopile) from the radiation receiving devices and creates two-dimensional thermal image data on the basis of the obtained electric signals. The configuration of the thermal image sensor 13 is as described above.

The created two-dimensional thermal image data is stored in the frame memory 15. The frame memory 15 may be a semiconductor memory or any other memory having a common storage function. The frame memory 15 may be provided inside or outside the air conditioning apparatus 10.

The arithmetic processing unit 16 obtains the two-dimensional thermal image data stored in the frame memory 15 and performs arithmetic processing. The arithmetic processing unit 16 may be a microcomputer or any other device having an arithmetic function.

In the arithmetic processing unit 16, first, the image processing section 16a performs image processing in which a position of the user, how thickly the user is dressed, a temperature distribution in the room, and the like are detected on the basis the thermal image data stored in the frame memory 15. A specific example of an image processing algorithm used by the image processing section 16a will be described later. The image processing section 16a then outputs information regarding the position of the user, temperatures of the user's hands and face, temperatures of walls, and the like to the device control section 16b.

The device control section 16b calculates control information for controlling (room temperature control, wind volume control, and wind direction control) the heat exchanger 18a such as a compressor, the blower 18b such as a fan, and the wind direction adjuster 18c such as a louver on the basis of the information output from the image processing section 16a. The control information calculated by the device control section 16b includes the number of rotations of the blower 18b and an angle of the wind direction adjuster 18c at which the louver is to be inclined. Devices to be controlled by the device control section 16b are not limited to the heat exchanger 18a, the blower 18b, and the wind direction adjuster 18c.

As illustrated in FIG. 7, the air conditioning apparatus 10 may include the environment measuring device 17 that measures the temperature and humidity in the room and control the temperature of the room and wind volume on the basis of the measured temperature and humidity.

Furthermore, environment information such as the temperature and humidity obtained by the environment measuring device 17 is desirably transmitted to the image processing section 16a, a reason for which will be described later.

The environment information desirably includes outside temperature, outdoor and indoor illuminances, and outdoor radiant heat in addition to the temperature and humidity in the room, a reason for which, too, will be described later.

Figure 8:
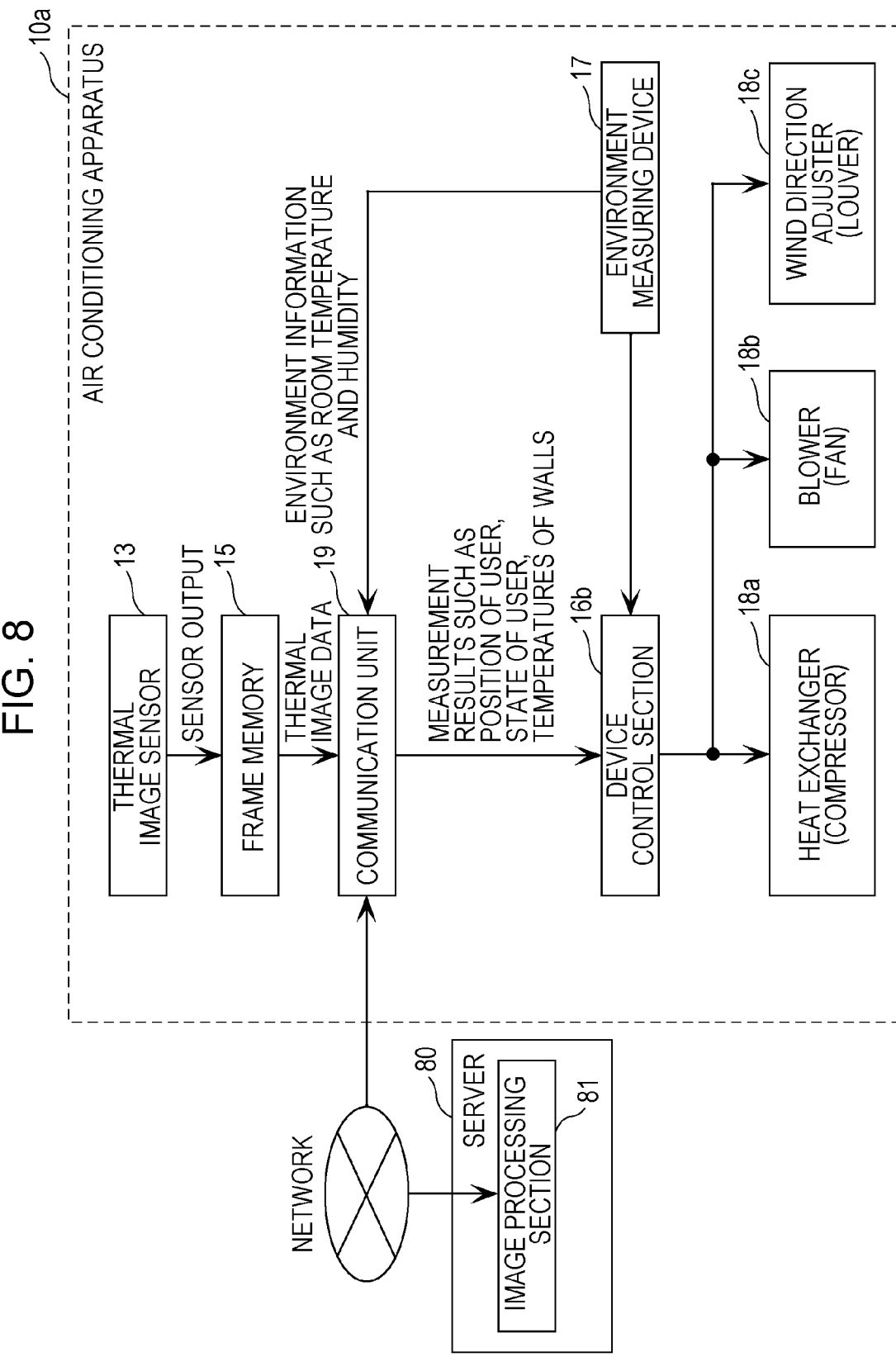
FIG. 8 is a block diagram illustrating the system configuration of an air conditioning apparatus for which an external image processing section is provided.

The image processing section 16a may be provided outside the air conditioning apparatus 10, instead. FIG. 8 is a block diagram illustrating the system configuration of an air conditioning apparatus for which an external image processing section is provided.

As illustrated in FIG. 8, an air conditioning apparatus 10a includes a communication unit 19 and transmits thermal image data to a server 80 through the communication unit 19. In this configuration, the image processing section 81 of the server 80 calculates the position of the user, the state of the user (the temperatures of the user's hands and face, how thickly the user is dressed, an attitude of the user, and the like), the temperatures of the walls, and the like.

Because thermal image data is regularly transmitted to the server 80 through the communication unit 19, deterioration of the sensitivity of the thermal image sensor 13 can be detected and corrected. In the communication performed by the communication unit 19, Wi-Fi (registered trademark), Bluetooth (registered trademark), or the like is used, and the communication unit 19 may transmit thermal image data to the external server 80 through a network such as the Internet. Alternatively, the communication unit 19 may transmit not thermal image data but an output of the thermal image sensor 13.

In addition, environment information, too, is desirably transmitted from the communication unit 19 to the server 80, a reason for which will be described later.

Detection of Position of User

Next, a method for detecting the position of the user and measuring the temperatures of the user's face, hands, and the like on the basis of thermal image data used by the image processing section 16a in order to detect the state of the user and effects produced by the method will be described. In the following description, either the thermal image sensor 20 or the thermal image sensor 30 may be used as the thermal image sensor 13.

First, the method for measuring the temperature of the user's face will be described.

Simple methods for detecting the position of the user and measuring the temperature of the user's face include a method in which an observation pixel 51 of thermal image data in which temperature is 30 to 40° C. is detected in each frame, a position of the detected observation pixel 51 is determined as the position of the user's face, and the temperature of the detected observation pixel 51 is determined as the temperature of the user's face.

Alternatively, a position of an observation pixel 51 in which temperature is 30 to 40° C. and has changed by 1° C. or more from a previous frame may be determined as the position of the user's face. Because positions and temperatures of heat sources other than a person hardly change between frames, the position of the user can be more accurately detected by this method.

According to this type of detection of the position of the user, the air conditioning apparatus 10 can avoid drying the user's skin, for example, by delivering air to areas in which the user is not present (the device control section 16b controls the wind direction adjuster 18c).

In addition, by measuring the temperature of the user's face in the above-described manner, the user can be protected from heatstroke. If the temperature of the user's face is 37° C. or higher, the user can be protected from heatstroke by cooling the air in the room. If the temperature of the user's face remains 37° C. or higher for an extended period of time, the air conditioning apparatus 10 can determine that the user has a cold or influenza, and humidify the room.

The thermal image sensor 13 may measure the temperature of the user's face even if the heat exchanger 18a and the device control section 16b are not being driven. That is, even if the air conditioning apparatus 10 is not operating (off state), the thermal image sensor 13 may continue performing measurement. In this case, when the user is asleep with the device control section 16b and the heat exchanger 18a turned off, for example, power consumption can be reduced and the user can be protected from heatstroke.

The size of each observation pixel 51 is desirably 20 cm×20 cm or smaller. In this case, the temperature of the user's face can be measured more accurately, and the user can be certainly protected from heatstroke. A desirable area of the room in which the air conditioning apparatus 10 is installed varies depending on a model, but the size of each observation pixel 51 is desirably 20 cm×20 cm or smaller, for example, at a position 3.6 m away from an air conditioning apparatus 10 for a room of about 10 m$^2$, 4.5 m away from an air conditioning apparatus 10 for a room of about 13 m$^2$, and 7.2 m away from an air conditioning apparatus 10 for a room of about 19 m$^2$.

If the size of each observation pixel 51 is 20 cm×20 cm or smaller, the total number of observation pixels 51 exceeds 512, but high-resolution measurement can be performed in this case.

If an observation pixel 51 corresponding to the position of the user's face does not move for a certain period of time, it may be determined that the user is asleep. The certain period of time is, for example, 1 to 60 minutes. If it is determined that the user is asleep, the air conditioning apparatus 10 can provide a function of decreasing a noise level by decreasing the wind volume, a function of decreasing the illuminance of a light-emitting diode (LED) or the like turned on while the air conditioning apparatus 10 is operating, a function of reducing the power consumption by turning down the air conditioning, and the like for the user.

The cooling and heating can be turned down by decreasing the number of rotations or rotational speed of the compressor. On the other hand, the cooling and heating can be turned up by increasing the number of rotations or rotational speed of the compressor.

If the position of the user's face significantly changes (e.g., 30 cm or more) during sleep, it may be determined that the user has woken up. By storing rising times of the user day by day on the basis of separately obtained time information, it becomes possible to provide the user with a function of heating the room in winter and cooling the room in summer around the rising time of the user.

Although not illustrated, the air conditioning apparatus 10 may include a storage device (memory) different from the frame memory 15 in order to store information regarding rising times and the like. Whether to use each function provided by the air conditioning apparatus 10 may be selected by the user through a user interface such as a remote control. In this case, the user can select desired functions. The selection of functions may be performed through a network using a smartphone or a television set, instead.

The air conditioning apparatus 10 may also have a function of illuminating the room. In this case, the air conditioning apparatus 10 can provide the user with a function of turning on a light around the rising time of the user. If the air conditioning apparatus 10 includes the communication unit 19, the air conditioning apparatus 10 may turn on a lighting device provided outside the air conditioning apparatus 10 through a communication network.

The temperature of the user's face during sleep may be regularly stored in a storage unit other than the frame memory 15. In this case, a basal body temperature of the user can be estimated from the temperature of the user's face immediately before rising, and the user can be provided with daily basal body temperature information.

If the basal body temperature of a female user is measured, air conditioning may be performed such that the humidity becomes higher than usual in a menstrual period, in which the basal body temperature usually decreases. In this case, the user's skin can be moisturized (this is effective especially in seasons where air is dry), and energy-saving air conditioning can be achieved at all times of the year.

In order to achieve this goal, the air conditioning apparatus 10 desirably includes humidity adjusting means. The humidity adjusting means is of a type that obtains water from an outdoor unit and increases the humidity in the room, for example, but the humidity adjusting means may be of a type that increases the humidity in the room after obtaining water in a water tank provided by the user, instead.

Figure 9:
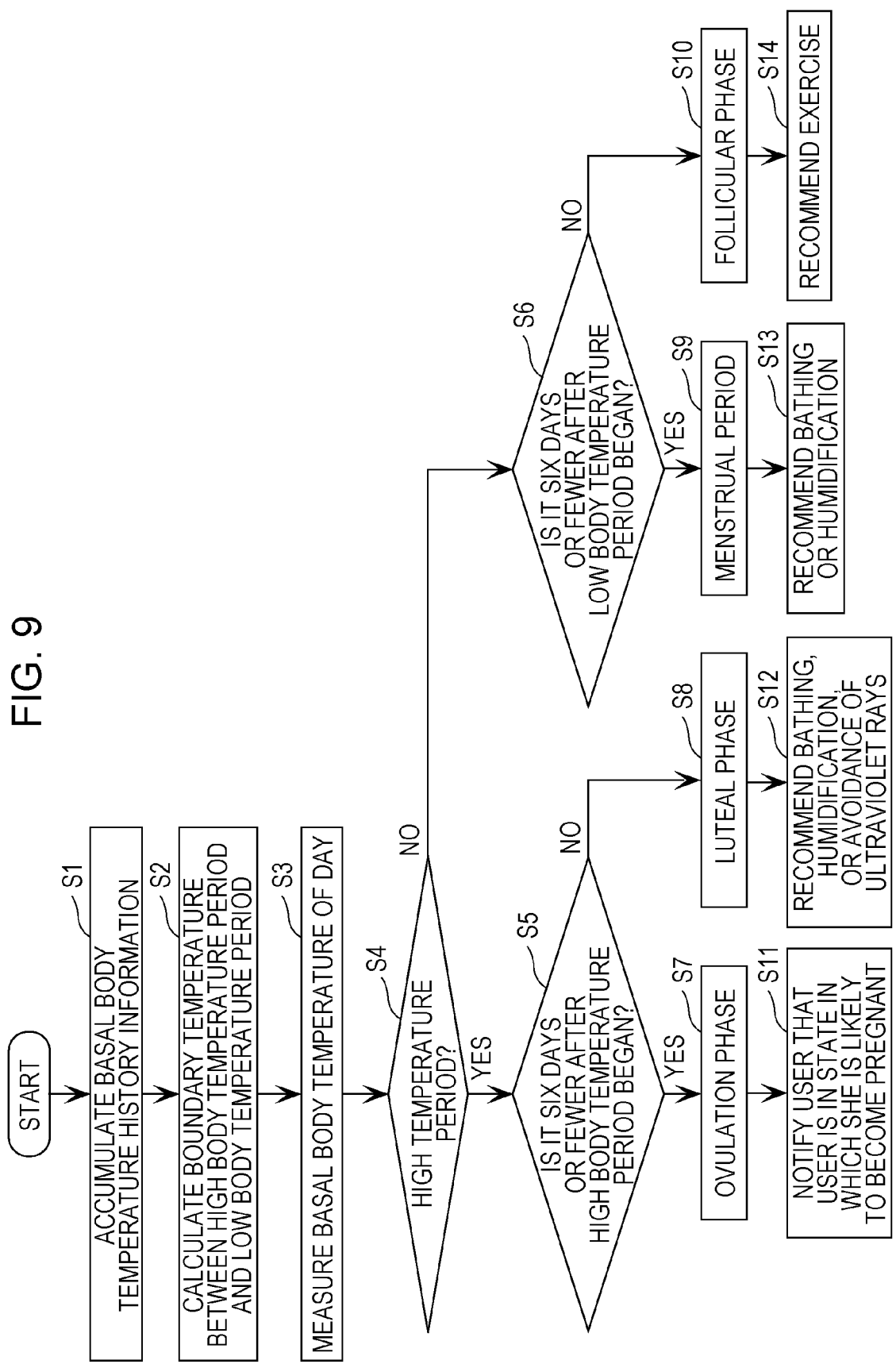
FIG. 9 is a flowchart for determining whether it is a high body temperature period or a low body temperature period now.

In the case of a female user, the air conditioning apparatus 10 may calculate a temperature for distinguishing a high body temperature period and a low body temperature period on the basis of the daily basal body temperatures and determine whether it is the high body temperature period or the low body temperature period now. FIG. 9 is a flowchart for determining whether it is the high body temperature period or the low body temperature period now.

As illustrated in FIG. 9, the air conditioning apparatus 10 accumulates daily basal body temperature history information (S1) and calculates a boundary temperature for distinguishing the high body temperature period and the low body temperature period (S2). The air conditioning apparatus 10 then measures the basal body temperature of the day (S3).

After determining whether the basal body temperature of the day falls into a range corresponding to the high temperature period (YES in S4) or a range corresponding to the low temperature period (NO in S4), the air conditioning apparatus 10 may determine whether it is an ovulation phase, a luteal phase, a menstrual period, or a follicular phase now (S5 to S10) on the basis of whether it is six days or fewer after the high body temperature period or the low body temperature period began. The air conditioning apparatus 10 may then provide recommendations and notifications suitable for the user.

In the ovulation phase, for example, the air conditioning apparatus 10 may notify the user that the user is in a state in which she is likely to become pregnant (S11). In the luteal phase, the air conditioning apparatus 10 may recommend bathing for improving the circulation of the blood or humidification (S12). The luteal phase may be divided into a first half and a second half, and, in the second half, the air conditioning apparatus 10 may recommend avoiding ultraviolet rays.

In the menstrual period, the air conditioning apparatus 10 may recommend bathing for improving the circulation of the blood or humidification (S13). In the follicular phase, the air conditioning apparatus 10 may notify the user that the user is in a state in which she is likely to slim down and recommend exercise (S14).

With this configuration, a female user can easily control her physical condition in accordance with her menstrual cycle.

The air conditioning apparatus 10 may provide notifications and recommendations for a female user several days earlier, instead. In this case, the female user can prepare tools for avoiding ultraviolet rays or arrange her schedule such as making an appointment at a gym. The order of the steps, the determination criterion (the number of days), and the types of notification and recommendation illustrated in the flowchart of FIG. 9 are examples.

If the basal body temperature information is provided for the user using the thermal image sensor 30 of a rotation type (movement type) illustrated in FIG. 5, the frequency of measurement of temperature around the user is desirably increased while the user is asleep. In this case, the basal body temperature can be estimated more accurately.

Methods for increasing the frequency of measurement of temperature in an arbitrary area used by the thermal image sensor 30 of a rotation type include a method in which the rotational speed of thermal image sensor 30 is decreased while temperatures of observation pixels 51 in the arbitrary area are being measured and a method in which the temperatures of the observation pixels 51 in the arbitrary area are repeatedly measured.

The air conditioning apparatus 10 may store daily rising times of the user and measure the temperature of the user's face more frequently before and after the rising times. In this case, the power consumption can be reduced, and an accuracy of measuring the basal body temperature can be improved.

Figure 10A:
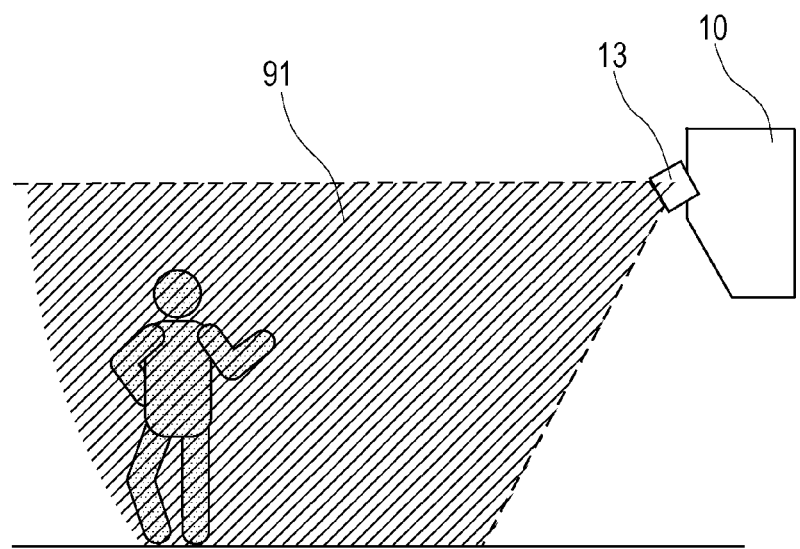
FIG. 10A is a first diagram illustrating an example in which a position of an observation area changes in accordance with a position of a user.
Figure 10B:
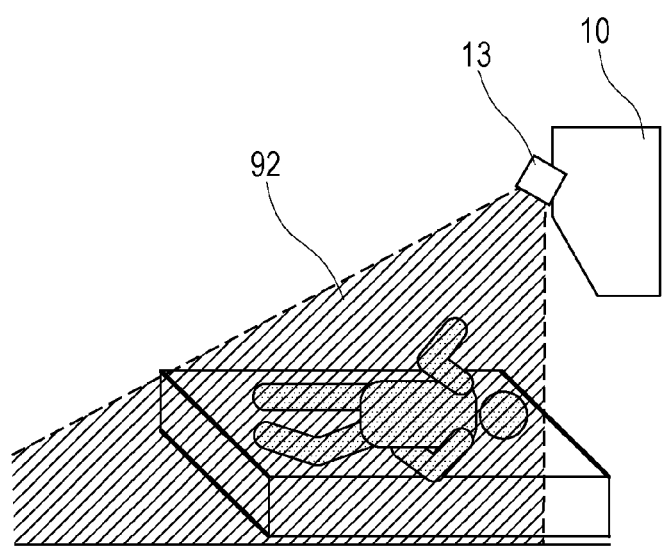
FIG. 10B is a second diagram illustrating an example in which the position of the observation area changes in accordance with the position of the user.

The position of the observation area 50 may be changed in accordance with the state of the user. FIGS. 10A and 10B are diagrams illustrating an example in which the position of the observation area 50 is changed in accordance with the position of the user.

The air conditioning apparatus 10 may include an installation angle changing unit for the thermal image sensor 13 in order to change the position of the observation area 50 in accordance with the state of the user, as indicated by an observation area 91 illustrated in FIG. 10A while the user is awake and an observation area 92 illustrated in FIG. 10B while the user is asleep.

In this case, even if the user is asleep right below the air conditioning apparatus 10 (outside the observation area 91), the air conditioning apparatus 10 can detect the user's face by changing the position of the observation area 91. Because, with this configuration, the number of radiation receiving devices included in the thermal image sensor 13 can be reduced, the thermal image sensor 13 can be fabricated at low cost. The installation angle changing unit is, more specifically, a rotation mechanism such as a stepping motor or a servomotor.

A position of an observation pixel 51 in which temperature is 30° C. or higher and has changed in a certain period of time may be determined as a position of the user's body. The certain period of time is, for example, 1 to 60 minutes. If there is a set of observation pixels 51 that satisfy these conditions, the air conditioning apparatus 10 can determine that the user's body is present at the positions of the set of observation pixels 51.

In another example, a position of an observation pixel 51 in which temperature is 25° C. or higher may be determined as the position of the user's body. Alternatively, a position of an observation pixel 51 in which temperature is higher than a room temperature by a certain value or more and has changed in a certain period of time may be determined as the position of the user's body.

In addition, an attitude of the user can be detected on the basis of a shape of the set of observation pixels 51.

In addition, the air conditioning apparatus 10 can estimate a height of the user on the basis of a length (length in the Y direction) of the set of observation pixels 51 at which the user's body is present. In this method, because the length of the set of observation pixels 51 corresponding to the user's body changes depending on the attitude (standing, sitting, or the like) of the user, it is difficult to estimate the height of the user accurately. By regularly storing results of measurement of the length of the set of observation pixels 51 for the user, however, the height of the user can be estimated from a maximum value of the length of the set of observation pixels 51.

Since the height of the user can be estimated, the user can be identified on the basis of the height, and air conditioning can be performed using unique settings for the user. If a desired temperature of the room differs between users, for example, the air conditioning apparatus 10 can identify a user in the room and automatically change a room temperature setting in accordance with the identified user.

A relationship between the length of the set of observation pixels 51 and the height changes depending on a distance between the user and the thermal image sensor 13 (air conditioning apparatus 10). The air conditioning apparatus 10 may therefore include means for estimating the distance between the user and the thermal image sensor 13. In this case, the height of the user can be estimated more accurately.

As the means for estimating the distance between the user and the air conditioning apparatus 10, means for measuring a distance between the air conditioning apparatus 10 and a floor may be used. If non-contact distance measuring means of a laser focus type or an ultrasonic wave type is mounted on a bottom surface of the air conditioning apparatus 10, the distance to the floor may be measured.

In the air conditioning apparatus 10, directions (angles) of the observation pixels 51 from the thermal image sensor 13 are known (predetermined). The air conditioning apparatus 10 can therefore calculate a distance between each observation pixel 51 and the floor right below the air conditioning apparatus 10 on the basis of the distance between the floor and the thermal image sensor 13. That is, the distance between the user standing on the floor and the air conditioning apparatus 10 can be calculated.

By calculating the distance between the user and the air conditioning apparatus 10, therefore, the height of the user can be estimated more accurately, and the user can be certainly identified.

Means (remote control setting or the like) for setting the distance between the air conditioning apparatus 10 and the floor may also be provided. If the user or a technician who has installed the air conditioning apparatus 10 inputs a height at which the air conditioning apparatus 10 is installed (the distance between the floor and the air conditioning apparatus 10), the height of the user can be measured more accurately.

The air conditioning apparatus 10 may also include means for measuring how much the air conditioning apparatus 10 is inclined from a direction (vertical direction) perpendicular to the floor. In this case, even if the air conditioning apparatus 10 is inclined, that is, for example, even if a surface on which the air conditioning apparatus 10 is installed is not perpendicular to the floor (not a vertical wall), the height of the user and the distance between the user and the air conditioning apparatus 10 can be estimated more accurately.

In the air conditioning apparatus 10, the thermal image sensor 13 may include lighting means for illuminating the observation area 50 or may be provided next to a lighting device. If the observation area 50 of the thermal image sensor 13 is illuminated, the user can easily understand an area (illuminated area) in which temperature is measured.

It is therefore desirable that the lighting means be dedicated lighting means that illuminates only the observation area 50 of the thermal image sensor 13. In this case, the user can accurately understand the observation area 50.

The thermal image sensor 13 may also include far-infrared radiation means or may be provided next to the far-infrared radiation means. In this case, an optical system of the thermal image sensor 13 is desirably designed such that the intensity of far-infrared radiation received becomes lower as a target to which the far-infrared radiation means emits the far-infrared radiation becomes further.

The air conditioning apparatus 10 having such a configuration can detect a distance between each portion of the observation area 50 and the thermal image sensor 13 by comparing thermal image data obtained by the thermal image sensor 13 when far-infrared radiation is emitted to the observation area 50 with thermal image data obtained by the thermal image sensor 13 when far-infrared radiation is not emitted. This is because an observation pixel 51 in which a difference between thermal image data while far-infrared radiation is being emitted and thermal image data while far-infrared radiation is not being emitted is large is an observation pixel 51 close to the thermal image sensor 13. As a result, the air conditioning apparatus 10 can detect an air current obstacle (a cabinet beside the air conditioning apparatus 10 or the like) and deliver air to the user while avoiding the obstacle. By not delivering air to an obstacle, for example, air conditioning can be efficient, thereby reducing the power consumption.

In addition, by detecting the attitude of the user as described above, the air conditioning apparatus 10 can detect observation pixels 51 corresponding to the user's hands and feet. That is, the air conditioning apparatus 10 can measure temperatures of the observation pixels 51 corresponding to the user's hands and feet.

As a result of an examination conducted by the present inventors, it has been found that although a comfortable temperature of hands is somewhat different between individuals, most people feel comfortable when the temperature of their hands is about 30° C. The air conditioning apparatus 10 can therefore save the user from adjusting the temperature of the room by measuring the temperature of the user's hands and performing automatic control so that the temperature of the user's hands becomes about 30° C.

Such automatic control can produce an effect of preventing excessive heating or cooling for a user who does not operate the air conditioning apparatus 10, such as a sleeping user or a young child, and also achieve energy saving.

In this automatic control, if the air conditioning apparatus 10 is cooling the room in summer and the temperature of the user's hands is lower than 30° C., for example, the air conditioning apparatus 10 may turn down the cooling. If the temperature of the user's hands is higher than 30° C., the air conditioning apparatus 10 may turn up the cooling. The cooling can be turned up by exchanging more heat using the heat exchanger 18a and turned down by exchanging less heat using the heat exchanger 18a. If the heat exchanger 18a is a compressor, the cooling can be turned up by increasing the number of rotations and turned down by decreasing the number of rotations. The same holds for heating in winter.

By estimating a thermal sensation of the user on the basis of the temperature of the user's hands in this manner and controlling (driving or stopping) the heat exchanger 18a, heating is not performed when the temperature of the user's hands is higher than 30° C., and cooling is not performed when the temperature of the user's hands is lower than 30° C. That is, power can be saved.

The temperature of the user's hands increases and the user feels hot when temperature and humidity are high. In the above automatic control, therefore, dehumidification may be performed instead of turning up cooling.

Although the air conditioning apparatus 10 includes the heat exchanger 18a here, an air conditioning apparatus including heating means (heating unit) such as a heater or a device that burns kerosene or an air conditioning apparatus having humidification and dehumidification functions instead of heating and cooling functions may perform the same control.

If the temperature of the user's hands is high during heating, for example, driving power of the heat exchanger 18a is reduced to turn down the heating. If the temperature of the user's hands is high during cooling, the driving power of the heat exchanger 18a is increased to turn up the cooling. Alternatively, if the temperature of the user's hands is high, heating performed by the heating means or humidification may be turned down or dehumidification may be turned up. This is because the temperature of the user's hands increases when temperature and humidity are high and decrease when temperature and humidity are low.

Alternatively, the same automatic control may be performed on the basis of a temperature of the user's feet, not hands.

Although the same automatic control may be performed by measuring a temperature of a body part other than hands and feet, the temperature of hands or feet, especially fingers or toes, is suitable to estimate the comfort of the user. The present inventors have found that the temperature of hands or feet is more relevant to the thermal sensation and comfort of the user than any other body part. By using the temperature of the user's hands or feet, therefore, accurate temperature control can be achieved.

User Interface

Figure 11A:
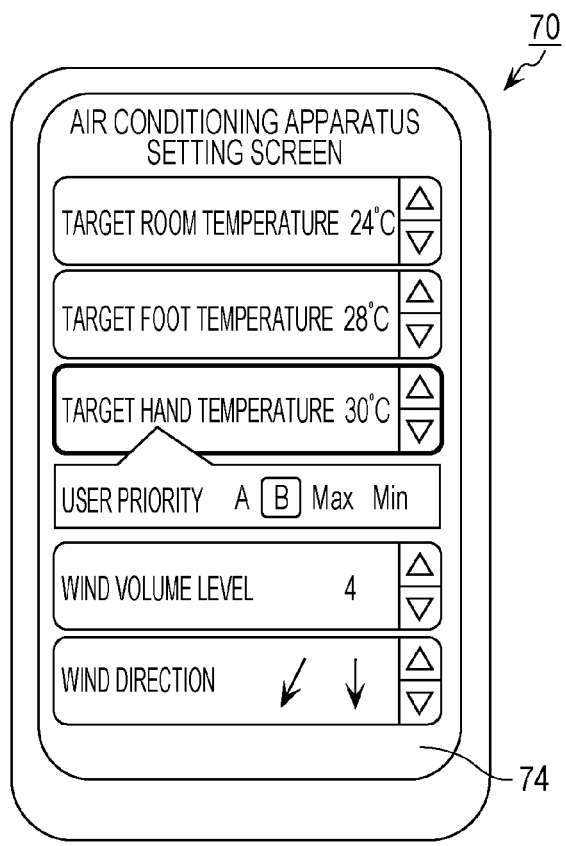
FIG. 11A is a first diagram illustrating an example of a user interface of the air conditioning apparatus.
Figure 11B:
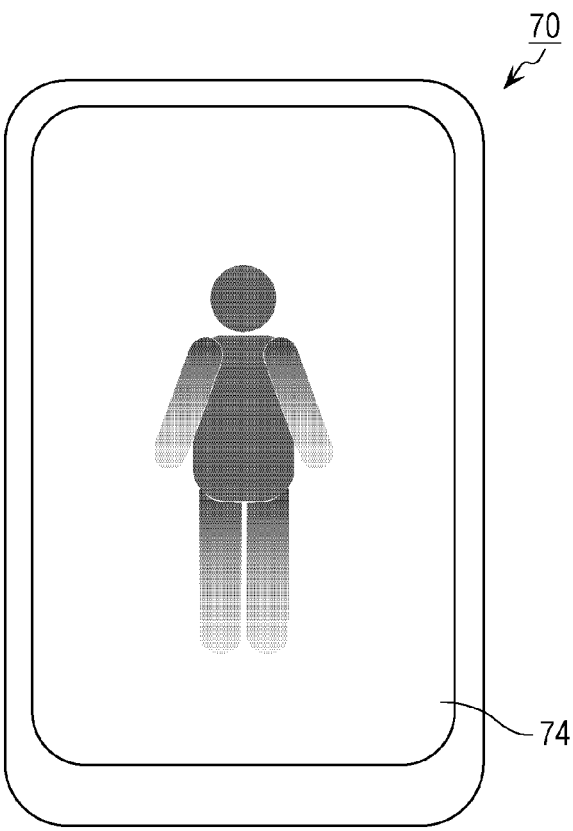
FIG. 11B is a second diagram illustrating the example of the user interface of the air conditioning apparatus.
Figure 11C:
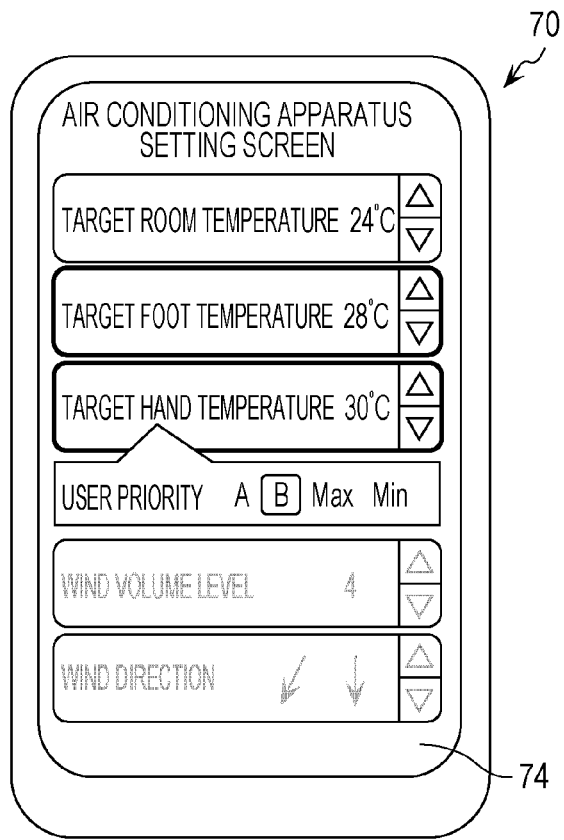
FIG. 11C is a third diagram illustrating the example of the user interface of the air conditioning apparatus.

A user interface of the above-described air conditioning apparatus 10 will be described. FIGS. 11A, 11B, and 11C are diagrams illustrating an example of the user interface of the air conditioning apparatus 10.

FIGS. 11A, 11B, and 11C illustrate a remote control 70 including a display unit 74 having an input function, such as a touch panel, as an example of the user interface. The user interface is not limited to this, and an input unit (setting reception unit) and the display unit 74 may be separately provided. The user interface of the air conditioning apparatus 10 need not be such a dedicated remote control. A smartphone or a tablet terminal on which an application is installed may be used as the remote control 70 of the air conditioning apparatus 10, instead.

The user interface of the air conditioning apparatus 10 has the following characteristics.

In the case of a conventional air conditioning apparatus, the user usually sets temperature of the room, a wind volume, and wind direction using a remote control. In the case of the air conditioning apparatus 10, on the other hand, the user can set a target hand temperature or a target foot temperature as illustrated in FIG. 11A. The user can thus set a desired hand temperature (foot temperature) as a target temperature.

Although a specific target hand temperature or foot temperature is set in the user interface illustrated in FIG. 11A, options (icons) such as "hot", "moderate", and "cold" may be displayed on the user interface, instead. If the icons are displayed, the number of letters displayed on the user interface becomes small, and sizes of the icons can be increased, thereby increasing visibility. In addition, a user who does not know his/her optimal hand temperature can simply select a type of air conditioning in accordance with his/her hand temperature. The icons "hot", "moderate", and "cold", for example, correspond to the user's hand temperatures of 31° C., 30° C., and 29° C., respectively.

The air conditioning apparatus 10 may be configured to be able to select a mode (hand temperature control mode) in which the air conditioning apparatus 10 is controlled on the basis of hand temperature or a mode (foot temperature control mode) in which the air conditioning apparatus 10 is controlled on the basis of foot temperature. In this case, for example, the user selects a mode through the user interface.

In FIG. 11A, "target hand temperature" is surrounded by a bold line. This means that the user has selected the hand temperature control mode.

The user can change the mode in accordance with the state of the user (e.g., how thickly the user is dressed), for example, by selecting the foot temperature control mode when the user is barefoot and the hand temperature control mode when the user is in slippers. In this case, the air conditioning apparatus 10 can estimate the thermal comfort of the user more accurately and control air conditioning.

As illustrated in FIG. 11B, a thermal image (a person icon in FIG. 11B) visually indicating the current body temperature of the user may be displayed on the user interface. A color of the icon may vary depending on the body temperature of the user (in FIG. 11B, the denser the color, the higher the body temperature of the user). For example, a body part in which temperature is high may be displayed in red, and a body part in which temperature is low may be displayed in blue.

In this case, the user can understand his/her own body temperature at a glance. The user can therefore easily set the target hand temperature or the target foot temperature.

The user interface illustrated in FIG. 11B may enable the user to change the target temperature of the room, the target hand temperature, or the target foot temperature from the screen. The user can change the target temperature of the room, the target hand temperature, or the target foot temperature, for example, by touching or rubbing a portion of the user interface corresponding to a body part whose temperature the user desires to increase.

Figure 11D:
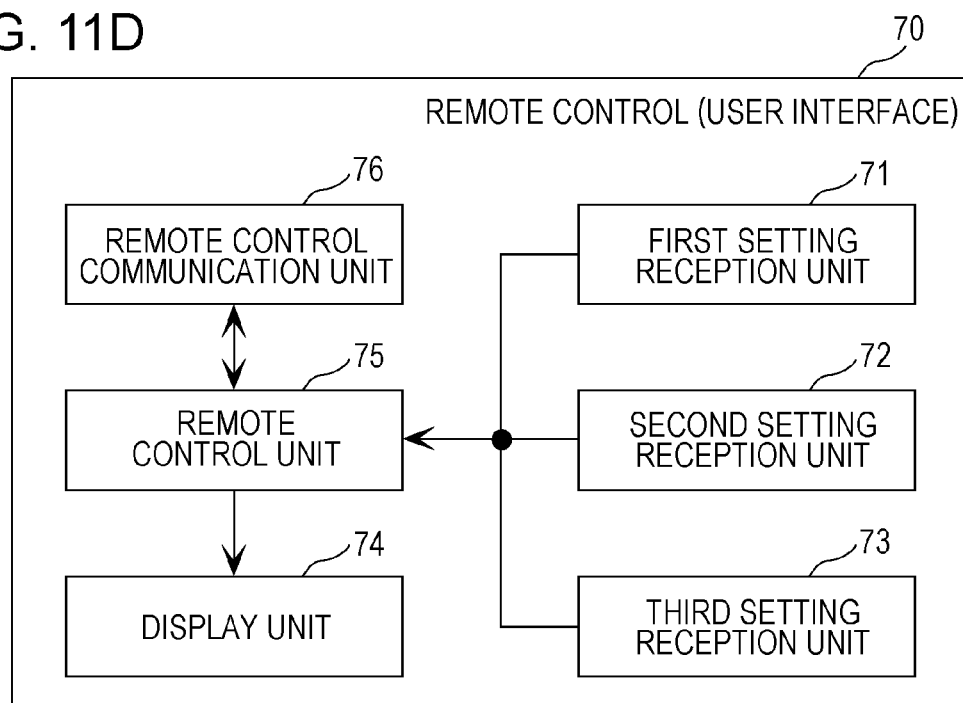
FIG. 11D is a block diagram illustrating the user interface for the air conditioning apparatus.

The system configuration of the remote control 70 (user interface) will be described hereinafter. FIG. 11D is a block diagram illustrating the system configuration of the remote control 70.

As illustrated in FIG. 11D, the remote control 70 includes a first setting reception unit 71, a second setting reception unit 72, a third setting reception unit 73, the display unit 74, a remote control unit (control unit) 75, and a remote control communication unit (communication unit) 76.

The remote control 70 is the user interface of the air conditioning apparatus 10 including the thermal image sensor 13 for generating a thermal image indicating the distribution of temperature in a target area (e.g., a room).

The first setting reception unit 71 receives setting of the target temperature of the room. More specifically, the first setting reception unit 71 is a touch panel (a field for setting the target temperature of the room illustrated in FIG. 11A) on the display unit 74. The first setting reception unit 71 may be hardware keys, instead.

The second setting reception unit 72 receives setting of a target temperature of a particular portion of the target area. The second setting reception unit 72 receives setting of a target temperature of at least any of a position of a person's face, positions of the person's hands, or positions of the person's feet as the target temperature of the particular portion. More specifically, the second setting reception unit 72 is a touch panel (fields for setting the target foot temperature and the target hand temperature illustrated in FIG. 11A). The second setting reception unit 72 may be hardware keys, instead.

The third setting reception unit 73 receives setting of the wind direction and the wind volume of the air conditioning apparatus 10. More specifically, the third setting reception unit 73 is a touch panel (areas for setting a wind volume level and wind direction illustrated in FIG. 11A). The third setting reception unit 73 may be hardware keys, instead.

As described later, if the first setting reception unit 71 and the second setting reception unit 72 have received setting of target temperatures, the third setting reception unit 73 does not receive setting of the wind direction and the wind volume. More specifically, for example, the remote control unit 75 does not determine an input received by the third setting reception unit 73 as a valid input, or does not transmit an input received by the third setting reception unit 73 to the air conditioning apparatus 10 as a command.

The display unit 74 displays the screens illustrated in FIGS. 11A to 11C. The display unit 74 displays the target temperature of the room, the target foot temperature, the target hand temperature, the wind direction, and the wind volume. More specifically, the display unit 74 is a liquid crystal panel or an organic electroluminescent (EL) panel.

The display unit 74 also displays a temperature of a position of a person detected on the basis of thermal image data. The position of a person at least include a position of the person's face, positions of the person's hands, or positions of the person's feet. More specifically, the display unit 74 displays a body temperature of the person using the person icon illustrated in FIG. 11B, but a value indicating the temperature may be displayed, instead.

As described later, if the first setting reception unit 71 and the second setting reception unit 72 have received setting of target temperatures, the display unit 74 indicates that setting to the third setting reception unit 73 is invalid. More specifically, as illustrated in FIG. 11C, the display unit 74 washes out (displays in gray) the fields of the wind direction and the wind volume.

The remote control unit 75 transmits commands corresponding to setting received by the first setting reception unit 71, the second setting reception unit 72, and the third setting reception unit 73 to the air conditioning apparatus 10 through the remote control communication unit 76. The remote control unit 75 also displays the person icon indicating body temperature illustrated in FIG. 11B on the display unit 74 on the basis of thermal image data (information regarding a thermal image) received by the remote control communication unit 76.

The remote control communication unit 76 is a communication module for allowing the remote control unit 75 to transmit commands to the air conditioning apparatus 10. The remote control communication unit 76 receives thermal image data from the air conditioning apparatus 10 (thermal image sensor 13). The remote control communication unit 76 is, for example, a wireless communication module employing infrared radiation. The air conditioning apparatus 10 includes a communication unit that communicates with the remote control communication unit 76.

Comfort of User

The comfort of the user is determined not only by a body surface temperature of the user but also a deep body temperature of the user. For this reason, temperatures of at least two body parts, one having a deep body temperature (face, neck, or the like) and one having a body surface temperature (hands, feet, or the like), namely a face temperature and a hand temperature, or a neck temperature and a foot temperature, may be measured. In this case, the comfort of the user can be estimated more accurately to control air conditioning.

The air conditioning apparatus 10 (image processing section 16a) may determine on the basis of thermal image data whether or not the user wears glasses, a gauze mask, gloves, socks, slippers, or the like. The air conditioning apparatus 10 may include means for notifying the user, on the basis of a result of the determination, that an accuracy of measuring temperatures is low since the user wears glasses, a gauze mask, gloves, socks, slippers, or the like. By displaying a warning on the user interface illustrated in FIG. 11A or 11B, for example, the notification can be issued to the user.

As a result, the user can understand that the accuracy of measuring temperatures is low. The user can then remove a factor that has decreased the accuracy or establish a mode in which another indicator that achieves a high measurement accuracy is used.

If "the accuracy of measuring hand temperatures is low due to gloves" is displayed on the user interface, the user can establish the foot temperature control mode or remove the gloves. The accuracy of measuring temperatures offered by the air conditioning apparatus 10 can thus be increased.

At this time, audio notification means may be used in addition to the notification that uses letters. In this case, a real-time notification can be issued to the user. In addition, if both the audio and letter notification means are used, the user is likely to notice the notification even if the room is noisy or the user is using an audio device.

Whether the user wears a gauze mask or any other accessory can be determined by the following method. Whether the user wears a gauze mask can be determined on the basis of a difference between a temperature of an observation pixel 51 corresponding to the user's eyes and a temperature of an observation pixel 51 corresponding to the user's mouth. When the user is in a gauze mask, the temperature of the observation pixel 51 corresponding to the user's mouth becomes higher than usual. Whether the user is in glasses can be determined by the same method because the temperature of the observation pixel 51 corresponding to the user's eyes decreases. Whether the user wears gloves can be determined by comparing a temperature of an observation pixel 51 corresponding to a palm of the user and an observation pixel 51 corresponding to an upper arm of the user. Whether the user wears socks or slippers can be determined by comparing a temperature of an observation pixel 51 corresponding to a toe of the user and a temperature of an observation pixel 51 corresponding to a calf of the user.

When the thermal image sensor 13 determines whether or not the user wears glasses, a gauze mask, gloves, socks, slippers, or the like, the size of each observation pixel 51 is desirably 10 cm×10 cm or smaller. By setting the size of the observation pixel 51 to 10 cm×10 cm or smaller, whether the user wears an accessory can be determined more accurately.

The desirable area of the room in which the air conditioning apparatus 10 is installed varies depending on the model, but the size of each observation pixel 51 is desirably 10 cm×10 cm or smaller, for example, at a position 3.6 m away from an air conditioning apparatus 10 for a room of about 10 m$^2$, 4.5 m away from an air conditioning apparatus 10 for a room of about 13 m$^2$, and 7.2 m away from an air conditioning apparatus 10 for a room of about 19 m$^2$. When the size of each observation pixel 51 is reduced, the total number of observation pixels 51 desirably exceeds 512.

The air conditioning apparatus 10 may measure a temperature of a top surface of the user's clothes on the basis of thermal image data. In this case, thermal insulation properties of the user's clothes (how thickly the user is dressed) can be estimated as a state of the user. If the temperature of the top surface of the user's clothes is low, the thermal insulation properties of the user's clothes are determined to be high, and cooling is turned up (heating is turned down). Because a relationship between the thermal sensation of the user and the temperature of the user's hands or feet changes depending on how thickly the user is dressed, air conditioning according to the thermal sensation of the user can be achieved by estimating the user's clothes and correcting a setting temperature on the basis of the user's clothes.

The relationship between the thermal sensation of the user and the temperature of the user's hands or feet is also affected by radiant heat from the room. The air conditioning apparatus 10 therefore desirably includes means for measuring a temperature distribution in the room. In this case, air conditioning according to the thermal sensation of the user can be achieved since the radiant heat from the room is taken into consideration. The measurement of the temperature distribution in the room is performed, for example, by the thermal image sensor 13.

The relationship between the thermal sensation of the user and the temperature of the user's hands or feet is also affected by humidity. The air conditioning apparatus 10 therefore desirably includes means for measuring the humidity in the room. In this case, air conditioning according to the thermal sensation of the user can be achieved since the humidity of the room is taken into consideration. The measurement of the humidity is performed, for example, by a common hygrometer.

The relationship between the thermal sensation of the user and the temperature of the user's hands or feet is also affected by the amount of movement and the attitude of the user. The air conditioning apparatus 10 therefore desirably includes means for measuring the amount of movement and the attitude of the user. In this case, air conditioning according to the thermal sensation of the user can be achieved since the amount of movement and the attitude of the user is taken into consideration. The amount of movement and the attitude of the user are calculated, for example, from an image obtained by the thermal image sensor 13.

The relationship between the thermal sensation of the user and the temperature of the user's hands or feet changes in accordance with a circadian rhythm. The air conditioning apparatus 10 therefore desirably includes means for measuring time (clock unit). In this case, air conditioning according to the thermal sensation of the user can be achieved since effects of the circadian rhythm are taken into consideration.

The relationship between the thermal sensation of the user and the temperature of the user's hands or feet is also affected by activities of the user, such as eating and bathing. The air conditioning apparatus 10 therefore desirably includes means for detecting the activities of the user, such as eating and bathing. In this case, air conditioning according to the thermal sensation of the user can be achieved since the activities of the user are taken into consideration. When the user is eating, for example, the activity can be detected by detecting a heat source on a dining table. Alternatively, the air conditioning apparatus 10 may detect that the user is eating on the basis of a period of time for which the user has stayed around the dining table or the number of persons around the dining table. When the user is bathing, on the other hand, the activity can be detected on the basis of information regarding the body temperature of the user. The thermal image sensor 13 can detect such activities of the user.

The relationship between the thermal sensation of the user and the temperature of the user's hands or feet is also affected by a season. The air conditioning apparatus 10 therefore desirably includes means for measuring time and outside air temperature. In this case, air conditioning according to the thermal sensation of the user can be achieved since the season is taken into consideration.

The relationship between the thermal sensation of the user and the temperature of the user's hands or feet is also affected by sweating of the user. The air conditioning apparatus 10 therefore desirably includes means for measuring a sweating rate of the user. In this case, air conditioning according to the thermal sensation of the user can be achieved since the sweating of the user is taken into consideration. The means for measuring the sweating rate of the user is, for example, a wearable sensor or a far-infrared spectrometer that measures the electrical conductivity of the user's skin.

The sweating rate of the user may be estimated in the following manner. In general, moisture tends to absorb light having a wavelength of 6 to 7 μm. For this reason, if the air conditioning apparatus 10 includes means for detecting infrared radiation of equal to or shorter than 7 μm and means for detecting infrared radiation of equal to or longer than 7 μm, a humidity distribution can be measured on the basis of an intensity ratio of infrared radiation received by these measuring means. If humidity around the user is higher than humidity in other areas of the room, it can be estimated that humidity has increased due to sweating. The air conditioning apparatus 10 may thus estimate the sweating rate on the basis of the humidity distribution around the user.

Alternatively, the air conditioning apparatus 10 may perform the same measurement on the basis of near-infrared radiation having a wavelength of 1.5 μm or 1.9 μm absorbed by moisture. If such spectroscopy employing infrared radiation is performed, the air conditioning apparatus 10 can measure the sweating rate of the user in a non-contact manner. That is, the air conditioning apparatus 10 can measure the sweating rate of the user who does not wear a wearable sensor.

Alternatively, the air conditioning apparatus 10 may estimate the sweating rate by measuring moisture on a surface of the user's skin exposed from the user's clothes, such as face, neck, hands, or feet, through spectroscopy employing infrared radiation.

The air conditioning apparatus 10 may measure a temperature of the user's nose on the basis of thermal image data. In this case, how heavily the user is stressed can be estimated.

In the first embodiment, the air conditioning apparatus 10 estimates the thermal sensation of the user using the temperature of the user's hands or feet and controls air conditioning. Alternatively, the air conditioning apparatus 10 may measure a temperature of the user's cheeks, nose, ears, or chin on the basis of thermal image data. In this case, the thermal sensation of the user can be estimated more accurately. In addition, the thermal sensation of the user can be accurately estimated even when the user wears gloves and slippers.

When the thermal image sensor 13 measures the temperature of the user's cheeks, nose, ears, or chin, the size of each observation pixel 51 is desirably 5 cm×5 cm or smaller. By setting the size of the observation pixel 51 to 5 cm×5 cm or smaller, the temperature of the user's nose can be measured more accurately. The desirable area of the room in which the air conditioning apparatus 10 is installed varies depending on the model, but the size of each observation pixel 51 is desirably 5 cm×5 cm or smaller, for example, at a position 3.6 m away from an air conditioning apparatus 10 for a room of about 10 m$^2$, 4.5 m away from an air conditioning apparatus 10 for a room of about 13 m$^2$, and 7.2 m away from an air conditioning apparatus 10 for a room of about 19 m$^2$. When the size of each observation pixel 51 is reduced, the total number of observation pixels 51 desirably exceeds 512.

The air conditioning apparatus 10 may measure a difference between a temperature of an upper half of the user's body and a temperature of a lower half of the user's body on the basis of thermal image data. In this case, whether the user tends to feel the cold in his/her feet can be determined, and the air conditioning apparatus 10 can turn up heating onto the user's feet. The user can desirably select whether to use such a function through the user interface. In this case, the user can select a desired function.

If there are a plurality of persons in the room in which the air conditioning apparatus 10 is installed, hand temperature (foot temperature) might differ between the persons. The air conditioning apparatus 10 therefore desirably includes means for giving priority to one of the persons. In this case, air conditioning that uses a hand temperature (foot temperature) as a target value can be performed even in a room in which there are a plurality of persons whose hand temperatures (foot temperatures) are different from one another.

The user can give priority to one of the persons, for example, through the user interface. FIG. 11A illustrates an example in which "B" is selected from among four options (icons) of "A", "B", "Max", and "Min".

If data regarding heights of family members are registered in advance, for example, the air conditioning apparatus 10 can measure heights of persons in the room from thermal image data and identify the persons. User names ("father", "sister", or specific names) registered in advance instead of "A" and "B" may be displayed as options (icons).

If "Max" illustrated in FIG. 11A is selected, the air conditioning apparatus 10 enters a mode in which a highest hand temperature of the room becomes the target hand temperature. If "Min" illustrated in FIG. 11A is selected, the air conditioning apparatus 10 enters a mode in which a lowest hand temperature of the room becomes the target hand temperature. Such modes may be provided as options.

In addition, a mode in which a body temperature of a person closest to the air conditioning apparatus 10 is used as an indicator or a mode in which a body temperature of a person furthest from the air conditioning apparatus 10 is used as an indicator may be provided. In addition, a mode in which an arbitrary position is set and a body temperature of a person closest to the set position is used as an indicator may be provided.

By providing a mode in which a person is selected on the basis of the position and a body temperature of the selected person is used as an indicator, control that offers a higher degree of freedom to the user is achieved.

If body temperatures (hand temperatures or foot temperatures) of a plurality of persons in the room are different from one another, a different ambient temperature environment may be provided for each user by adjusting the wind direction and the wind volume and, during cooling, delivering air to a person whose body temperature is high or, during heating, delivering air to a person whose body temperature is low. In this case, an indoor environment in which all the plurality of persons can feel comfortable can be provided.

If there is only one person in the room, the wind direction and the wind volume may be adjusted such that two or more body parts (e.g., hands and feet) of the user achieve their respective target temperatures. In this case, for example, the target hand temperature and the target foot temperature is surrounded by bold lines on the user interface as illustrated in FIG. 11C (selected by the user). In order to achieve target temperatures at two or more body parts, the wind direction and the wind volume must be adjusted.

That is, in this case, it is difficult for the user to set the wind direction and the wind volume through the user interface. As illustrated in FIG. 11C, the wind direction and the wind volume are washed out (displayed in gray) on the user interface. Alternatively, the user may be notified that the user cannot change the wind direction and the wind volume, instead of washing out the wind direction and the wind volume.

The air conditioning apparatus 10 may detect how the room is arranged on the basis of thermal image data regarding the room. In this case, air conditioning according to the activities of the user can be performed.

Since the air conditioning apparatus 10 can detect the position of the user's face while the user is asleep, the air conditioning apparatus 10 can also detect a position of a pillow of the user. The air conditioning apparatus 10 can then avoid drying the user's face skin or throat by not delivering air to the user's face while the user is asleep.

The air conditioning apparatus 10 may detect a position of the dining table and store data regarding the position of the dining table in a storage unit of the air conditioning apparatus 10. In this case, when the user stays around the dining table, for example, the air conditioning apparatus 10 can estimate that the user is eating, and, in winter, turn down heating. The air conditioning apparatus 10 can detect a place where the user stays for 10 to 60 minutes in a certain period of time (e.g., 7:00 a.m.) as the dining table.

If a temperature of the observation pixel 51 corresponding to the dining table is 80 to 100° C., the air conditioning apparatus 10 can determine that a one-pot meal is served. If the air conditioning apparatus 10 determines in winter that a one-pot meal is served, the air conditioning apparatus 10 can further turn down the heating. At this time, an air conditioning apparatus 10 having a dehumidification function may turn up dehumidification as well as turning down the heating. The user may select whether to use such functions through the user interface such as the remote control 70. In this case, the user can select a desired function.

Modifications of First Embodiment

The air conditioning apparatus 10 according to the first embodiment has been described. Although the air conditioning apparatus 10 is installed in a room in the first embodiment, the air conditioning apparatus 10 may be installed in an automobile, instead. A specific example of an air conditioning apparatus installed in an automobile will be described later.

Although the air conditioning apparatus 10 measures the temperatures of the user's hands and feet using the thermal image sensor 13 in the first embodiment, the temperatures of the user's hands and feet may be measured using a wearable temperature measuring device (a wristwatch wearable terminal, a terminal incorporated into a shoe (or a sock), or the like) including a communication unit, instead. In this case, the same advantageous effects can be produced by regularly notifying the air conditioning apparatus 10 of the temperatures of the user's hands and feet through the communication unit using the temperature measuring device. A method in which the thermal image sensor 13 is used is advantageous in that temperatures of hands and feet of a user who does not wear the temperature measuring device can be measured.

Although the air conditioning apparatus 10 including the thermal image sensor 13 has been described in the first embodiment, the thermal image sensor 13 and the air conditioning apparatus 10 may be separately provided, for example, and connected to each other by a network through a communication unit, instead. In this case, however, positions at which the thermal image sensor 13 and the air conditioning apparatus 10 are provided need to be appropriately adjusted, and the configuration according to the first embodiment is advantageous in that the positions of the thermal image sensor 13 and the air conditioning apparatus 10 need not be adjusted.

In the first embodiment, components such as the thermal image sensor 13, the frame memory 15, and the arithmetic processing unit 16 may be provided as a single module and mounted on the air conditioning apparatus 10. In addition, in the first embodiment, the thermal image sensor 13 and the other components (the frame memory 15, the arithmetic processing unit 16, and the like) may be provided as separate modules and mounted on the air conditioning apparatus 10.

In the first embodiment, the arithmetic processing performed by the arithmetic processing unit 16 may be achieved by a program installed from the outside. The program may be provided from a storage medium (a compact disc (CD), an external memory, or the like) or installed from a server (cloud server) through the Internet.

The same holds for second to fifth embodiments, which will be described hereinafter.

Second Embodiment

Underlying Knowledge Forming Basis of Second Embodiment

In the second embodiment, a thermal image sensor will be described. First, underlying knowledge forming a basis of the thermal image sensor according to the second embodiment will be described.

Since the thermal image sensor 20 according to the first embodiment, in which radiation receiving devices are arranged in a matrix, includes many radiation receiving devices, the size of the thermal image sensor 20 is large and cost is high. By reducing the size of each of the radiation receiving devices arranged in a matrix, the cost of the thermal image sensor 20 can be reduced, but in this case, the sensitivity of the thermal image sensor 20 decreases, thereby decreasing the accuracy of measuring temperatures.

On the other hand, since the thermal image sensor 30, in which radiation receiving devices are arranged in a line, includes fewer radiation receiving devices than the thermal image sensor 20, cost is low. A time taken for the thermal image sensor 30, however, to measure thermal image data of one frame is long, namely several seconds. It is therefore difficult for the thermal image sensor 30 to measure a movement (the amount of movement) of a moving object such as a person or a pet.

By measuring the amount of movement, air conditioning can be controlled while taking into consideration the amount of movement of the user. If the amount of movement of the user is large, for example, the body temperature of the user increases. More appropriate control can therefore be performed by measuring the amount of movement and turning up cooling or turning down heating.

A thermal image sensor that measures the amount of movement has not so far been examined in detail. In Japanese Unexamined Patent Application Publication No. 2010-216688, a method is disclosed for generating high-resolution two-dimensional thermal image data by displacing a thermal image sensor in which radiation receiving devices are arranged in one dimension (in a line) by a certain distance at a change point in the scanning direction before the thermal image sensor starts next scanning operation. In Japanese Unexamined Patent Application Publication No. 2010-216688, however, measurement of the amount of movement is not examined. In the second embodiment, a cost-efficient thermal image sensor suitable to measure the amount of movement will be described.

Configuration

Specific examples of the thermal image sensor according to the second embodiment will be described hereinafter. Although a plurality of types of thermal image sensors will be described in the second embodiment, these thermal image sensors are examples. A new thermal image sensor may be fabricated by combining some of these thermal image sensors.

Figure 12:
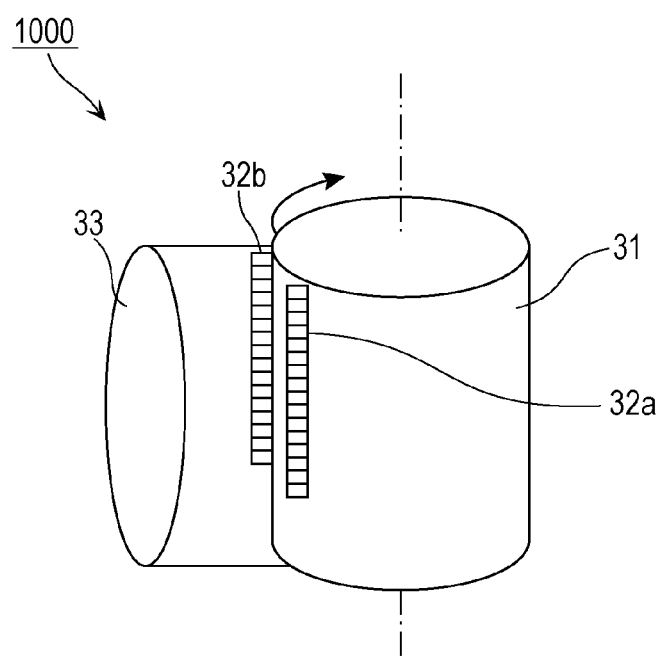
FIG. 12 illustrates an appearance of a thermal image sensor according to a second embodiment.
Figure 13:
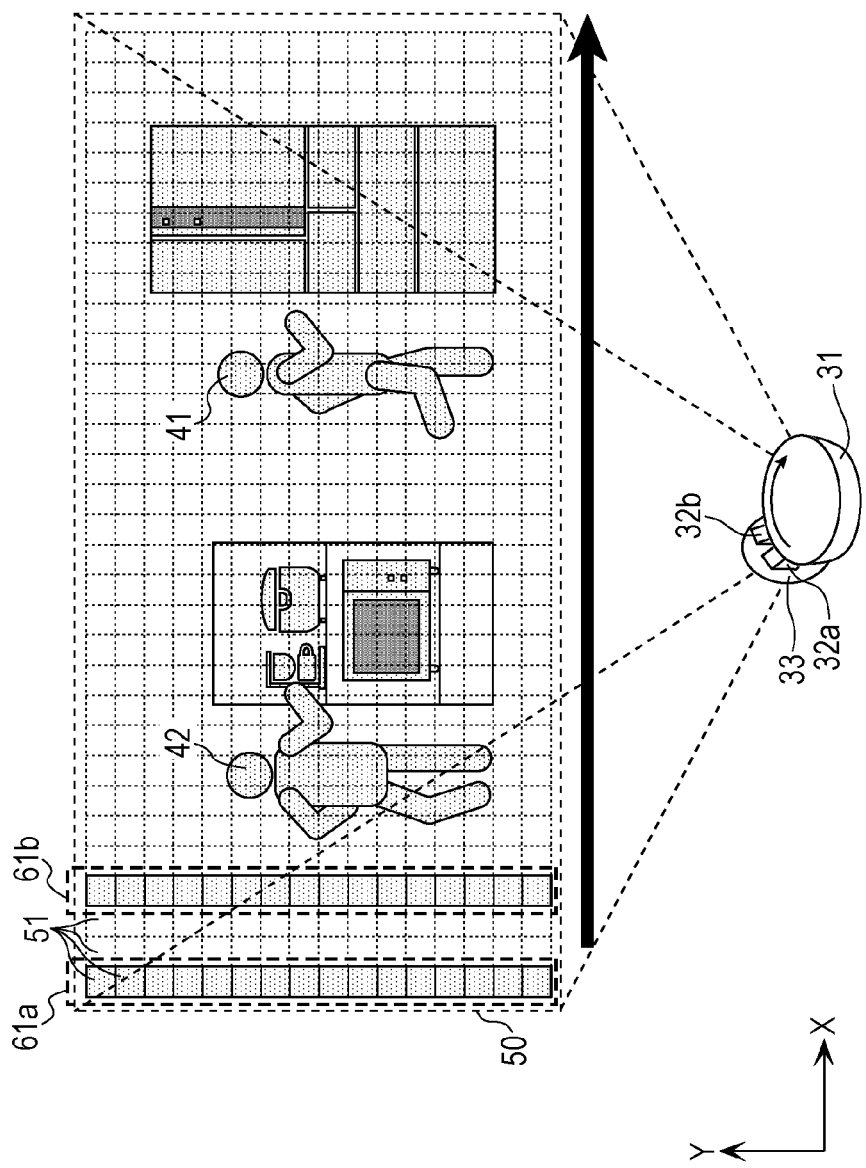
FIG. 13 is a diagram illustrating a method for measuring a temperature distribution used by the thermal image sensor according to the second embodiment.

First, the configuration of the thermal image sensor according to the second embodiment will be described. FIG. 12 is a diagram illustrating an appearance of the thermal image sensor according to the second embodiment. FIG. 13 is a diagram illustrating a method for measuring a temperature distribution used by the thermal image sensor according to the second embodiment.

As with the thermal image sensor 30, a thermal image sensor 1000 illustrated in FIG. 12 includes the rotation unit 31 and the lens 33. Unlike the thermal image sensor 30, however, the thermal image sensor 1000 includes two one-dimensional radiation receiving sensors 32 (one-dimensional radiation receiving sensors 32a and 32b), in each of which radiation receiving devices are arranged in a line.

The thermal image sensor 1000 can therefore simultaneously measure temperatures of observation pixels 51 included in 1×16 line observation areas 61a and 61b as illustrated in FIG. 13. As the rotation unit 31 rotates, the line observation areas 61a and 61b move rightward (positive direction along an X axis) in FIG. 13. That is, the observation pixels 51 whose temperatures have been measured in the line observation area 61b are then included in the line observation area 61a and the temperatures thereof are measured again.

In the thermal image sensor 1000, therefore, thermal image data regarding observation pixels 51 included in the line observation area 61a and thermal image data regarding observation pixels 51 included in the line observation area 61b can be compared with each other, and a difference in the thermal image data (hereinafter also referred to as a "thermal image temporal change") between two points of time can be measured. That is, the thermal image sensor 1000 can detect whether there is a moving object such as a person or an animal.

In other words, the thermal image sensor 1000 can obtain one of the following results on the basis of a thermal image temporal change:

(1) If there is no thermal image temporal change, there is no object;

(2) If the thermal image temporal change is small, there is a moving object, but a moving speed of the object is low (the amount of movement is small); and (3) If the thermal image temporal change is large, there is a moving object, and the moving speed of the object is high (the amount of movement is large).

A relational expression between the thermal image temporal change and the amount of movement in the cases of (2) and (3) is set in accordance with a difference between times at which measurement is performed in the line observation areas 61a and 61b and the moving speed of an object (assumed range). A temporal change in the temperature of each observation pixel 51 may be calculated, and an accumulated value (e.g., an accumulated value of one vertical line) of the temporal changes may be defined as a thermal image temporal change of each vertical line. In the relational expression, for example, the amount of movement may be proportional to the thermal image temporal change.

If the rotation unit 31 is a stepping motor, the width of each step is desirably one n-th (n is a natural number) of a distance between the line observation areas 61a and 61b in the scanning direction (one n-th of a distance between the one-dimensional radiation receiving sensors 32a and 32b). In this case, observation pixels 51 included in the line observation area 61b are included in the line observation area 61a several steps later. That is, by measuring the amount of infrared radiation of the same observation pixels 51 at different times, a moving object can be detected more accurately through a simpler process.

If a number of radiation receiving devices corresponding to a part of the observation area 50 are used to measure the temperatures of the same observation pixels 51 a plurality of times, a shape of each radiation receiving device is desirably a rectangle whose long sides are parallel to the scanning direction (rotational direction). With this configuration, by rotating the one-dimensional radiation receiving sensors 32a and 32b by a distance smaller than the length of each radiation receiving device in the rotational direction at a time, thermal image data whose S/N ratio is high and whose resolution is high in both direction (X and Y directions) can be obtained.

As described above, the thermal image sensor 1000 uses a number of radiation receiving devices corresponding to a part of the observation area 50 to measure the temperatures of the same observation pixels 51 a plurality of times. The configuration of a thermal image sensor that measures the amount of movement of an object on the basis of this idea is not limited to that of the thermal image sensor 1000.

Other configurations (modifications) of the thermal image sensor according to the second embodiment will be described hereinafter. In some of the following modifications, however, the amount of infrared radiation from the exactly same area (the same observation pixels 51) is not measured at different times, but the amount of infrared radiation from areas whose positions or sizes are different from each other is measured at different times. Even when the amount of infrared radiation from areas whose positions or sizes are different from each other is used, a moving object can be detected insofar as the amount of infrared radiation from close areas or overlapping areas is used.

In addition, in the drawings, the arrangement and rotational direction of the radiation receiving devices and a shape and a scanning direction of an observation area (observation pixels 51) in which temperature is measured at once are illustrated for the sake of simplicity. The configurations of thermal image sensors according to the following modifications are the same as that of the thermal image sensor 30 or the thermal image sensor 1000 except otherwise stated. That is, each thermal image sensor includes the rotation unit 31, radiation receiving sensors, and the lens 33.

The following modifications are examples, and thermal image sensors of different types may be constructed by combining some of the following modifications.

First Modification of Second Embodiment

Figure 14:
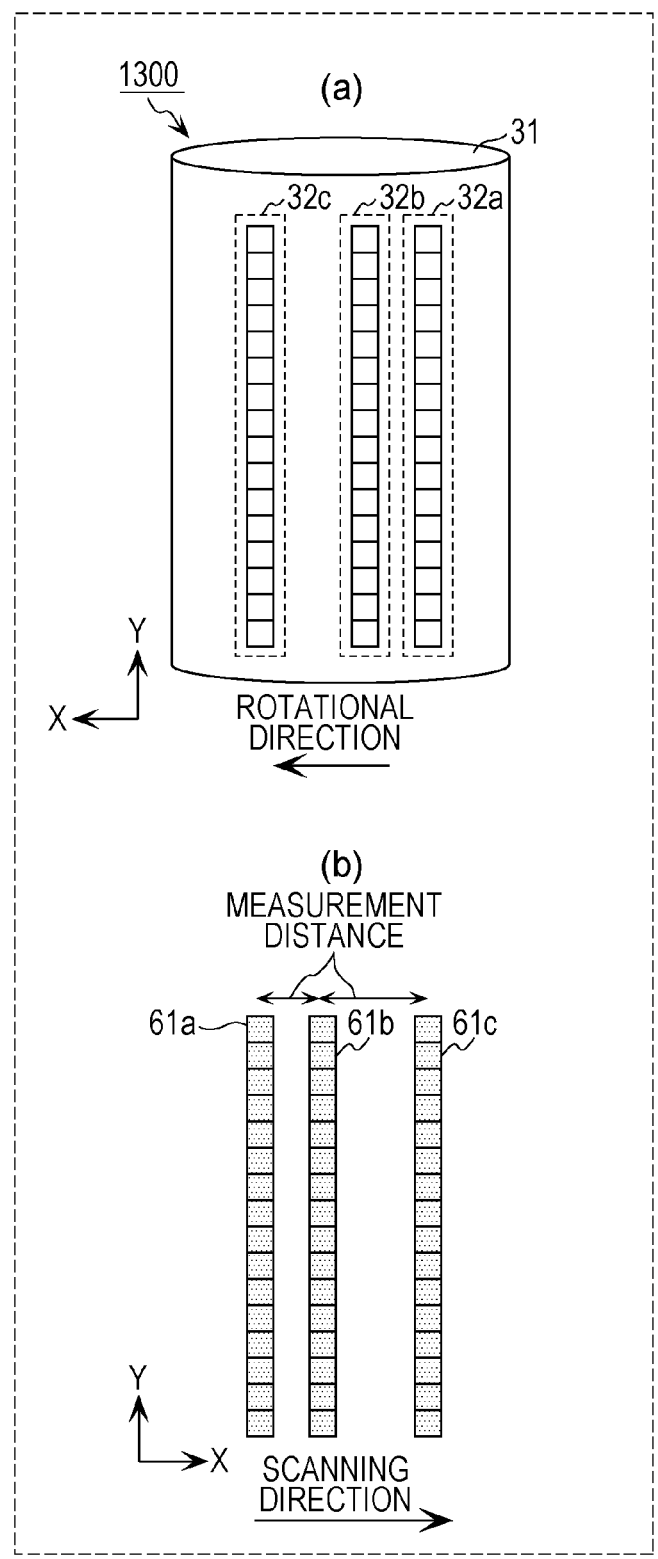
FIG. 14 illustrates a thermal image sensor according to a first modification of the second embodiment and observation areas of the thermal image sensor.

FIG. 14(a) is a diagram illustrating a thermal image sensor according to a first modification of the second embodiment. FIG. 14(b) is a diagram illustrating line observation areas of the thermal image sensor illustrated in FIG. 14(a).

A thermal image sensor 1300 according to the first modification includes three one-dimensional radiation receiving sensors 32 (one-dimensional radiation receiving sensors 32a, 32b, and 32c), in each of which radiation receiving devices are arranged in a line. That is, if the thermal image sensor 1300 is used, three line observation areas 61a, 61b, and 61c illustrated in FIG. 14(b) appear. The thermal image sensor 1300 can therefore measure the amount (speed) of movement of a moving object more accurately.

As illustrated in FIG. 14(a), a distance (the distance here refers to a distance in the rotational direction; the same holds in the following description) between the one-dimensional radiation receiving sensors 32a and 32b and a distance between the one-dimensional radiation receiving sensors 32b and 32c are different from each other. Because a moving object can be measured using thermal image data obtained at different time intervals, a change in the moving speed of the moving object can be measured more accurately.

Second Modification of Second Embodiment

FIGS. 15(a) and (b) are diagrams illustrating thermal image sensors according to a second modification of the second embodiment. FIG. 15(c) is a diagram illustrating observation areas of the thermal image sensor illustrated in FIG. 15(a), and FIG. 15(d) is a diagram illustrating observation areas of the thermal image sensor illustrated in FIG. 15(b).

The thermal image sensors according to the second modification each include a first radiation receiving device line 1401a, which is a one-dimensional radiation receiving sensor 32, and a second radiation receiving device group (a second radiation receiving device line 1402a or a second radiation receiving device group 1402b), whose distance to the first radiation receiving device line 1401a is not constant. As a result, the thermal image sensors according to the second modification can accurately measure a moving speed of a moving object.

In a thermal image sensor 1400a illustrated in FIG. 15(a), for example, radiation receiving devices are arranged such that a distance between a radiation receiving device belonging to the first radiation receiving device line 1401a and a corresponding radiation receiving device belonging to the second radiation receiving device line 1402a becomes larger in a lower portion of the thermal image sensor 1400a (a negative direction along a Y axis). If the thermal image sensor 1400a is used, therefore, a line observation area 61 and a diagonal line observation area 1401 illustrated in FIG. 15(c) appear. The thermal image sensor 1400a can cause line observation areas at low cost.

In a thermal image sensor 1400b illustrated in FIG. 15(b), on the other hand, radiation receiving devices belonging to the second radiation receiving device group 1402b are arranged at random in terms of their horizontal positions. That is, if the thermal image sensor 1400b is used, a line observation area 61 and a non-line observation area 1402 illustrated in FIG. 15(d) appear. The thermal image sensor 1400b can accurately measure a moving speed of a small object.

In FIG. 15(a), a positional relationship between the first radiation receiving device line 1401a and the second radiation receiving device line 1402a in the X direction may be reversed. That is, the first radiation receiving device line 1401a may be arranged further in the positive direction along the X axis than the second radiation receiving device line 1402a.

The distance between a radiation receiving device belonging to the first radiation receiving device line 1401a and a corresponding radiation receiving device belonging to the second radiation receiving device line 1402a may become larger in a positive direction along the Y axis or the negative direction along the Y axis. The same holds for the arrangement of radiation receiving devices of thermal image sensors described hereinafter.

Third Modification of Second Embodiment

FIGS. 16(a) to (d) are diagrams illustrating thermal image sensors according to a third modification of the second embodiment. FIGS. 16(e) to (h) are diagrams illustrating observation areas of the thermal image sensors illustrated in FIGS. 16(a) to (d), respectively.

The thermal image sensors according to the third modification includes a plurality of radiation receiving devices whose sizes are different from each other. Large observation pixels (radiation receiving devices) can assure a high accuracy of measuring temperatures, and small observation pixels (radiation receiving devices) can achieve high resolution.

Figure 16:
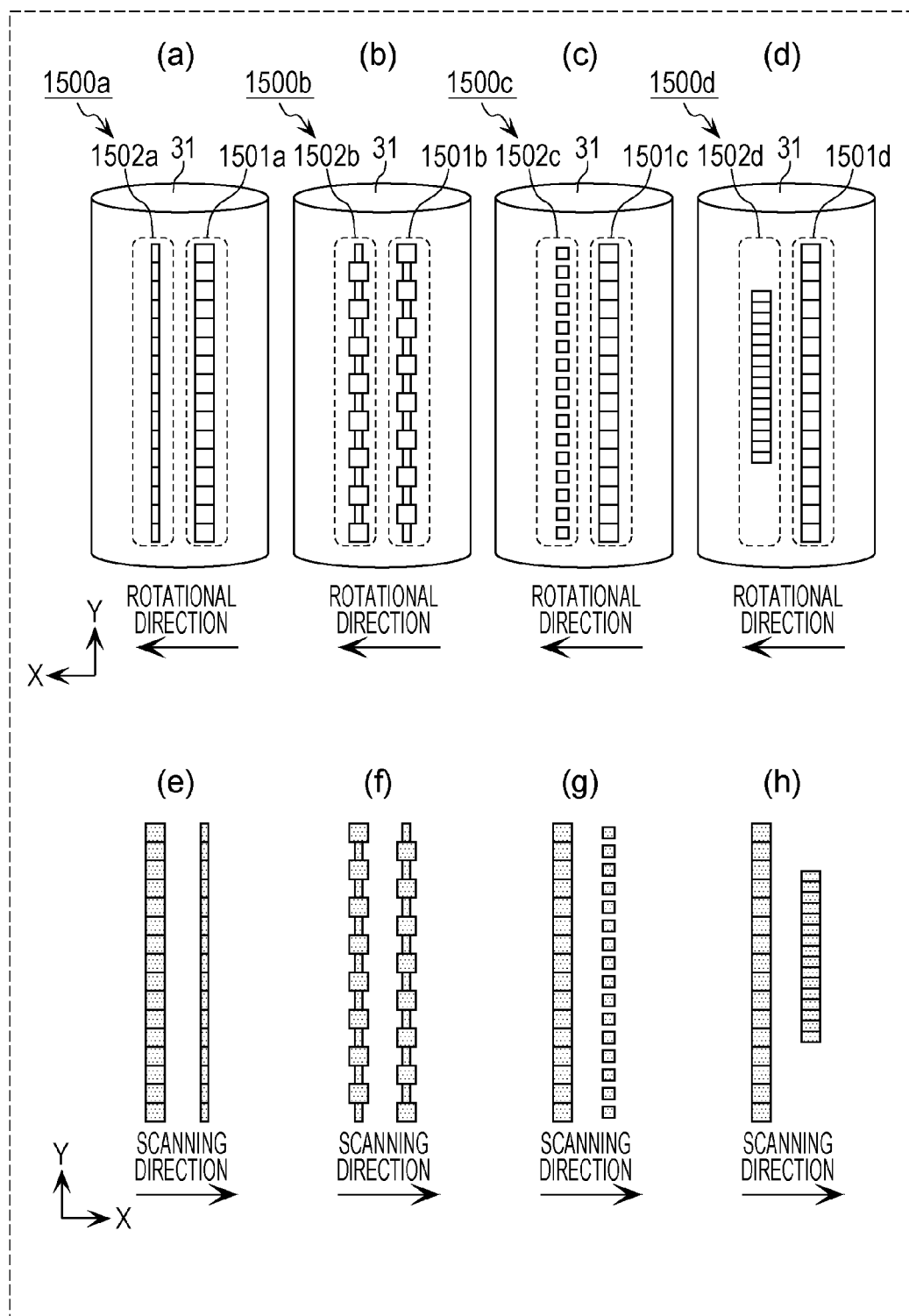
FIG. 16 illustrates thermal image sensors according to a third modification of the second embodiment and observation areas of the thermal image sensors.

In a thermal image sensor 1500a illustrated in FIG. 16(a), for example, a first radiation receiving device line 1501a including radiation receiving devices having a first size and a second radiation receiving device line 1502a including radiation receiving devices having a second size, which is different from the first size in the X direction (smaller in the X direction), are arranged parallel to each other. According to the thermal image sensor 1500a, the observation areas illustrated in FIG. 16(e) appear. In such a configuration in which radiation receiving devices have varied lengths in the X direction, resolution of thermal image data in the X direction improves.

Alternatively, as in a thermal image sensor 1500b illustrated in FIG. 16(b), a first radiation receiving device line 1501b and a second radiation receiving device line 1502b, each including radiation receiving devices having the first size and radiation receiving devices having the second size, may be arranged parallel to each other.

More specifically, in the first radiation receiving device line 1501b, radiation receiving devices having the first size and the radiation receiving devices having the second size are alternately arranged in the Y direction. In the second radiation receiving device line 1502b, too, radiation receiving devices having the first size and radiation receiving devices having the second size are alternately arranged in the Y direction. A combination of radiation receiving devices adjacent to each other in the X direction includes a radiation receiving device having the first size and a radiation receiving device having the second size. According to the thermal image sensor 1500b, the observation areas illustrated in FIG. 16(f) appear. In such a configuration in which radiation receiving devices having varied lengths in the X direction, the resolution of thermal image data in the X direction improves.

In a thermal image sensor 1500c illustrated in FIG. 16(c), a first radiation receiving device line 1501c including radiation receiving devices having the first size and a second radiation receiving device line 1502c including radiation receiving devices having a third size, which is different from the first size both in the X direction and in the Y direction (smaller in both directions), are arranged parallel to each other. According to the thermal image sensor 1500c, the observation areas illustrated in FIG. 16(g) appear. By providing the plurality of radiation receiving devices having the third size, which is smaller than the first size in the X direction and the Y direction (a direction perpendicular to the scanning direction), resolution of thermal image data in the X and Y directions improves.

In a thermal image sensor 1500d illustrated in FIG. 16(d), a first radiation receiving device line 1501d including radiation receiving devices having the first size and a second radiation receiving device line 1502d including radiation receiving devices having a fourth size, which is different from the first size in the Y direction (smaller in the Y direction), may be arranged parallel to each other. According to the thermal image sensor 1500d, the observation areas illustrated in FIG. 16(h) appear. By arranging the radiation receiving devices having the fourth size in a particular small area, resolution of thermal image data regarding the particular area can be improved.

Fourth Modification of Second Embodiment

FIGS. 17(a) and (b) are diagrams illustrating thermal image sensors according to a fourth modification of the second embodiment.

The thermal image sensors according to the fourth modification each include a plurality of radiation receiving devices whose heat capacities are different from each other. More specifically, the thermal image sensors according to the fourth modification each include radiation receiving devices 1601 and radiation receiving devices 1602 whose heat capacity is lower than that of the radiation receiving devices 1601.

In a thermal image sensor 1600a illustrated in FIG. 17(a), a first radiation receiving device line 1601a including only radiation receiving devices 1601 and a second radiation receiving device line 1602a including only radiation receiving devices 1602 are arranged parallel to each other. In a thermal image sensor 1600b illustrated in FIG. 17(b), radiation receiving devices 1601 and radiation receiving devices 1602 are alternately arranged in the Y direction in both a first radiation receiving device line 1601b and a second radiation receiving device line 1602b. In the thermal image sensor 1600b, a combination of radiation receiving devices adjacent to each other in the X direction includes a radiation receiving device 1601 and a radiation receiving device 1602.

By providing two types of radiation receiving device whose heat capacities are different from each other for a thermal image sensor, the accuracy of measuring temperatures can be improved, and a fast moving object can be measured. As the radiation receiving devices whose heat capacities are different from each other, for example, thermopiles whose thicknesses are different from each other may be used.

Fifth Modification of Second Embodiment

FIGS. 18(a) and (b) are diagrams illustrating thermal image sensors according to a fifth modification of the second embodiment. The thermal image sensors according to the fifth modification each include radiation receiving devices

1701 and radiation receiving devices 1702 composed of different materials. More specifically, for example, the radiation receiving devices 1701 may be thermopiles, and the radiation receiving devices 1702 may be photodiodes.

Figure 18:
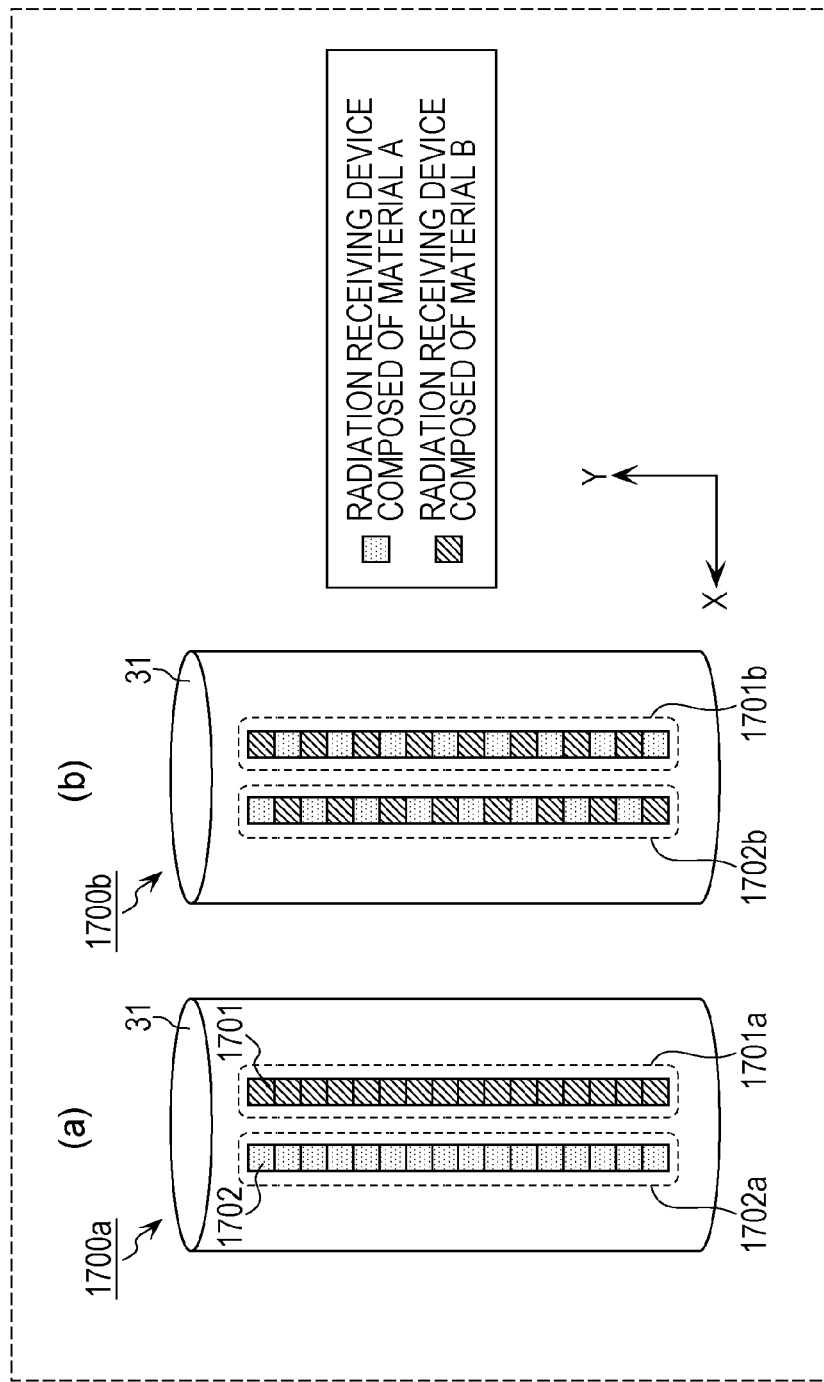
FIG. 18 illustrates thermal image sensors according to a fifth modification of the second embodiment.

In a thermal image sensor 1700a illustrated in FIG. 18(*a*), a first radiation receiving device line 1701a including only radiation receiving devices 1701 and a second radiation receiving device line 1702a including only radiation receiving devices 1702 are arranged parallel to each other. In a thermal image sensor 1700b illustrated in FIG. 18(*b*), radiation receiving devices 1701 and radiation receiving devices 1702 are alternately arranged in the Y direction in both a first radiation receiving device line 1701b and a second radiation receiving device line 1702b. In the thermal image sensor 1700b, a combination of radiation receiving devices adjacent to each other in the X direction includes a radiation receiving device 1701 and a radiation receiving device 1702.

The cost of such a configuration is higher than that of a configuration in which thermopiles having varied thicknesses are used (fourth modification), but this configuration is superior in terms of the accuracy of measuring temperatures and the measurement of a fast moving object.

Sixth Modification of Second Embodiment

Figure 19:
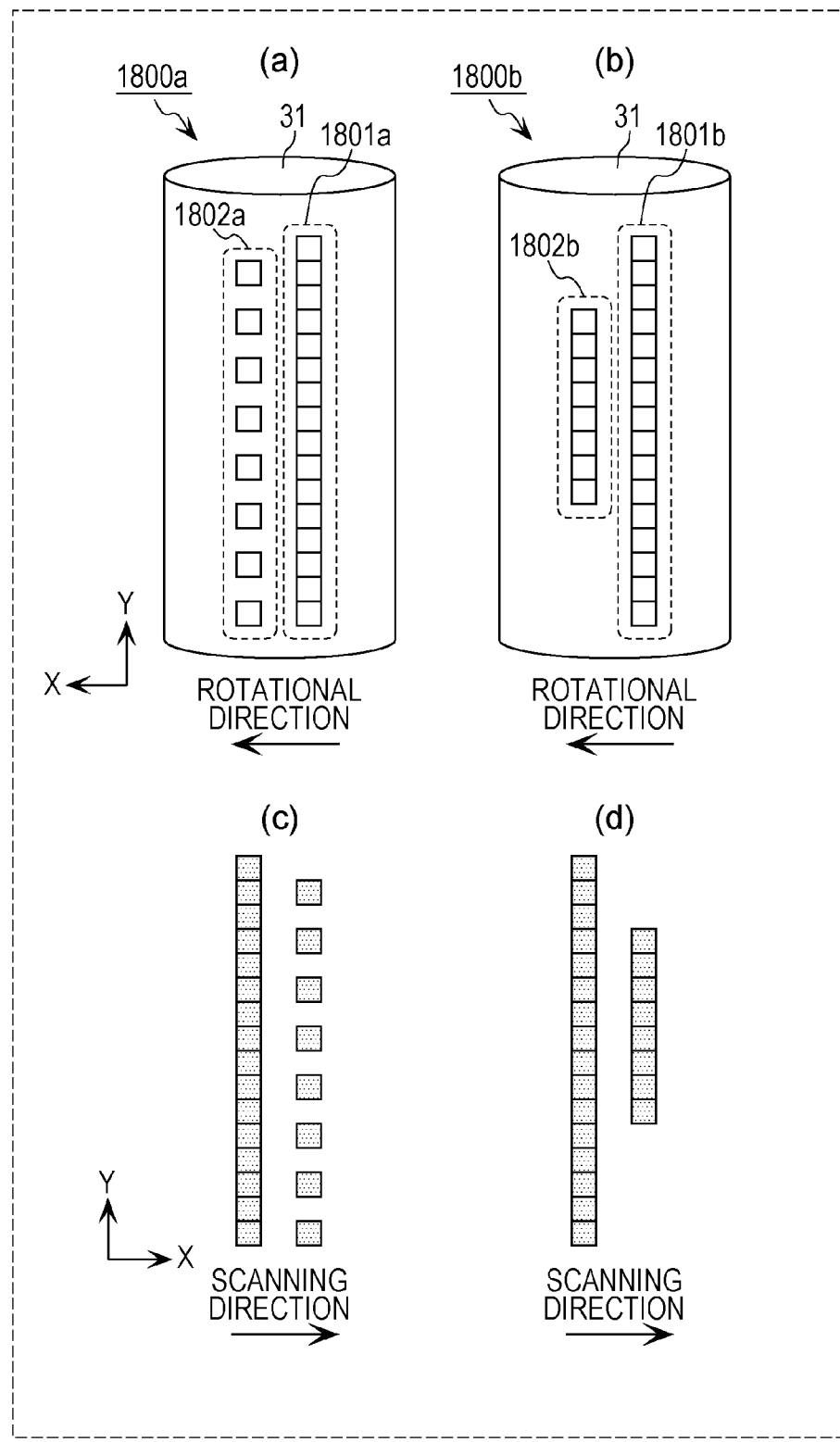
FIG. 19 illustrates thermal image sensors according to a sixth modification of the second embodiment and observation areas of the thermal image sensors.

FIGS. 19(*a*) and (*b*) are diagrams illustrating thermal image sensors according to a sixth modification of the second embodiment. FIGS. 19(*c*) and (*d*) are diagrams illustrating observation areas of the thermal image sensors illustrated in FIGS. 19(*a*) and (*b*), respectively.

The thermal image sensors according to the sixth modification each include a plurality of radiation receiving device lines including different numbers of radiation receiving devices. More specifically, a thermal image sensor 1800a illustrated in FIG. 19(*a*) includes a first radiation receiving device line 1801a and a second radiation receiving device line 1802a including fewer radiation receiving devices than the first radiation receiving device line 1801a (the number of radiation receiving devices included in the second radiation receiving device line 1802a is half that of radiation receiving devices included in the first radiation receiving device line 1801a). A thermal image sensor 1800b illustrated in FIG. 19(*b*) includes a first radiation receiving device line 1801b and a second radiation receiving device line 1802b including fewer radiation receiving devices than the first radiation receiving device line 1801b. The thermal image sensor 1800a and the thermal image sensor 1800b are different from each other in that the plurality of radiation receiving devices included in the second radiation receiving device line 1802a of the thermal image sensor 1800a are discretely (every second corresponding radiation receiving device) arranged whereas the plurality of radiation receiving devices included in the second radiation receiving device line 1802b of the thermal image sensor 1800b are continuously arranged.

According to the thermal image sensor 1800a, the observation areas illustrated in FIG. 19(*c*) appear, and according to the thermal image sensor 1800b, the observation areas illustrated in FIG. 19(*d*) appear. Since the number of radiation receiving devices used is smaller than in the thermal image sensor 1000, the thermal image sensors 1800a and 1800b can detect a moving object at lower cost than in the thermal image sensor 1000.

The thermal image sensor 1800a is advantageous in that the thermal image sensor 1800a can detect a moving object regardless of a position of the moving object. The thermal image sensor 1800b is advantageous in that an accuracy of detecting a moving object in a particular area corresponding to the continuously arranged radiation receiving devices is high.

Seventh Modification of Second Embodiment

Figure 20:
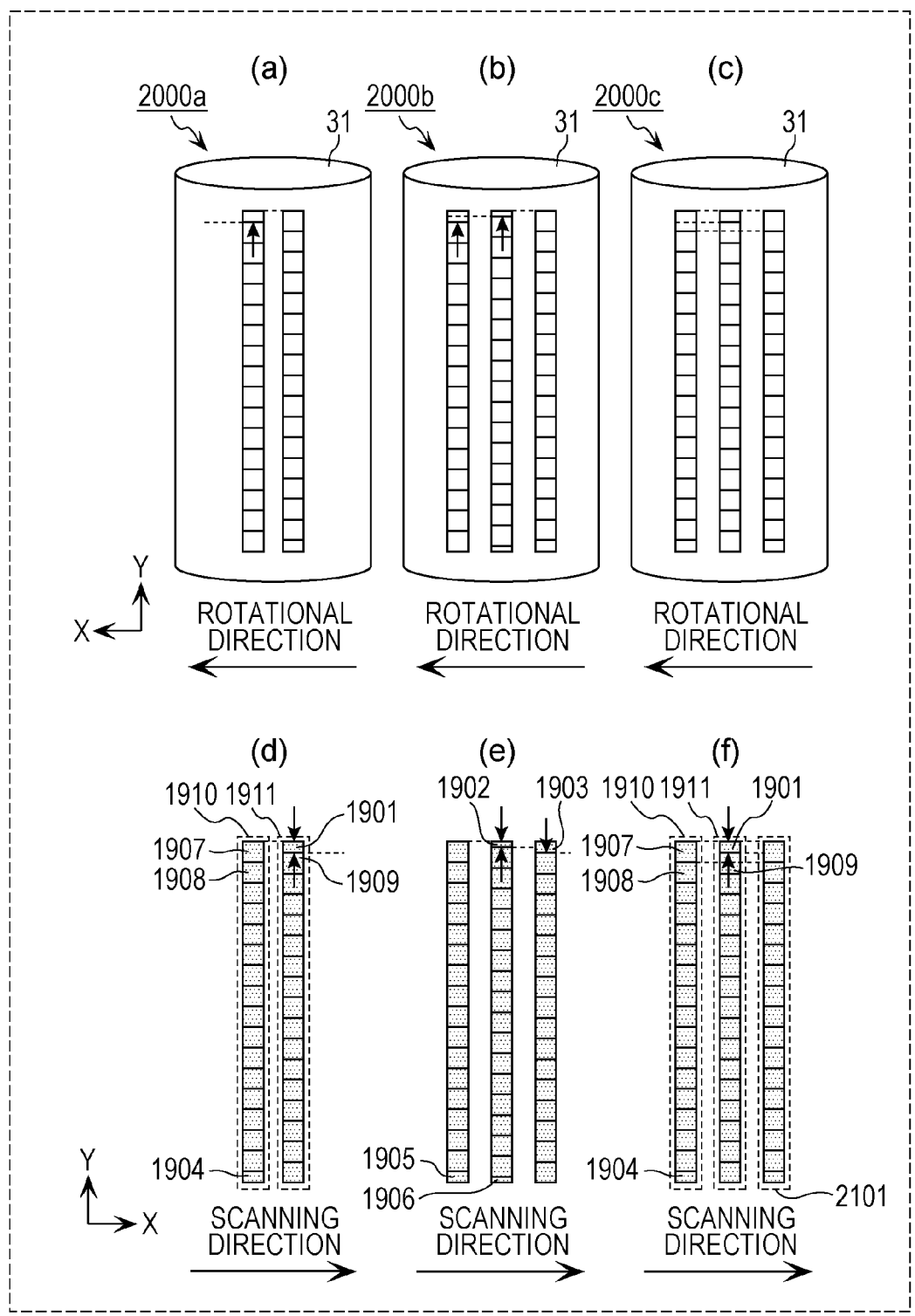
FIG. 20 illustrates thermal image sensors according to a seventh modification of the second embodiment and observation areas of the thermal image sensors.

FIGS. 20(*a*) to (*c*) are diagram illustrating thermal image sensors according to a seventh modification of the second embodiment. FIGS. 20(*d*) to (*f*) are diagrams illustrating observation areas of the thermal image sensors illustrated in FIGS. 20(*a*) to (*c*), respectively. The thermal image sensors according to the seventh modification each include a plurality of radiation receiving device lines, and positions of radiation receiving devices in the plurality of radiation receiving device lines in the direction (Y direction) perpendicular to the rotational direction are slightly different from each other. A thermal image sensor 2000a illustrated in FIG. 20(*a*) includes two radiation receiving device lines, and a thermal image sensor 2000b illustrated in FIG. 20(*b*) and a thermal image sensor 2000c illustrated in FIG. 20(*c*) each include three radiation receiving device lines.

According to the thermal image sensor 2000a, a plurality of line observation areas 1910 and 1911 illustrated in FIG. 20(*d*), in which positions of observation pixels 51 in the Y direction are slightly different from each other, appear. Similarly, according to the thermal image sensor 2000b, the plurality of line observation areas illustrated in FIG. 20(*e*) appear. As a result, sensitive thermal image data whose resolution in the Y direction is high can be obtained.

Differences in the positions of the observation pixels 51 in the Y direction are desirably half a length of each observation pixel 51 (radiation receiving device) in the Y direction in the case of the thermal image sensor 2000a, in which the two radiation receiving device lines are arranged. The differences are desirably one third of the length of each observation pixel 51 in the Y direction in the case of the thermal image sensor 2000b, in which three radiation receiving device lines are arranged. The differences are desirably one n-th (n is a natural number) of the length of each observation pixel 51 in the Y direction in the case of a thermal image sensor in which n radiation receiving device lines are arranged. In this case, a high-resolution thermal image can be obtained with fewer pixels.

The resolution of thermal image data can be increased even if the differences are not one n-th in a thermal image sensor in which n radiation receiving device lines are arranged, but the resolution is higher when the differences are closer to one n-th.

As illustrated in FIGS. 20(*d*) and (*e*), partial observation pixels 1901 to 1906 desirably appear at ends of the line observation areas. In other words, in the thermal image sensor 2000a and 2000b, it is desirable that radiation receiving devices (partial radiation receiving devices) whose lengths in the Y direction are different from those of ordinary radiation receiving devices be provided at the ends of the radiation receiving device lines.

The Y-direction length of the partial observation pixels 1901 and 1904 that appear in the case of the thermal image sensor 2000a is half that of observation pixels 1907 and 1908. The Y-direction lengths of the partial observation pixels 1903 and 1905 that appear in the case of the thermal image sensor 2000b is two-thirds of that of ordinary observation pixels 51, and the Y-direction length of the partial observation pixels 1902 and 1906 is one-third of that of the ordinary observation pixels 51. As a result, thermal image data whose accuracy of measuring temperatures is high (S/N ratio is high) can be obtained. The Y-direction lengths of the partial observation pixels 1901 to 1906 most desirably match the differences in the positions of the observation pixels 51, and, in this case, a higher S/N ratio can be achieved. Even if the Y-direction lengths of the partial observation pixels 1901 to 1906 are different from the differences in the positions of the observation pixels 51, however, an advantageous effect can be produced to a certain degree.

Figure 21:
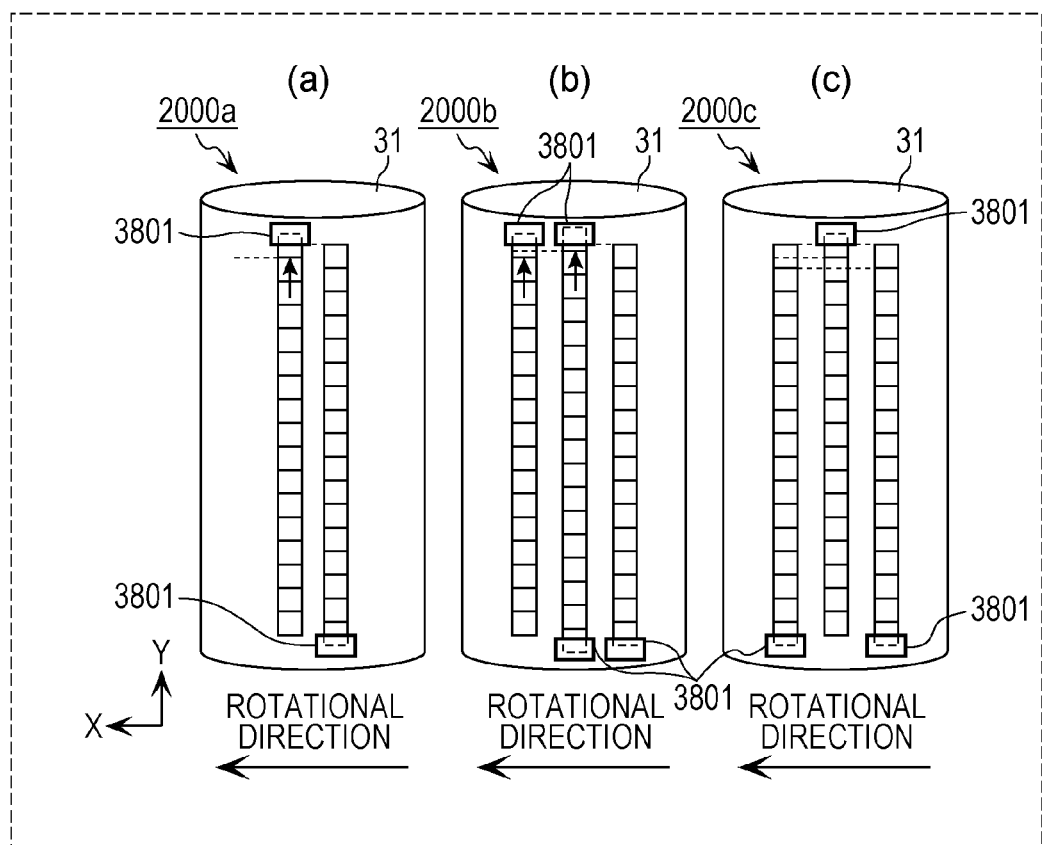
FIG. 21 is a diagram illustrating an example of a method for constructing partial observation pixels.

The partial observation pixels appear when radiation receiving devices whose pixel sizes are small are provided for a thermal image sensor. As illustrated in FIG. 21, however, the partial observation pixels can also appear by hiding (edge-cutting) part of radiation receiving devices (radiation receiving devices having the same pixel sizes as the other radiation receiving devices) positioned at the ends of the radiation receiving devices with masks 3801 whose temperatures are known.

Figure 22:
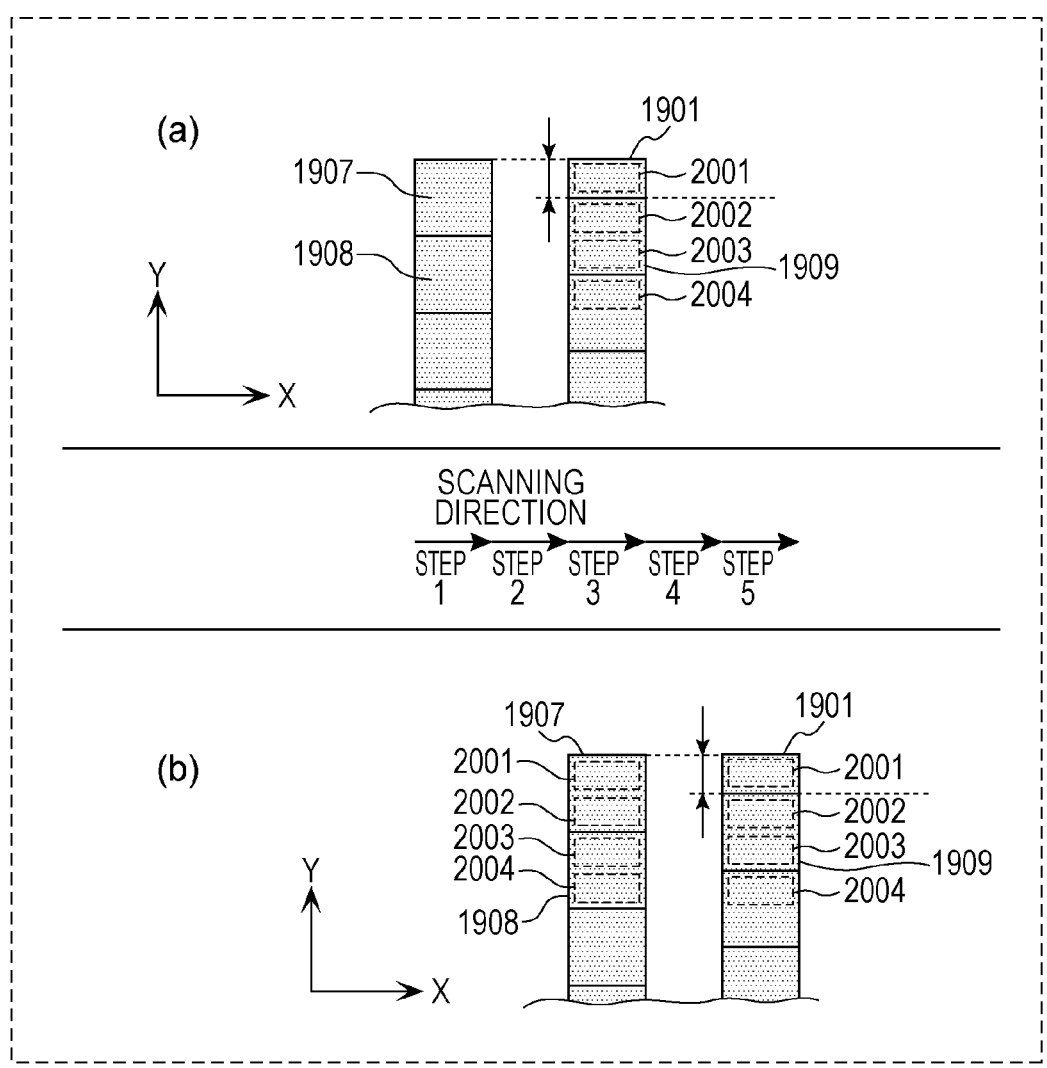
FIG. 22 is a diagram illustrating a high-resolution effect produced by displacing observation pixels.

A high-resolution effect produced by displacing the observation pixels 51 in the thermal image sensors 2000a and 2000b will be described hereinafter with reference to FIG. 22. FIG. 22 is a diagram illustrating the high-resolution effect produced by displacing the observation pixels 51.

First, at a time (a time of step 1) illustrated in FIG. 22(*a*), only a room fixed section 2001 is included in the partial observation pixel 1901, and room fixed sections 2002 and 2003 are included in an observation pixel 1909.

Next, FIG. 22(*b*) illustrates a time (a time of step 3) two steps later than the time illustrated in FIG. 22(*a*), that is, a time after the observation areas move in the scanning direction by two pixels from the state illustrated in FIG. 22(*a*). At this time, the room fixed sections 2001 and 2002 are included in the observation pixel 1907, and room fixed sections 2003 and 2004 are included in the observation pixel 1908.

First, the amount of infrared radiation from the room fixed section 2001 is calculated from data regarding the amount of infrared radiation of the partial observation pixel 1901 at the time of step 1 (FIG. 22(*a*)).

Next, the amount of infrared radiation from the room fixed section 2002 is calculated from a difference between data regarding the amount of infrared radiation of the observation pixel 1907 at the time of step 3 (FIG. 22(*b*)) and data regarding the amount of infrared radiation of the partial observation pixel 1901 at the time of step 1 (FIG. 22(*a*)).

Furthermore, the amount of infrared radiation from the room fixed section 2003 is calculated from a difference between data regarding the amount of infrared radiation of the observation pixel 1909 at the time of step 1 (FIG. 22(*a*)) and the amount of infrared radiation from the room fixed section 2002 calculated in the above manner.

Furthermore, the amount of infrared radiation from the room fixed section 2004 is calculated from a difference between data regarding the amount of infrared radiation of the observation pixel 1908 at the time of step 3 (FIG. 22(*b*)) and the amount of infrared radiation from the room fixed section 2003 calculated in the above manner.

In this method, if a temporal change (a change in the amount of infrared radiation from step 1 to step 3) in the amount of infrared radiation from each room fixed section is large, it is difficult to produce the high-resolution effect. The two radiation receiving device lines of the thermal image sensor 2000a are therefore desirably arranged as close to each other as possible. Because time intervals at which the line observation areas caused by the two radiation receiving device lines are measured are short, resolution (definition) becomes even higher.

If another radiation receiving device line is added to the thermal image sensor 2000a to obtain the thermal image sensor 2000c illustrated in FIG. 20(*c*), a line observation area 2101 illustrated in FIG. 20(*f*) appears. The line observation area 2101 is a line observation area in which positions of observation pixels 51 are the same as those of observation pixels 51 included in the line observation area 1910 or 1911 (the line observation area 1910 in FIG. 20(*c*)).

With this configuration, a temporal change (change in the amount of infrared radiation between steps) in the amount of infrared radiation from each room fixed section can be estimated by comparing data regarding the amount of infrared radiation from the line observation area 1910 and data regarding the amount of infrared radiation from the line observation area 2101. As a result, resolution (definition) becomes even higher.

In an attempt to increase resolution displacing the observation pixels 51, the partial observation pixel 1901 might not appear because a partial radiation receiving device is not provided for the thermal image sensor 2000a. In this case, for example, the amount of infrared radiation from the room fixed section 2001 is assumed to be the same as that of the observation pixel 1907.

Figure 23:
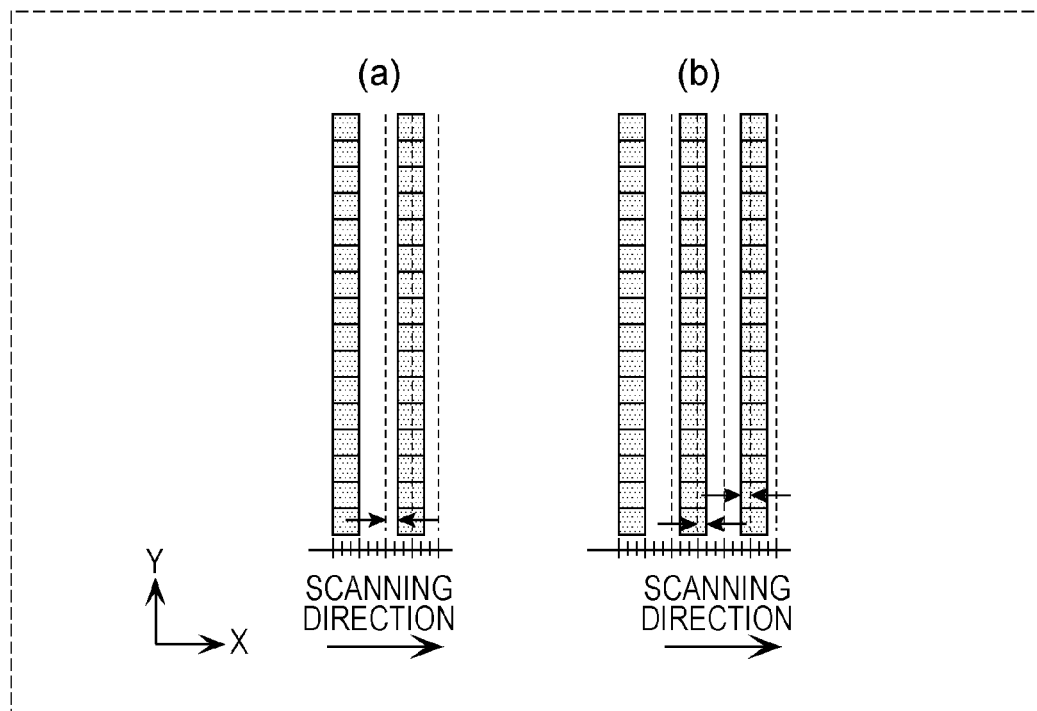
FIG. 23 is a diagram illustrating an example of observation areas at a time when radiation receiving device lines are displaced from ordinary positions in an X direction.

Positions of radiation receiving device lines may be different from each other in the X direction. FIG. 23 is a diagram illustrating an example of observation areas at a time when the radiation receiving device lines are displaced in the X direction.

As illustrated in FIGS. 23(*a*) and (*b*), intervals of a plurality of lines observation areas (intervals of a plurality of radiation receiving device lines) need not be one n-th of a width of each line observation area. If there are two line observation areas as illustrated in FIG. 23(*a*), the interval is desirably half a pixel off. If there are n line observation areas, the intervals are desirably a 1/n pixel off. In this case, the resolution of thermal image data in the X direction is increased.

If the intervals of a plurality of line observation areas are an integral multiple of the width of each line observation area, a width of one step (the amount of rotation) of the rotation unit 31 is desirably smaller (e.g., ½ or ⅓) than a width of each radiation receiving device. With this configuration, too, the resolution of thermal image data can be increased as when the intervals of a plurality of line observation areas are changed. In view of measurement speed, however, it is more desirable that the intervals of a plurality of line observation areas be changed.

Figure 24:
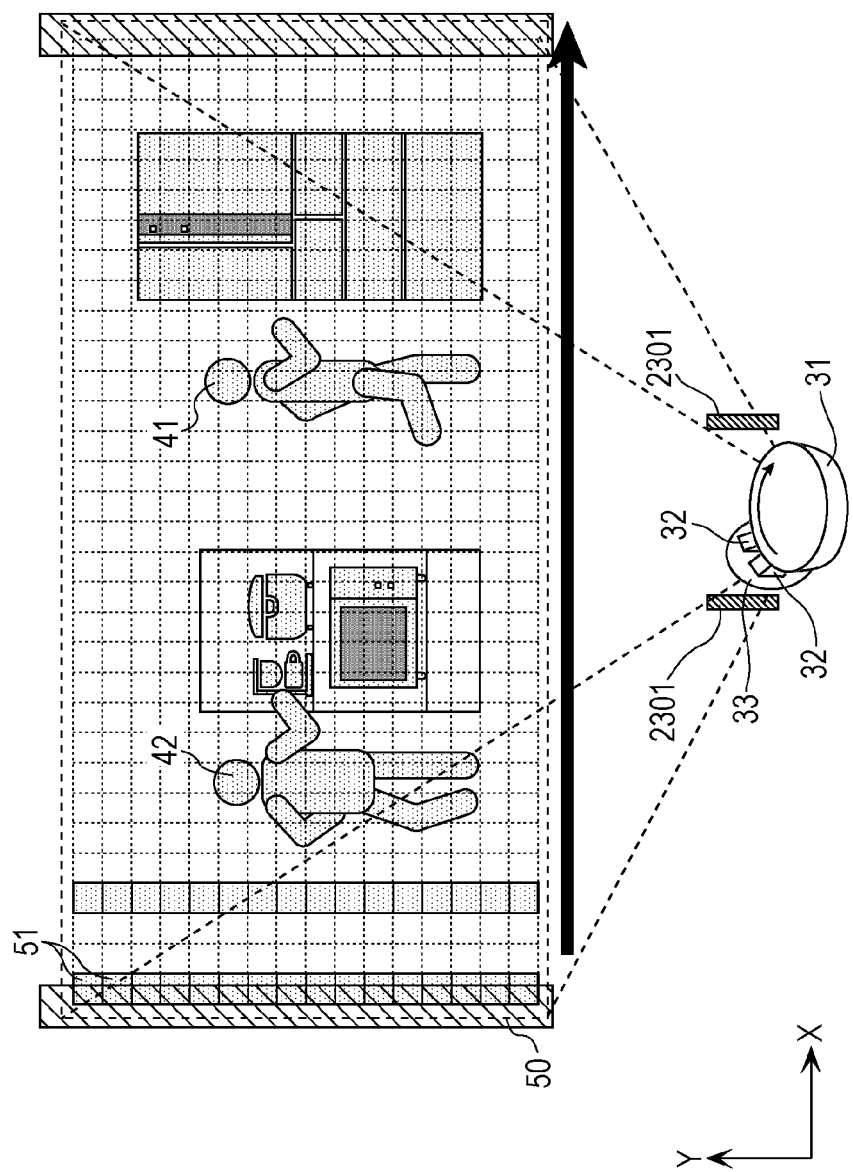
FIG. 24 is a diagram illustrating a high-resolution effect produced by providing radiation blocking plates.

The same high-resolution effect as that produced by changing the intervals of a plurality of line observation areas can be produced by providing radiation blocking plates. FIG. 24 is a diagram illustrating a high-resolution effect produced by providing radiation blocking plates.

As illustrated in FIG. 24, at least one radiation blocking plate 2301 (in FIG. 24, two radiation blocking plates 2301 are provided) may be provided near a thermal image sensor in order to block infrared radiation in part of line observation areas at left and right ends of the observation area 50. At this time, the radiation blocking plates 2301 may be provided at any positions insofar as the radiation blocking plates 2301 block infrared radiation at the ends of the observation area 50. In this case, the same high-resolution effect as that produced by changing the intervals of a plurality of line observation areas can be produced.

In addition to the radiation blocking plates 2301 provided to block infrared radiation in the line observation areas at the left and right ends of the observation area 50 as illustrated in FIG. 24, for example, radiation blocking plates (not illustrated) may be provided in order to block infrared radiation in part of line observation areas at upper and lower ends of the observation area 50.

More specifically, instead of hiding part of radiation receiving devices at upper and lower ends of radiation receiving device lines with the masks 3801 illustrated in FIG. 21, for example, radiation blocking plates (not illustrated) whose temperatures are known may be provided in part of line observation areas at the upper and lower ends of the observation area 50 (observation areas corresponding to part of radiation receiving devices at upper and lower ends of radiation receiving device lines).

With this configuration, temperatures corresponding to the amount of infrared radiation received when there are no radiation blocking plates can be obtained in part of the radiation receiving devices at the upper and lower ends of the radiation receiving device lines using the temperatures of the radiation blocking plates. In this case, the accuracy of measuring temperatures can be increased in a wider area.

In addition, by providing thermistors (not illustrated) for the radiation blocking plates at the upper and lower ends of the observation area 50, the temperatures of the radiation blocking plates can be obtained more accurately.

Eighth Modification of Second Embodiment

Figure 25:
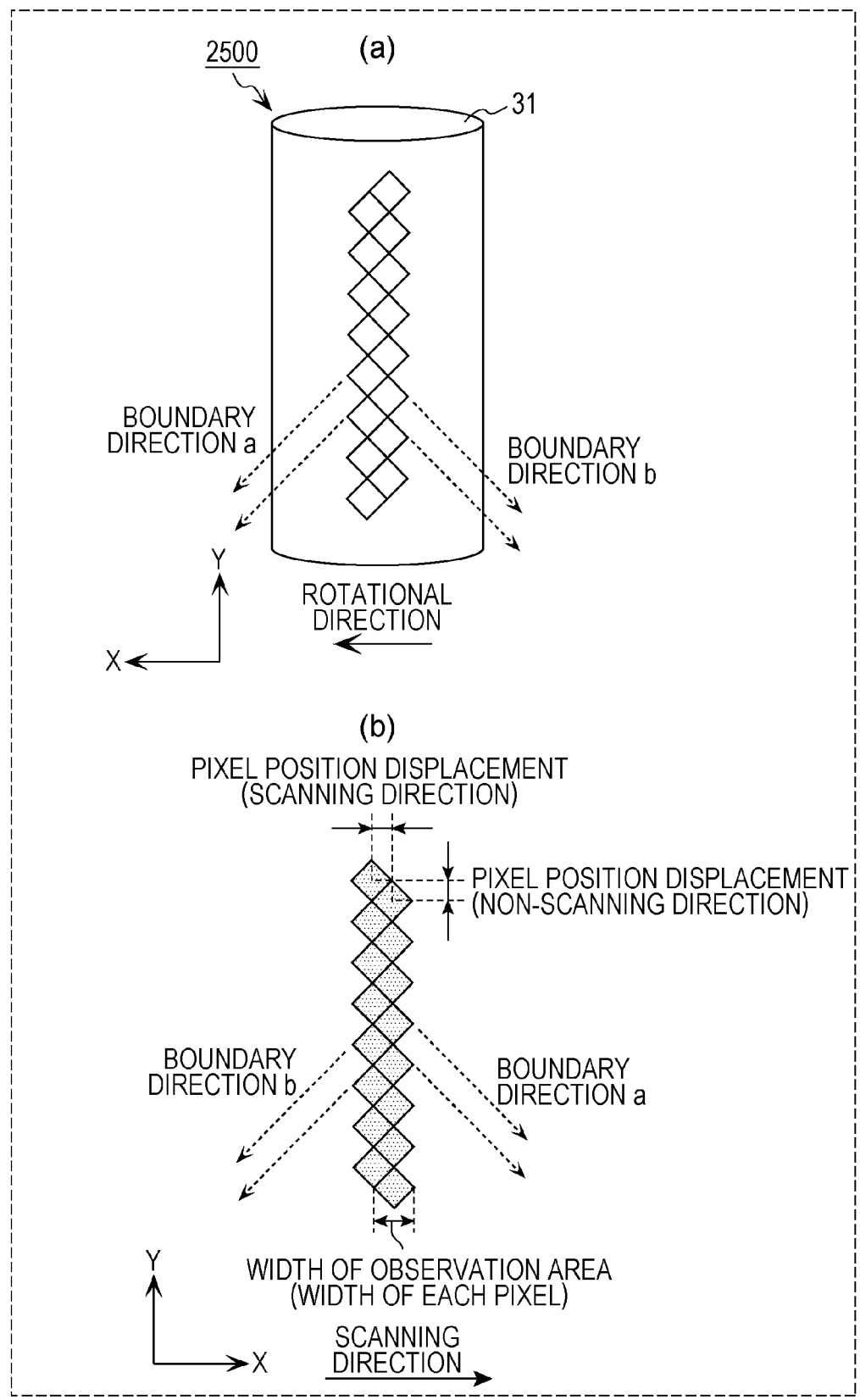
FIG. 25 illustrates a thermal image sensor according to an eighth modification of the second embodiment and observation areas of the thermal image sensor.

FIG. 25(*a*) is a diagram illustrating a thermal image sensor according to an eighth modification of the second embodiment. FIG. 25(*b*) is a diagram illustrating observation areas of the thermal image sensor illustrated in FIG. 25(*a*). As illustrated in FIG. 25(*a*), in a thermal image sensor 2500 according to the eighth modification, directions a and b of boundaries between adjacent radiation receiving receives are inclined in both the X direction and the Y direction. More specifically, the boundary directions a and b intersect with the X direction and the Y direction, respectively, by an angle of 45 degrees. According to the thermal image sensor 2500, the observation areas (observation pixels) illustrated in FIG. 25(*b*) appear.

With this configuration, two line observation areas in which centers of observation pixels are away from each other in the X direction by half a pixel (one pixel here corresponds to a length of a diagonal of a square observation pixel), and an area of each observation pixel (radiation receiving device) can be increased.

In the configuration illustrated in FIG. 23, for example, the interval of the two line observation area (a distance in the X direction) is at least one pixel. In the configuration of the thermal image sensor 2500, on the other hand, the interval of the line observation areas (a distance in the X direction) can be equal or shorter than one pixel, and the thermal image sensor 2500 can detect a moving object that moves even faster. In addition, in the thermal image sensor 2500, the area of each radiation receiving device can be increased, and the accuracy of measuring temperatures improves.

If the width (the amount of rotation) of one step in the scanning direction (rotational direction) is one pixel or less in the thermal image sensor 2500, the resolution of thermal image data can be increased in both the X direction and the Y direction. A principle of the high-resolution effect is the same as that in the seventh modification.

In addition, according to the thermal image sensor 2500, two line observation areas whose central positions are different from each other in the X direction appear. The thermal image sensor 2500 can therefore offer a high accuracy of measuring the speed of a moving object (the amount of movement).

In this case, the width of one step in the scanning direction (rotational direction) is desirably a 1/n pixel (e.g., half a pixel).

Figure 26:
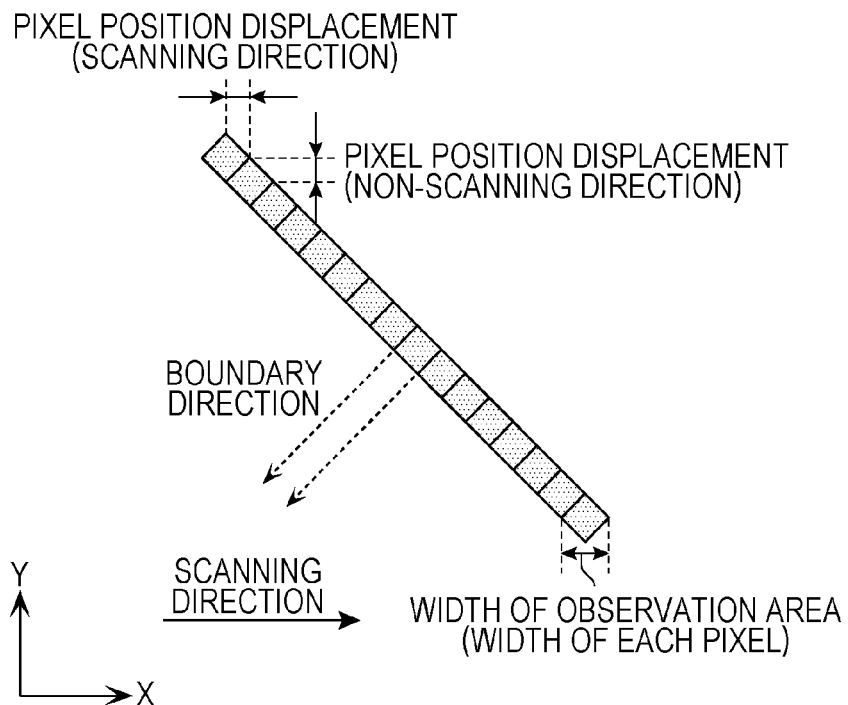
FIG. 26 is a diagram illustrating another example of the observation area according to the eighth modification of the second embodiment.

A configuration in which boundary directions of radiation receiving devices are inclined in both the X direction and the Y direction is not limited to that illustrated in FIG. 25. FIG. 26 is a diagram illustrating another example of the observation area according to the eighth modification of the second embodiment.

The observation area illustrated in FIG. 26 is caused by one radiation receiving device line. In the radiation receiving device line, radiation receiving devices are arranged in a direction that intersects with both the X direction and the Y direction. A thermal image sensor that causes the observation area illustrated in FIG. 26 can be achieved by simply inclining the one-dimensional radiation receiving sensor 32 of the thermal image sensor 30 illustrated in FIG. 5, that is, the thermal image sensor can be fabricated at low cost. In addition, the thermal image sensor that causes the observation area illustrated in FIG. 26 can obtain thermal image data regarding an observation area rapidly.

Figure 27:
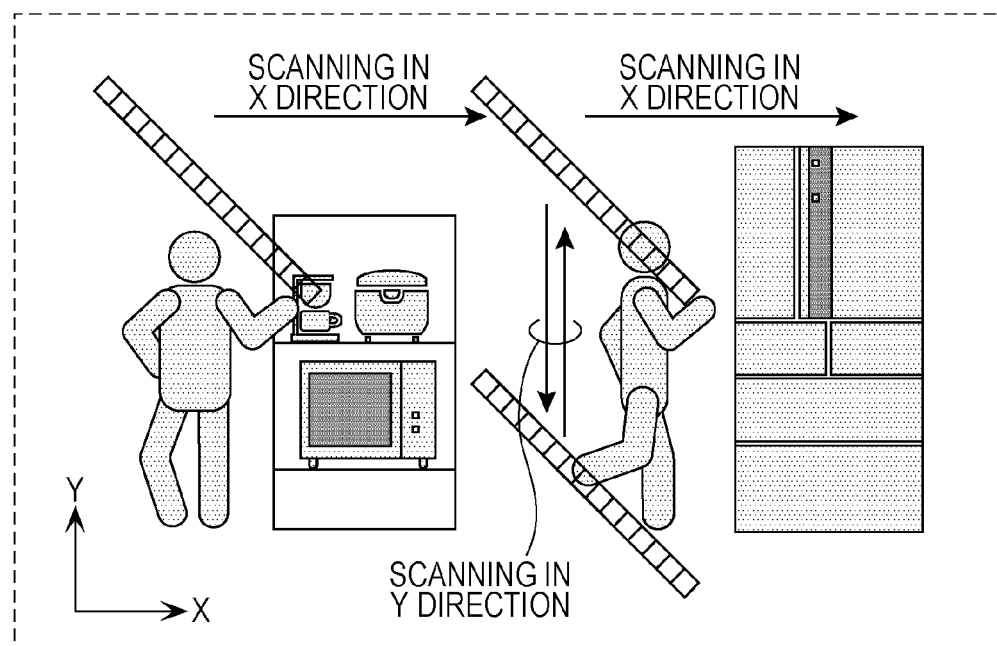
FIG. 27 is a diagram illustrating scanning in a Y direction.

The thermal image sensor that causes the observation area illustrated in FIG. 26 can scan not only in the X direction but also in the Y direction. FIG. 27 is a diagram illustrating the scanning in the Y direction. As illustrated in FIG. 27, if a heat source (a person's face) is detected in an observation area as a result of the scanning in the X direction, the thermal image sensor then scans an area around the heat source in the Y direction. As a result, if the heat source detected as a result of the scanning in the X direction is a human body, an accuracy of measuring a height of the detected human body increases.

Figure 28:
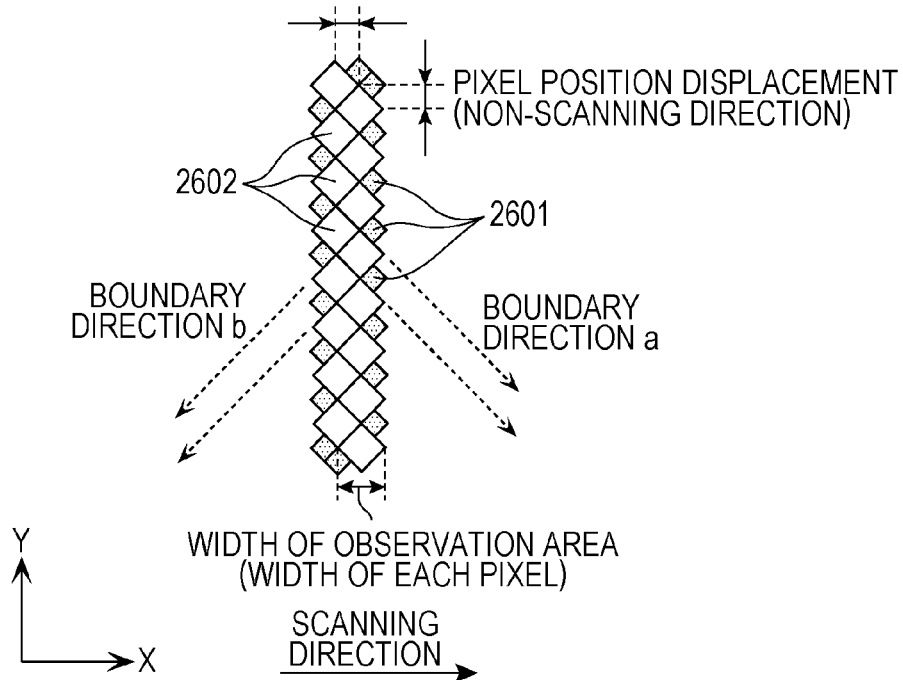
FIG. 28 is a diagram illustrating an example of observation areas at a time when two or more types of radiation receiving devices of different sizes are provided for the thermal image sensor according to the eighth modification.

In the thermal image sensor according to the eighth modification, two or more types of radiation receiving device whose sizes are different from each other may be provided. FIG. 28 is a diagram illustrating an example of observation areas at a time when two or more types of radiation receiving devices of different sizes are provided for the thermal image sensor according to the eighth modification.

The observation areas illustrated in FIG. 28 include observation pixels 2602 having an ordinary size and partial observation pixels 2601 smaller than the observation pixels 2602. With this configuration thermal image data having a higher S/N ratio can be obtained.

A length of sides of each partial observation pixel 2601 is desirably half a length of one side of each observation pixel 2602. In this case, thermal image data having a higher S/N ratio can be obtained. The observation areas may also include partial observation pixels having sides whose length is half that of the sides of the partial observation pixels 2601 (an area of each partial observation pixel is a quarter of that of each partial observation pixel 2601) in addition to the partial observation pixels 2601. In this case, thermal image data having an even higher S/N ratio can be obtained.

Ninth Modification of Second Embodiment

Figure 29:
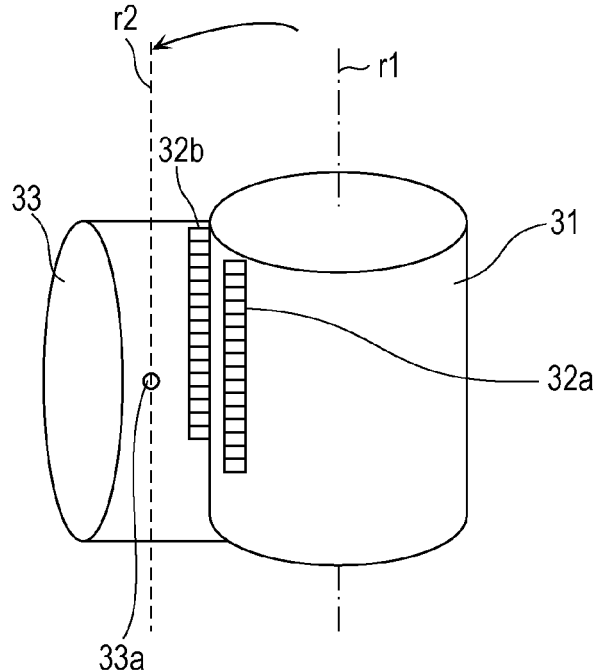
FIG. 29 is a diagram illustrating a rotation axis of a thermal image sensor according to a ninth modification of the second embodiment.
Figure 30:
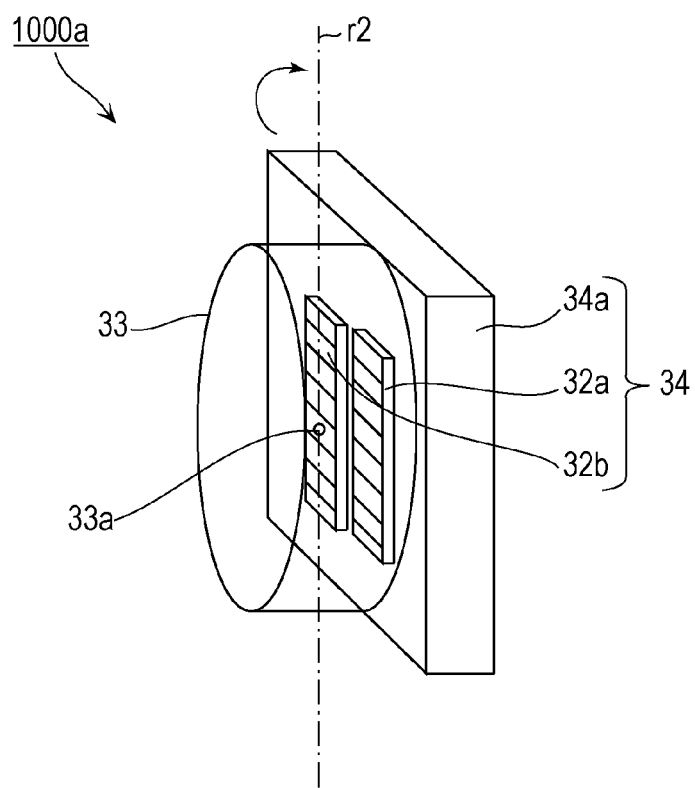
FIG. 30 illustrates an appearance of the thermal image sensor according to the ninth modification of the second embodiment.
Figure 31:
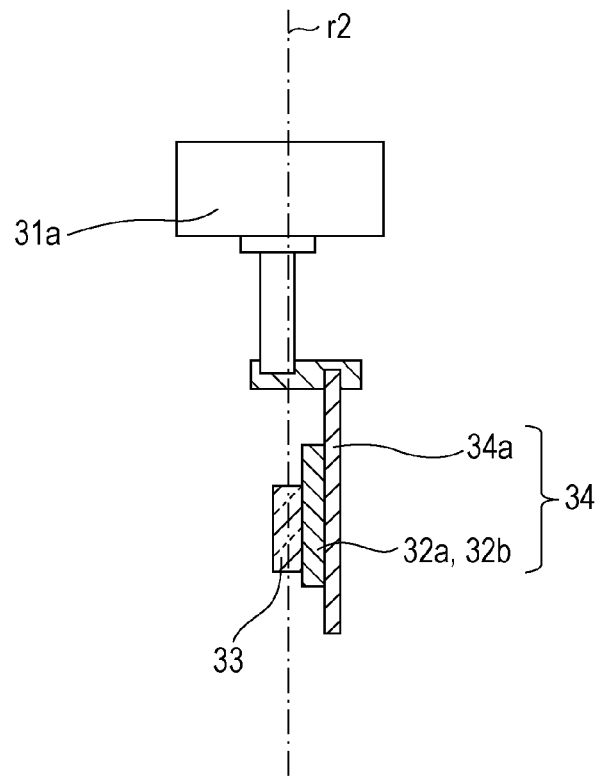
FIG. 31 illustrates an appearance of the thermal image sensor according to the ninth modification of the second embodiment.

FIG. 29 is a diagram illustrating a rotation axis of a thermal image sensor according to a ninth modification of the second embodiment. The same components as those illustrated in FIG. 12 are given the same reference numerals, and detailed description thereof is omitted. FIGS. 30 and 31 illustrate appearances of the thermal image sensor according to the ninth modification of the second embodiment.

Although a rotation center of the thermal image sensor 1000 illustrated in FIG. 12 is an axis (rotation axis r1) through the center of the rotation unit 31, the rotation center is not limited to this. As in a thermal image sensor 1000*a* according to the ninth modification, the rotation center may be an axis (rotation axis r2) through a part of the lens 33. The thermal image sensor 1000*a* will be specifically described hereinafter with reference to FIGS. 30 and 31.

As illustrated in FIGS. 30 and 31, the thermal image sensor 1000a according to the ninth modification includes a rotation unit 31a, the lens 33, and the infrared receiving unit 34.

The infrared receiving unit 34 includes a plurality of infrared receiving devices that receive infrared radiation. The infrared receiving unit 34 includes the one-dimensional radiation receiving sensors 32a and 32b and a board 34a. The one-dimensional radiation receiving sensors 32a and 32b are an example of the plurality of infrared receiving devices. The one-dimensional radiation receiving sensors 32a and 32b are arranged on the board 34a and rotated. The plurality of infrared receiving devices are not limited to the one-dimensional radiation receiving sensors 32a and 32b according to the second embodiment, and may be any of the one-dimensional radiation receiving sensors according to the second embodiment or the first to eighth modifications of the second embodiment.

The lens 33 is used for emitting infrared radiation onto the infrared receiving unit 34. More specifically, as described above, the lens 33 is composed of silicon or ZnS, which transmits infrared radiation well, and designed to emit infrared radiation incident from various directions to different infrared receiving devices included in the one-dimensional radiation receiving sensors 32a and 32b. The lens 33 is rotated by the rotation unit 31a about a part thereof. The part of the lens 33 is, for example, a pole that is an optical center of the lens 33. FIGS. 29 and 30 illustrate a pole 33a of the lens 33.

On the board 34a, the one-dimensional radiation receiving sensors 32a and 32b and the lens 33 are disposed.

The rotation unit 31a rotates the infrared receiving unit 34 and the lens 33 about the part of the lens 33. Here, for example, the rotation unit 31a rotates the infrared receiving unit 34 and the lens 33 about an axis (straight line) through the pole 33a of the lens 33 as the rotation axis r2. In the present modification, as illustrated in FIG. 31, the rotation unit 31a has the rotation axis r2 through the pole 33a of the lens 33 and rotates the board 34a about the rotation axis r2. That is, in the present modification, the rotation unit 31a can rotate the one-dimensional radiation receiving sensors 32a and 32b and the lens 33 about the pole 33a of the lens 33 to cause the one-dimensional radiation receiving sensors 32a and 32b to scan a target space (observation area).

With the above configuration, the rotation center of the thermal image sensor 1000a and the pole 33a of the lens 33 substantially match, and a boundary between a high-temperature area and a low-temperature area in an infrared image obtained by the thermal image sensor 1000a can be clear. A boundary between a high-temperature area and a low-temperature area in an obtained infrared image becomes more unclear as the rotation axis of a thermal image sensor and a pole of a lens are more deviated from each other, a reason for which will be described later. In an infrared image in which a boundary between a high-temperature area and a low-temperature area is unclear, it is difficult to detect an object such as a person accurately.

As described above, according to the present modification, an object, such as a person, in an infrared image obtained by the thermal image sensor 1000a can be detected more accurately.

Tenth Modification of Second Embodiment

The thermal image sensors according to the second embodiment and the like each basically include a rotation unit, a radiation receiving sensor (infrared receiving unit), and a lens. The radiation receiving sensor and the lens might become dirty over time. In order to keep the radiation receiving sensor and the lens clean, the thermal image sensor according to each of the second embodiment and the like may further include a cover. The cover may be composed of polyethylene, germanium, silicon, or any another material that transmits infrared radiation well.

If the thermal image sensor according to each of the second embodiment and the like further includes a cover, however, the radiation receiving sensor undesirably detects not only a temperature of a detection target but also a temperature of the cover. It is therefore difficult for the radiation receiving sensor to detect the temperature of the detection target accurately.

On the other hand, even if the radiation receiving sensor detects the temperature of the cover, a correction process can be performed if the temperature and a transmittance of the cover at each time. In this case, the temperature of the detection target can be accurately detected. That is, even if the thermal image sensor according to each of the second embodiment and the like further includes a cover, a temperature of a detection target can be accurately detected insofar as a correction process can be performed.

Now, an example of a thermal image sensor including a cover that has a portion whose transmittance is different (low) from other portions and capable of obtaining a temperature of the cover at each time in order to perform a correction process will be described hereinafter as a tenth modification of the second embodiment.

FIGS. 32A to 32G are diagrams illustrating examples of the cover of the thermal image sensor according to the tenth modification of the second embodiment. The same components as those illustrated in FIGS. 30 and 31 are given the same reference numerals, and detailed description thereof is omitted.

Figure 32A:
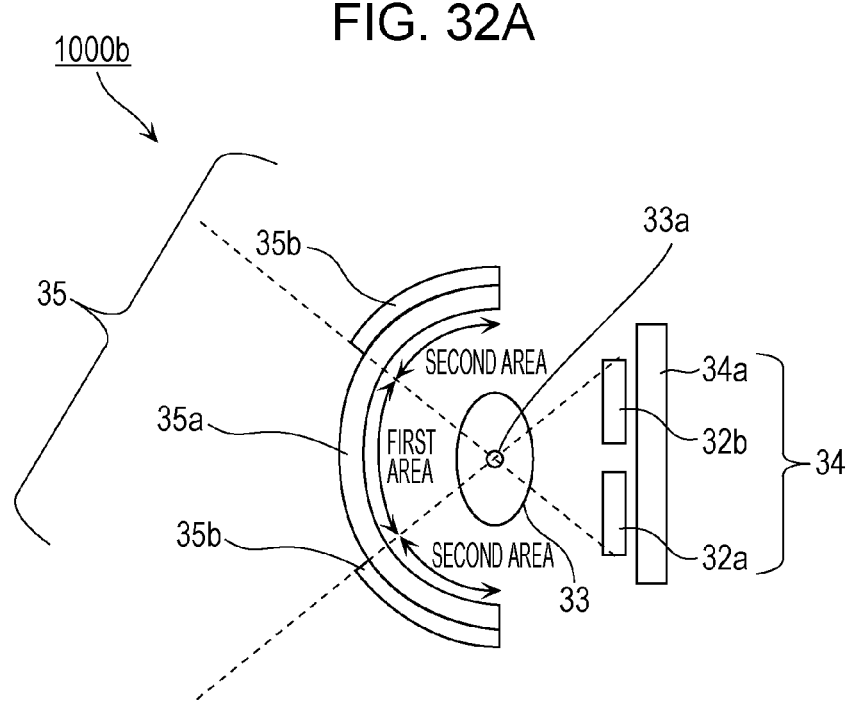
FIG. 32A is a diagram illustrating an example of a cover member of a thermal image sensor according to a tenth modification of the second embodiment.

FIG. 32A illustrates an example of a case in which a thickness of a portion of a cover member is different from that of other portions.

A thermal image sensor 1000b illustrated in FIG. 32A includes a cover member 35.

The lens 33 is used for emitting infrared radiation that has passed through the cover member 35 to the infrared receiving unit 34.

The cover member 35 faces the infrared receiving unit 34 across the lens 33 and has translucency. As described above, the cover member 35 is composed of a material that transmits infrared radiation well, such as polyethylene, germanium, or silicon. In the present modification, the rotation unit 31a does not rotate the cover member 35. In other words, the rotation unit 31a does not rotate the cover member 35 but rotates the infrared receiving unit 34 and the lens 33 about a part of the lens 33.

The cover member 35 includes a first area having a first infrared transmittance and second areas having a second infrared transmittance, which is lower than the first infrared transmittance. The second areas and the first area are composed of the same material, and the second areas are thicker than the first area.

More specifically, as illustrated in FIG. 32A, the first area of the cover member 35 is a member 35a having the first infrared transmittance, and the second areas of the cover member 35 include the member 35a and members 35b, which has the first infrared transmittance, stacked on the member 35a. The members 35a and 35b are composed of the same material.

Since the thickness of the second areas is different from that of the first area in the thermal image sensor 1000b illustrated in FIG. 32A, the infrared transmittance of the second areas is lower than that of the first area. The first infrared transmittance is 40% or higher, for example, and the second infrared transmittance is 20% or lower. Infrared radiation that has passed through the second areas, whose infrared transmittance is low, is significantly affected by a temperature of the cover member 35. Infrared radiation that has passed through the first area, whose infrared transmittance is high, is less affected by the temperature of the cover member 35 and mainly affected by a temperature of a detection target.

In the thermal image sensor 1000b illustrated in FIG. 32A, therefore, the temperatures of the cover member 35 and the detection target obtained by receiving infrared radiation that has passed through the first area can be corrected using the temperature of the cover member 35 obtained by receiving infrared radiation that has passed through the second areas, in order to obtain the temperature of the detection target.

An example of a case in which a portion of a cover member has an infrared transmittance different from that of other portions is not limited to that illustrated in FIG. 32A. A thermal image sensor 1000c illustrated in FIG. 32B or a thermal image sensor 1000d illustrated in FIG. 32C may be used, instead. Differences from the thermal image sensor 1000b illustrated in FIG. 32A will be mainly described hereinafter.

Figure 32B:
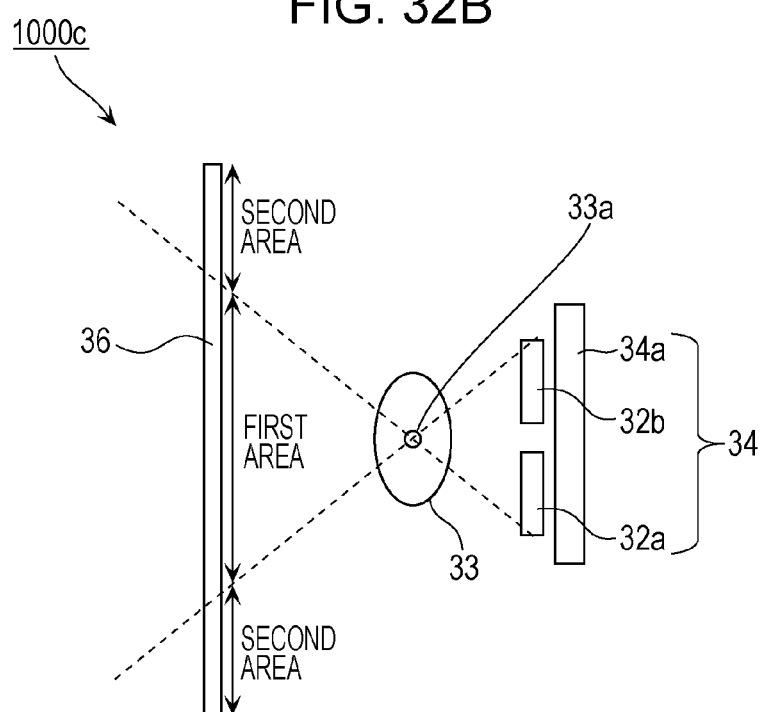
FIG. 32B is a diagram illustrating another example of the cover member of the thermal image sensor according to the tenth modification of the second embodiment.

FIG. 32B illustrates another example of the cover member including the first area and the second areas having different infrared transmittances from each other.

The thermal image sensor 1000c illustrated in FIG. 32B includes a cover member 36.

The lens 33 is used for emitting infrared radiation that has passed through the cover member 36 to the infrared receiving unit 34.

The cover member 36 faces the infrared receiving unit 34 across the lens 33 and has translucency. As described above, the cover member 36 is composed of a material that transmits infrared radiation well, such as polyethylene, germanium, or silicon.

As in the case of the cover member 35, the rotation unit 31a does not rotate the cover member 36. In other words, the rotation unit 31a does not rotate the cover member 36 but rotates the infrared receiving unit 34 and the lens 33 about a part of the lens 33.

As illustrated in FIG. 32B, the cover member 36 includes the first area and the second areas. The cover member 36 is, for example, a flat translucent member. A radius of curvature of the cover member 36 is larger than that of that of the lens 33. If a radius of curvature of the lens 33 on a side of the cover member 36 and a radius of curvature of the lens 33 on a side of the infrared receiving unit 34 are different from each other, the radius of curvature of the cover member 36 is larger than the smaller radius of curvature of the lens 33. The lens 33 may be flat either on the side of the cover member 36 or on the side of the infrared receiving unit 34. A distance between each second area and the lens 33 is larger than a distance between the first area and the lens 33. More specifically, a minimum value of a distance between a position at which infrared radiation that has entered the second area goes out (exits) and a rotation center (pole 33a) of the lens 33 is larger than a distance between a position at which infrared radiation that has entered the first area exits and the rotation center of the lens 33, wherever the latter position is.

In addition, a minimum value of an optical length, in the second area, of infrared radiation that passes through the second area and the rotation center of the lens 33 is larger than an optical length, in the first area, of infrared radiation that passes through the first area and the rotation center of the lens 33. In this case, a boundary between the first area and the second area is regarded as included in the second area. By rotating the infrared receiving unit 34 and the lens 33 about a part of the lens 33, not the cover member 36, the optical length can be changed. As a result, the first area of the cover member 36 achieves the first infrared transmittance, and the second areas of the cover member 36 achieve the second infrared transmittance, which is lower than the first infrared transmittance.

Although the shape of the cover member 36 is flat in the above description, the shape of the cover member 36 is not limited to this. The cover member 36 may be, for example, a curved translucent plate. The radius of curvature of the cover member 36 in this case is larger than that of the lens 33.

If the radius of curvature of the lens 33 on the side of the cover member 36 and the radius of curvature of the lens 33 on the infrared receiving unit 34 are different from each other, the radius of curvature of the cover member 36 is larger than the smaller radius of curvature of the lens 33. The lens 33 may be flat either on the side of the cover member 36 or on the side of the infrared receiving unit 34.

By adopting this configuration, an incident angle of infrared radiation that enters the second areas can be smaller than when the cover member 36 is flat. As a result, the second areas can transmit infrared radiation better. Compared to when the cover member 36 is flat, a range of the second areas that can be detected by the infrared receiving unit 34 increases.

The cover member 36 is more advantageous than the cover member 35 in that the cover member 36 can be fabricated with less processing, which reduces cost. On the other hand, the cover member 35 is more advantageous than the cover member 36 in that the cover member 35 is smaller and stronger.

Figure 32C:
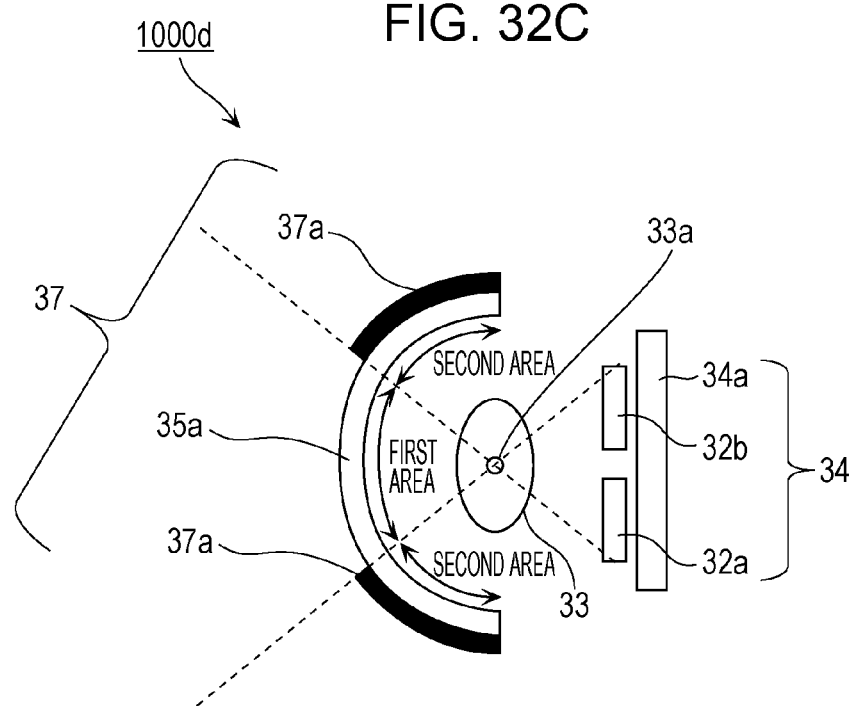
FIG. 32C is a diagram illustrating another example of the cover member of the thermal image sensor according to the tenth modification of the second embodiment.

FIG. 32C illustrates another example of the cover member including the first area and the second areas having different infrared transmittances.

A thermal image sensor 1000d illustrated in FIG. 32C includes a cover member 37.

The lens 33 is used for emitting infrared radiation that has passed through the cover member 37 to the infrared receiving unit 34.

The cover member 37 faces the infrared receiving unit 34 across the lens 33 and has translucency. As described above, the cover member 37 is composed of a material that transmits infrared radiation well, such as polyethylene, germanium, or silicon.

As in the case of the cover members 35 and 36, the rotation unit 31a does not rotate the cover member 37. In other words, the rotation unit 31a does not rotate the cover member 37 but rotates the infrared receiving unit 34 and the lens 33 about a part of the lens 33.

The cover member 37 includes the first area, which has the first infrared transmittance, and the second areas, which have the second infrared transmittance, which is lower than the first infrared transmittance. The first area of the cover member 37 is the member 35a having the first infrared transmittance, and the second areas of the cover member 37 include the member 35a and members 37a, which absorb infrared radiation, stacked on the member 35a. The members 37a are composed of an infrared absorbing material, and may be applied to the member 35a or may be black tape that absorbs infrared radiation.

The cover member 37 is more advantageous than the cover member 36 in that the cover member 37 is smaller and stronger.

Figure 32D:
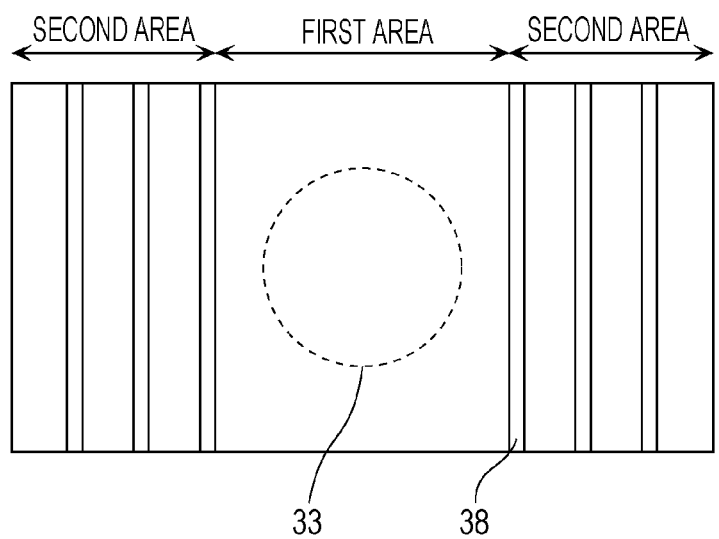
FIG. 32D is a diagram illustrating another example of the cover member of the thermal image sensor according to the tenth modification of the second embodiment.
Figure 32E:
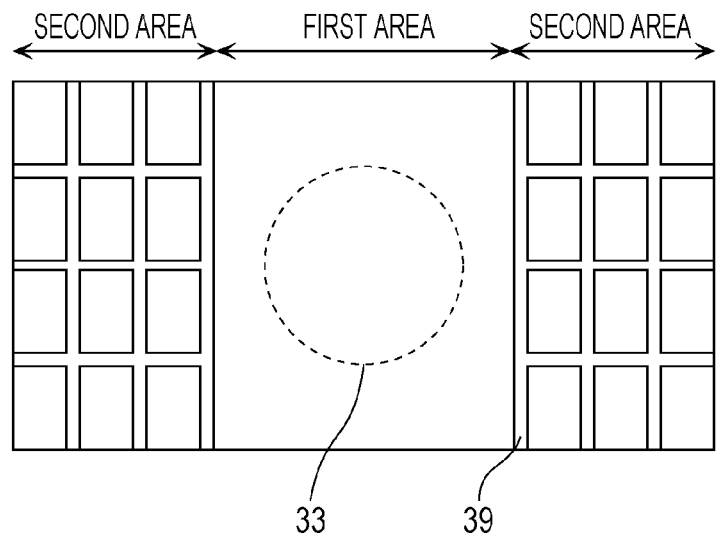
FIG. 32E is a diagram illustrating another example of the cover member of the thermal image sensor according to the tenth modification of the second embodiment.
Figure 32F:
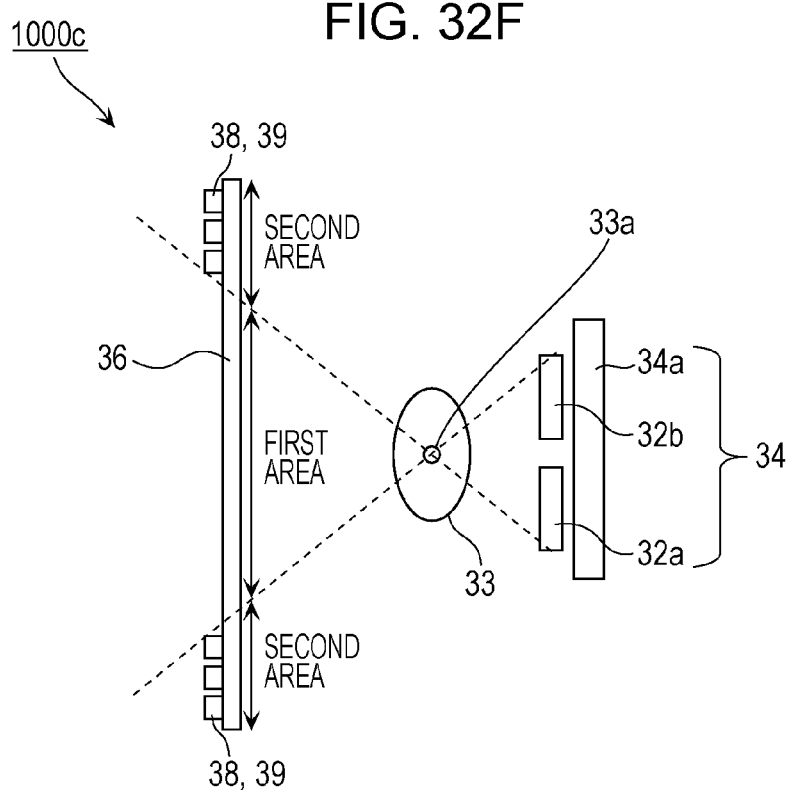
FIG. 32F is a diagram illustrating another example of the cover member of the thermal image sensor according to the tenth modification of the second embodiment.

The thermal image sensor 1000c illustrated in FIG. 32B does not necessarily include only the cover member 36. As illustrated in FIG. 32F, the thermal image sensor 1000c may further include members 38 or 39 in the second areas of the cover member 36.

As illustrated in FIG. 32F, the members 38 are arranged on a side of the second areas of the cover member 36 that does not face the lens 33. As illustrated in FIG. 32D, the members 38 are a plurality of plates having translucency arranged at certain intervals.

As illustrated in FIG. 32F, the members 39, too, are arranged on the side of the second areas of the cover member 36 that does not face the lens 33. As illustrated in FIG. 32E, the members 39 are partition members having a certain pattern.

As illustrated above, since the thermal image sensor 1000c illustrated in FIG. 32F further includes the members 38 or 39, a difference between the infrared transmittance (second infrared transmittance) of the second areas of the cover member 36 and the infrared transmittance (first infrared transmittance) of the first area of the cover member 36 becomes larger.

Furthermore, since the thermal image sensor 1000c illustrated in FIG. 32F further includes the members 38 or 39, the structure of the second areas of the cover member 36 can be reinforced. As a result, the entire structure of the cover member 36 can be reinforced.

Similarly, the thermal image sensor 1000b illustrated in FIG. 32A may include the members 38 or 39. In this case, as illustrated in FIG. 32G, the thermal image sensor 1000b may include the members 38 or 39 instead of the members 35b.

Figure 32G:
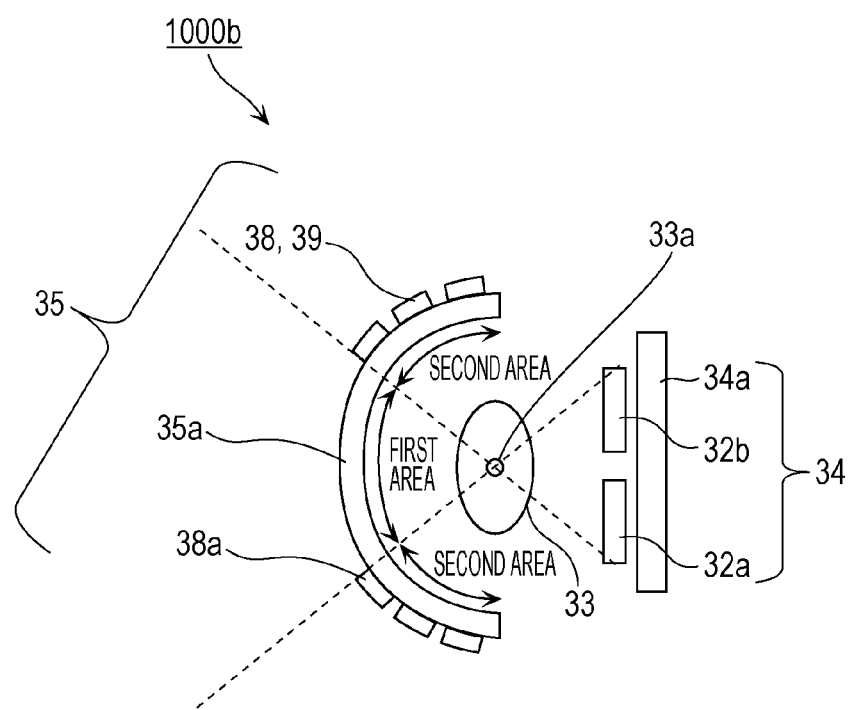
FIG. 32G is a diagram illustrating another example of the cover member of the thermal image sensor according to the tenth modification of the second embodiment.

In this case, since the thermal image sensor 1000b illustrated in FIG. 32G includes the members 38 or 39 instead of the members 35b, the structure of the second areas of the cover member 36 can be reinforced. As a result, the entire structure of the cover member 36 can be reinforced.

As described above, according to the thermal image sensor according to the present modification, temperatures of a cover member and a detection target obtained by receiving infrared radiation that has passed through the first area can be corrected using a temperature of the cover member obtained by receiving infrared radiation that has passed through the second area. As a result, the temperature of the detection target can be accurately detected. That is, according to the thermal image sensor according to the present modification, since the temperature and transmittance of the cover member at each time can be obtained, the temperature of the detection target can be accurately detected by performing a correction process.

Although the rotation unit 31a scans a target space (observation area) at a uniform speed (that is, the rotation unit 31a rotates at a uniform speed) in the present modification, the scanning speed is not limited to this. The scanning speed (rotational speed) may be different between different areas of the cover member having different infrared transmittances.

That is, when the rotation unit 31a rotates the infrared receiving unit 34 and the lens 33, a first rotational speed of the rotation unit 31a while the infrared receiving unit 34 is receiving infrared radiation that has passed through the first area and a second rotational speed of the rotation unit 31a while the infrared receiving unit 34 is receiving infrared radiation that has passed through the second areas may be different from each other.

The second rotational speed may be higher than the first rotational speed. This is because it is preferable that the scanning speed (rotational speed) be lower while the infrared receiving unit 34 is receiving infrared radiation that has passed through the first area in order to increase reception sensitivity for infrared radiation that has passed through the first area, whose infrared transmittance is high. By increasing the reception sensitivity for infrared radiation that has passed through the first area, whose infrared transmittance is high, reception sensitivity for infrared radiation from a target space (observation area) having higher observation priority can be increased. On the other hand, the scanning speed (rotational speed) while the infrared receiving unit 34 is receiving infrared radiation that has passed through the second areas may be high because only the temperature of the cover member needs to be measured.

Since the thermal image sensor according to the present modification only needs to measure the temperature of the cover member, a period in which infrared radiation that has passed through the second areas is received may be short. After infrared radiation that has passed through the second areas is received at a beginning of the scanning performed by the thermal image sensor according to the present modification, for example, infrared radiation that has passed through the second areas may be received at certain time intervals.

If the second areas of the cover member are extremely smaller than the first area, the second rotational speed may be lower than the first rotational speed. This is because infrared radiation that has passed through the extremely small second areas needs to be certainly received in order to measure the temperature of the cover member.

Eleventh Modification of Second Embodiment

The thermal image sensors according to the second embodiment and the first to tenth modifications of the second embodiment may be incorporated into electronic cookers such as microwave ovens. An example of this case will be described hereinafter.

Figure 33A:
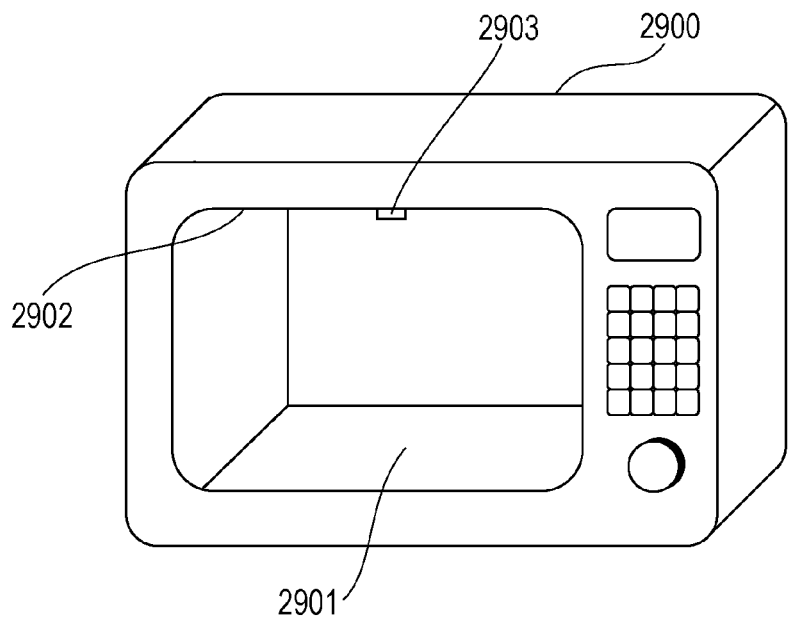
FIG. 33A is a diagram illustrating an example of an electronic cooker according to an eleventh modification of the second embodiment.
Figure 33B:
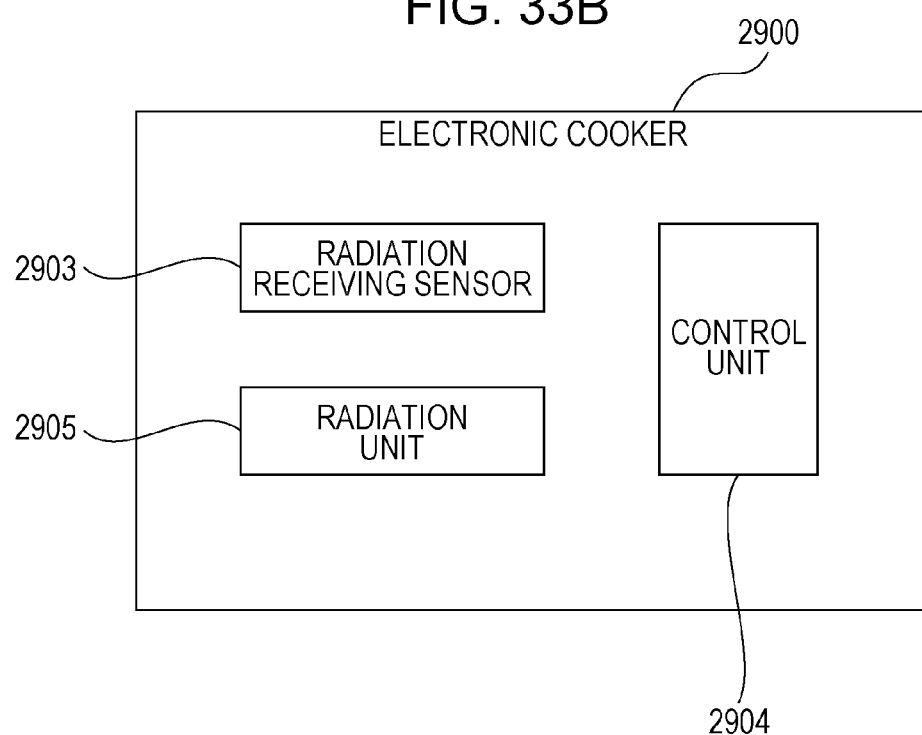
FIG. 33B is a diagram illustrating an example of the electronic cooker according to the eleventh modification of the second embodiment.
Figure 34:
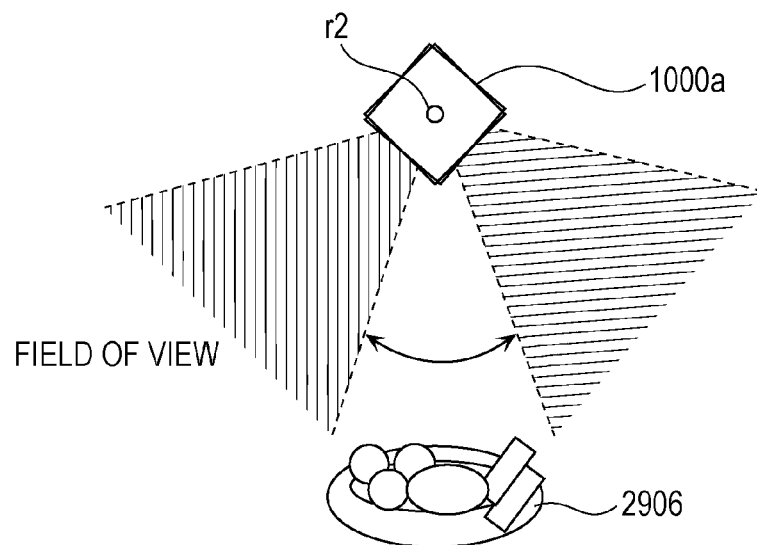
FIG. 34 is a diagram illustrating a method for arranging a thermal image sensor according to the eleventh modification of the second embodiment.
Figure 35:
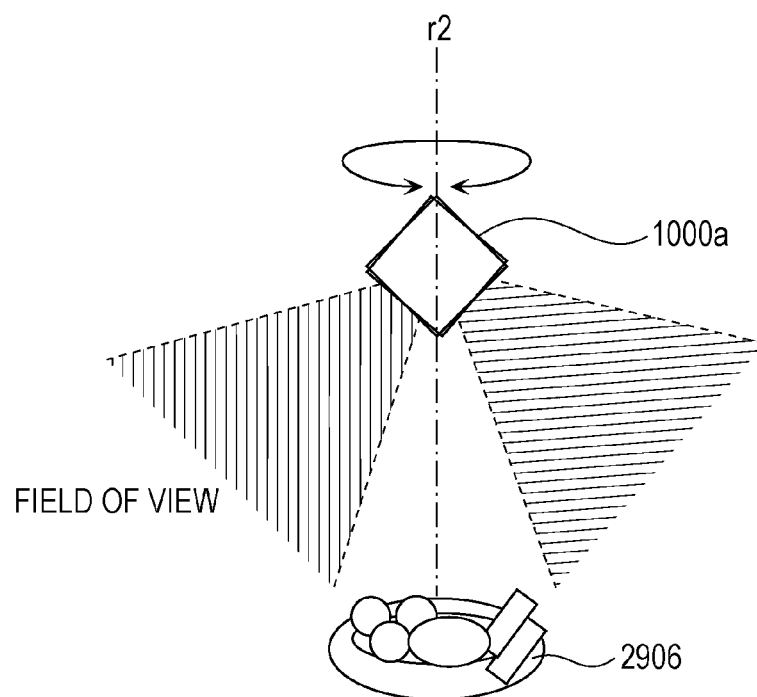
FIG. 35 is a diagram illustrating a method for arranging a thermal image sensor in a comparison example.

FIG. 33A is a diagram illustrating an example of an electronic cooker according to an eleventh modification of the second embodiment. FIG. 33B is a diagram illustrating an example of a functional configuration of the electronic cooker according to the eleventh modification of the second embodiment. FIG. 34 is a diagram illustrating a method for arranging the thermal image sensor according to the eleventh modification of the second embodiment. FIG. 35 is a diagram illustrating a method for arranging a thermal image sensor in a comparison example.

An electronic cooker 2900 illustrated in FIG. 33A includes a platform 2901, a ceiling 2902, and a radiation receiving sensor 2903. The electronic cooker 2900 includes the radiation receiving sensor 2903, a control unit 2904, and a radiation unit 2905 as functional components.

The platform 2901 is used for placing an object (e.g., a target 2906) to be cooked.

The radiation receiving sensor 2903 is the thermal image sensor 1000a, for example, and arranged on the ceiling 2902. Since the thermal image sensor 1000a is arranged on the ceiling 2902, the thermal image sensor 1000a can scan a wide range inside the electronic cooker 2900. The radiation receiving sensor 2903 is not limited to the thermal image sensor 1000a. The radiation receiving sensor 2903 may be one of the thermal image sensors 1000b to 1000d according to the tenth modification of the second embodiment, or may be one of the thermal image sensors according to the second embodiment and the first to eighth modifications of the second embodiment.

The rotation axis r2 of the rotation unit 31a of the thermal image sensor 1000a is substantially parallel to the ceiling 2902. As indicated by the comparison example illustrated in FIG. 35, for example, if the rotation axis r2 of the thermal image sensor 1000a is substantially perpendicular to the ceiling 2902, it is difficult for the thermal image sensor 1000a to scan the target 2906, which is right below the thermal image sensor 1000a. On the other hand, as illustrated in FIG. 34, for example, by making the rotation axis r2 of the thermal image sensor 1000a substantially parallel to the ceiling 2902, the thermal image sensor 1000a can scan the target 2906 right therebelow.

The radiation unit 2905 emits infrared radiation to the target 2906. The radiation unit 2905 includes an infrared source (not illustrated) such as a halogen lamp or a heating wire unit. The radiation unit 2905 can control an area inside the electronic cooker 2900 to which infrared radiation is emitted.

The radiation unit 2905 may include a plurality of infrared sources that emit infrared radiation only to certain areas inside the electronic cooker 2900. In this case, one of the infrared sources included in the radiation unit 2905 may be selected in order to control the emission area. The radiation unit 2905 may include only one infrared source. In this case, the radiation unit 2905 may further include radiation blocking means between the infrared source and the target 2906, and the radiation blocking means may block part of the emission area of the infrared source to achieve a desired area. The radiation unit 2905 desirably includes a plurality of infrared sources because, in this case, efficiency is higher than when the radiation unit 2905 includes only one infrared source.

The control unit 2904 controls the operation of the electronic cooker 2900. The control unit 2904 controls, for example, an electronic cooking function of the electronic cooker 2900 that employs an electromagnetic field, execution of the electronic cooking function being a main purpose of the electronic cooker 2900. The control unit 2904 also controls the radiation unit 2905 such that the radiation unit 2905 emits infrared radiation to the target 2906 detected on the basis of an infrared image obtained from the radiation receiving sensor 2903.

The control unit 2904 ends the operation of the electronic cooker 2900, for example, when a temperature of the target 2906 detected on the basis of the infrared image obtained from the radiation receiving sensor 2903 has reached a certain value. Since the electronic cooker 2900 includes the radiation receiving sensor 2903, the electronic cooker 2900 can heat the target 2906 to a temperature close to a desired temperature.

The control unit 2904 may control the radiation receiving sensor 2903 such that the radiation receiving sensor 2903 emits infrared radiation to the target 2906 if a rate of increase in the temperature of the target 2906 detected on the basis of the infrared image obtained from the radiation receiving sensor 2903 is lower than a certain value. Since the electronic cooker 2900 includes the radiation receiving sensor 2903 and the radiation unit 2905, the electronic cooker 2900 can intensively heat, on the basis of a result of measurement performed by the thermal image sensor, a heating area (target 2906) in which the rate of increase in temperature is low. As a result, the electronic cooker 2900 can heat the target 2906 to a temperature close to a desired temperature while suppressing uneven heating of the target 2906.

There might be a case in which there are a plurality of targets 2906 and rates of increase in temperatures of the plurality of targets 2906 are different from one another and a case in which the rates of increase in the temperatures of portions of a single target 2906 are different from one another such as a case in which the target 2906 is a box meal. In these cases, the control unit 2904 may reduce power used for heating and slowly heat the target 2906 on the basis of differences between the rates of increase in the temperatures of the target(s) 2906 detected from an infrared image obtained from the radiation receiving sensor 2903. In this case, uneven heating of the target(s) 2906 can be suppressed, and all the target(s) 2906 can be heated to a temperature close to a desired temperature.

Although the electronic cooker 2900 includes the radiation unit 2905 in the above description, the radiation unit 2905 is not a mandatory component. The radiation unit 2905 need not be included in the electronic cooker 2900.

The electronic cooker 2900 may further include non-contact moisture measuring means that includes an infrared source of 1.2 to 1.6 µm and a radiation receiving unit. If the electronic cooker 2900 includes the moisture measuring means, the electronic cooker 2900 can emit infrared radiation having the above wavelength to the target 2906 and calculate an infrared absorption rate at a surface of the target 2906 by receiving infrared radiation reflected from the surface of the target 2906. Because infrared radiation having a wavelength of 1.2 to 1.6 µm tends to be absorbed by water, a moisture content of the surface of the target 2906 can be estimated to be high when the infrared absorption rate of the surface is high.

That is, if the electronic cooker 2900 includes the moisture measuring means, the electronic cooker 2900 can heat the target 2906 while measuring a moisture content of the target 2906. The electronic cooker 2900 can therefore control an output heat such that the moisture content of the target 2906 achieves a desired value.

If the electronic cooker 2900 includes the radiation unit 2905, the electronic cooker 2900 can obtain the distribution (variation) of moisture in the target 2906 and control an emission area of the radiation unit 2905. In this case, uneven moisture contents of portions of the target 2906 can be suppressed by turning down heating of an emission area in which a decrease in moisture content is large. As a result, it is possible to suppress an extreme increase in the temperature of the target 2906 and an extreme decrease in the moisture content of the target 2906, thereby suppressing a deterioration of tastes of a meal that is the target 2906.

Twelfth Modification of Second Embodiment

In the ninth modification of the second embodiment, an example of a case in which a rotation center of a thermal image sensor and a pole of a lens substantially match has been described.

By using the thermal image sensor according to the ninth modification of the second embodiment, it can be checked whether the rotation axis or a center of a field of view of the thermal image sensor is not deviated in a device for which the thermal image sensor is provided. An example of this case will be described hereinafter with reference to the drawings.

Figure 36:
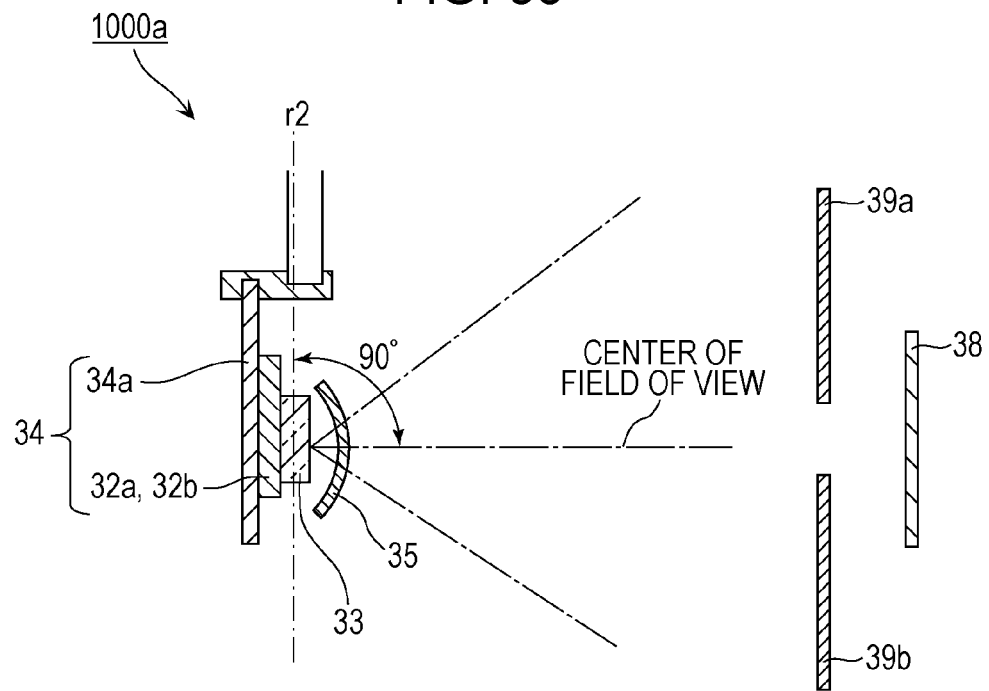
FIG. 36 is a diagram illustrating an example of a thermal image sensor according to a twelfth modification of the second embodiment.

FIG. 36 is a diagram illustrating an example of a thermal image sensor according to a twelfth modification of the second embodiment. The same components as those illustrated in FIG. 31 are given the same reference numerals, and detailed description thereof is omitted.

In FIG. 36, the cover member 35 is provided for the thermal image sensor 1000a according to the ninth modification of the second embodiment, and a hot member 38 and cold members 39*a* and 39*b* are provided at a certain distance away from the thermal image sensor 1000*a* as members having different temperatures.

The hot member 38 is hotter than the cold members 39*a* and 39*b*. The cold members 39*a* and 39*b* are colder than the hot member 38. A difference in temperature between the hot member 38 and the cold members 39*a* and 39*b* is desirably as large as possible, but it is only required that the hot member 38 positioned between (behind a gap between) the cold members 39*a* and 39*b* be accurately detected from a thermal image obtained by the thermal image sensor 1000*a*.

The hot member 38 is positioned between the cold members 39*a* and 39*b* when viewed from the thermal image sensor 1000*a*. The gap between the cold members 39*a* and 39*b* is arranged in such a way as to include a center of a field of view of the thermal image sensor 1000*a*.

The thermal image sensor 1000*a* according to the twelfth modification of the second embodiment can thus check whether or not the rotation axis r2 or the center of the field of view of the thermal image sensor 1000*a* is deviated by obtaining a thermal image of the hot member 38 and the cold members 39*a* and 39*b*, whose temperatures are different from each other.

Figure 37:
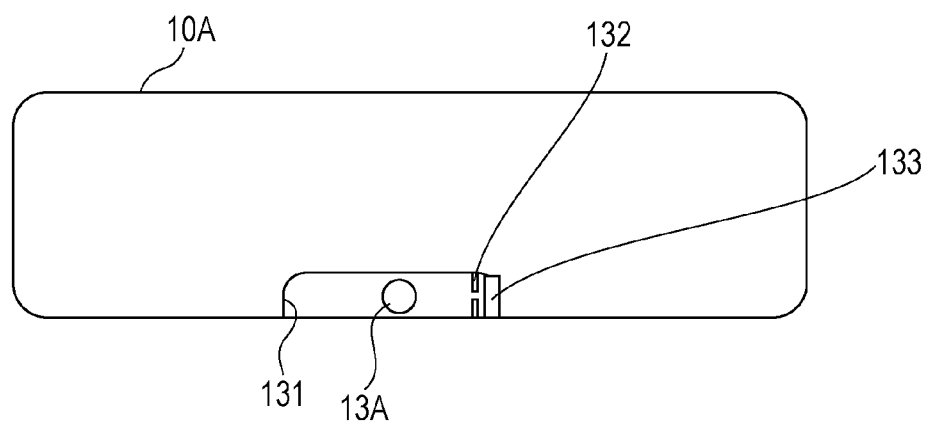
FIG. 37 is a diagram illustrating an example of a device for which the thermal image sensor illustrated in FIG. 36 is provided.

FIG. 37 is a diagram illustrating an example of a device for which the thermal image sensor 1000*a* illustrated in FIG. 36 is provided.

In FIG. 37, an air conditioner 10A is illustrated as an example of the device. In the air conditioner 10A, a thermal image sensor 13A is installed in a sensor installation space 131.

The air conditioner 10A is the same as the air conditioning apparatus 10 illustrated in FIG. 1 except for the components illustrated in FIG. 37, and detailed description thereof is omitted.

The thermal image sensor 13A is the thermal image sensor 1000*a* illustrated in FIG. 36. The thermal image sensor 1000*a* according to the ninth modification of the second embodiment may be used, instead, insofar as the rotation center and the pole of the lens substantially match in the thermal image sensor 1000*a*.

The sensor installation space 131 is a space in which the thermal image sensor 13A is installed. In the present modification, a low-temperature member 132 having a hole at a center thereof and a high-temperature member 133 are provided at an end of the sensor installation space 131.

The low-temperature member 132 and the high-temperature member 133 are arranged at positions at which the low-temperature member 132 and the high-temperature member 133 do not affect a measurement target area, such as behind the thermal image sensor 13A or at a side of the measurement target area viewed from the thermal image sensor 13A. In the example illustrated in FIG. 36, the low-temperature member 132 and the high-temperature member 133 are arranged at a side of the measurement target area viewed from the thermal image sensor 13A, that is, a right end of the sensor installation space 131.

The low-temperature member 132 is the cold members 39*a* and 39*b* illustrated in FIG. 36. The low-temperature member 132 is a member that does not generate heat and may be, for example, a surface beside the sensor installation space 131 in which a hole is cut. As described above, the hole is cut at a center of a field of view of the thermal image sensor 13A.

The high-temperature member 133 is the hot member 38 illustrated in FIG. 36. The high-temperature member 133 is a member that generates heat and may be, for example, a circuit of the air conditioner 10A adjacent to the sensor installation space 131. This is because the circuit of the air conditioner 10A generates heat during use of the air conditioner 10A. Obviously, a dedicated member separate from the circuit may be used, instead.

As described above, by providing members whose temperatures are different from each other, the air conditioner 10A can check whether the rotation axis of the thermal image sensor 13A is inclined and whether the center of the field of view of the thermal image sensor 13A is deviated. In this case, by correcting deviation of the thermal image sensor 13 from a design center, for example, a detection target space (observation area) can be appropriately set.

Other Modifications

As with the thermal image sensor 30 and the thermal image sensor 1000, the thermal image sensors according to the second embodiment and the modifications of the second embodiment each basically include the rotation unit 31, the corresponding radiation receiving sensor, and the lens 33.

Figure 38:
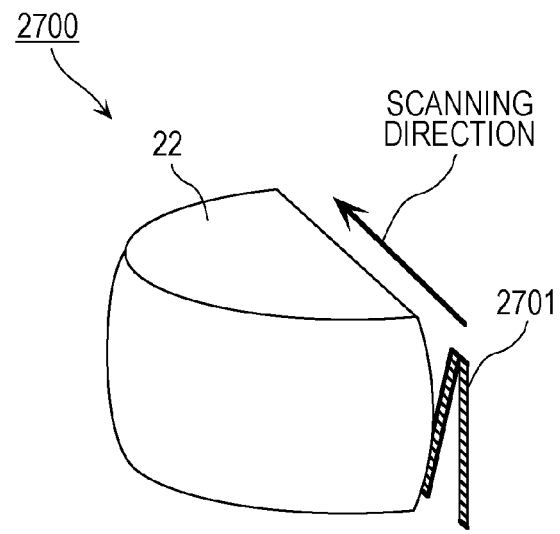
FIG. 38 is a diagram illustrating an example of a thermal image sensor that moves a radiation receiving sensor (radiation receiving devices)

The configuration of a thermal image sensor is not limited to these examples. A thermal image sensor, for example, need not include the rotation unit 31. FIG. 38 is a diagram illustrating an example of a thermal image sensor that moves a radiation receiving sensor (radiation receiving devices).

Figure 15:
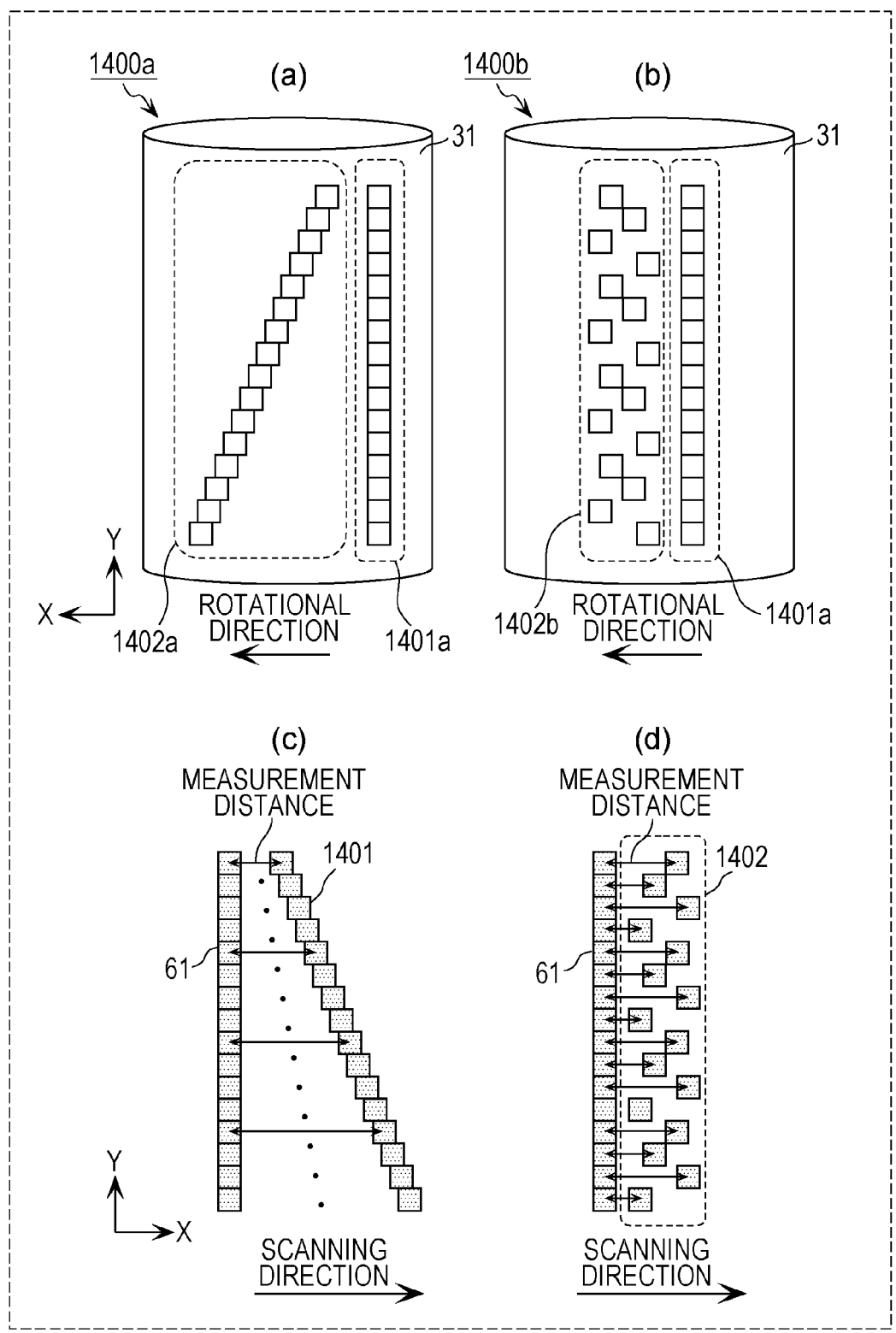
FIG. 15 illustrates thermal image sensors according to a second modification of the second embodiment and observation areas of the thermal image sensors.

A thermal image sensor 2700 illustrated in FIG. 38 includes the lens 22 illustrated in FIG. 2 and a radiation receiving sensor 2701 in which radiation receiving devices are arranged in the same manner as in the thermal image sensor 1400*a* illustrated in FIG. 15(*a*). The radiation receiving sensor 2701 is moved behind the lens 22 (on a side opposite to a side on which there is an observation target). Although the thermal image sensor 2700 has the same observation areas as the thermal image sensor 1400*a*, for example, the arrangement of the radiation receiving devices in the thermal image sensor 2700 may be horizontally or vertically reversed depending on the configuration of an optical system.

Figure 39:
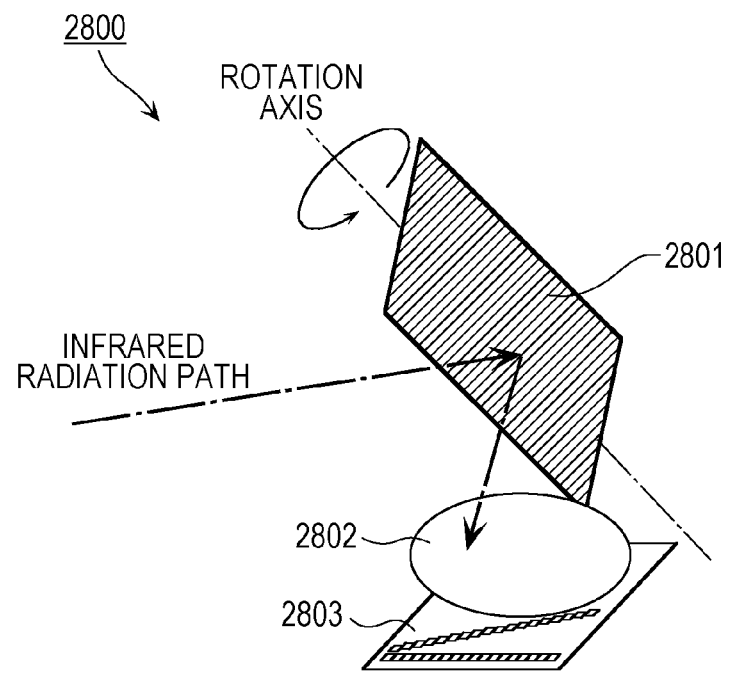
FIG. 39 is a diagram illustrating an example of a thermal image sensor that performs scanning by moving a component other than a radiation receiving sensor.

Scanning may be performed by moving a component other than the radiation receiving sensor 2701. FIG. 39 is a diagram illustrating an example of a thermal image sensor that performs scanning by moving a component other than a radiation receiving sensor.

As illustrated in FIG. 39, a thermal image sensor 2800 includes a mirror 2801, a lens 2802, and a radiation receiving sensor 2803. The mirror 2801 reflects infrared radiation emitted from an observation target and causes the infrared radiation to enter the lens 2802. The radiation receiving sensor 2803 receives the infrared radiation reflected from the mirror 2801 through the lens 2802.

Although the radiation receiving sensor 2803 does not move or rotate in this example, the mirror 2801 is rotated to perform scanning. The mirror 2801 is rotated by a driving unit (not illustrated) or the like.

Although the lens 2802 is arranged between the mirror 2801 and the radiation receiving sensor 2803 in the thermal image sensor 2800, the lens 2802 may be attached to a reflection surface of the mirror 2801 or may be arranged between the mirror 2801 and the observation target. Alternatively, the lens 2802 may be omitted, and the mirror 2801 may be a concave mirror.

Although the radiation receiving devices are arranged as illustrated in FIG. 15(*a*) in the thermal image sensors 2700 and 2800, the radiation receiving devices may be arranged in a different manner.

The arrangement of observation pixels of a thermal image for achieving measurement of a moving object and producing a high-resolution effect and the image processing method according to the second embodiment may be applied to any image sensor that generates an image by performing scanning using a line sensor. The arrangement of observation pixels and the image processing method may be used, for example, in an inspection apparatus including a line sensor used in a manufacturing line of a factory.

If the air conditioning apparatus 10 according to the first embodiment includes the thermal image sensor according to the second embodiment, the air conditioning apparatus 10 can perform air conditioning while detecting the user more accurately and measuring temperatures of a surface of the user's body.

Summary

The thermal image sensor according to the second embodiment includes a plurality of infrared receiving devices (hereinafter also referred to as "infrared detection devices") that detect infrared radiation from observation areas (hereinafter also referred to as "detection areas") and a movement unit that moves the detection areas in the scanning direction in order to cause the plurality of infrared detection devices to detect infrared radiation in a target area of a thermal image. The plurality of infrared detection devices include infrared detection devices whose positions are different from one another in a certain direction (e.g., the rotational direction of the rotation unit 31). The certain direction corresponds to the scanning direction in the arrangement of the plurality of infrared detection devices.

As with the second radiation receiving device line 1402a illustrated in FIG. 15, for example, the plurality of infrared detection devices are arranged in a direction that intersects with both the certain direction and a direction perpendicular to the certain direction.

Alternatively, the plurality of infrared detection devices form a plurality of device lines, each of which includes some of the plurality of infrared detection devices and is positioned differently in the certain direction. Examples of such device lines include the one-dimensional radiation receiving sensors 32a, 32b, and 32c illustrated in FIGS. 12, 14, and the like.

Alternatively, the plurality of device lines may include a device line including infrared detection devices arranged in the direction perpendicular to the certain direction and a device line including infrared detection devices arranged in a direction that intersects with both the certain direction and the direction perpendicular to the certain direction. An example of such device lines is the first radiation receiving device line 1401a and the second radiation receiving device line 1402a.

As illustrated in FIG. 19, the number of infrared detection devices included in one of the plurality of device lines may be different from the number of infrared detection devices included in another device line.

Figure 17:
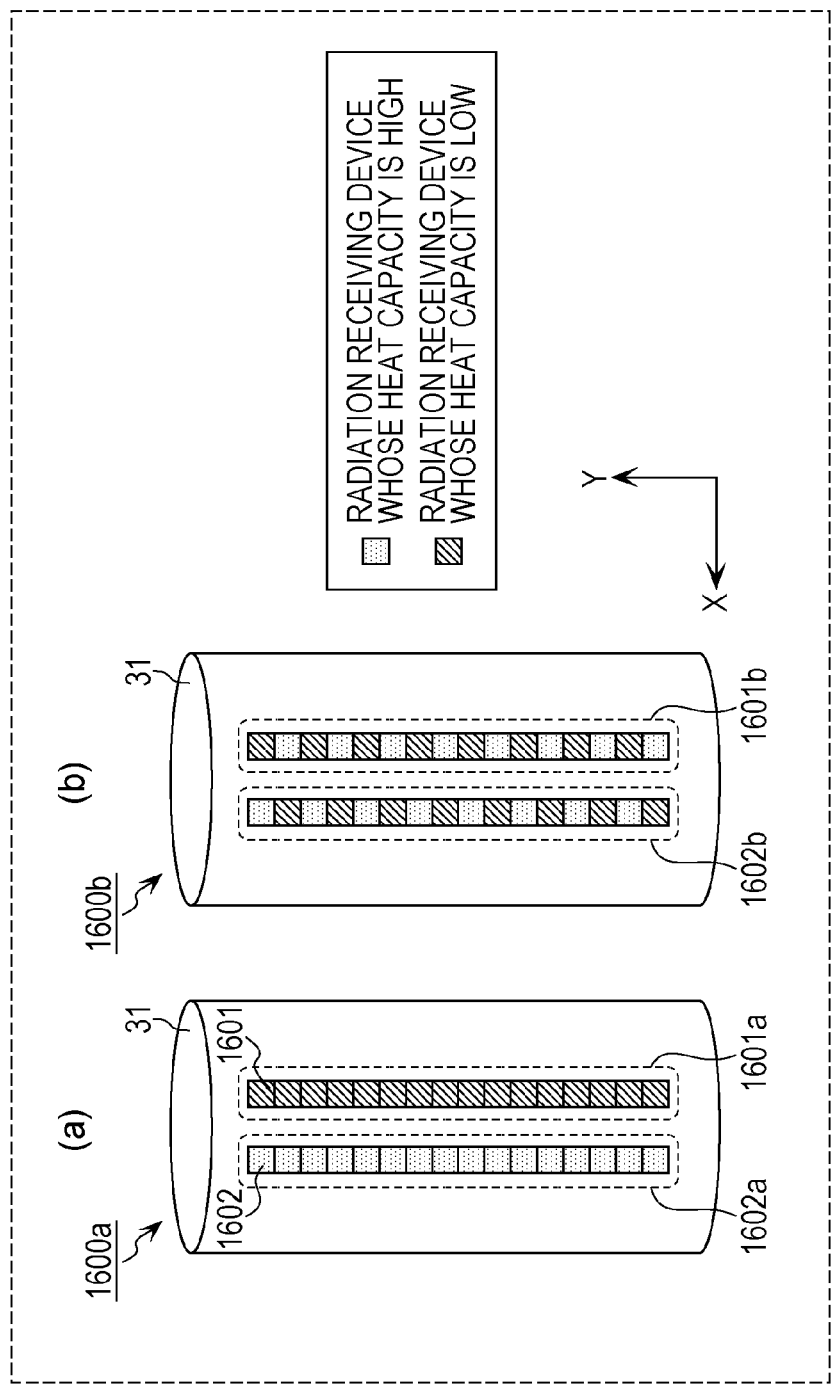
FIG. 17 illustrates thermal image sensors according to a fourth modification of the second embodiment.

As illustrated in FIGS. 17 and 18, the plurality of infrared detection devices may include at least two types of infrared detection devices whose shapes, heat capacities, sizes, or materials are different from each other.

The movement unit of the thermal image sensor according to the second embodiment may move the plurality of infrared detection devices in the certain direction to scan the detection area in the scanning direction. An example of such a movement unit is the rotation unit 31.

Alternatively, the movement unit may move the optical system that causes infrared radiation from a target to enter the plurality of infrared detection devices to scan the detection area in the scanning direction. Examples of such a movement unit include a mechanism for driving the lens 22 illustrated in FIG. 38 and a mechanism for rotating the mirror 2801 illustrated in FIG. 39.

The thermal image sensor according to the second embodiment is more cost-efficient than the thermal image sensor 20, in which infrared detection devices are arranged in a matrix, and more suitable to measure the amount of movement of a person than the thermal image sensor 30, in which infrared detection devices are arranged in a line.

Third Embodiment

In the third embodiment, an automobile air conditioning apparatus that performs air conditioning inside an automobile on the basis of a temperature distribution in the automobile and a transport device will be described. Because the automobile air conditioning apparatus according to the third embodiment is obtained by applying the air conditioning apparatus 10 according to the first embodiment to the transport device, some redundant description is omitted.

The transport device according to the third embodiment is a transport device including an air conditioning apparatus according to the first embodiment or described below and various measuring means (a hygrometer, scattered light measuring means, and the like). Although an example in which an air conditioning apparatus including a thermal image sensor is applied to a transport device will be described in the present embodiment, the transport device may include the thermal image sensor.

The automobile air conditioning apparatus according to the third embodiment includes heat exchange means and blower means and performs air conditioning inside the automobile by heating or cooling air taken therein from inside the automobile and then delivering the heated or cooled air to the inside of the automobile. As in the first embodiment, if means for measuring the temperatures of the surface of the user's body is included and the heat exchange means and the blower means are controlled on the basis of the temperatures of the surface of the user's body, air conditioning according to the state of the user can be performed.

Configuration

Figure 40:
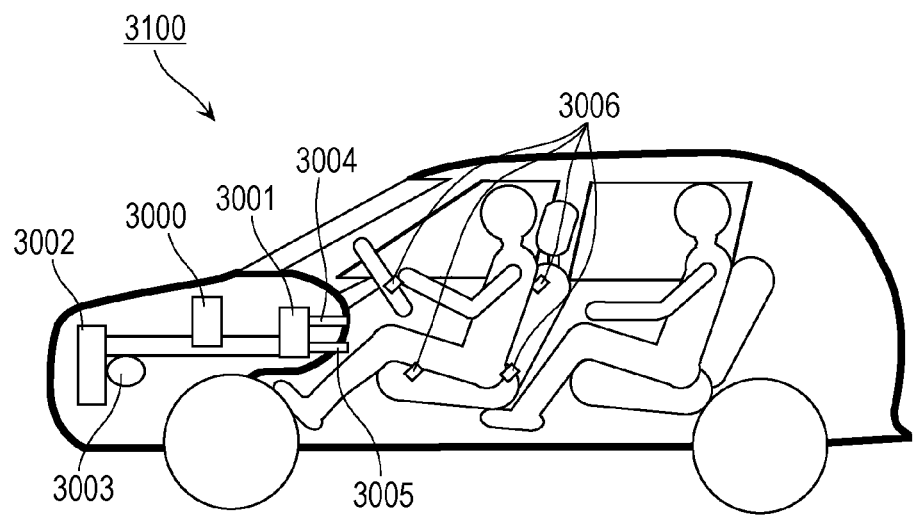
FIG. 40 is a diagram illustrating a first example of an automobile air conditioning apparatus according to a third embodiment.
Figure 41:
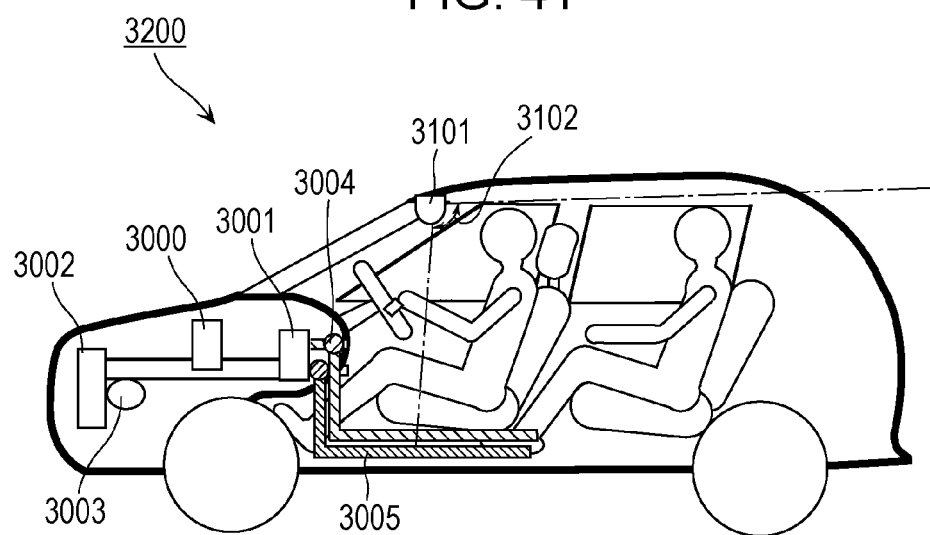
FIG. 41 is a diagram illustrating a second example of the automobile air conditioning apparatus according to the third embodiment.

Two examples of the configuration of the automobile air conditioning apparatus according to the third embodiment will be described hereinafter. FIG. 40 is a diagram illustrating a first example of the automobile air conditioning apparatus according to the third embodiment. FIG. 41 is a diagram illustrating a second example of the automobile air conditioning apparatus according to the third embodiment. An automobile air conditioning apparatus 3100 illustrated in FIG. 40 and an automobile air conditioning apparatus 3200 illustrated in FIG. 41 each include a compressor 3000 as the heat exchange means, an evaporator 3001, a condenser 3002, and a receiver 3003.

First, a cooling operation will be described. A refrigerant compressed by the compressor 3000 is sent to the condenser 3002 and cooled by outside air. Partly liquefied refrigerant is then sent to the receiver 3003. The refrigerant sent to the receiver 3003 is divided into liquefied refrigerant and refrigerant that has not been liquefied, and moisture is removed using a desiccant or the like.

The liquefied refrigerant is injected into the evaporator 3001 through minute nozzle holes of an expansion valve and evaporated. The evaporated refrigerant takes away heat around the evaporator 3001 to cool the evaporator 3001. Air taken by inlet means 3005 from inside the automobile is delivered to the cooled evaporator 3001 and returned to the inside of the automobile by blower means 3004. The air delivered to the inside of the automobile by the blower means 3004 has been cooled by the evaporator 3001, and a temperature of air inside the automobile can be decreased.

In the case of heating, as with a common automobile air conditioning apparatus, a method in which waste heat of an engine is used is employed. In the case of an automobile that generates little heat such as an electric transport device, however, heating is desirably performed using a compressor as in a household air conditioning apparatus in order to achieve an efficient automobile air conditioning apparatus.

As described above, the automobile air conditioning apparatuses 3100 and 3200 include the means for heating or cooling air inside the automobile and means for measuring the temperature of the user. The means for measuring the temperature of the user will be described hereinafter.

In the automobile air conditioning apparatus 3100, temperature sensors 3006 are provided for components that come into contact with the user, such as a steering wheel and a chair, in order to measure the temperature of the user.

In the automobile air conditioning apparatus 3200, on the other hand, a thermal image sensor 3101 is provided inside the automobile in order to measure the temperature of the user. The thermal image sensor 3101 may be of any type. As the thermal image sensor 3101, for example, one of the thermal image sensors according to the first, second, and fourth embodiments is used.

The method in which a plurality of temperature sensors are used as in the automobile air conditioning apparatus 3100 is desirable in that temperatures of various body parts of the user can be measured at low cost. On the other hand, the method in the thermal image sensor 3101 is used as in the automobile air conditioning apparatus 3200 is desirable in that body parts of the user that are not in contact with the steering wheel or the chair and a temperature of the inside of the automobile can be measured by the thermal image sensor 3101 alone.

A contact temperature sensor and a thermal image sensor may be simultaneously used, instead. In this case, temperatures of more body parts of the user can be measured, and air conditioning according to the temperatures of the surface of the user's body can be performed more accurately.

The system configuration of the automobile air conditioning apparatus 3200 is the same as that of the air conditioning apparatus 10 (or the air conditioning apparatus 10*a*) according to the first embodiment, and detailed description is omitted. As in the first embodiment, the automobile air conditioning apparatus 3200 calculates temperatures of portions of a seat used by the user, the temperatures of the surface of the user's body, a temperature of a side window beside the user, and the like on the basis of outputs of the thermal image sensor 3101. A device control unit of the automobile air conditioning apparatus 3200 adjusts the rotational speed or a wind volume of the compressor 3000 in order to achieve air conditioning according to the state of the user and the environment.

An observation area of the thermal image sensor 3101 (not illustrated) desirably includes at least part of a driver's seat. In this case, air conditioning according to temperatures of a surface of a driver's body can be performed.

Alternatively, the observation area of the thermal image sensor 3101 may include only an area around a steering wheel in front of the driver's seat. In this case, air conditioning according to the temperatures of surface of the driver's body (hands) can be performed using a minimum observation area. Unlike a contact temperature sensor mounted on the steering wheel, the thermal image sensor 3101 can immediately measure the temperatures of the user's hands regardless of portions of the steering wheel that the user touches. Since the observation area is small, high-resolution thermal image data can be obtained at low cost, and an accuracy of measuring the temperatures of the user's hands increases.

The observation area of the thermal image sensor 3101 may also include a passenger seat as well as the driver's seat. In this case, air conditioning according to the driver and a person in the passenger seat can be performed.

The observation area of the thermal image sensor 3101 may also include a rear seat like an observation area 3102 illustrated in FIG. 41. In this case, air conditioning according to temperatures of surfaces of persons' bodies including a person in the rear seat can be performed.

If air conditioning according to a plurality of users is performed in the automobile, the automobile air conditioning apparatus 3100 or 3200 desirably includes a plurality of blower means. In this case, the automobile air conditioning apparatus 3100 or 3200 can accurately adjust an air temperature around each user.

In addition, the automobile air conditioning apparatus 3100 or 3200 more desirably includes a plurality of inlet means. In this case, the automobile air conditioning apparatuses 3100 or 3200 can accurately adjust the air temperature around each user.

User Interface

The automobile air conditioning apparatus 3100 or 3200 desirably includes a user interface. In particular, the automobile air conditioning apparatus 3100 or 3200 desirably includes the user interface described in the first embodiment with reference to FIGS. 11A to 11C.

The blower means, the inlet means, and the user interface are most desirably provided for each seat. In this case, a user in each seat can individually set a temperature.

The blower means, the inlet means, and the user interface are desirably integrated with one another. In this case, a more cost-efficient automobile air conditioning apparatus can be achieved.

In a transport device that is not provided with blower means for each seat, it is desirable for the user interface to enable the user to select a person in the automobile to whom priority is given. In this case, the automobile air conditioning apparatus 3100 or 3200 performs air conditioning such that temperatures of a surface of the selected user reach target temperatures. A more cost-efficient automobile air conditioning apparatus than when blower means is provided for each seat can be achieved.

Figure 42:
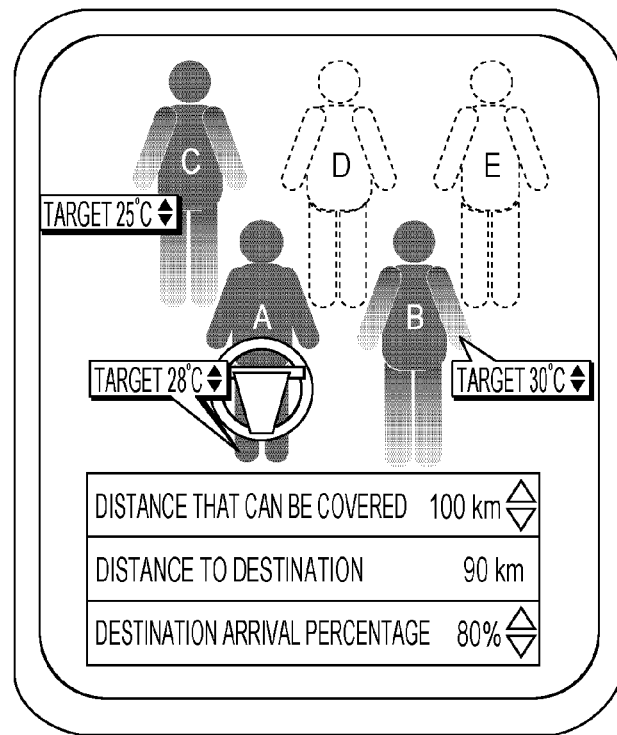
FIG. 42 is a diagram illustrating an example of a user interface according to the third embodiment.

In a transport device in which a user interface is not provided for each seat, a user interface that can detect states of all the seats may be provided. FIG. 42 is a diagram illustrating an example of the user interface according to the third embodiment. By providing the user interface illustrated in FIG. 42 around the driver's seat, the driver can control air conditioning for all the seats.

In the user interface illustrated in FIG. 42, signs A to E indicating the seats and corresponding person icons are displayed. Temperatures of a surface of each user are indicated in colors in each person icon (in FIG. 42, temperature is indicated by shades). If there is a person in each seat, the corresponding person icon is indicated by solid lines, and if there is no person in each seat, the corresponding person icon is indicated by broken lines. In doing so, the user can understand states of persons in the automobile more intuitively. Whether there is a user in each seat is determined on the basis of thermal image data. It is determined that there is a person if there is an object whose temperature is 30° C. or higher.

A target temperature for each person is desirably displayed on the user interface, and the target temperature can desirably be changed for each person. In the user interface illustrated in FIG. 42, a frame pointing at feet of a person in the A seat and a frame pointing at hands of a person in the B seat are displayed. In each frame, a target temperature is displayed. In this case, the target temperature for the feet of the person in the A seat is 28° C., and the target temperature for the hands of the person in the B seat is 30° C.

A frame that does not point at any part of the icon is displayed for the C seat. This means that the target temperature for a person in the C seat is 25° C. and ambient (surrounding air) temperature has already achieved the target temperature.

By displaying such a screen, target temperatures in the automobile can be intuitively understood.

As illustrated in FIG. 42, the user interface desirably displays a steering wheel icon. In this case, a position of the driver's seat can be intuitively understood.

If the automobile air conditioning apparatus 3100 or 3200 is installed in an electric automobile or a fuel automobile, a distance that can be covered is desirably estimated from the amount of fuel remaining and current settings of air conditioning, and the estimated distance is desirably displayed as illustrated in FIG. 42. In this case, the user can understand the distance that can be covered in real-time.

In addition, as illustrated in FIG. 42, the user interface desirably displays a distance to a destination and a destination arrival percentage. In this case, the user can adjust air conditioning in consideration of the destination arrival percentage.

In addition, as illustrated in FIG. 42, the user interface may include means (e.g., triangular icons) for increasing or decreasing the distance that can be covered and the destination arrival percentage. In this case, the user can give priority to the air conditioning or the destination arrival percentage.

If the user sets the distance that can be covered to 110 km, for example, a target temperature (setting temperature) for each user is automatically changed in order to cover the set distance. In order to increase the distance that can be covered, the setting temperature for each user decreases during heating and increases during cooling.

Similarly, if the user sets the destination arrival percentage at 90%, for example, the target temperatures are changed in order to achieve the destination arrival percentage of 90%.

The observation area 3102 of the thermal image sensor 3101 may include a side window. By measuring the temperature of the side window using the automobile air conditioning apparatus 3200, radiant heat from the side window to the user can be taken into consideration. In this case, the automobile air conditioning apparatus 3200 can measure the thermal sensation of the user more accurately, thereby achieving air conditioning according to the thermal sensation of the user.

It is more desirable that the observation area 3102 of the thermal image sensor 3101 include side windows beside the driver's seat and the passenger seat. In this case, the automobile air conditioning apparatus 3200 can perform air conditioning for each seat in accordance with the amount of radiant heat from the side windows beside the driver's seat and the passenger seat. A low target temperature is set, for example, for a seat close to a hot side window (the amount of radiant heat is large).

Prediction of Dew Formation

Figure 43:
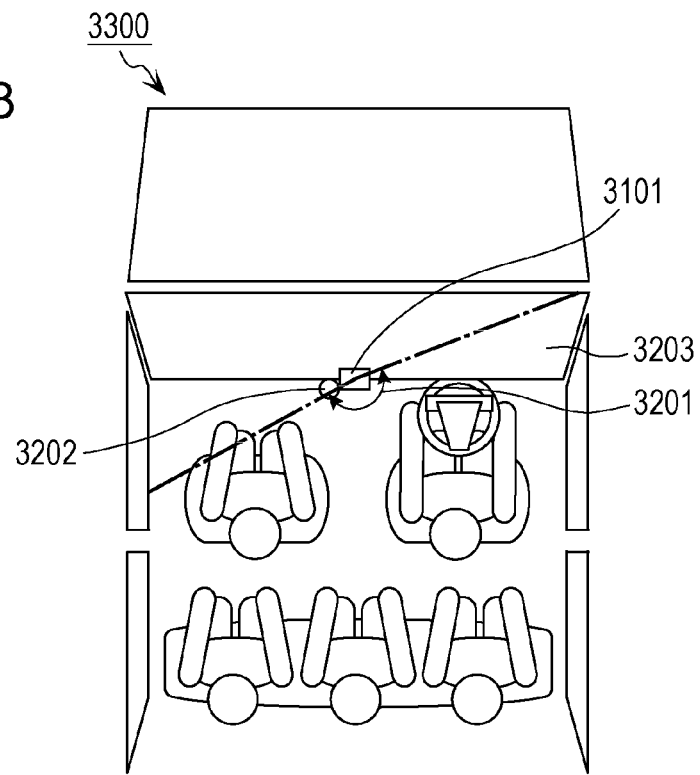
FIG. 43 is a diagram illustrating an automobile air conditioning apparatus in which an observation area includes a windshield.

The observation area 3102 of the thermal image sensor 3101 desirably includes a windshield. In this case, dew formation can be predicted, which will be described hereinafter. FIG. 43 is a diagram illustrating an automobile air conditioning apparatus in which an observation area includes a windshield.

An observation area 3201 of an automobile air conditioning apparatus 3300 illustrated in FIG. 43 includes a windshield 3203. The automobile air conditioning apparatus 3300 illustrated in FIG. 43 further includes a hygrometer 3202 and can calculate humidity on the windshield 3203 on the basis of humidity in the automobile and a temperature (saturation vapor pressure) of the windshield 3203 obtained by the thermal image sensor 3101. The automobile air conditioning apparatus 3300 can thus predict dew formation on the windshield 3203 and prevent dew formation by taking in air from outside the automobile before dew is formed on the windshield 3203.

The automobile air conditioning apparatus 3300 may include means for dehumidifying the inside of the automobile, not ventilating the automobile by taking in air from outside the automobile. In this case, when air outside the automobile is foul, for example, the automobile air conditioning apparatus 3300 can prevent dew formation without ventilating the automobile.

As described above, the thermal image sensor 3101 that measures the temperatures of various objects, such as the driver's seat, the passenger seat, the side windows, and the windshield 3203, desirably includes the rotation unit 31 according to the first or second embodiment. In this case, a wide-rage, high-resolution thermal image sensor 3101 can be achieved at low cost.

The hygrometer 3202 may be incorporated into the thermal image sensor 3101 or may be provided separately from the thermal image sensor 3101. If the hygrometer 3202 is provided separately from the thermal image sensor 3101, the hygrometer 3202 and the thermal image sensor 3101 may each include a communication unit, and the automobile air conditioning apparatus 3300 may include a signal processing unit that predicts dew formation on the basis of information transmitted from these communication units.

Figure 44:
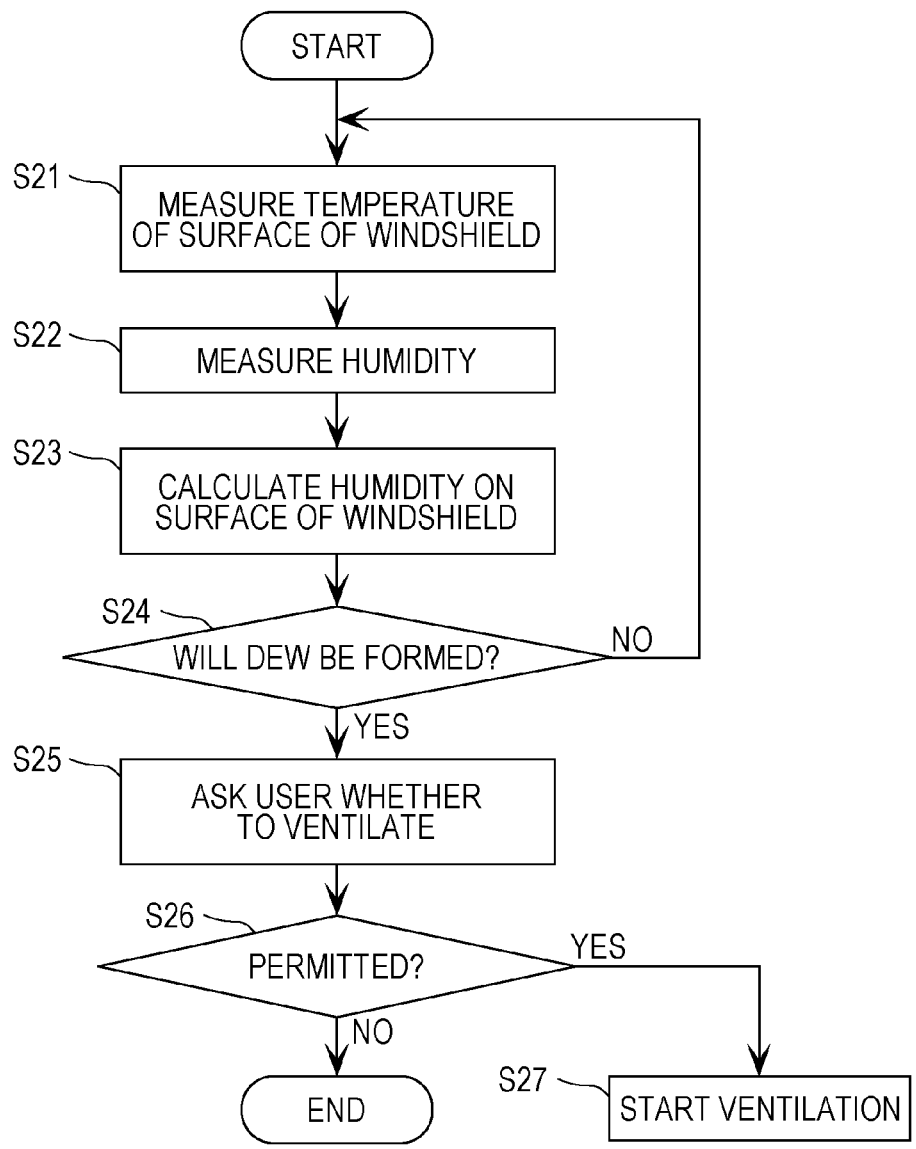
FIG. 44 is a flowchart illustrating an example of a ventilation operation based on prediction of dew formation.

Next, a ventilation operation based on the prediction of dew formation will be described. FIG. 44 is a flowchart illustrating the ventilation operation based on the prediction of dew formation.

The signal processing unit of the automobile air conditioning apparatus 3300 measures the temperature of the windshield 3203 using the thermal image sensor 3101 (S21) and humidity using the hygrometer 3202 (obtains a sensor output of the hygrometer 3202) (S22). The signal processing unit then predicts dew formation, that is, calculates humidity on the windshield 3203, on the basis of results of the measurement (S23).

If the humidity on the windshield 3203 is lower than an arbitrary threshold (e.g., 95%), the signal processing unit determines that dew will not be formed (NO in S24) and continues the regular measurement of the temperature of the windshield 3203 and the humidity (S21 and S22).

If the humidity on the windshield 3203 is equal to or higher than the threshold, the signal processing unit determines that dew is likely to be formed (YES in S24) and asks the user whether to ventilate the automobile (S25). At this time, the signal processing unit may output a speech sound or display a message through a display of an automotive navigation system or the like. The user responds to the inquiry with voice or a panel operation. If the user does not permit ventilation (NO in S26), the signal processing unit ends the operation. Alternatively, the signal processing unit may wait for an arbitrary period of time and issue the inquiry to the user again. If the user responds negatively a plurality of times, the signal processing unit may end the operation.

On the other hand, if the user permits ventilation (YES in S26), the signal processing unit starts ventilation (S27).

Figure 45:
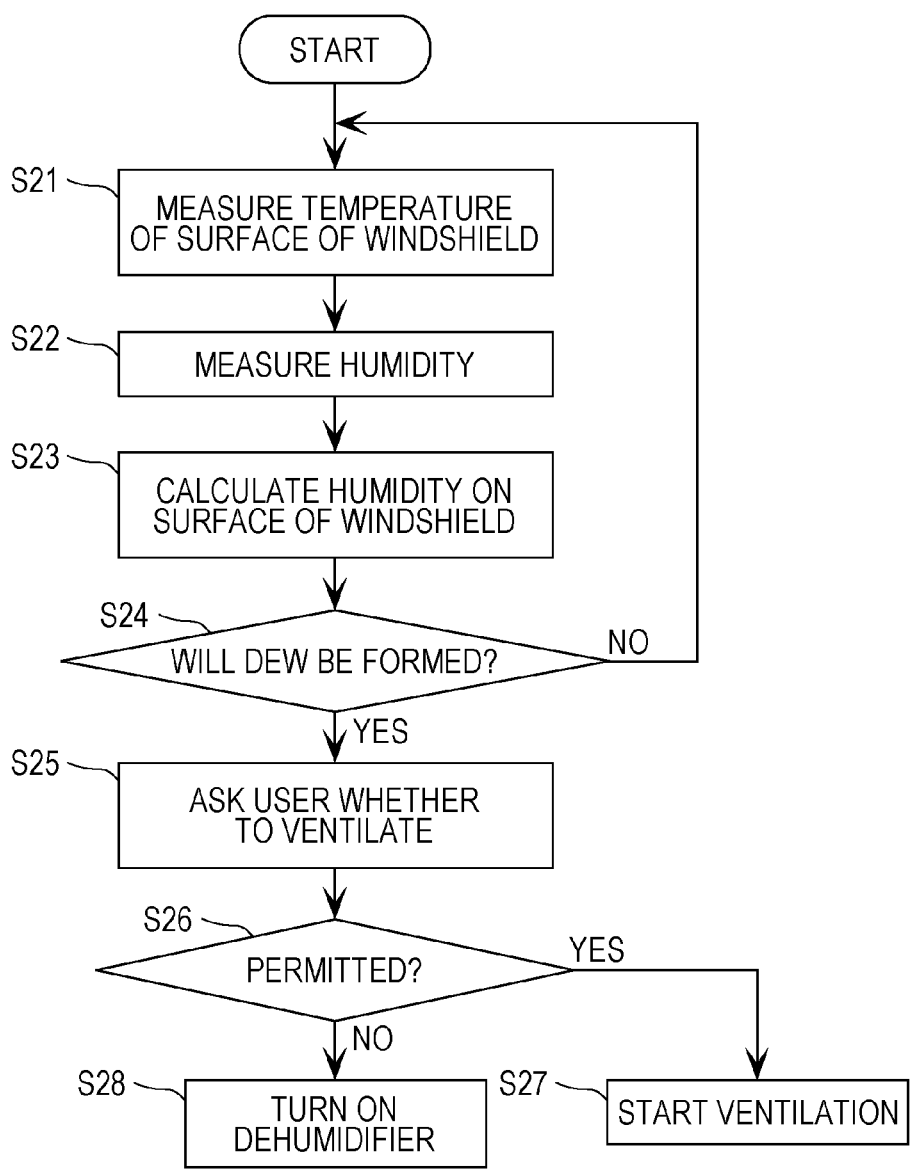
FIG. 45 is a flowchart illustrating another example of the ventilation operation based on the prediction of dew formation.

If the automobile air conditioning apparatus 3300 includes dehumidification means and the user does not permit ventilation (NO in S26), the dehumidifier may be turned on (S28) as illustrated in FIG. 45. In doing so, the automobile air conditioning apparatus 3300 can prevent dew formation without ventilating the automobile. In this case, the signal processing unit may ask the user whether to turn on the dehumidifier before turning on the dehumidifier.

The automobile air conditioning apparatus 3300 desirably includes means for measuring a state of outside air. If the automobile air conditioning apparatus 3300 includes a spectrometer that measures the concentration of carbon monoxide or hydrocarbon, for example, air conditioning that takes into consideration the state of the outside air can be performed. If the outside air is clean (the concentration of carbon monoxide or hydrocarbon is low), for example, ventilation can be performed, and if the outside air is foul (the concentration of carbon monoxide or hydrocarbon is high), the dehumidifier can be used. In this case, too, a speech sound or a user interface such as a touch panel is desirably provided in order to notify the user of the state of the outside air and ask the user whether to perform each operation. As a result, air conditioning according to the user's intention can be performed.

Figure 46:
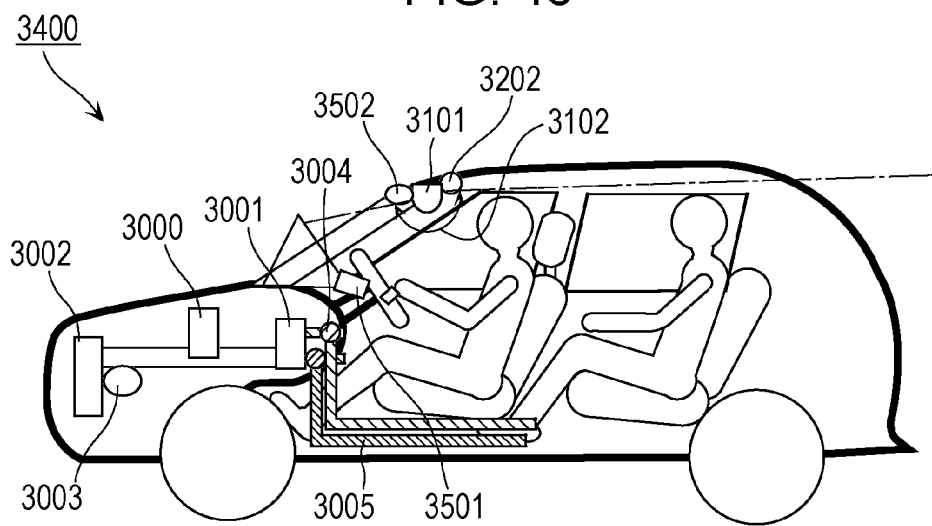
FIG. 46 is a diagram illustrating a transport device equipped with scattered light measuring means.

A transport device (moving body) equipped with the automobile air conditioning apparatus 3300 desirably includes scattered light measuring means for measuring the amount of scattered light on inner and outer surfaces of a windshield. FIG. 46 is a diagram illustrating a transport device equipped with the scattered light measuring means.

A transport device 3400 illustrated in FIG. 46 includes scattered light measuring means 3501. If humidity on an inner surface of a windshield is low, namely equal to or lower than 80%, but the amount of scattered light on the inner and outer surfaces of the windshield, for example, it can be determined that dew has been formed on the outer surface of the windshield.

If dew has been formed on the outer surface of the windshield, the transport device 3400 desirably automatically operates wipers to remove scattering caused by the dew formation. In this case, the user need not check whether dew has formed on the inner or outer surface of the windshield and the dew can be automatically removed.

As the scattered light measuring means 3501, for example, a laser light source and a photodiode are used. The laser light source diagonally emits light to the windshield, and the photodiode measures the amount of laser light reflected as a result of backscattering.

Another example of the scattered light measuring means 3501 is a camera that captures an image of a scene ahead of the transport device 3400. A difference in color between adjacent pixels is small in a portion of an image captured by the camera in which dew has been formed, and a portion of the image in which dew is not formed significantly changes during driving. Scattered light can thus be measured.

Although the transport device (moving body) 3400 equipped with the automobile air conditioning apparatus 3300 includes the scattered light measuring means 3501 in the above description, the transport device 3400 need not include the scattered light measuring means 3501. The transport device 3400 may include moisture detection means for detecting moisture through spectroscopy instead of the scattered light measuring means 3501. Since water absorbs light of 1.2 to 1.6 μm, the moisture detection means desirably includes an infrared receiving device capable of measuring the intensity of light in a wavelength band of 1.2 to 1.6 μm. As such an infrared receiving device, an InGaAs sensor, a thermopile, a bolometer, or the like may be used. If the moisture detection means includes such an infrared receiving device, the moisture detection means can measure the amount of water on the inner and outer surfaces of the windshield.

Alternatively, the moisture detection means may include a visible light detection sensor sensitive to somewhere between 0.3 μm and 1.2 μm and an infrared detection sensor sensitive to somewhere between 1.2 μm and 1.6 μm. Since water does not absorb light of 1.2 μm or less, the moisture detection means can measure the amount of water more accurately.

The transport device (moving body) 3400 equipped with the automobile air conditioning apparatus 3300 may also include a light source in addition to the moisture detection means. In this case, the amount of water can be accurately measured even at night.

Since the transport device (moving body) 3400 equipped with the automobile air conditioning apparatus 3300 includes the moisture detection means, water on the windshield can be detected.

If there is water on the outer surface of the windshield but it can be determined that dew is unlikely to be formed on the inner surface of the windshield, it may be determined that the water on the outer surface of the windshield is caused by rain or dew formation in a tunnel, and the wipers may be operated.

Figure 47:
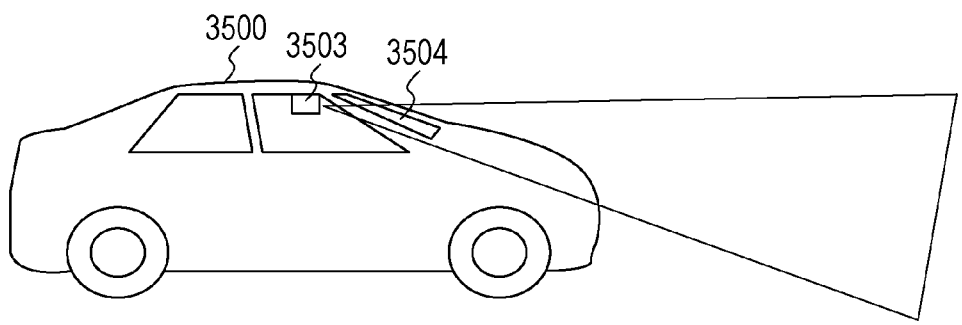
FIG. 47 is a diagram illustrating an automobile provided with moisture detection means.

As illustrated in FIG. 47, the water detection means may be provided along with a thermal image sensor 3503 on a ceiling of an automobile 3500. The thermal image sensor 3503 may be one of the thermal image sensors according to the first to third embodiments. With this configuration, the moisture detection means can see not only a horizontal forward direction through a windshield 3504 of the automobile 3500 but also a range of lower 30 degrees from the horizontal forward direction. The moisture detection means need not be provided on the ceiling of the automobile 3500 insofar as the moisture detection means can see the range. In this case, the moisture detection means can be used not only for detecting water on the inner and outer surfaces of the windshield but also for detecting a frozen road surface ahead of the automobile 3500.

Figure 48:
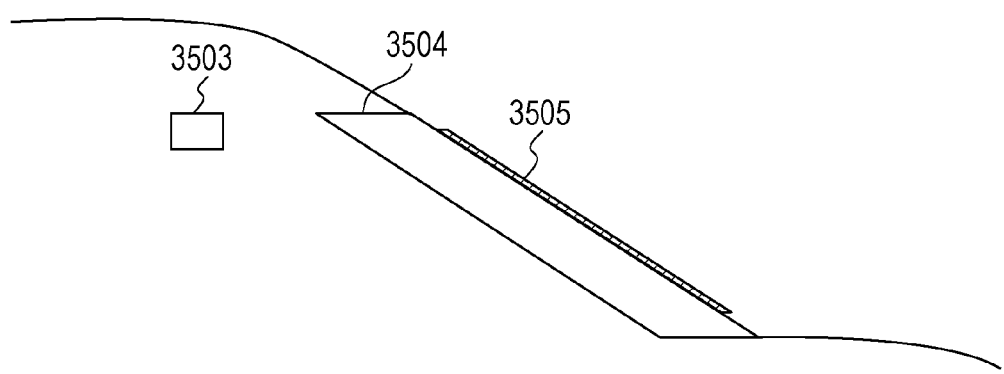
FIG. 48 is a diagram illustrating a windshield of the automobile on which there is water.

If there is water 3505 on the outer surface of the windshield 3504 as illustrated in FIG. 48, for example, the moisture detection means receive light coming from ahead through the windshield 3504. Since light of 1.2 to 1.6 μm is absorbed by water, the moisture detection means can detect water. It is difficult, however, for the moisture detection means to determine whether the detected water is the water 3505 on the windshield 3504 or water on a road surface ahead of the automobile 3500 only on the basis of the received light. If the moisture detection means uses water increase rate information, the water detection means can determine whether the detected water is the water 3505 on the windshield 3504 or water on the road surface ahead of the automobile 3500. This is because the water 3505 on the windshield 3504 increases more slowly than water on the road surface ahead of the running automobile 3500.

The transport device 3400 (or the automobile air conditioning apparatus 3300) desirably includes a communication unit. In this case, a place (region) where the transport device 3400 was running when dew was formed on the outer surface of the windshield can be shared through cloud storage. The transport device 3400 can therefore provide other transport devices that are not equipped with the scattered light measuring means 3501 with information regarding regions where dew is likely to be formed on windshields of the transport devices.

If the transport device 3400 (or the automobile air conditioning apparatus 3300) includes the communication unit, the transport device 3400 can obtain history information indicating that the user has took a bath or a meal, for example, from a system bath, or a kitchen appliance such as a microwave oven in the user's house through the communication unit. Air conditioning that better suits the thermal sensation of the user can be achieved on the basis of information obtained in this manner.

Modifications of Third Embodiment

As in the first embodiment, the automobile air conditioning apparatus according to the third embodiment may measure temperatures of a plurality of body parts of the user, such as forehead, hands, feet, nose, ears, and cheeks. In this case, air conditioning in which a temperature of an arbitrary body part of the user is used as a target temperature is achieved.

As described in the first embodiment, if the heat exchanger is a compressor, cooling is turned up by increasing the number of rotations and turned down by decreasing the number of rotations. Air conditioning by which the temperature of the surface of the user's body becomes close to an arbitrary setting temperature can be achieved by turning up cooling if the temperature of the surface of the user's body is higher than the target temperature or turning down the cooling if the temperature of the surface of the user's body is lower than the target temperature.

As in the first embodiment, the automobile air conditioning apparatus according to the third embodiment may determine on the basis of thermal image data whether or not the user wears glasses, a mask, gloves, socks, slippers, or the like. The automobile air conditioning apparatus according to the third embodiment may further include means for notifying the user, on the basis of a result of the determination, that measurement accuracy is low because the user wears glasses, a mask, gloves, socks, slippers, or the like. Description of methods for achieving these functions is omitted since the methods have been described in the first embodiment.

The automobile air conditioning apparatus according to the third embodiment may include means for determining how thickly the user is dressed, the amount of radiant heat, humidity, attitude, the amount of movement, time, sweating, and season on the basis of thermal image data. In this case, air conditioning that better suits the thermal sensation of the user can be performed. Description of such measurement methods is omitted since the measurement methods have been described in the first embodiment.

The automobile air conditioning apparatus according to the third embodiment may include lighting means for illuminating the observation area 3102 of the thermal image sensor 3101. As illustrated in FIG. 46, for example, the thermal image sensor 3101 of the automobile air conditioning apparatus may include lighting means 3502, or the lighting means may be arranged next to the thermal image sensor 3101. In this case, the user can easily check an area (=an area illuminated by the lighting means) in which the thermal image sensor 3101 can measure temperatures.

The lighting means is desirably lighting means that emits light only to the observation area 3102 of the thermal image sensor 3101. In this case, the user can accurately understand a position of the observation area 3102.

The thermal image sensor 3101 of the automobile air conditioning apparatus according to the third embodiment may include a far-infrared radiation means, or may be arranged next to the far-infrared radiation means. In this case, an optical system is desirably designed such that the concentration of far-infrared radiation received becomes lower as far-infrared radiation is emitted to a target located further from the far-infrared radiation means.

The automobile air conditioning apparatus having such a configuration can detect a distance between each portion of the observation area 3102 and the thermal image sensor 3101 by comparing thermal image data obtained by emitting far-infrared radiation to the observation area 3102 with thermal image data at a time when far-infrared radiation is not emitted. This is because a difference between these two pieces of thermal image data is large in a portion of the observation area 3102 close to the thermal image sensor 3101. In this case, the automobile air conditioning apparatus can detect an air current obstacle (a large piece of baggage on the passenger seat or the like) in the automobile and deliver air to the user while avoiding the obstacle. Power consumption can therefore be reduced by selectively delivering air only from blower means whose operation is not affected by the obstacle.

If the transport device (or the automobile air conditioning apparatus) according to the third embodiment includes a thermal image sensor as in the above description, the transport device can determine whether there is a person in each seat. A thermal image sensor that detects a position of a person is more advantageous than a sensor that measures a weight on a seat surface in that the thermal image sensor does not erroneously detect a piece of baggage as a person. The transport device according to the third embodiment can therefore ask a person to wear a seatbelt, for example, only when the person is in the passenger seat or the like.

Another Modification of Third Embodiment

Mold Risk Estimation

Although the automobile air conditioning apparatus according to the third embodiment can use a hygrometer as a dew formation sensor that predicts dew formation on the windshield, usage of the hygrometer is not limited to this. The automobile air conditioning apparatus according to the third embodiment may use a hygrometer as a mold sensor that estimates a risk of developing mold, instead. Although the automobile air conditioning apparatus according to the third embodiment is installed in a vehicle as an automobile air conditioner or the like in the above description, usage of the automobile air conditioning apparatus is not limited to this. The automobile air conditioning apparatus may be installed in a room as a room air conditioner or the like. A function of the mold sensor may be added to a dehumidifier, a blower, such as an electric fan, or a vacuum cleaner. An example of a case in which the mold sensor is installed in an indoor space such as a room of a house or an office building will be described with reference to the drawings.

Figure 49A:
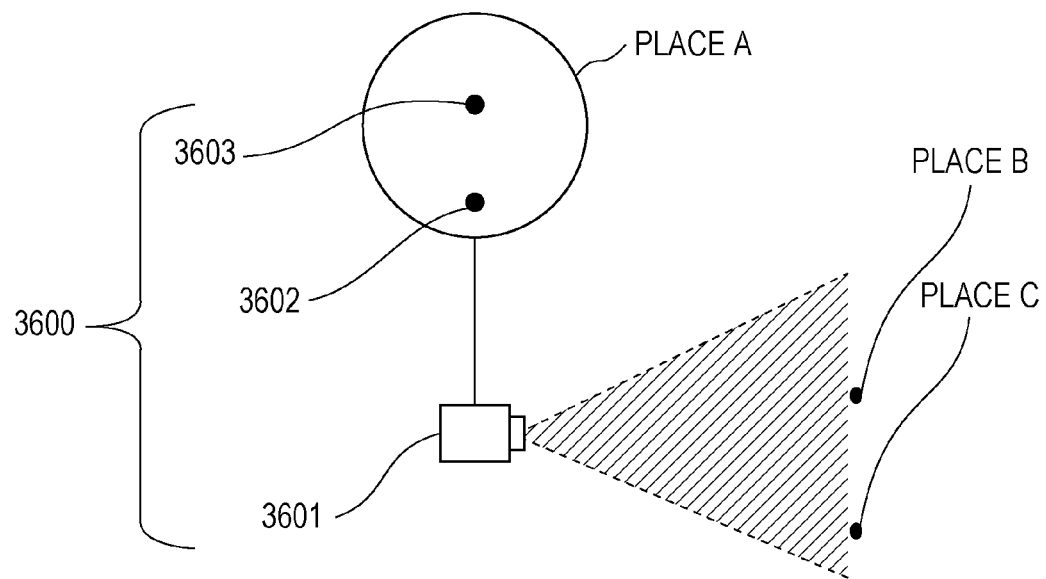
FIG. 49A is a diagram illustrating an example of the configuration of a mold sensor and an observation area of the mold sensor.
Figure 49B:
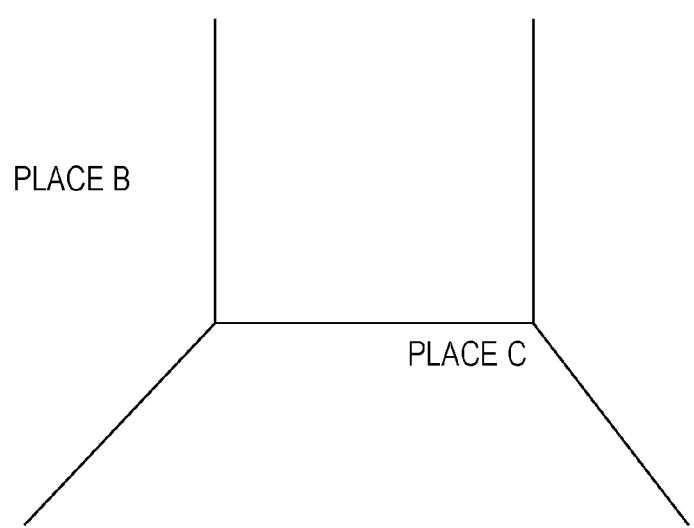
FIG. 49B is a diagram illustrating an example of the observation area of the mold sensor illustrated in FIG. 49A.

FIG. 49A is a diagram illustrating an example of the configuration of the mold sensor and an observation area of the mold sensor. FIG. 49B is a diagram illustrating an example of the observation area of the mold sensor illustrated in FIG. 49A.

A mold sensor 3600 illustrated in FIG. 49A includes a thermal image sensor 3601, a hygrometer 3602, and a thermometer 3603.

The thermometer 3603 is set in place A illustrated in FIG. 49A and measures temperatures in an indoor space (single space) illustrated in FIG. 49B including places A, B, and C.

The hygrometer 3602 is set in place A illustrated in FIG. 49A and measures humidity in the single space including places A, B, and C. Humidity can be divided into absolute humidity and relative humidity, and the hygrometer 3602 usually measures relative humidity. The absolute humidity indicates the amount of water vapor included in a dry air of 1 kg in mass (grams). The relative humidity indicates a relationship between a saturated vapor density of air of a certain temperature and an actual amount of water vapor included in the air in percentage (%).

The thermal image sensor 3601 may be any of the thermal image sensors according to the first to third embodiments and obtains a thermal image in the observation area including places B and C. The thermal image sensor 3601 need not be set in place A insofar as the thermal image sensor 3601 can obtain a thermal image of the observation area.

The mold sensor 3600 calculates the absolute humidity using values obtained by the hygrometer 3602 and the thermometer 3603. Because a method for calculating the absolute humidity from temperature and relative humidity is known, detailed description of the method is omitted here.

The mold sensor 3600 obtains a temperature in a portion of the observation area such as place B or C, for example, on the basis of a thermal image obtained from the thermal image sensor 3601 and calculates a humidity (relative humidity) in place B or C.

The mold sensor 3600 then determines whether there is a risk of developing mold on the basis of the calculated humidity (relative humidity) in the portion of the observation area. If there is a risk of developing mold, the mold sensor 3600 warns the user about the risk. If the calculated relative humidity in place B or C exceeds a predetermined value, for example, the mold sensor 3600 determines that there is a risk of developing mold in place B or C, and notifies (warns) the user of place B or C, in which the relative humidity has exceeded the predetermined value.

It is known that mold is likely to be developed when the amount of moisture in air is large. More specifically, when the relative humidity in air is 80% or higher, mold is likely to be formed. A humidity at which mold is likely to be developed, such as 80% or 92%, is set as the predetermined value.

Figure 50:
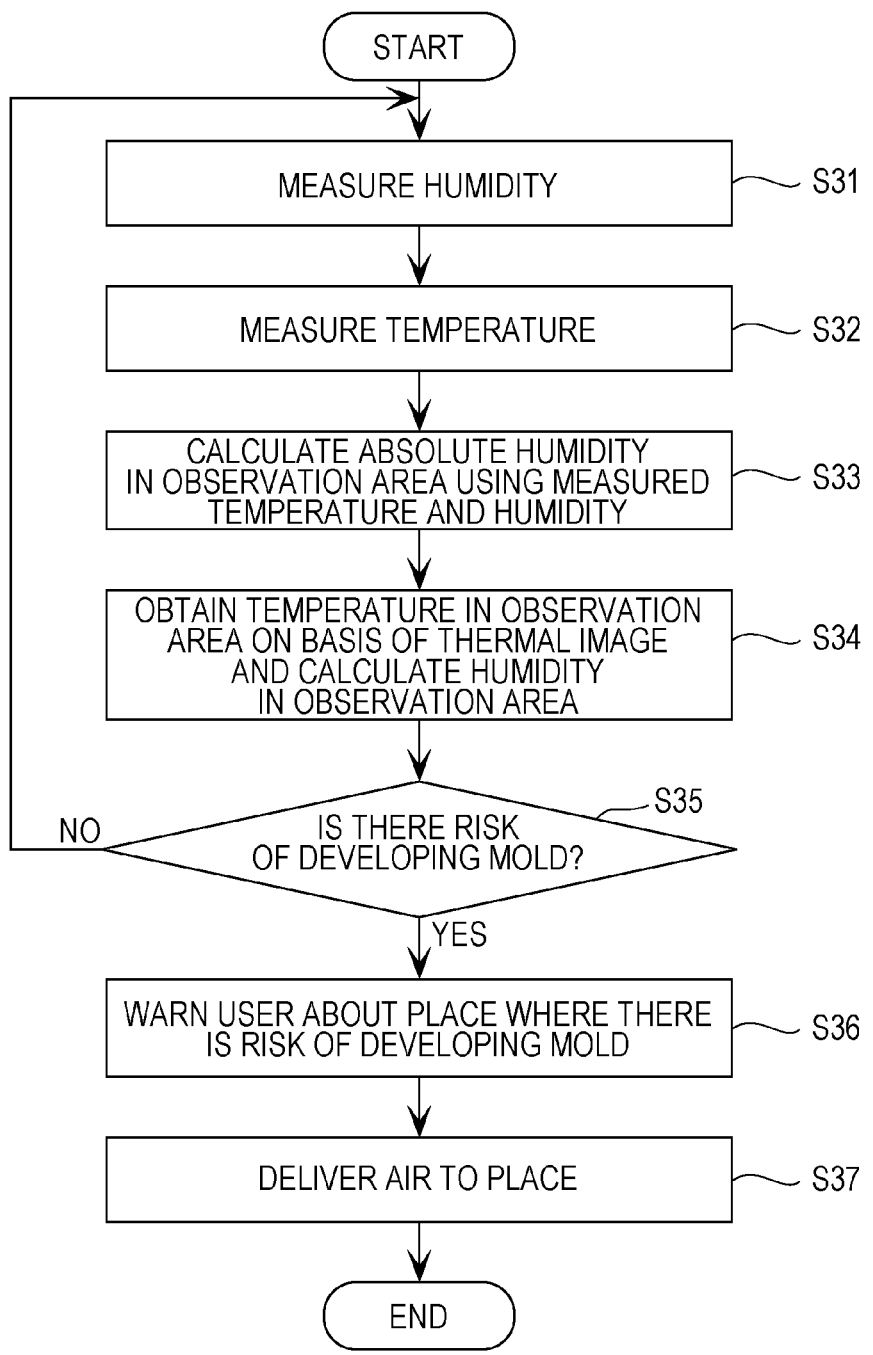
FIG. 50 is a flowchart illustrating a drying operation based on mold risk estimation.

Next, a drying operation based on the mold risk estimation performed by the automobile air conditioning apparatus having the function of the mold sensor 3600 will be described. FIG. 50 is a flowchart illustrating the drying operation based on the mold risk estimation.

The mold sensor 3600 included in the automobile air conditioning apparatus according to the present modification measures humidity in an indoor space (single space) illustrated in FIG. 49B, for example, using the hygrometer 3602 (S31) and a temperature of the room (single space) using the thermometer 3603 (S32).

Next, the mold sensor 3600 calculates absolute humidity in the room, which is an observation area, on the basis of the measured temperature and humidity (S33).

Next, the mold sensor 3600 obtains a temperature in a portion of the observation area such as place B or C on the basis of a thermal image obtained from the thermal image sensor 3601 and calculates humidity (relative humidity) in the portion of the observation area (S34).

Next, the mold sensor 3600 determines on the basis of the calculated humidity (relative humidity) in the portion of the observation area whether there is a risk of developing mold (S35). If there is a risk of developing mold (YES in S35), the mold sensor 3600 warns the user about the place where there is a risk of developing mold (S36).

The automobile air conditioning apparatus delivers air, from a blower unit such as a fan, to the place where there is a risk of developing mold to dry the place (S37).

Although the automobile air conditioning apparatus according to the present modification calculates humidity in an observation area on the basis of a temperature in the observation area, a method used by the automobile air conditioning apparatus is not limited to this. The automobile air conditioning apparatus according to the present modification may notify the user that there is a risk of developing mold, instead, if there is at least one pixel in a thermal image obtained from the thermal image sensor 3601 whose temperature is equal to or lower than a predetermined value. Alternatively, the automobile air conditioning apparatus according to the present modification may deliver air to an area whose temperature is lowest in a thermal image obtained from the thermal image sensor 3601 if there is at least one pixel in the thermal image whose temperature is equal to or lower than a predetermined value. In this case, a risk of developing mold in a most likely area can be reduced, and an efficiency of preventing development of mold increase.

The automobile air conditioning apparatus according to the present modification may determine, on the basis of a temperature and humidity in place A, whether a temperature of a coldest pixel in a thermal image obtained from the thermal image sensor 3601 is a temperature at which dew is likely to be formed using the above-described method. If the temperature is higher than a predetermined value, the automobile air conditioning apparatus may warn the user about development of mold or deliver air to the coldest pixel. In this case, a risk of developing mold can be estimated without calculating humidity of each pixel of the thermal image, thereby increasing an effect of reducing the amount of memory used in the signal processing means.

The automobile air conditioning apparatus according to the present modification may divide a thermal image obtained from the thermal image sensor 3601 into a plurality of areas and calculate a lowest temperature in each area. If the lowest temperature in a coldest area is equal to or higher than a predetermined value (a value for estimating a risk of developing mold), the automobile air conditioning apparatus according to the present modification may deliver air to the area.

Passenger Alcohol Detection

The automobile air conditioning apparatus according to the third embodiment may include means for measuring infrared radiation of 9 to 10 μm and means for measuring infrared radiation of 10 μm or more or 9 μm or less, in addition to the thermal image sensor. The means for measuring infrared radiation may be, for example, optical filters.

In this case, air around each passenger in the automobile can be measured, and the distribution of alcohol (alcohol concentration) included in exhaled air of each passenger can be measured. By calculating the alcohol concentration of air around each passenger, it can be determined which passenger has drunk alcohol. This is because infrared radiation of 9 to 10 μm tends to be absorbed by alcohol (ethanol gas).

The means for measuring infrared radiation may be an optical filter that passes only light of 9 μm or less, for example, or may be an optical filter that passes only light of 10 μm or less. Alternatively, the means for measuring infrared radiation may be an optical filter that passes only light of 10 μm or more, or may be an optical filter that passes only light of 9 μm or more.

The automobile air conditioning apparatus according to the present modification may further include warning means for issuing a warning to a passenger. If the automobile air conditioning apparatus according to the present modification determines that a driver has drunk alcohol, for example, the automobile air conditioning apparatus may issue warnings to the driver and passengers. The warning means may issue warnings through vibration, sound, light, or the like.

If the automobile air conditioning apparatus according to the present modification determines that a driver has drunk alcohol, the automobile air conditioning apparatus may prevent an engine from starting or notify a third party of the driver's drinking.

Although a fact that ethanol gas included in exhaled air absorbs infrared radiation of 9 to 10 μm is utilized in the present modification, the same effect may be produced by employing absorption wavelengths of another ethanol gas. Ethanol gas can also absorb, for example, infrared radiation of 7 to 7.5 μm, 8 to 8.5 μm, 11 to 12 μm, and other wavelengths. That is, the automobile air conditioning apparatus according to the present modification may measure the distribution of alcohol (alcohol concentration) included in exhaled air of each passenger in the automobile using one these absorption wavelength bands, instead.

Fourth Embodiment

Underlying Knowledge Forming Basis of Fourth Embodiment

It is known that even in an environment in which temperature and humidity are constant, a sensible temperature of a person changes depending on the amount of movement of the person. Even when temperature is 25° C. and humidity is 50%, which is an environment usually considered comfortable for a person standing still, for example, a person might feel hot if he/she is working out.

If the amount of movement of a person can be detected, therefore, parameters of the air conditioning apparatus, such as the temperature and the wind volume, can be adjusted in accordance with the amount of movement of the person. As a result of the adjustment, a comfortable environment can be provided for a person whose amount of movement is large.

In Japanese Unexamined Patent Application Publication No. 2010-133692, a configuration has been proposed in which the amount of movement is calculated from data obtained from an infrared detector and fed back to an air conditioning apparatus, in order to improve comfort.

In order to measure a temperature distribution in a room, for example, an infrared detector might be used as a detector. In Japanese Unexamined Patent Application Publication No. 2010-216688, for example, an array infrared detector moves in a certain direction in order to increase a detection range thereof.

In the infrared detectors disclosed in Japanese Unexamined Patent Application Publication No. 2010-133692 and Japanese Unexamined Patent Application Publication No. 2010-216688, however, a person in a scanning range is scanned only once in one scanning operation. Because it usually takes tens of seconds to several minutes to complete one scanning operation, it is difficult for the infrared detectors disclosed in Japanese Unexamined Patent Application Publication No. 2010-133692 and Japanese Unexamined Patent Application Publication No. 2010-216688 to measure the amount of movement of a person. It is especially difficult for the infrared detectors disclosed in Japanese Unexamined Patent Application Publication No. 2010-133692 and Japanese Unexamined Patent Application Publication No. 2010-216688 to detect the amount of movement of a person over a wide range.

In the fourth embodiment, an infrared detector capable of detecting the amount of movement of a person over a wide range will be described. The infrared detector according to the fourth embodiment corresponds to the thermal image sensor according to each of the first to third embodiments. Infrared detection devices according to the fourth embodiment correspond to the radiation receiving devices according to each of the first to third embodiments.

Configuration

Figure 52A:
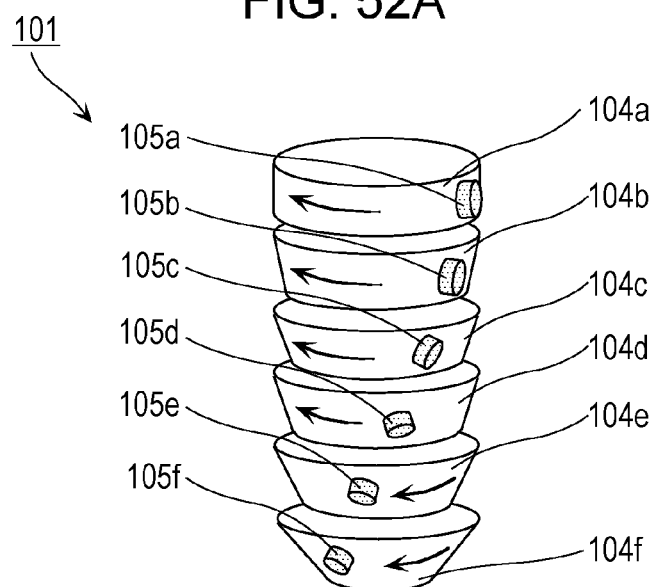
FIG. 52A is a perspective view of the infrared detector according to the fourth embodiment.

First, the configuration of the infrared detector according to the fourth embodiment will be described along with the configuration of an air conditioning apparatus including the infrared detector. FIG. 51 is a schematic diagram illustrating a room in which an air conditioning apparatus 100 including the infrared detector according to the fourth embodiment is installed. FIG. 52A is a perspective view of the infrared detector according to the fourth embodiment, and FIG. 52B is a side view of the infrared detector according to the fourth embodiment.

As illustrated in FIG. 51, an infrared detector 101 according to the fourth embodiment is included in the air conditioning apparatus 100. The air conditioning apparatus 100 is installed, for example, in a room in which table 103 is placed and a person 102 stays.

Figure 52B:
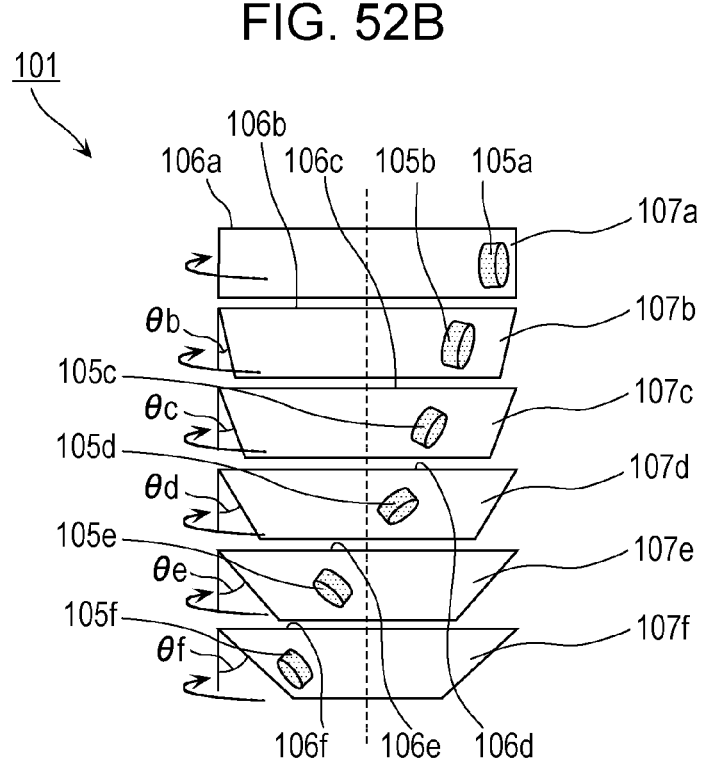
FIG. 52B is a side view of the infrared detector according to the fourth embodiment.

As illustrated in FIGS. 52A and 52B, the infrared detector 101 (thermal image sensor) includes infrared detection devices 105a to 105f (radiation receiving devices). The infrared detection devices 105a to 105f are mounted on rotors 104a to 104f (rotation units), respectively. The rotors 104a to 104f rotate clockwise when the infrared detector 101 is viewed from above.

As illustrated in FIG. 52B, a side surface 107a of the rotor 104a is perpendicular to an upper surface 106a of the rotor 104a, but a side surface 107b of the rotor 104b is inclined by θb° relative to an upper surface 106b of the rotor 104b. A diameter of the rotor 104b becomes smaller toward a bottom of the rotor 104b. A side surface 107c of the rotor 104c is inclined inward by θc°, which is larger than θb°, relative to an upper surface 106c of the rotor 104c, and a diameter of the rotor 104c becomes smaller toward a bottom of the rotor 104c.

Similarly, a side surface 107d of the rotor 104d is inclined inward by θd°, which is larger than θc°, relative to an upper surface 106d of the rotor 104b, and a diameter of the rotor 104d becomes smaller toward a bottom of the rotor 104d. The same holds for the rotors 104e and 104f. Angles θb, θc, θd, θe, and θf of side surfaces 107a to 107f of the rotors 104a to 104f satisfy θb<θc<θd<θe<θf so that the infrared detection devices 105a to 105f are inclined more and more downward in this order.

Since attitudes of the infrared detection devices 105a to 105f are different from one another in the vertical direction, the infrared detection devices 105a to 105f can measure temperatures at different heights in the room.

Although higher infrared detection devices detect (measure) temperatures at higher positions in the room here, a relationship between positions of the infrared detection devices 105a to 105f and measurement positions may be different from this. The side surface 107a of the rotor 104a, too, need not be perpendicular to the upper surface 106a as with the side surfaces of the other rotors. By providing lenses or the like for the infrared detection devices 105a to 105f, measurement (detection) ranges and positions may be adjusted.

In addition, in the infrared detector 101, the infrared detection devices 105a to 105f are arranged on the rotors 104a to 104f at certain intervals in a rotational direction of the rotors 104a to 104f. In FIGS. 52A and 52B, the infrared detection devices 105a to 105f are arranged such that the infrared detection devices on lower rotors become more forward in the rotational direction than those on upper rotors.

Next, an infrared image (thermal image data) obtained by the infrared detector 101 included in the air conditioning apparatus 100 will be described with reference to FIGS. 53A to 53E. FIGS. 53A to 53E are conceptual diagrams illustrating a detection area of the infrared detector 101.

As illustrated in FIGS. 52A and 52B, the infrared detection devices 105a to 105f included in the infrared detector 101 are arranged at the certain intervals in the rotational direction. Places in which the infrared detection devices 105a to 105f detect infrared radiation (places in which temperatures are measured) therefore appear at certain intervals in a horizontal direction of an infrared image, that is, in the scanning direction.

Figure 53A:
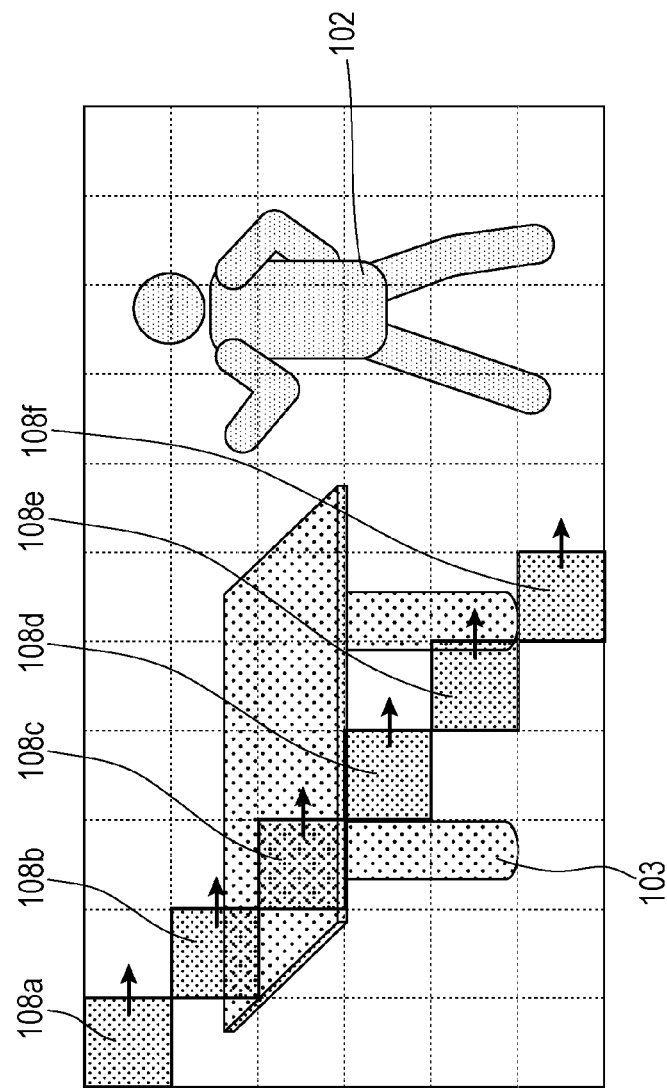
FIG. 53A is a conceptual diagram illustrating detection areas of infrared detection devices according to the fourth embodiment.

FIG. 53A conceptually illustrates detection areas 108a to 108f of the infrared detection devices 105a to 105f, respectively, at a beginning of detection. In a state illustrated in FIG. 53A, the infrared detection device 105f comes first in the rotational direction (a direction (the rotational direction here) corresponding to the scanning direction in the arrangement of the infrared detection devices 105a to 105f will also be referred to as a "scanning direction" hereinafter). The detection area 108f therefore comes first in the rotational direction. The detection areas 108a to 108f of the infrared detection devices 105a to 105f appear at certain intervals. In FIG. 53A, a detection area of the infrared detector 101 includes the table 103 but does not yet include the person 102.

FIG. 53B is a diagram illustrating the detection areas 108a to 108f one frame after the beginning of the detection (the state illustrated in FIG. 53A). As illustrated in FIGS. 52A and 52B, when viewed from above, the infrared detector 101 rotates clockwise. The detection areas 108a to 108f one frame after the beginning of the detection has shifted to the right by one pixel each relative to the detection areas 108a to 108f at the beginning of the detection illustrated in FIG. 53A. In FIG. 53B, too, the detection area of the infrared detector 101 includes the table 103 but does not yet include the person 102.

FIG. 53C is a diagram illustrating the detection areas 108a to 108f two frames after the beginning of the detection. The detection areas 108a to 108f have shifted to the right by two pixels each relative to the beginning of the detection. In FIG. 53C, the detection area 108f includes a left foot 102a of the person 102, and measurement of a temperature of the left foot 102a starts. Three frames after the beginning of the detection (not illustrated), the detection area 108e includes the left foot 102a of the person 102, and the person 102 is sequentially captured by the other detection areas.

Figure 53D:
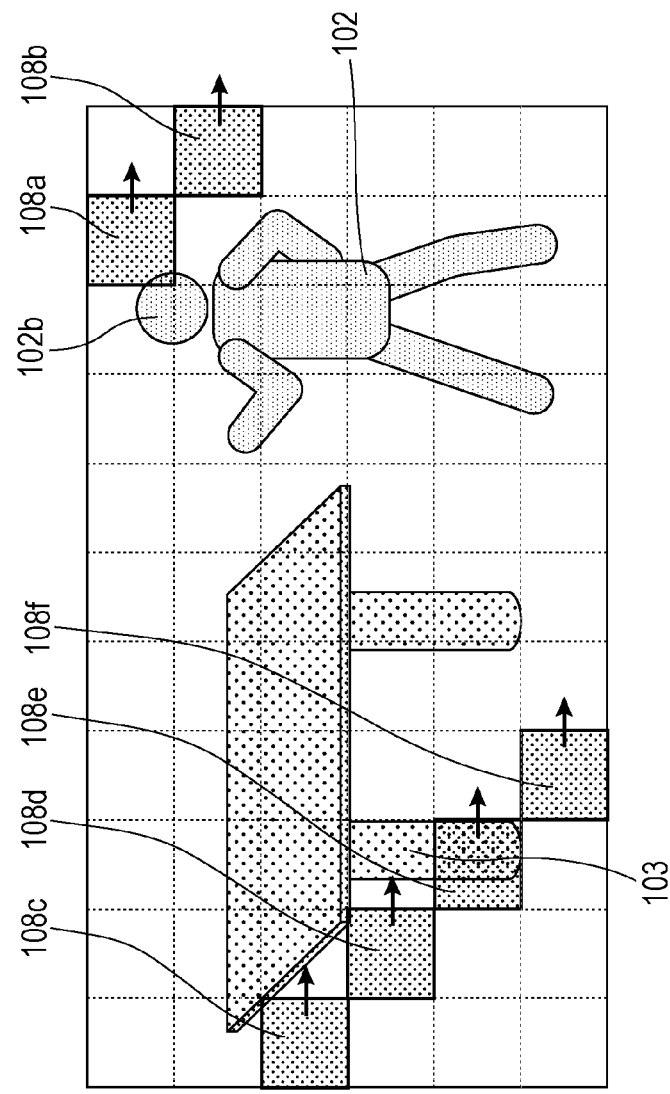
FIG. 53D is a conceptual diagram illustrating the detection areas of the infrared detection devices according to the fourth embodiment.

If the rotors 104a to 104f of the infrared detector 101 keep rotating in the same direction (clockwise), a period for which any of the detection areas 108a to 108f captures the person 102 is from two frames after the beginning of the detection (FIG. 53C) to nine frames after the beginning of the detection (FIG. 53D). In FIG. 53D, the detection area 108a that comes last in the scanning direction captures a head 102b of the person 102.

It takes 11 frames for the detection areas 108a to 108f to return to the positions thereof at the beginning of the detection. According to the infrared detector 101, therefore, any of the infrared detection devices 105a to 105f detects the person 102 in eight frames (from two frames later to nine frames later) out of the 11 frames.

If each of the rotors 104a to 104f of the infrared detector 101 rotates in a reverse direction (if the rotational direction is reversed) after each of the detection areas 108a to 108f reaches a right end of a scanning area, the person 102 remains detected from two frames later to 12 frames later as illustrated in FIG. 53E.

In this case, the detection areas 108a to 108f return to the positions thereof at the beginning of the detection 20 frames after the beginning of the detection, when the detection areas 108a to 108f have reached both ends of the scanning area. In this case, any of the infrared detection devices 105a to 105f detects the person 102 in 11 frames (from two frames later to 12 frames later) out of the 20 frames.

Figure 54:
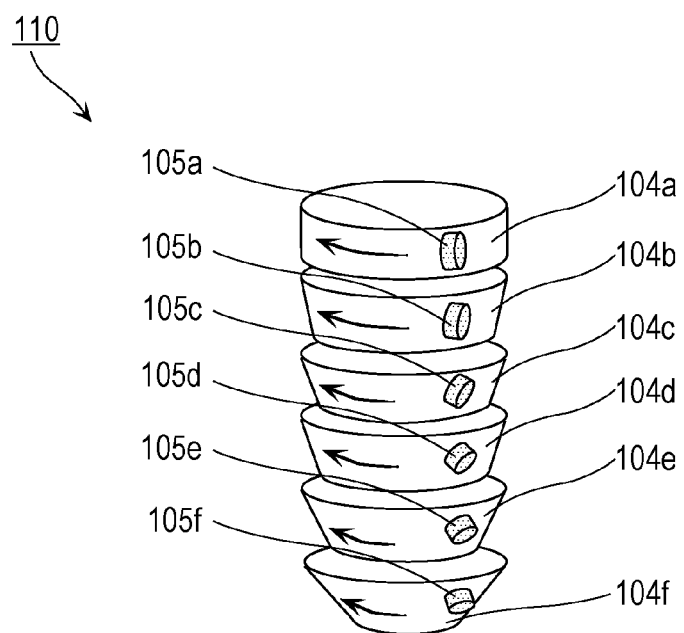
FIG. 54 is a perspective view of an infrared detector in which the infrared detection devices are aligned with one another in a vertical direction.
Figure 55B:
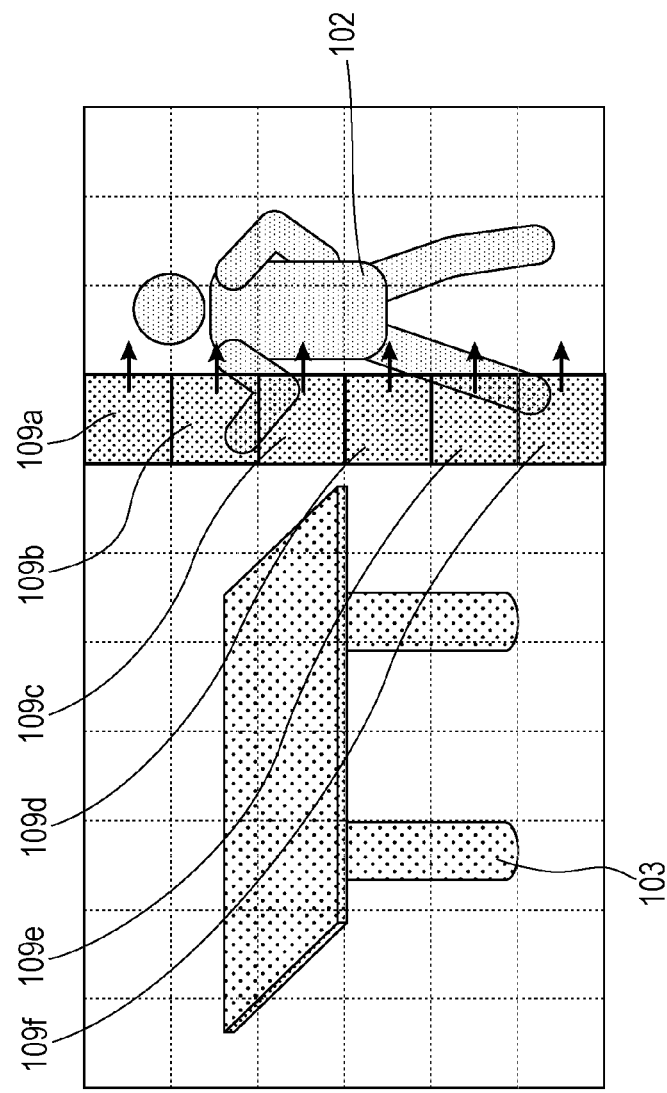
FIG. 55B is a conceptual diagram illustrating the detection areas of the infrared detection devices illustrated in FIG. 54.
Figure 55C:
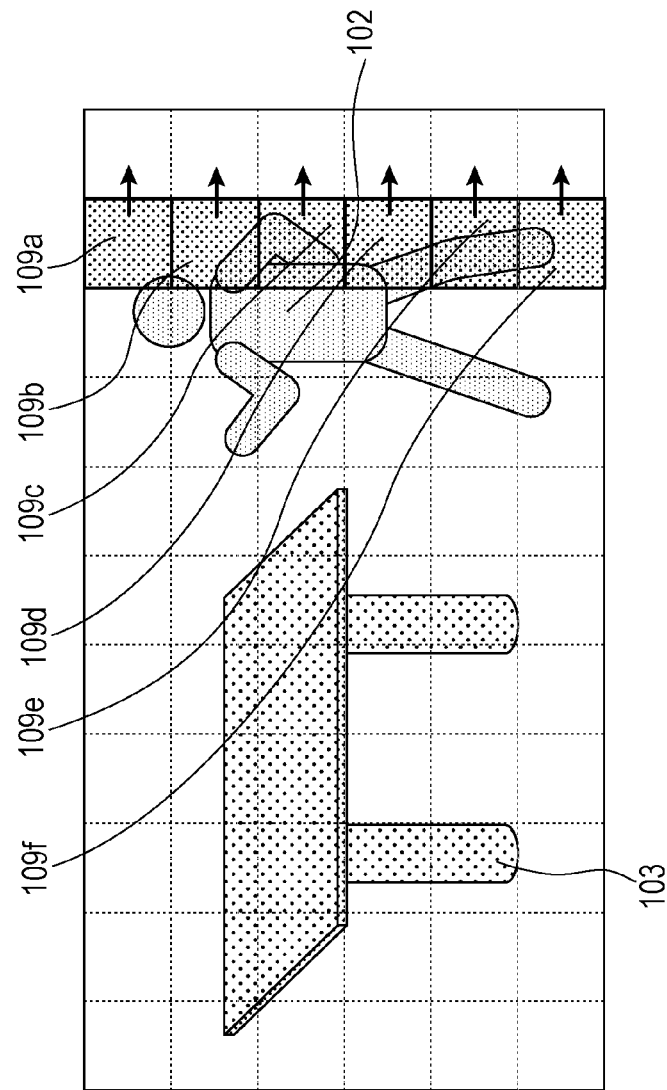
FIG. 55C is a conceptual diagram illustrating the detection areas of the infrared detection devices illustrated in FIG. 54.

An infrared detector in which, unlike the infrared detector 101, the infrared detection devices 105a to 105f are aligned with one another in the vertical direction and a detection area thereof will be described. FIG. 54 is a perspective view of the infrared detector in which the infrared detection devices 105a to 105f are aligned with one another in the vertical direction. FIGS. 55A to 55C are conceptual diagrams illustrating detection areas of the infrared detection devices 105a to 105f illustrated in FIG. 54.

In the infrared detector 110 illustrated in FIG. 54, positions of the infrared detection devices 105a to 105f are the same in the rotational direction. As illustrated in FIG. 55A, the detection areas 109a to 109f of the infrared detector 110 are aligned with one another in the vertical direction at a left end of a scanning area at a beginning of detection performed by the infrared detector 110.

The infrared detector 110 begins to detect the person 102 seven frames later as illustrated in FIG. 55B. Thereafter, the person 102 remains detected until nine frames later as illustrated in FIG. 55C.

If the rotors 104a to 104f of the infrared detector 110 keep rotating in the same direction, it takes 11 frames for the detection areas 108a to 108f to return to the positions thereof at the beginning of the detection. In the case of the infrared detector 110, the infrared detection devices 105a to 105f detect the person 102 only in three frames (from seven frames later to nine frames later) out of the 11 frames.

If the rotors 104a to 104f of the infrared detector 110 rotate in a reverse direction (if the rotational direction is reversed) after the detection areas 108a to 108f reach a right end of the scanning area, it takes 20 frames for the detection areas 108a to 108f to return to the positions thereof at the beginning of the detection illustrated in FIG. 55A.

In this case, the infrared detection devices 105a to 105f detect the person 102 only in six frames, that is, from seven frames after the beginning of the detection to nine frames after the beginning of the detection and from 11 frames after the beginning of the detection to 13 frames after the beginning of the detection (six frames out of the 20 frames).

As described above, in the infrared detector 101, at least one infrared detection device is shifted in the scanning direction. According to the infrared detector 101, the following advantageous effect can be produced.

In general, if the amount of movement of a person is measured by moving infrared detection devices, the amount of movement is estimated on the basis of a difference between a temperature distribution (first thermal image data) in a room obtained as a result of a first scanning operation and a temperature distribution (second thermal image data) in the room obtained as a result of a second scanning operation.

If thermopile devices composed of silicon or the like are used as the infrared detection devices, for example, it might take a few seconds to complete detection of one frame. If it takes three seconds to complete detection of one frame, it takes 33 seconds to complete detection of a total of 11 frames and obtain thermal image data in the example illustrated in FIG. 53A to 53D.

If the infrared detector 110 is used as described above, the person 102 is detected only in three frames out of the 11 frames. That is, the temperature distribution of the person 102 is measured only in nine seconds out of the 33 seconds. A period in which the amount of movement of the person 102 is not obtained is too long.

In the infrared detector 101, on the other hand, since the infrared detection devices 105a to 105f are arranged at the certain intervals in the rotational direction, the temperature distribution of the person 102 is measured in eight frames out of the 11 frames, that is, in 24 seconds out of the 33 seconds. Despite being an infrared detector of a scanning type, the infrared detector 101 can obtain the amount of movement of the person 102 in substantially all the frames.

According to the infrared detector 101, the amount of movement of the person 102 can be accurately detected. The air conditioning apparatus 100 including the infrared detector 101 can achieve comfortable air conditioning according to the accurately measured amount of movement of the person 102.

The same holds for when each of the rotors 104a to 104f of the infrared detector 101 rotates in the reverse direction after each of the detection areas 108a to 108f reaches the right end of the scanning area.

As described above, the infrared detector 110 measures the temperature distribution of the person 102 only in six frames out of the 20 frames, that is, in 18 seconds out of the 60 seconds. On the other hand, as described above, the infrared detector 101 can measure the temperature distribution of the person 102 in 11 frames out of the 20 frames, that is, in 33 seconds out of the 60 seconds. That is, despite being an infrared detector of a scanning type, the infrared detector 101 can obtain the amount of movement of the person 102 in a longer period.

Although the infrared detector 101 includes six infrared detection devices 105a to 105f, the number of infrared detection devices used is not particularly limited.

In the infrared detector 101, the infrared detection devices 105a to 105f are arranged on the rotors 104a to 104f at the certain intervals in the scanning direction. In other words, in the infrared detector 101, there are no two infrared detection devices whose positions in the scanning direction are the same. If at least one infrared detection device is shifted in the scanning direction, however, an effect of detecting a person in a longer time can be produced. That is, the arrangement of infrared detection devices is not limited to that in the infrared detector 101.

The rotational direction of the rotors 104a to 104f, a scanning length of each frame, and other scanning parameters employed by the infrared detector 101 are examples, and not particularly limited. Various modifications may be made insofar as the scope of the infrared detector 101 is not deviated from.

First Modification of Fourth Embodiment

Figure 56A:
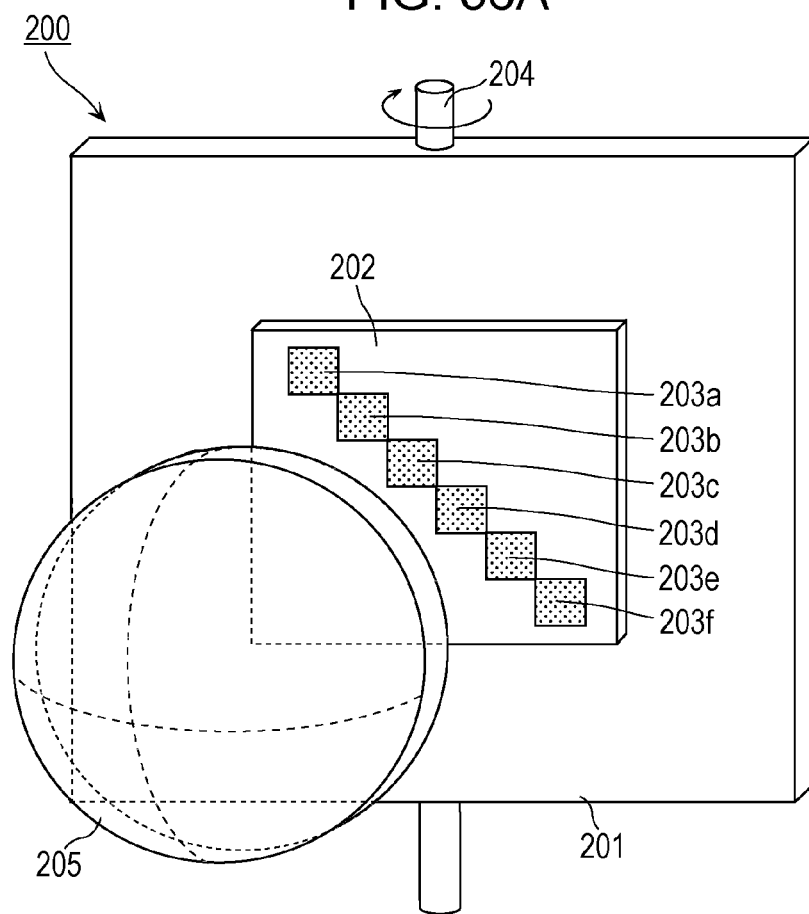
FIG. 56A is a perspective view of an infrared detector according to a first modification of the fourth embodiment.
Figure 56B:
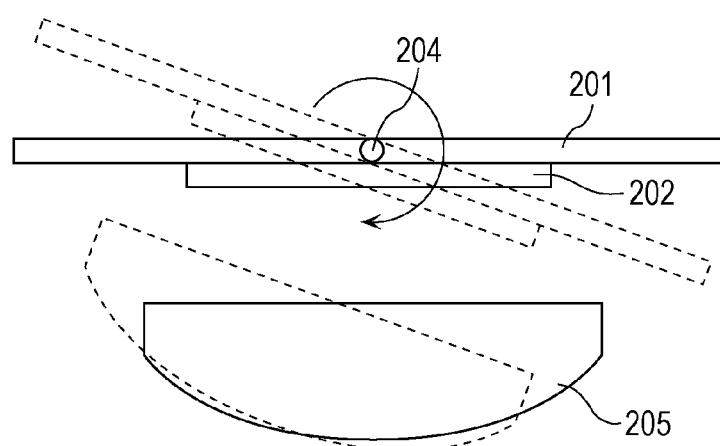
FIG. 56B is a plan view of the infrared detector according to the first modification of the fourth embodiment.

An infrared detector according to a first modification of the fourth embodiment will be described hereinafter. FIG. 56A is a perspective view of the infrared detector according to the first modification of the fourth embodiment. FIG. 56B is a plan view of the infrared detector according to the first modification of the fourth embodiment.

An infrared detector 200 illustrated in FIGS. 56A and 56B includes an infrared detection device array 202 formed on a board 201 and an imaging lens 205 fixed on the board 201 by a mount, which is not illustrated. The board 201 is fixed to a shaft 204, and the infrared detection device array 202 and the imaging lens 205 arranged on the board 201 simultaneously rotate as the shaft 204 rotates. As a result, the infrared detector 200 can scan in the horizontal direction. The imaging lens 205 is desirably composed of germanium, ZnSe (zinc selenide), silicon, or the like that hardly absorbs infrared radiation.

As illustrated in FIG. 56A, in the infrared detection device array 202 of the infrared detector 200, rectangular infrared detection devices 203a to 203f are diagonally arranged. That is, in the infrared detector 200, the infrared detection device array 202 (infrared detection devices 203a to 203f) is inclined from the scanning direction by a certain angle in the same plane.

As with the infrared detector 101, despite being an infrared detector of a scanning type, the infrared detector 200 can obtain the amount of movement of the person 102 at most times by rotating the board 201 about the shaft 204. That is, according to the infrared detector 200, the amount of movement of the person 102 can be accurately detected. The air conditioning apparatus 100 including the infrared detector 200 can achieve comfort air conditioning according to the accurately measured amount of movement of the person 102.

Although the infrared detector 200 rotates clockwise in FIG. 56B, the infrared detector 200 may rotate counterclockwise if a scanning direction of the infrared detector 200 is reversed after each of detection areas reaches a right end of a scanning area.

Modification of First Modification of Fourth Embodiment

Figure 57:
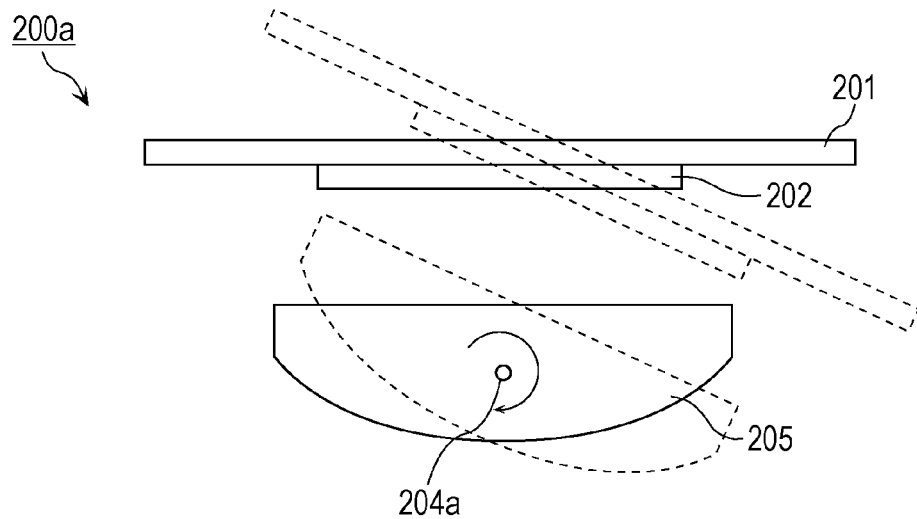
FIG. 57 is a plan view of an infrared detector according to a modification of the first modification of the fourth embodiment.

FIG. 57 is a plan view of an infrared detector according to a modification of the first modification of the fourth embodiment. The same components as those illustrated in FIG. 56B are given the same reference numerals, and detailed description thereof is omitted.

Although the infrared detection device array 202 and the imaging lens 205 arranged on the board 201 simultaneously rotate as the shaft 204 rotates in the infrared detector 200 illustrated in FIG. 56B, the infrared detection device array 202 need not rotate in this manner. The infrared detection device array 202 may rotate as described in the ninth modification of the second embodiment and the like. That is, as illustrated in FIG. 57, a rotation center of the infrared detection device array 202 may be an axis (rotation axis 204a) through a part of the imaging lens 205.

The imaging lens 205 is rotated about the axis (rotation axis 204a) through the part of the imaging lens 205. The axis (rotation axis 204a) through the part of the imaging lens 205 is, for example, an axis through a pole that is an optical center of the imaging lens 205.

Since the rotation center of an infrared detector 200a and the pole of the imaging lens 205 can substantially match, a boundary between a high-temperature area and a low-temperature area in an infrared image obtained by the infrared detector 200a becomes clear.

A boundary between a high-temperature area and a low-temperature area in an obtained infrared image becomes more unclear as the rotation center of the infrared detector 200a (thermal image sensor) and the pole of the imaging lens 205 (lens) are more deviated from each other, a mechanism of which will be described hereinafter with reference to the drawings.

Figure 58:
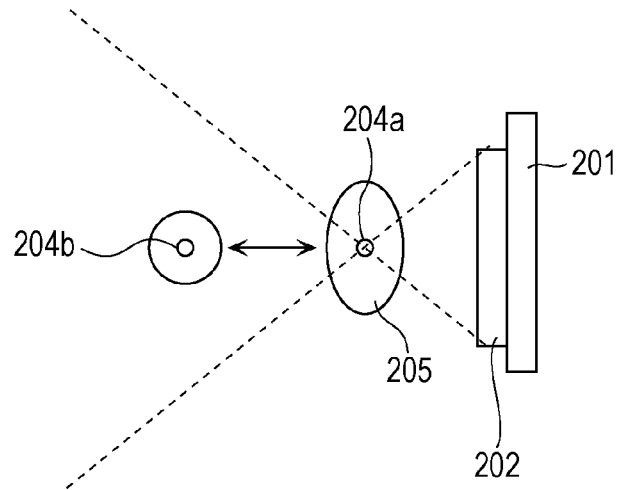
FIG. 58 is a schematic diagram illustrating a pole of a lens and a rotation center of an infrared sensor.
Figure 59:
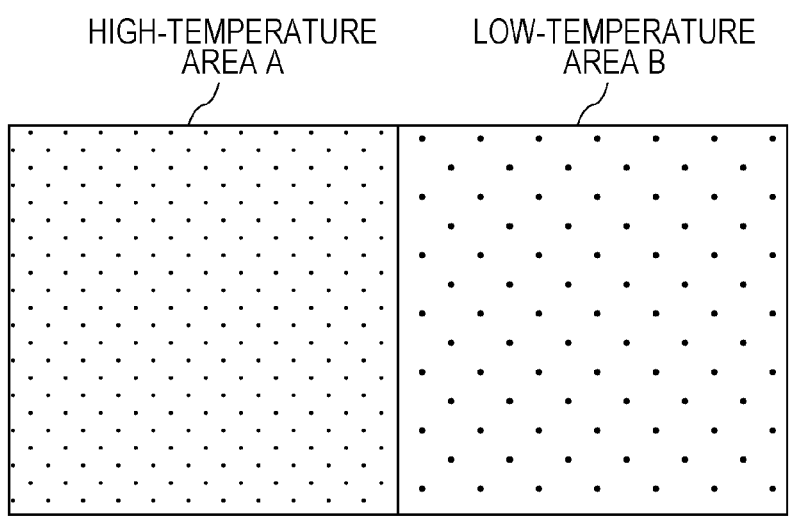
FIG. 59 is a diagram illustrating an example of a measurement target (observation area) of the infrared sensor illustrated in FIG. 58.
Figure 60A:
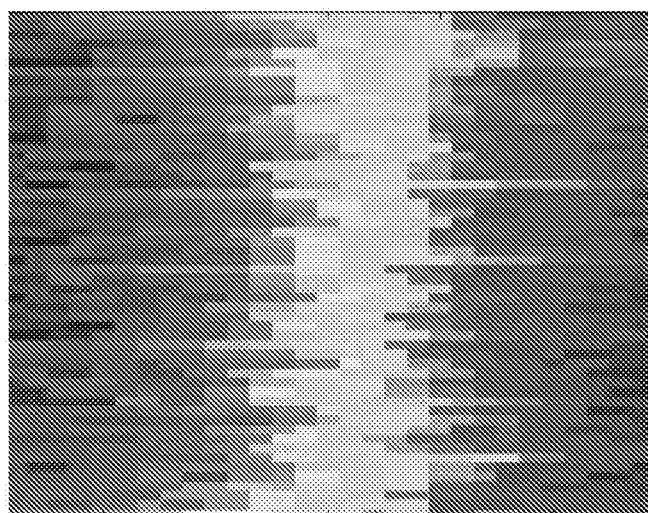
FIG. 60A is a diagram illustrating a thermal image (measurement result) obtained by the infrared sensor illustrated in FIG. 58.
Figure 60B:
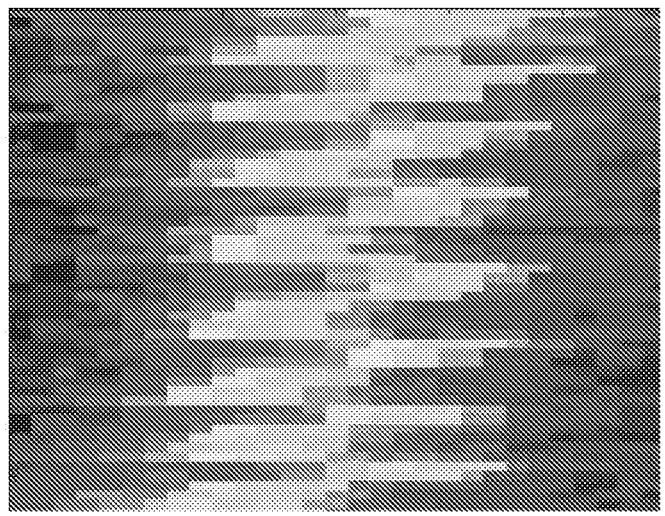
FIG. 60B is a diagram illustrating a thermal image (measurement result) obtained by the infrared sensor illustrated in FIG. 58.
Figure 60C:
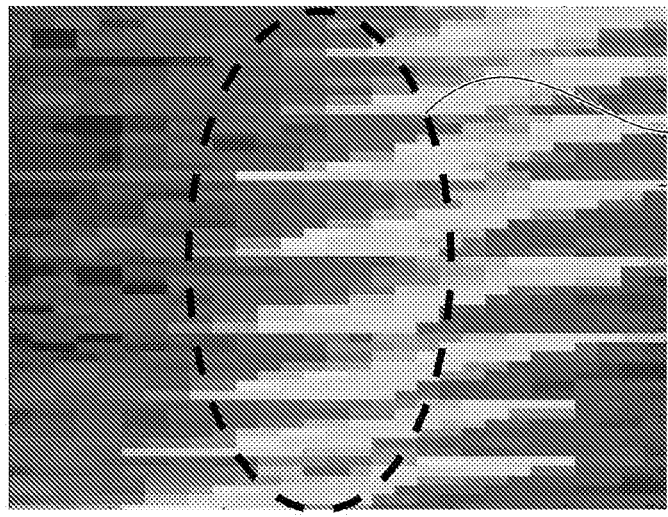
FIG. 60C is a diagram illustrating a thermal image (measurement result) obtained by the infrared sensor illustrated in FIG. 58.

FIG. 58 is a schematic diagram illustrating the pole of the imaging lens 205 and a rotation center of an infrared sensor. FIG. 59 is a diagram illustrating an example of a measurement target (observation area) of the infrared sensor illustrated in FIG. 58. FIGS. 60A to 60C are diagrams illustrating thermal images (measurement results) obtained by the infrared sensor illustrated in FIG. 58.

In the infrared sensor illustrated in FIG. 58, a rotation center 204b can be moved. That is, the infrared sensor illustrated in FIG. 58 can make a distance between the pole of the imaging lens 205 and the rotation center 204b be 0 mm (substantially match, that is, no deviation), 5 mm (small deviation), or 10 mm (large deviation). The infrared sensor illustrated in FIG. 58 measures a measurement target (obtains a thermal image of an observation area), for example, for which a heat source is provided such that a left half of the measurement target becomes a high-temperature area A and a right half of the measurement target becomes a low-temperature area B as illustrated in FIG. 59.

In this case, if the pole of the imaging lens 205 and the rotation center 204b substantially match (no deviation), the infrared sensor illustrated in FIG. 58 obtains a thermal image illustrated in FIG. 60A. If the deviation between the pole of the imaging lens 205 and the rotation center 204b is small, the infrared sensor illustrated in FIG. 58 obtains a thermal image illustrated in FIG. 60B. If the deviation between the pole of the imaging lens 205 and the rotation center 204b is large, the infrared sensor illustrated in FIG. 58 obtains a thermal image illustrated in FIG. 60C.

As illustrated in FIGS. 60A to 60C, as the deviation between the rotation center 204b of the thermal image sensor and the pole of the imaging lens 205 becomes large, the boundary between the high-temperature area A and the low-temperature area B becomes more serrated. That is, as the deviation between the rotation center 204b of the thermal image sensor and the pole of the imaging lens 205 becomes larger, a boundary between a high-temperature area and a low-temperature area in an obtained thermal image (infrared image) becomes more unclear.

In a thermal image (infrared image) in which a boundary between a high-temperature area and a low-temperature area is unclear, a contour of an object such as a person becomes unclear, and it is undesirably difficult to detect an object such as a person accurately.

By substantially matching the rotation center of the infrared detector 200a and the pole of the imaging lens 205 as in the present modification, a boundary between a high-temperature area and a low-temperature area in an infrared image obtained by the infrared detector 200a becomes clear. In this case, an object such as a person in an infrared image obtained by the infrared detector 200a can be detected more accurately.

The infrared detection device array 202 and the imaging lens 205 of the infrared detector 200a according to the present modification might become dirty over time. In order to prevent the infrared detection device array 202 and the imaging lens 205 from becoming dirty, the infrared detector 200a may further include one of the cover members described in the tenth modification of the second embodiment.

FIGS. 61A to 61G are diagrams illustrating examples of a cover member of the infrared detector 200a according to the modification of the first modification of the fourth embodiment. The same components as those illustrated in FIGS. 32A to 32G and 57 are given the same reference numerals, and detailed description thereof is omitted.

Figure 61A:
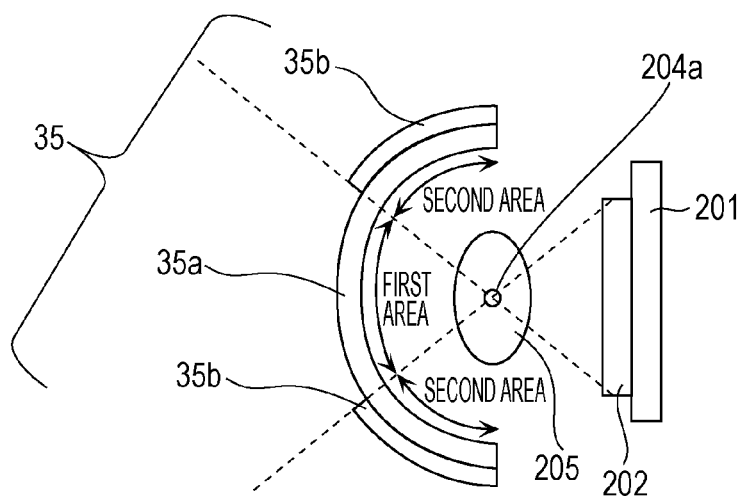
FIG. 61A is a diagram illustrating an example of a cover member of the infrared detector according to the modification of the first modification of the fourth embodiment.
Figure 61B:
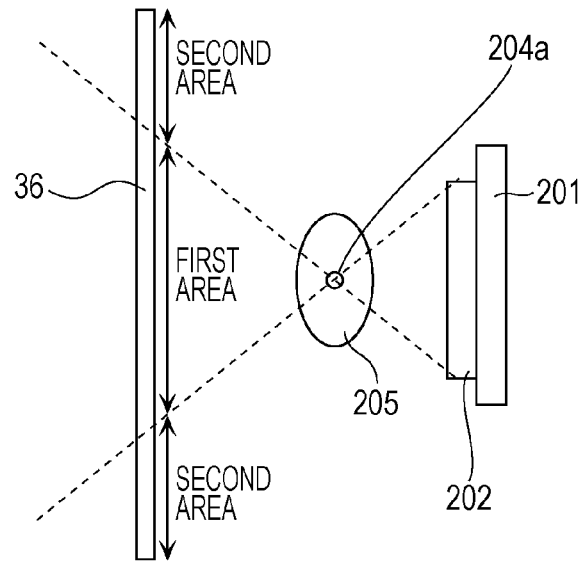
FIG. 61B is a diagram illustrating another example of the cover member of the infrared detector according to the modification of the first modification of the fourth embodiment.
Figure 61C:
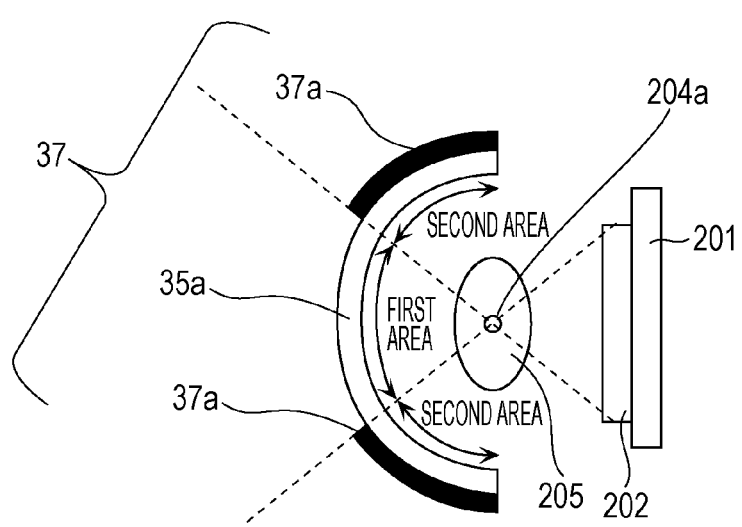
FIG. 61C is a diagram illustrating another example of the cover member of the infrared detector according to the modification of the first modification of the fourth embodiment.
Figure 61D:
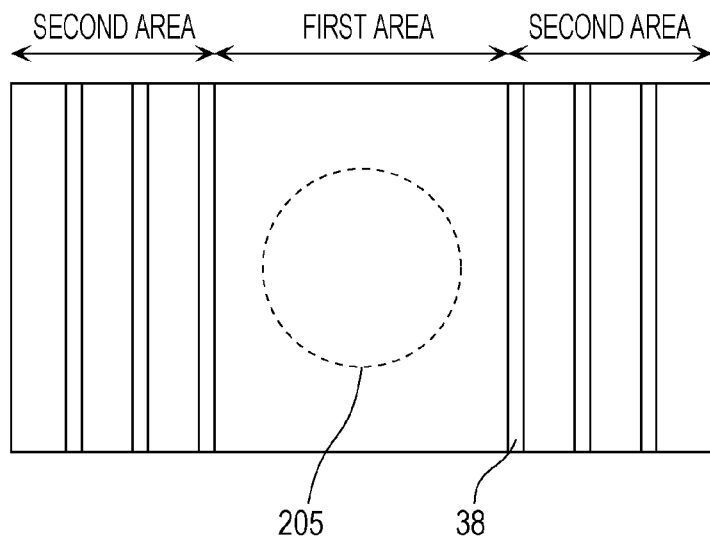
FIG. 61D is a diagram illustrating another example of the cover member of the infrared detector according to the modification of the first modification of the fourth embodiment.
Figure 61E:
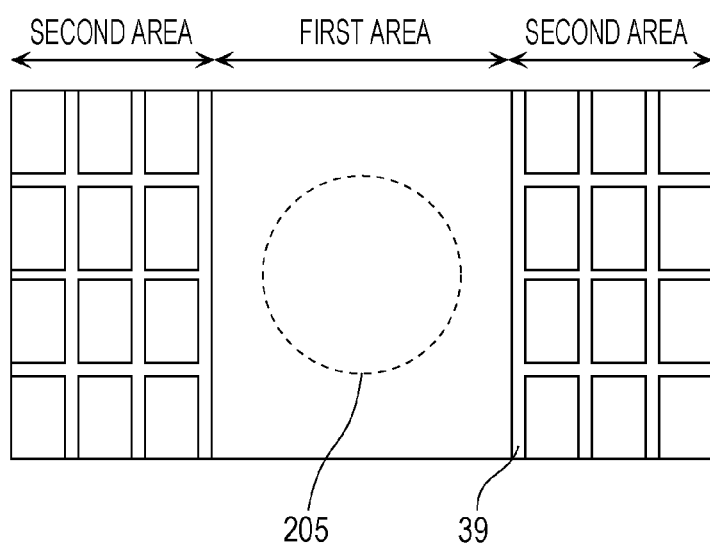
FIG. 61E is a diagram illustrating another example of the cover member of the infrared detector according to the modification of the first modification of the fourth embodiment.

FIG. 61A illustrates an example of a case in which thicknesses of parts of the cover member are changed. FIG. 61B illustrates an example, which is different from that illustrated in FIG. 61A, of the cover member including the first area and the second areas having different infrared transmittances. FIG. 61C illustrates an example, which is different from that illustrated in FIG. 61A, of the cover member including the first area and the second areas having different infrared transmittances. The cover members 35 to 37 are the same as those illustrated in FIGS. 32A to 32C, respectively, and description thereof is omitted.

Figure 61F:
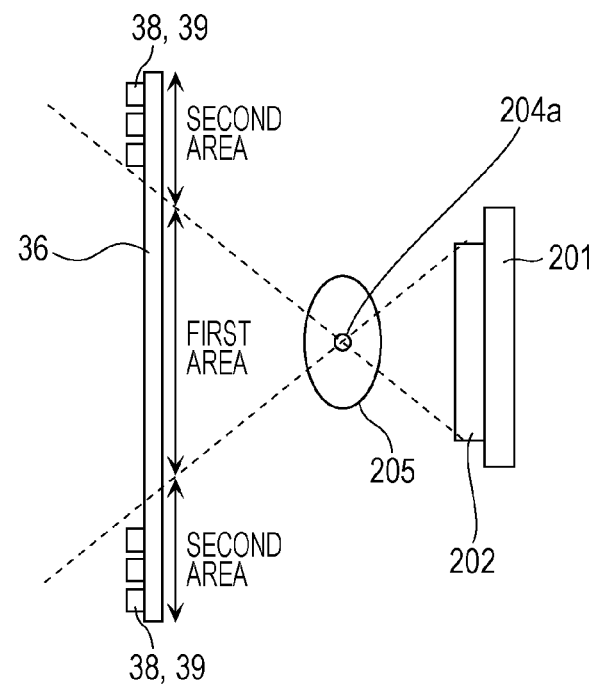
FIG. 61F is a diagram illustrating another example of the cover member of the infrared detector according to the modification of the first modification of the fourth embodiment.
Figure 61G:
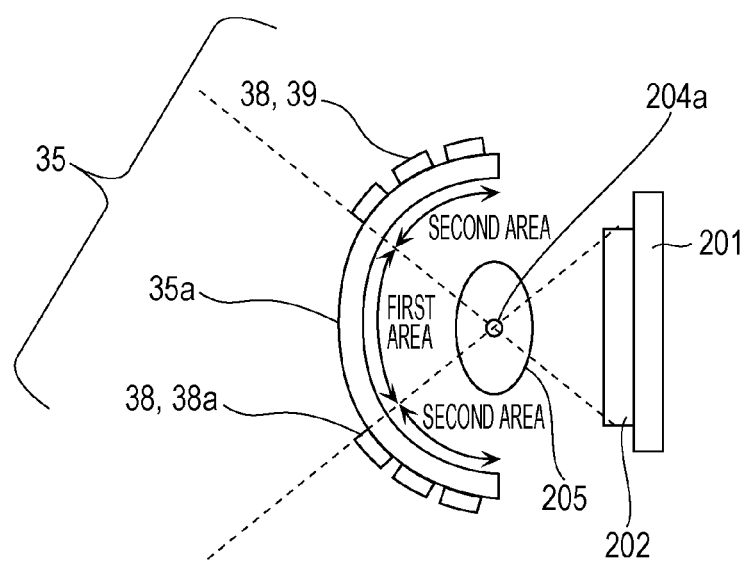
FIG. 61G is a diagram illustrating another example of the cover member of the infrared detector according to the modification of the first modification of the fourth embodiment.

FIGS. 61D to 61G illustrate other examples of the cover member of the infrared detector according to the modification of the first modification of the fourth embodiment. That is, FIG. 61F illustrates a case in which the members 38 or 39 are included in the second areas of the cover member 36 for the infrared detector 200a according to the present modification. FIG. 61G illustrates a case in which the members 38 or 39 are included instead of the members 35b of the cover member 35 of the infrared detector 200a according to the present modification. The infrared detector 200a illustrated in FIG. 61F or 61G includes the members 38 or 39 to reinforce the structure of the second areas and the entire structure of the cover member.

A member (not illustrated) that does not transmit infrared radiation is desirably provided near the cover member of the infrared detector 200a (thermal image sensor). If infrared radiation emitted from the member can be received by the infrared receiving unit 34 through the lens 33, a temperature of the member may be regarded as a temperature of the cover member.

The member that does not transmit infrared radiation is desirably composed of, for example, a black body.

The member that does not transmit infrared radiation is desirably not a heat source.

If, among members included in an air conditioning apparatus including an infrared detector described in the above embodiments, there is a member (not illustrated), other than the infrared detector, that does not transmit infrared radiation near the cover member of the infrared detector and infrared radiation emitted from the member can be received by the infrared receiving unit 34 through the lens 33, a temperature of the member may be regarded as a temperature of the cover member.

The same holds for an electronic cooker including an infrared detector, an automobile air conditioning apparatus including an infrared detector, and a transport device including an infrared detector.

Details are the same as those described with reference to FIGS. 32D to 32G, and description thereof is omitted here.

Second Modification of Fourth Embodiment

Figure 62A:
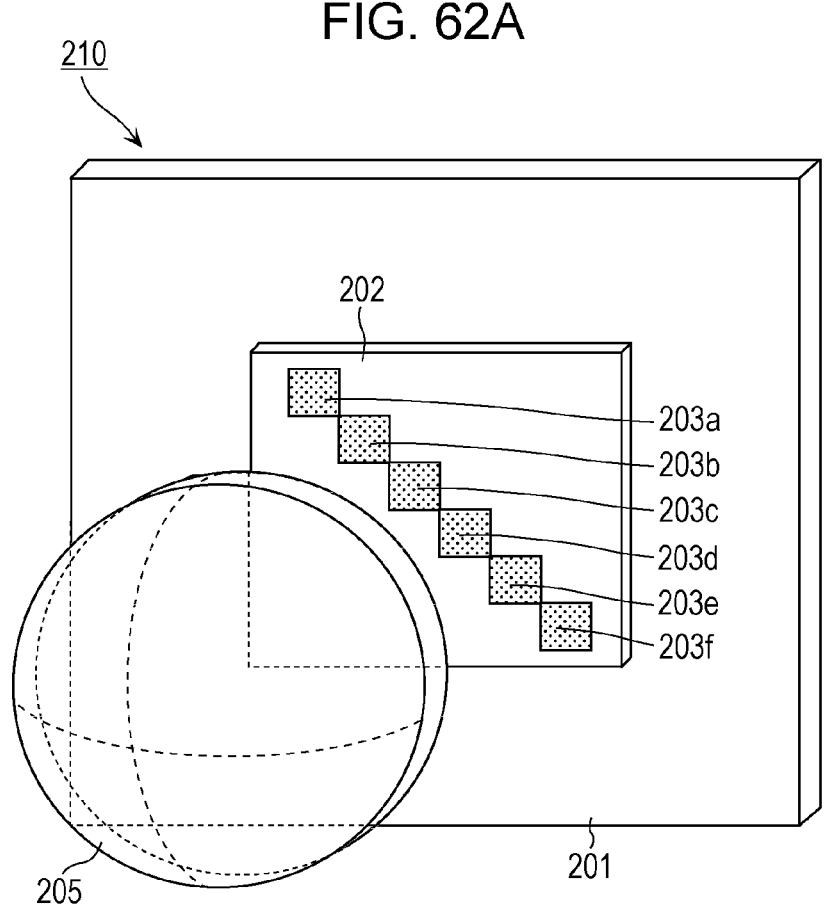
FIG. 62A is a perspective view of an infrared detector according to a second modification of the fourth embodiment.
Figure 62B:
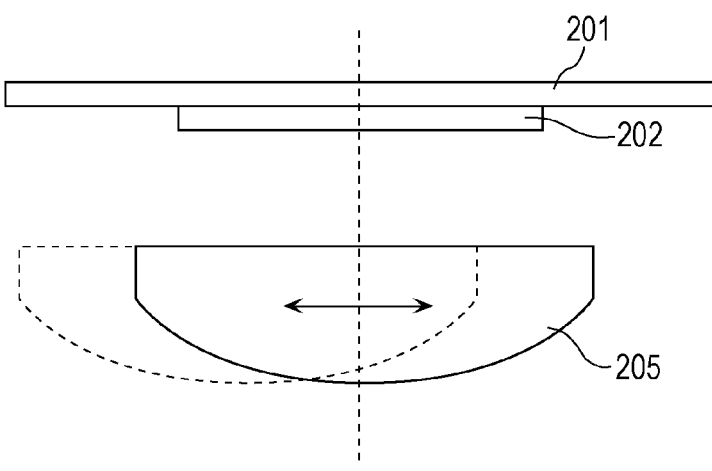
FIG. 62B is a plan view of an infrared detector according to the second modification of the fourth embodiment.

An infrared detector according to a second modification of the fourth embodiment will be described hereinafter. FIG. 62A is a perspective view of the infrared detector according to the second modification of the fourth embodiment. FIG. 62B is a plan view of the infrared detector according to the second modification of the fourth embodiment.

An infrared detector 210 illustrated in FIGS. 62A and 62B is similar to the infrared detector 200, but different from the infrared detector 200 in that the infrared detector 210 does not include the shaft 204, the imaging lens 205 is not fixed on the board 201, and, as illustrated in FIG. 62B, the imaging lens 205 can move to the left and right (scanning direction) using a mechanism that is not illustrated.

Despite being of a scanning type, the infrared detector 210 can obtain the amount of movement of the person 102 at most times as in a case in which the scanning direction of the infrared detector 101 is reversed. That is, according to the infrared detector 210, the amount of movement of the person 102 can be accurately detected. The air conditioning apparatus 100 including the infrared detector 210 can achieve comfortable air conditioning according to the accurately measured amount of movement of the person 102.

Third Modification of Fourth Embodiment

Figure 63:
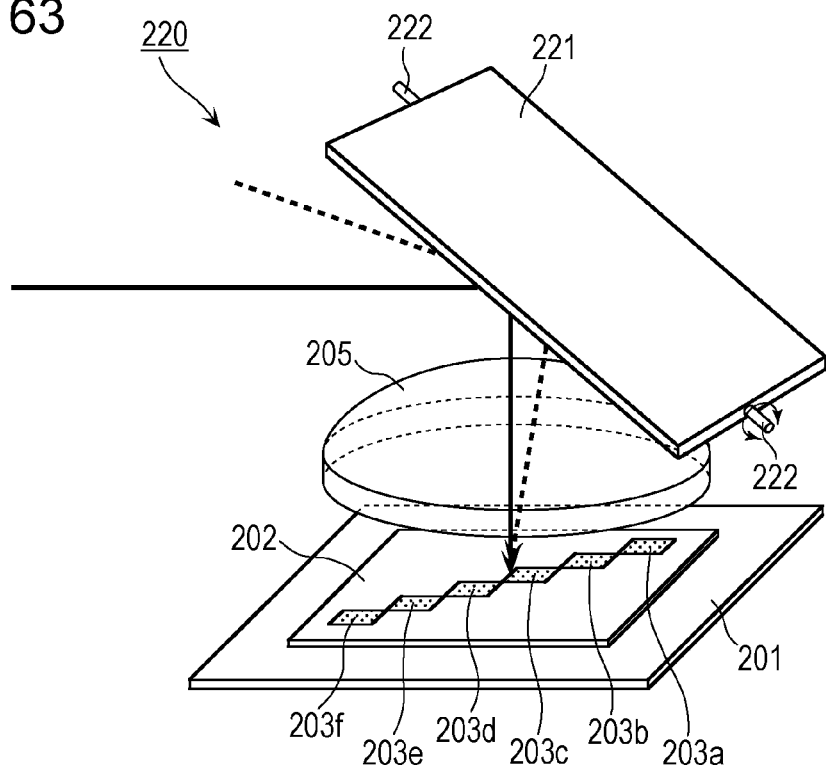
FIG. 63 is a perspective view of an infrared detector according to a third modification of the fourth embodiment.

An infrared detector according to a third modification of the fourth embodiment will be described hereinafter. FIG. 63 is a perspective view of the infrared detector according to the third modification of the fourth embodiment.

An infrared detector 220 illustrated in FIG. 63 includes the infrared detection device array 202 and the imaging lens 205 arranged on the board 201. The infrared detection device array 202 and the imaging lens 205 are the same as those included in the infrared detector 200.

The infrared detector 220, however, is different from the infrared detector 200 in that the board 201, the infrared detection device array 202, and the imaging lens 205 are not moved at all and a mirror 221 provided above the imaging lens 205 is rotated about a shaft 222. More specifically, the mirror 221 reflects infrared radiation entering from the left in FIG. 63 downward. The reflected infrared radiation passes through the imaging lens 205 and is distributed over the infrared detection device array 202.

Since the mirror 221 is rotated about the shaft 222, the infrared detector 220 can, despite being of a scanning type, obtain the amount of movement of the person 102 at most times while reducing a movable portion to a minimum. That is, according to the infrared detector 220, the amount of movement of the person 102 can be accurately detected. The air conditioning apparatus 100 including the infrared detector 220 can achieve comfortable air conditioning according to the accurately measured amount of movement of the person 102.

In the infrared detector 220, a movable portion is only the mirror 221 that rotates about the shaft 222, and the mirror 221 does not include wires. That is, the configuration of the infrared detector 220 is simple. A lifetime of the infrared detector 220 is therefore long, and the infrared detector 220 can be fabricated at low cost.

Figure 64:
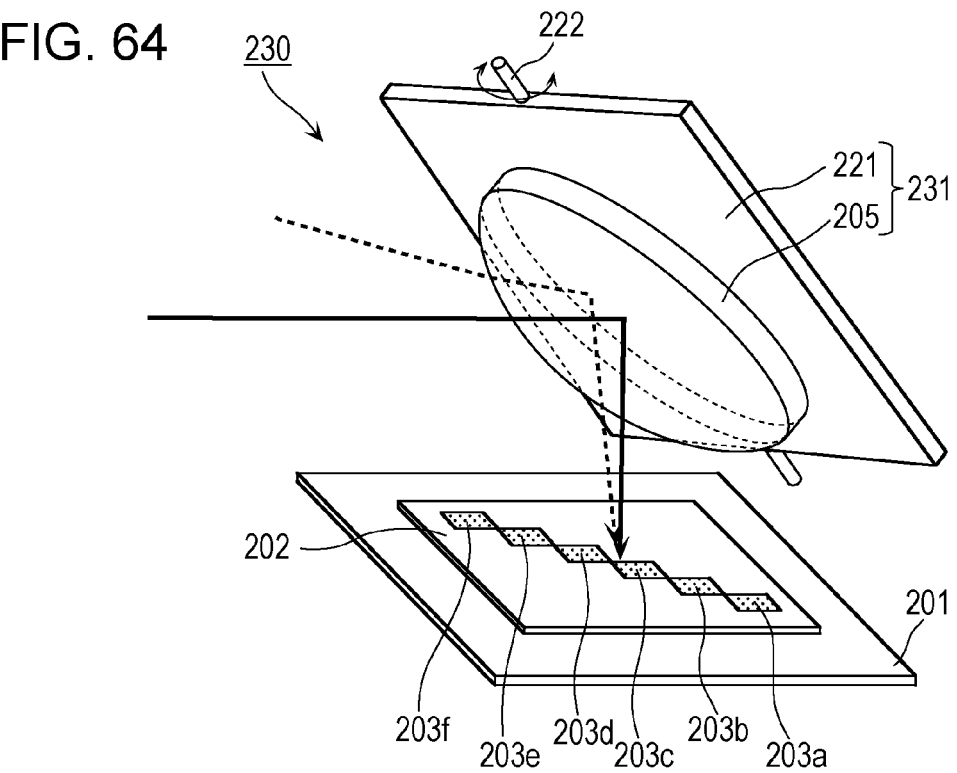
FIG. 64 is a perspective view of an infrared detector in which an imaging lens is mounted on a mirror.

In this case, the imaging lens 205 may be mounted on the mirror 221. FIG. 64 is a perspective view of an infrared detector in which the imaging lens 205 is mounted on the mirror 221.

An infrared detector 230 illustrated in FIG. 64 is similar to the infrared detector 220 but different from the infrared detector 220 only in that the imaging lens 205 is mounted on the mirror 221. In FIG. 64, the mirror 221 on which the imaging lens 205 is mounted is indicated as a lens-mounted mirror 231.

Infrared radiation that has entered the imaging lens 205 passes through the imaging lens 205 and reaches the mirror 221. The infrared radiation is then reflected from the mirror 221 and passes through the imaging lens 205 again. The infrared radiation that has passed through the imaging lens 205 enters the infrared detection device array 202 and is distributed over the infrared detection device array 202.

The infrared detector 230 produces the same advantageous effects as the infrared detector 220. Since infrared radiation passes through the imaging lens 205 twice, a focal distance can be reduced despite the infrared detector 230 including only one lens, and an area in which a temperature distribution can be measured can be widened.

Fourth Modification of Fourth Embodiment

Figure 65:
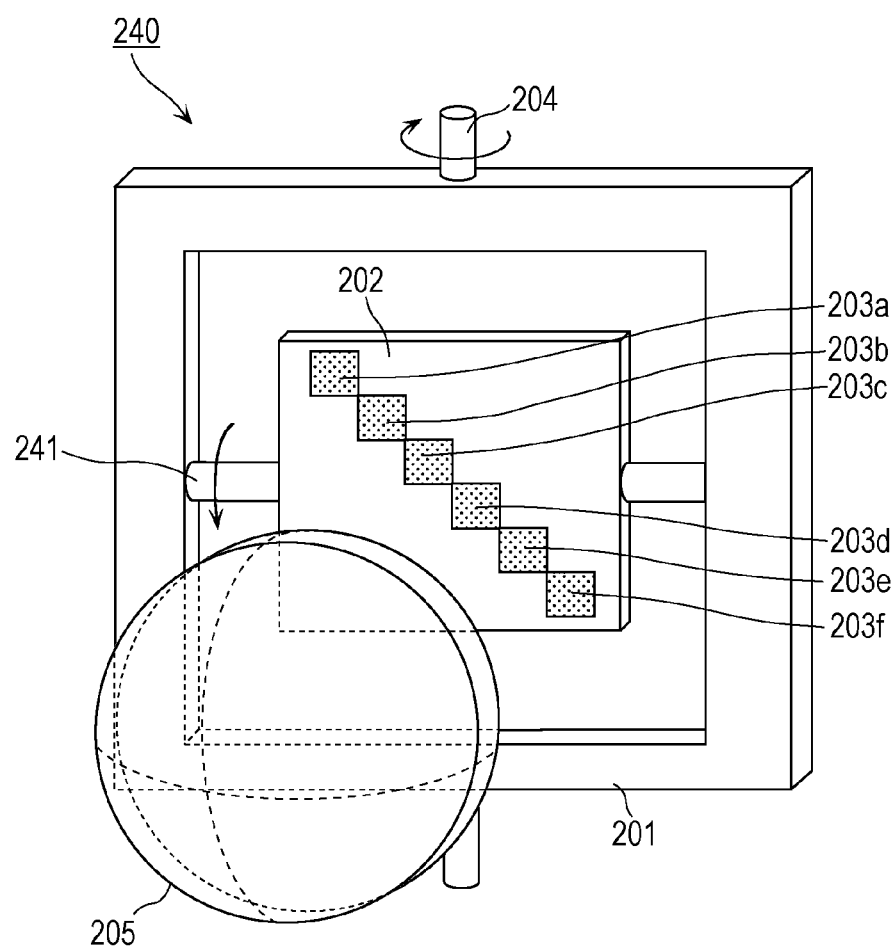
FIG. 65 is a perspective view of an infrared detector according to a fourth modification of the fourth embodiment.

An infrared detector according to a fourth modification of the fourth embodiment will be described hereinafter. FIG. 65 is a perspective view of the infrared detector according to the fourth modification of the fourth embodiment.

An infrared detector 240 illustrated in FIG. 65 is similar to the infrared detector 200. In the infrared detector 240, however, the board 201 is hollowed out and the infrared detection device array 202 supported by a shaft 241 is provided across the hollow. The shaft 241 is a horizontally extending shaft and fixed to the board 201. The infrared detection device array 202 can rotate in the vertical direction in FIG. 65.

In the infrared detector 240, the imaging lens 205 is fixed to the infrared detection device array 202 by a mount, which is not illustrated. In this case, the infrared detector 240 can perform scanning not only in the horizontal direction through the rotation of the shaft 204 but also in the vertical direction through the rotation of the shaft 241. The infrared detector 240 can receive infrared radiation over a wide range, thereby obtaining a temperature distribution over the wide range.

Figure 66B:
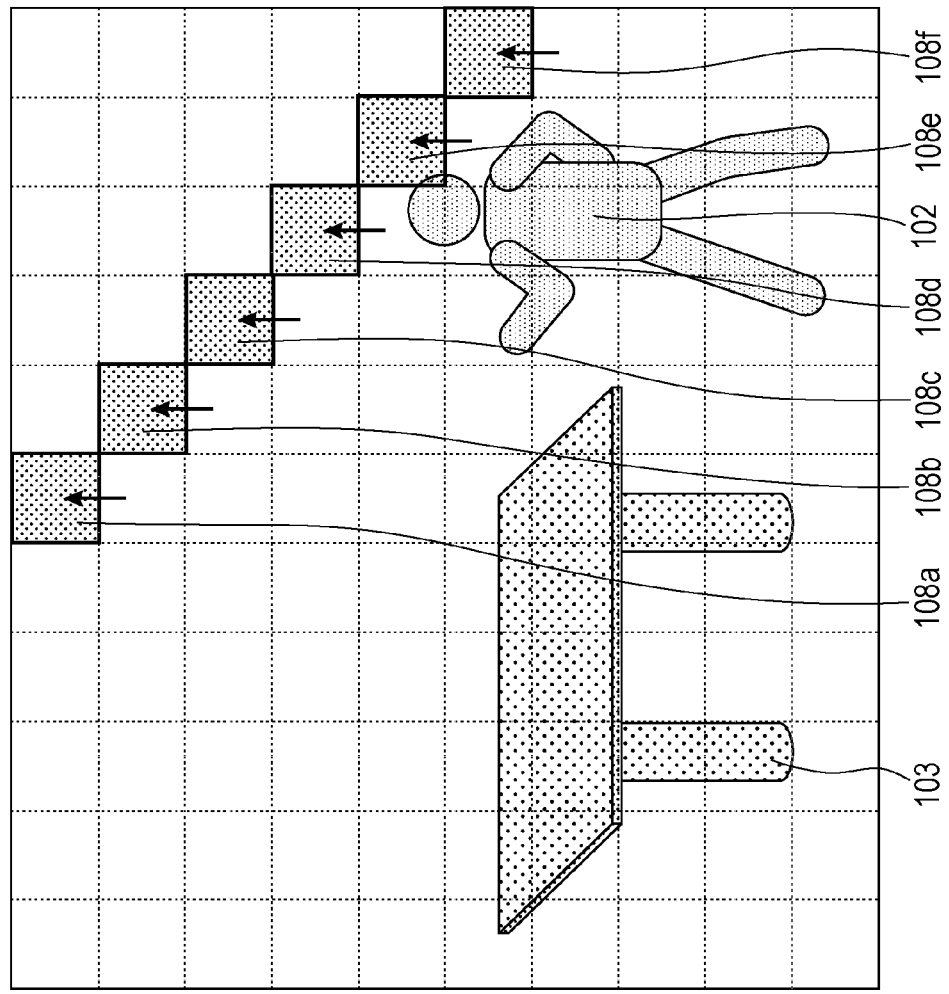
FIG. 66B is a conceptual diagram illustrating the detection areas in the scanning in the vertical direction.

If the person 102 is detected (FIG. 53C) on the basis of the amount of movement thereof in the scanning in the horizontal direction (FIGS. 53A to 53C), the infrared detector 240 rotates the shaft 241 while stopping the rotation of the shaft 204 to fix a scanning position in the horizontal direction. In this case, as illustrated in FIG. 66A, a temperature distribution in the vertical direction can be measured. FIGS. 66A to 66C are conceptual diagrams illustrating detection areas in the scanning in the vertical direction. FIG. 66A is a diagram illustrating detection areas at a beginning of the scanning in the vertical direction. FIG. 66B is a diagram illustrating detection areas at a time when upward scanning has been performed in the state illustrated in FIG. 66A. FIG. 66C is a diagram illustrating detection areas at a time when downward scanning has been performed in the state illustrated in FIG. 66A.

An area in which a region of interest is likely to appear may be usually horizontally scanned, and, only if a region of interest appears, vertical scanning may be performed as illustrated in FIGS. 66A to 66C. In this case, a wide range need not always be scanned. According to the infrared detector 240, a time taken to complete an ordinary scanning operation can be reduced, and the air conditioning apparatus 100 can be controlled more precisely.

Since the infrared detector 240 can closely check a temperature distribution around the person 102, the infrared detector 240 can obtain the amount of movement of the person 102 more precisely. The air conditioning apparatus 100 including the infrared detector 240 can therefore achieve comfortable air conditioning according to the amount of movement of the person 102.

As a method for detecting the person 102 on the basis of the temperature distribution, for example, a method may be used in which a portion of a detected temperature distribution in which an object within a certain temperature range, namely about 30° C. to 36° C., has been detected is detected (determined) as the person 102. The method for detecting the person 102 is not particularly limited, and one of various other methods including a method in which an area within a certain temperature range and of a certain size is determined as the person 102.

Figure 68:
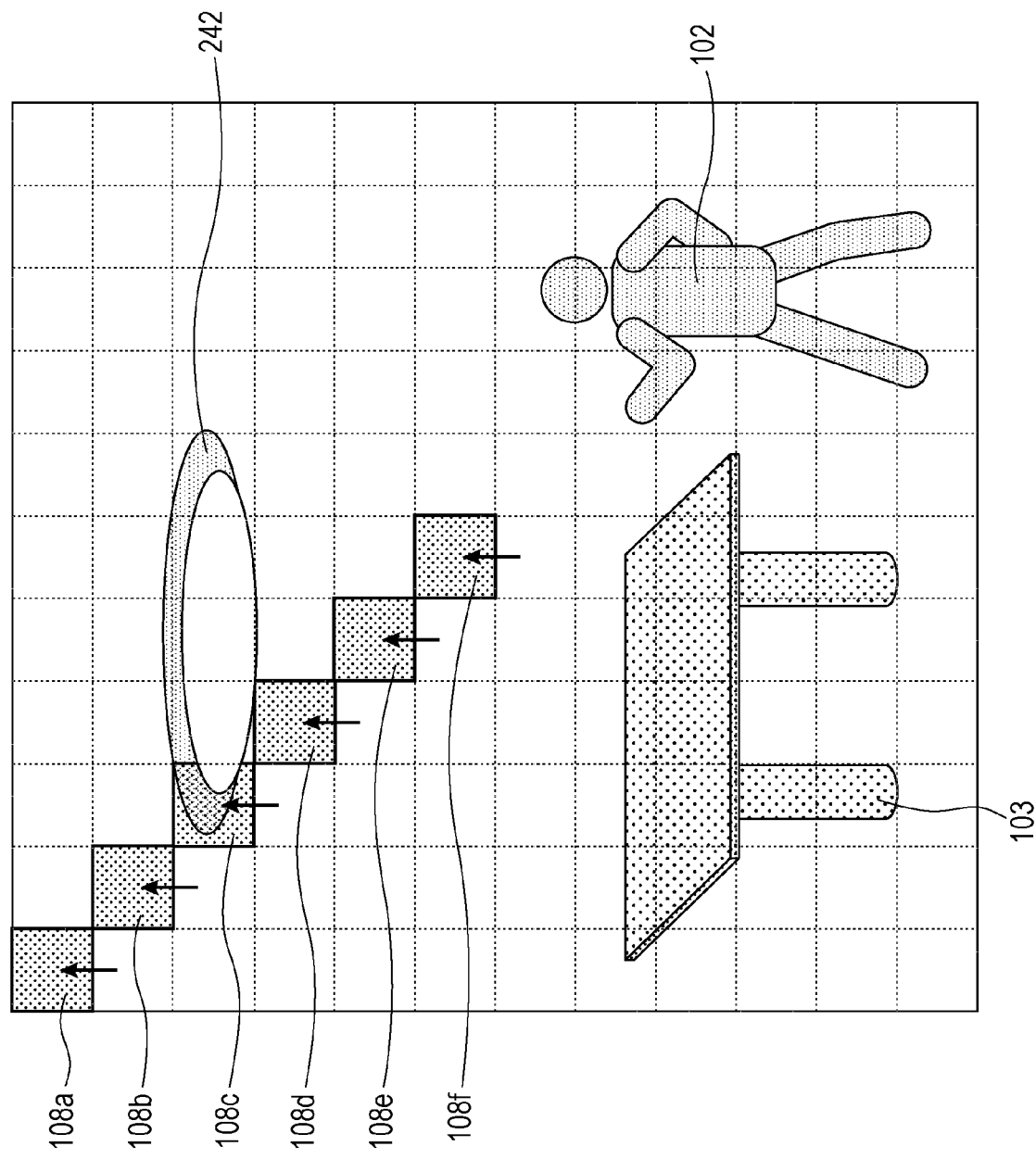
FIG. 68 is a conceptual diagram illustrating detection areas at a time when the lighting device is detected.

Although a method in which a portion in which the person 102 has been detected is determined as a region of interest and a temperature distribution around the region of interest is accurately detected has been described above, objects other than the person 102 may be determined as a region of interest. FIG. 67 is a diagram illustrating an example in which an object other than the person 102 is determined as a region of interest (detection target). FIG. 68 is a conceptual diagram illustrating detection areas at a time when a room provided with a lighting device is vertically scanned.

As illustrated in FIG. 67, if there is a lighting device 242 in the room, the lighting device 242 is detected by vertically scanning the room over a wide range as illustrated in FIG. 68. Since the lighting device 242 does not generate heat when off, it is difficult for the infrared detector 240 to detect the lighting device 242 that is turned off. When the lighting device 242 is turned on, the lighting device 242 generates heat, and the infrared detector 240 can detect the lighting device 242.

If an area in which temperature is different from other areas is found as a result of horizontal and vertical scanning over a wide range, for example, the infrared detector 240 intensively detects a temperature distribution around the area. If, then, a position of the area remains the same for a certain period of time, the area can be determined as a home appliance (in operation). The home appliance is, for example, the lighting device 242 illustrated in FIGS. 67 and 68 or one of other devices that generate heat.

The infrared detector 240 may also detect power consumption in the room or a house in advance and analyze temporal changes in the power consumption in order to identify which home appliance has begun to operate. By obtaining (storing) in advance information regarding the power consumption of each home appliance, such as 50 W of a ceiling lighting device and 100 W of a liquid crystal television, for example, the infrared detector 240 can identify a home appliance on the basis of a temporal change in the power consumption before and after the home appliance begins to operate.

In addition, if there is a high-temperature or low-temperature area, the infrared detector 240 may intensively scan the area. If the temperature of the area becomes equal to or higher than a certain value or equal to or lower than a certain value, the infrared detector 240 may warn the user (person 102) about the phenomenon. The high-temperature area might be, for example, a home appliance that is abnormally generating heat, and the low-temperature area might be, for example, a refrigerator whose door is open. In this case, the infrared detector 240 can not only perform air conditioning but also assure comfort and safety in the house.

The mechanism of the infrared detector 240 described above is an example. The mechanism of the infrared detector 240 is not particularly limited insofar as the infrared detector 240 can vertically and horizontally scan the room. The infrared detector 240 may be modified in various ways without deviating from the scope of the present disclosure.

Fifth Modification of Fourth Embodiment

Figure 69A:
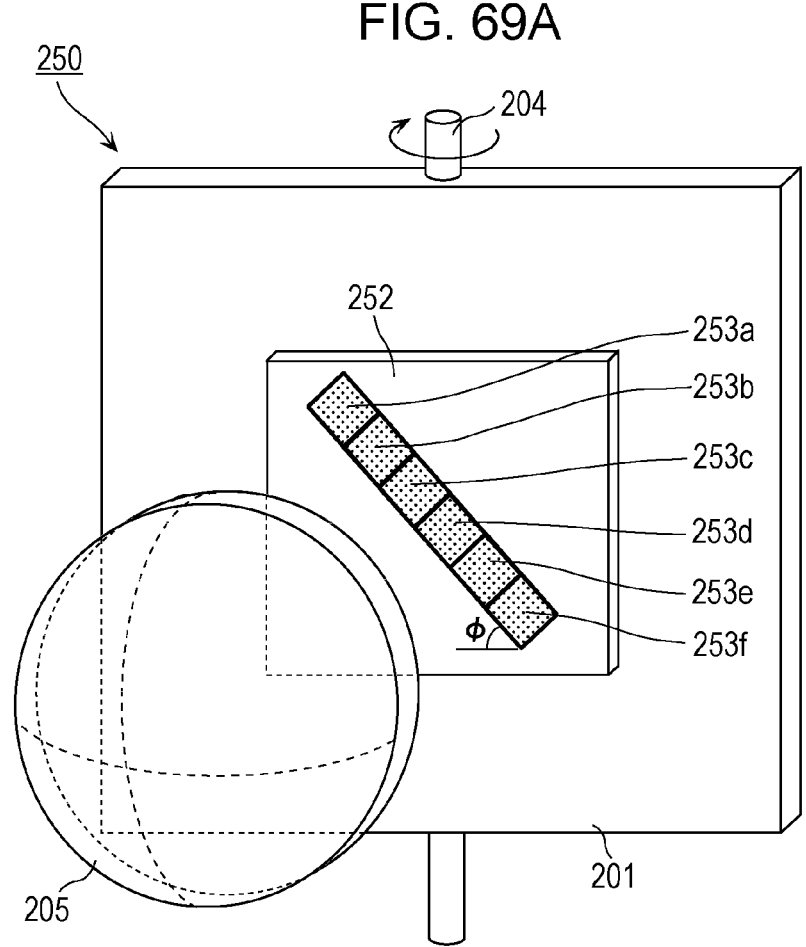
FIG. 69A is a perspective view of an infrared detector according to a fifth modification of the fourth embodiment.
Figure 69B:
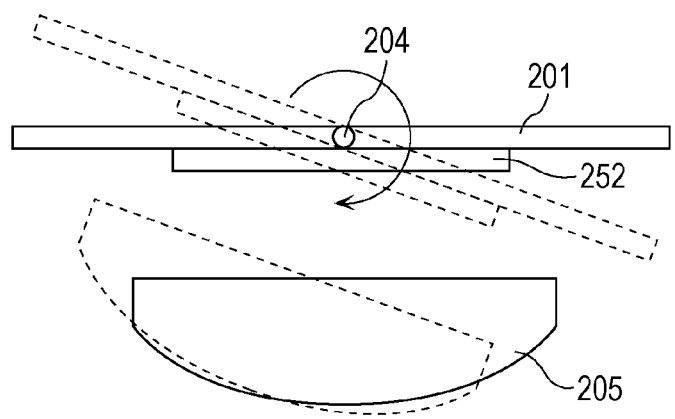
FIG. 69B is a plan view of the infrared detector according to the fifth modification of the fourth embodiment.

Next, an effect of increasing the resolution of an infrared image obtained by an infrared detection device array will be described with respect to a fifth modification of the fourth embodiment. FIG. 69A is a perspective view of an infrared detector according to the fifth modification of the fourth embodiment. FIG. 69B is a plan view of the infrared detector according to the fifth modification of the fourth embodiment.

An infrared detector 250 illustrated in FIG. 69A is similar to the infrared detector 200. In the above-described infrared detection device array 202 of the infrared detector 200, the infrared detection devices 203a to 203f are arranged (aligned) such that sides thereof become perpendicular or parallel to the scanning direction. As illustrated in FIG. 56A, for example, the infrared detection device 203b is in contact with the infrared detection device 203a only at an upper-left corner thereof.

In an infrared detection device array 252 of the infrared detector 250, on the other hand, infrared detection devices 253a to 253f are arranged at an angle of $\phi°$ as illustrated in FIG. 69A. Furthermore, the infrared detection devices 253a to 253f are in contact with an adjacent infrared detection device(s) not at corners but at sides. Aside from these, the infrared detector 200 and the infrared detector 250 are the same. In the infrared detector 250, the imaging lens 205 mounted on the board 201 is rotated about the shaft 204 to detect a temperature distribution over a wide range.

Figure 70:
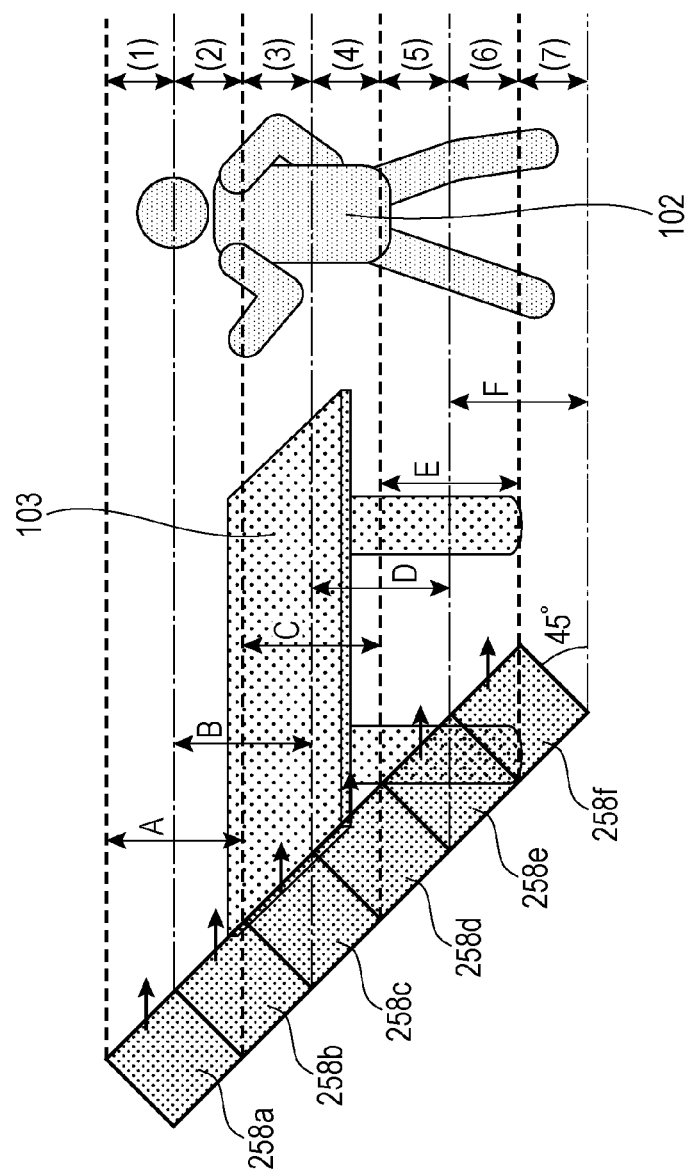
FIG. 70 is a conceptual diagram illustrating detection areas of the infrared detector according to the fifth modification of the fourth embodiment.

Characteristics of the infrared detector 250 including the infrared detection device array 252 will be described with reference to FIG. 70. FIG. 70 is a conceptual diagram illustrating detection areas of the infrared detector 250.

In the following description, the angle $\phi$ indicated in FIG. 69A is assumed to be 45°. Detection areas of the infrared detection devices 253a to 253f are detection areas 258a to 258f, respectively.

When scanning is performed from left to right as illustrated in FIG. 70, a detection range of the detection area 258a of the infrared detection device 253a is range A (an area extending in the scanning direction whose width is A). Similarly, a detection range of the detection area 258b of the infrared detection device 253b is range B. Detection ranges of the detection areas 258c to 258f of the infrared detection devices 253c to 253f are ranges C to F, respectively.

A lower half of range A and an upper half of range B overlap. Similarly, a lower half of range B and an upper half of range C overlap. That is, an upper half (lower half) of each range and a lower half (upper half) of an adjacent range overlap. In the following description, the upper half of range A will be referred to as a range (1), a range in which range A and range B overlap will be referred to as a range (2), a range in which range B and range C overlap will be referred to as a range (3). Subsequent ranges will be referred to as ranges (4) to (7) as illustrated in FIG. 70.

If there is a heat source only in the range (3), for example, the infrared detection devices 253b and 253c detect the heat source, but the infrared detection devices 253a and 253d do not detect the heat source. As a result, it can be determined that the heat source is in the range (3).

Figure 71:
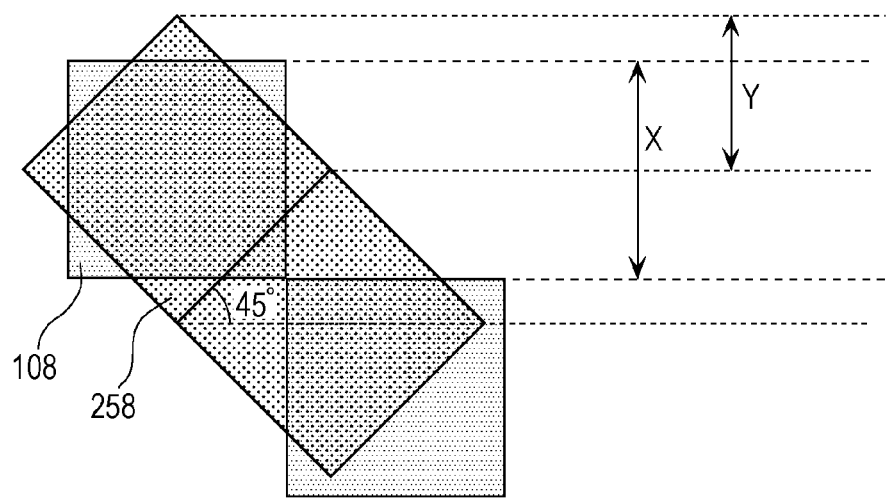
FIG. 71 is a diagram illustrating improvement of the resolution of an infrared image.

Since the detection ranges (detection target areas) of adjacent infrared detection devices overlap in the direction perpendicular to the scanning direction, the resolution of an infrared image improves in the direction perpendicular to the scanning direction. FIG. 71 is a diagram illustrating the improvement of the resolution of an infrared image.

FIG. 71 illustrates infrared detection devices 108 and 258 of the same size (area). The infrared detection device 108 is arranged such that four sides thereof become parallel or perpendicular to the scanning direction. The infrared detection device 258 is arranged such that four sides thereof are inclined from the scanning direction by $\phi=45°$ as in FIG. 70. At this time, a detection width of the infrared detection device 108 is X, but a detection width Y of the infrared detection device 258 is $1/\sqrt{2}$ of X because of an effect of the overlap. That is, the resolution of an infrared image obtained with the arrangement of the infrared detection device 258 is $\sqrt{2}$ times higher than that of an infrared image obtained with the arrangement of the infrared detection device 108.

As described above, by arranging infrared detection devices such that detection areas thereof overlap in the direction perpendicular to the scanning direction, the resolution of an infrared image can be improved.

Although the angle $\phi$ is 45° in the above description, this is an example. The angle $\phi$ may be different or a different type of arrangement may be employed insofar as detection areas of adjacent infrared detection devices overlap in the direction perpendicular to the scanning direction.

Sixth Modification of Fourth Embodiment

Figure 72:
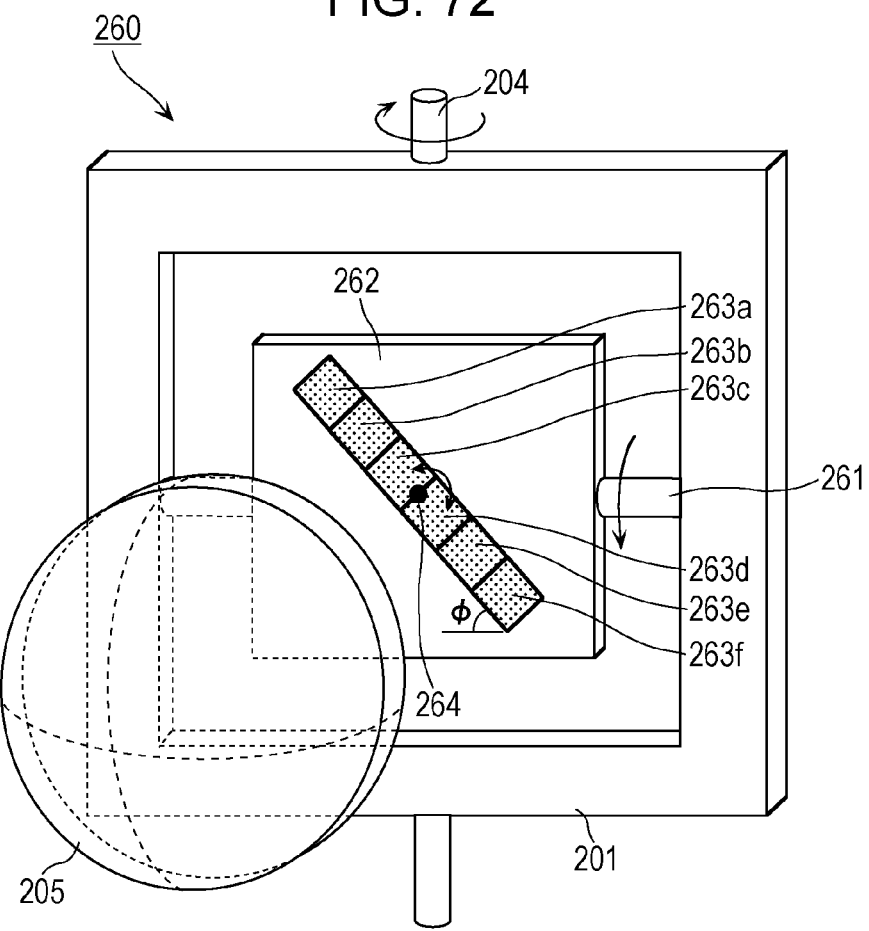
FIG. 72 is a perspective view of an infrared detector according to a sixth modification of the fourth embodiment.

Next, an infrared detector according to a sixth modification of the fourth embodiment will be described. FIG. 72 is a perspective view of the infrared detector according to the sixth modification of the fourth embodiment.

In an infrared detector 260 illustrated in FIG. 72, as in the infrared detector 250, infrared detection devices 263a to 263f included in an infrared detection device array 262 are inclined from the horizontal direction by the angle φ. In the infrared detector 260, the angle φ can be changed using a rotation mechanism 264. Furthermore, because a shaft 261 supports the infrared detection device array 262, vertical scanning can be performed.

Figure 73:
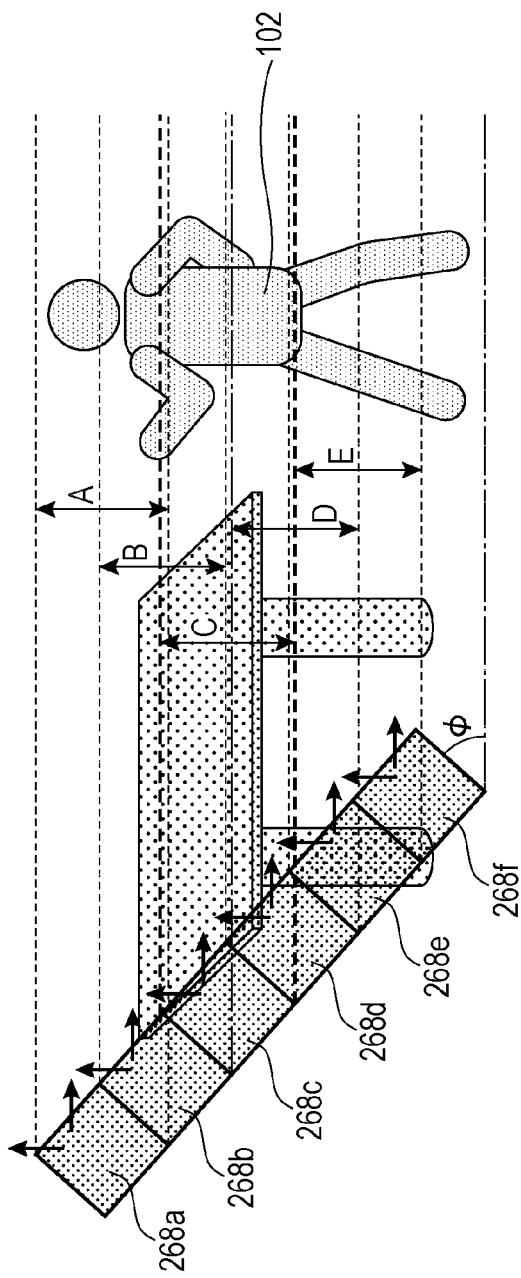
FIG. 73 is a diagram illustrating a change to the resolution of an infrared image.

The imaging lens 205 is fixed to the infrared detection device array 262 by a mount, which is not illustrated. The infrared detector 260 having such a configuration can arbitrarily change the resolution of an infrared image. FIG. 73 is a diagram illustrating a change to the resolution of an infrared image.

In FIG. 73, detection areas 268a to 268f are detection areas of the infrared detection devices 263a to 263f, respectively.

If the angle φ is larger than 45°, for example, a detection range of the detection area 268c is range C. At this time, range C includes range A (a detection range of the detection area 268a) and range E (a detection range of the detection area 268e), as well as range B (a detection range of the detection area 268b) and range D (a detection range of the detection area 268d). The infrared detector 260 can therefore obtain an infrared image of a higher resolution.

The infrared detector 260 can obtain, for example, the following infrared image (temperature distribution). First, the infrared detector 260 performs scanning with the angle φ=90° (that is, the infrared detection devices 263a to 263f are vertically arranged in a line). If a size of a region of interest is smaller than a width of an entire scanning range, the infrared detector 260 rotates the rotation mechanism 264 to cover the region of interest exactly, that is, to reduce the length of the detection areas 268a to 268f, and performs scanning again. As a result, a high-resolution infrared image (temperature distribution) of the region of interest can be obtained.

In addition, the infrared detector 260 can rotate the shaft 261 to perform vertical scanning. Even if a region of interest is located above or below the infrared detector 260, therefore, the infrared detector 260 can scan only the region of interest by adjusting the infrared detection device array 262 to a vertical position of the region of interest and performing horizontal scanning.

When a horizontal position of the region of interest is identified, the infrared detector 260 may stop performing horizontal scanning using the shaft 204 and perform vertical scanning using the shaft 261. In this case, too, the infrared detector 260 can obtain a high-resolution two-dimensional infrared image by rotating the infrared detection devices 263a to 263f about the rotation mechanism 264 in accordance with a horizontal length of the region of interest.

Additional Description of Modifications of Fourth Embodiment

Figure 74:
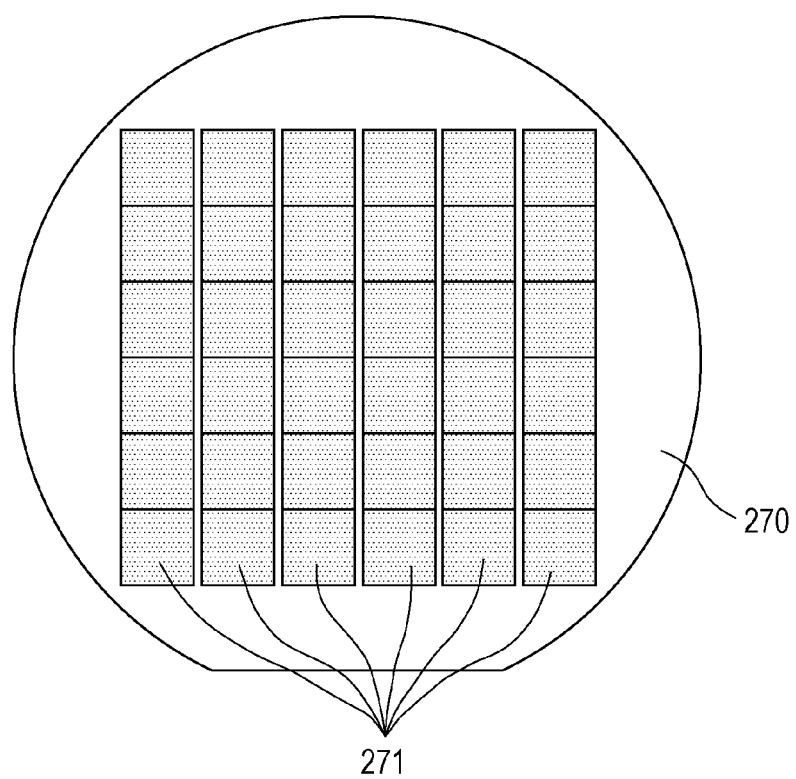
FIG. 74 is a diagram illustrating infrared detection device arrays cut out of a wafer.

The infrared detection device arrays 252 and 262 described in the modifications of the fourth embodiment are advantageous in that the infrared detection device arrays 252 and 262 can be fabricated at extremely low cost. FIG. 74 is a diagram illustrating infrared detection device arrays cut out of a wafer.

In general, an infrared detection device is fabricated through a semiconductor process. If an infrared detection device array 271 such as the infrared detection device array 252 or 262 is cut out of a wafer 270, a large number of infrared detection device arrays can be cut out of the single wafer 270 because adjacent infrared detection devices are in contact with each other at their sides in the infrared detection device arrays 271. In FIG. 74, six infrared detection device arrays 271 can be obtained from the single wafer 270. The infrared detection device arrays 252 and 262 are advantageous in that the infrared detection device arrays 252 and 262 can be fabricated at low cost.

The configurations described in the fourth embodiment are just examples, and the number of infrared detection devices included in an infrared detection device array, driving mechanisms for the shafts 204 and 261, a rotation mechanism such as the rotation mechanism 264, and the like are not particularly limited. Various modifications and alterations may be made without deviating from the scope of the present disclosure. In addition, the above-described embodiments and modifications may be combined with one another.

Summary

The thermal image sensor (infrared detector) according to the fourth embodiment includes a plurality of infrared detection devices that detect infrared radiation from detection areas and a movement unit used for scanning the detection areas in the scanning direction in order to cause the plurality of infrared detection devices to detect infrared radiation from the detection areas that are a target of a thermal image. The plurality of infrared detection devices include infrared detection devices whose positions in a certain direction (e.g., the rotational direction of the rotors 104a to 104f) are different from each other. The certain direction corresponds to the scanning direction in the arrangement of the plurality of infrared detection devices.

As with the infrared detection device array 202, for example, the plurality of infrared detection devices are arranged in a direction in which the plurality of infrared detection devices intersect with both the certain direction and a direction perpendicular to the certain direction.

As illustrated in FIGS. 70 and 73, for example, the plurality of infrared detection devices may be arranged such that, as in the infrared detection device array 252, a detection range of one of the plurality of infrared detection devices overlaps a detection range of an adjacent infrared detection device. The detection ranges refer to ranges in which corresponding detection areas move during scanning.

The movement unit of the thermal image sensor according to the fourth embodiment may move the plurality of infrared detection devices in the certain direction to scan the detection areas in the scanning direction. In this case, the movement unit is, for example, a driving mechanism such as the rotors 104a to 104f or the shaft 204.

The thermal image sensor according to the fourth embodiment may move the optical system that causes infrared radiation from a target to enter the plurality of infrared detection devices to scan the detection areas in the scanning direction. In this case, the movement unit is, for example, a driving mechanism such as the shaft 222.

The thermal image sensor according to the fourth embodiment may further include a vertical movement unit used for scanning the detection areas in the direction perpendicular to the scanning direction. The vertical movement unit is, for example, a driving mechanism such as the shaft 261.

The thermal image sensor according to the fourth embodiment may include a mechanism for changing an angle between the intersecting direction and the certain direction by rotating the plurality of infrared detection devices. Such a mechanism is, for example, the rotation mechanism 264.

The thermal image sensor according to the fourth embodiment is more cost-efficient than the thermal image sensor 20, in which infrared detection devices are arranged in a matrix, and more suitable to measure the amount of movement of the person 102 than the thermal image sensor 30, in which infrared detection devices are arranged in a line.

Fifth Embodiment

Figure 75:
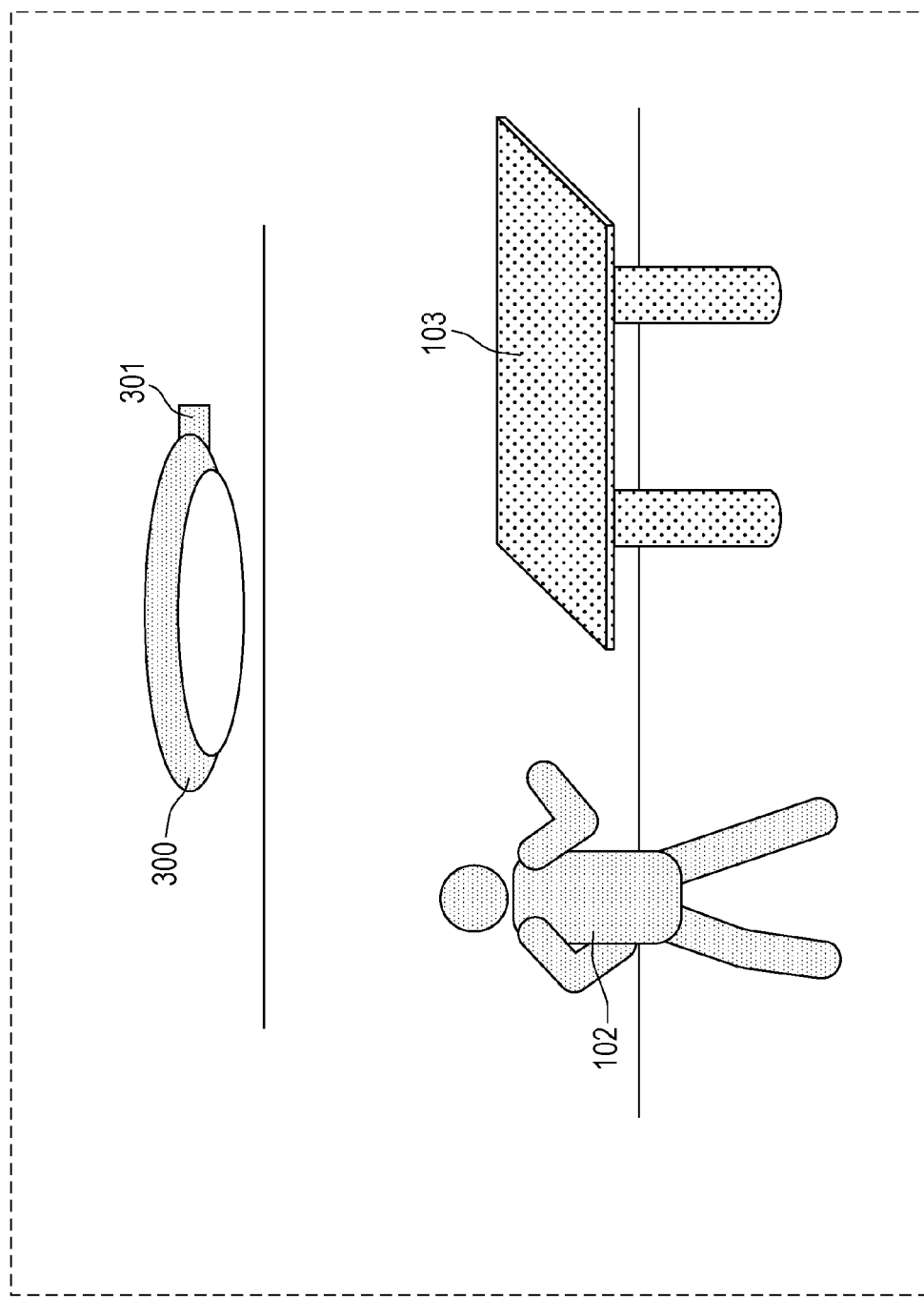
FIG. 75 is a conceptual diagram illustrating a room in which a lighting device including an infrared detector is mounted on a ceiling.

The infrared detector according to the fourth embodiment may be used in a device other than the air conditioning apparatus 100, instead. In the fifth embodiment, for example, a lighting device including an infrared detector will be described. FIG. 75 is a conceptual diagram illustrating a room in which a lighting device 300 including an infrared detector 301 is mounted on a ceiling. In the room illustrated in FIG. 75, for example, the person 102 and the table 103 are present.

The infrared detector 301 included in the lighting device 300 may be any of the infrared detectors 101, 200, 210, 220, 230, 240, 250, and 260 according to the fourth embodiment. The lighting device 300 including the infrared detector 301, for example, can identify the person 102 on the basis of the detected height of the person 102 and control lighting on the basis of a result of the identification.

If a favorite lighting color of the person 102 is registered in advance, for example, the lighting device 300 may change a lighting color in accordance with the person 102 identified by the infrared detector 301. In a simple example, the lighting device 300 may be turned on or off in accordance with presence or absence of the person 102. If the infrared detector 301 detects that the person 102 is watching television in the room, the lighting device 300 can improve the visibility of television by turning down lighting.

If the infrared detector 301 determines that the person 102 has fallen asleep, the lighting device 300 may be turned down or turned off. On the other hand, if the infrared detector 301 determines that the person 102 has woken up, the lighting device 300 may be turned on. By performing control in this manner, convenience improves while power consumption is reduced.

The configuration described in the fifth embodiment is an example, and a result of detection performed by the infrared detector 301 may be used for another type of control performed by the lighting device 300, instead. Although the lighting device 300 is mounted on the ceiling in FIG. 75, the lighting device 300 may be mounted on a wall, instead.

Although an example in which the infrared detector 301 is included in the lighting device 300 has been described in the fifth embodiment, the infrared detector 301 may be included in another apparatus. The infrared detector 301 may be included, for example, in a television set. Such a television set can detect a viewer using the infrared detector 301 and suggests television programs in accordance with a profile of the detected viewer. If no viewer is detected, the television set may be automatically turned off.

Other Embodiments

Although the first to fifth embodiments have been described, the present disclosure is not limited to these embodiments.

Figure 76:
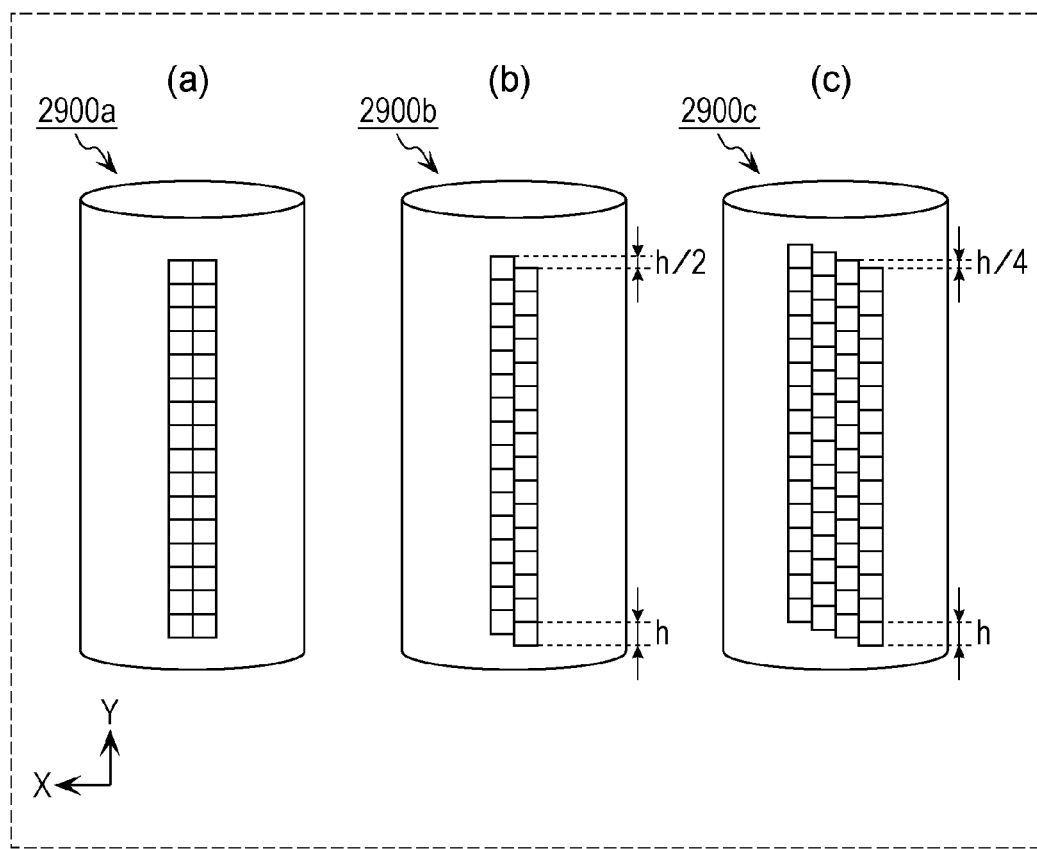
FIG. 76 illustrates an example of thermal image sensors in each of which a plurality of one-dimensional radiation receiving sensors are provided in contact with each other.

Although an example in which a plurality of one-dimensional radiation receiving sensors (device lines) are provided has been mainly described in the second embodiment, for example, the plurality of one-dimensional radiation receiving sensors need not be separately provided. FIG. 76 is a diagram illustrating an example of thermal image sensors in each of which a plurality of one-dimensional radiation receiving sensors are provided in contact with each other.

A thermal image sensor 2900a illustrated in FIG. 76(a), for example, includes two one-dimensional radiation receiving sensors in which positions of radiation receiving devices in the Y direction are the same. The two one-dimensional radiation receiving sensors of the thermal image sensor 2900a are in contact with each other in the X direction.

A thermal image sensor 2900b illustrated in FIG. 76(b) includes two one-dimensional radiation receiving sensors in which radiation receiving devices are displaced in the Y direction by half a length of one radiation receiving device (indicated by h in FIG. 76(b)). The two one-dimensional radiation receiving sensors of the thermal image sensor 2900b are in contact with each other in the X direction.

A thermal image sensor 2900c illustrated in FIG. 76(c) includes four one-dimensional radiation receiving sensors in which radiation receiving devices are displaced in the Y direction by a quarter of the length of one radiation receiving device (indicated by h in FIG. 76(c)). The four one-dimensional radiation receiving sensors of the thermal image sensor 2900c are in contact with one another in the X direction.

When positions of radiation receiving devices are displaced as in the thermal image sensor 2900b and the thermal image sensor 2900c, the high-resolution effect can be produced.

The present disclosure may be implemented, for example, as the above-described air conditioning apparatus, automobile air conditioning apparatus, lighting device, or electric device (home appliance) such as a television set. The present disclosure may also be implemented as a program for causing an information processing terminal, such as a smartphone, to operate as a user interface (user interface device) or a non-transitory storage medium storing the program.

In each of the above embodiments, the components may be achieved by dedicated hardware or by executing software programs suitable for the components. The components may be achieved by a program execution unit, such as a central processing unit (CPU) or a processor, that reads and executes the software programs stored in a storage medium such as a hard disk or a semiconductor memory.

In each of the above embodiments, a process performed by a certain processing unit may be performed by another processing unit. Order of a plurality of processes may be changed, or a plurality of processes may be performed in parallel with each other. A process performed by the arithmetic processing unit included in the air conditioning apparatus may be performed by a user interface (smartphone), instead.

In each of the above embodiments, components such as a thermal image sensor and an arithmetic processing unit may be integrated as a single module, or a thermal image sensor and other components may be provided as separate devices.

Although thermal image sensors (and user interfaces) according to one or a plurality of aspects have been described on the basis of the embodiments, the present disclosure is not limited to the embodiments. Modes obtained by modifying the embodiments in various ways that can be conceived by those skilled in the art and modes obtained by combining components according to different embodiments may be included in the one or plurality of aspects, insofar as the scope of the present disclosure is not deviated from.

The radiation receiving sensor (thermal image sensor) in the present disclosure can be fabricated at relatively low cost and is useful as a radiation receiving sensor (thermal image sensor) suitable to measure the amount of movement of a person.

What is claimed is:

1. A radiation receiving sensor comprising:
an infrared receiver including a plurality of infrared receiving devices that receive infrared radiation;
a lens that allows infrared radiation to enter the infrared receiver;
a rotator that rotates the infrared receiver and the lens about a part of the lens; and
a cover member that faces the infrared receiver through the lens and that has translucency,
wherein the lens allows infrared radiation that has passed through the cover member to enter the infrared receiver,
wherein the cover member includes a first area having a first infrared transmittance and a second area having a second infrared transmittance, which is lower than the first infrared transmittance, and
wherein a distance between the second area of the cover member and the lens is larger than a distance between the first area of the cover member and the lens, and an optical length of infrared radiation that enters the lens in the second area is larger than an optical length of infrared radiation that enters the lens in the first area.

2. The radiation receiving sensor according to claim 1, wherein the part of the lens is a pole of the lens, and
wherein the rotator rotates the infrared receiver and the lens about a straight line through the lens as a rotation axis.

3. The radiation receiving sensor according to claim 1, wherein the second area and the first area of the cover member are composed of the same material, and
wherein the second area of the cover member is thicker than the first area of the cover member.

4. A radiation receiving sensor comprising:
an infrared receiver including a plurality of infrared receiving devices that receive infrared radiation;
a lens that allows infrared radiation to enter the infrared receiver;
a rotator that rotates the infrared receiver and the lens about a part of the lens; and
a cover member that faces the infrared receiver through the lens and that has translucency,
wherein the lens allows infrared radiation that has passed through the cover member to enter the infrared receiver,
wherein the rotator rotates the infrared receiver and the lens at a first rotational speed while infrared radiation that has passed through the first area is entering the infrared receiver and at a second rotational speed while infrared radiation that has passed through the second area is entering the infrared receiver, the first rotational speed and the second rotational speed being different from each other.

5. The radiation receiving sensor according to claim 4, wherein the second rotational speed is lower than the first rotational speed.

6. An air conditioner comprising:
a radiation receiving sensor including
an infrared receiver including a plurality of infrared receiving devices that receive infrared radiation,
a lens that allows infrared radiation to enter the infrared receiver,
a rotator that rotates the infrared receiver and the lens about a part of the lens, and
a cover member that faces the infrared receiver through the lens and that has translucency,
wherein the lens allows infrared radiation that has passed through the cover member to enter the infrared receiver,
wherein the cover member includes a first area having a first infrared transmittance and a second area having a second infrared transmittance, which is lower than the first infrared transmittance, and
wherein a distance between the second area of the cover member and the lens is larger than a distance between the first area of the cover member and the lens, and an optical length of infrared radiation that enters the lens in the second area is larger than an optical length of infrared radiation that enters the lens in the first area.

7. An air conditioner comprising:
a radiation receiving sensor including
an infrared receiver including a plurality of infrared receiving devices that receive infrared radiation,
a lens that allows infrared radiation to enter the infrared receiver,
a rotator that rotates the infrared receiver and the lens about a part of the lens, and
a cover member that faces the infrared receiver through the lens and that has translucency,
wherein the lens allows infrared radiation that has passed through the cover member to enter the infrared receiver,
wherein the rotator rotates the infrared receiver and the lens at a first rotational speed while infrared radiation that has passed through the first area is entering the infrared receiver and at a second rotational speed while infrared radiation that has passed through the second area is entering the infrared receiver, the first rotational speed and the second rotational speed being different from each other.

8. An electronic cooker comprising:
a radiation receiving sensor including
an infrared receiver including a plurality of infrared receiving devices that receive infrared radiation,
a lens that allows infrared radiation to enter the infrared receiver,
a rotator that rotates the infrared receiver and the lens about a part of the lens, and
a cover member that faces the infrared receiver through the lens and that has translucency,
wherein the lens allows infrared radiation that has passed through the cover member to enter the infrared receiver,
wherein the cover member includes a first area having a first infrared transmittance and a second area having a second infrared transmittance, which is lower than the first infrared transmittance, and
wherein a distance between the second area of the cover member and the lens is larger than a distance between the first area of the cover member and the lens, and an optical length of infrared radiation that enters the lens in the second area is larger than an optical length of infrared radiation that enters the lens in the first area.

9. The electronic cooker according to claim 8, further comprising:
a ceiling; and
a platform on which an object that is a cooking target is placed, wherein the radiation receiving sensor is mounted on the ceiling, and
wherein a rotation axis used by the rotator is substantially parallel to the ceiling.

10. The electronic cooker according to claim 9, further comprising:
a controller that controls an operation of the electronic cooker,
wherein, if a temperature of the cooking target identified on the basis of an infrared image obtained from the radiation receiving sensor reaches a certain value, the controller ends the operation.

11. The electronic cooker according to claim 9, further comprising:
a controller that controls an operation of the electronic cooker,
wherein, if it is determined that there are two or more cooking targets on the platform on the basis of an infrared image obtained from the radiation receiving sensor, the controller controls the operation using, among a plurality of operation methods for heating the two or more cooking targets, a first operation method in which power used for heating is smallest.

12. The electronic cooker according to claim 9, further comprising:
a controller that controls an operation of the electronic cooker; and
a radiator that emits infrared radiation to the cooking target,
wherein the controller controls the radiator such that the radiator emits infrared radiation to a position of the cooking target identified on the basis of an infrared image obtained from the radiation receiving sensor.

13. The electronic cooker according to claim 12,
wherein, if a rate of increase in a temperature of the cooking target identified on the basis of an infrared image obtained from the radiation receiving sensor is equal to or lower than a certain value, the controller controls the radiator such that the radiator emits infrared radiation to the position of the cooking target.

14. An electronic cooker comprising:
a radiation receiving sensor including
an infrared receiver including a plurality of infrared receiving devices that receive infrared radiation,
a lens that allows infrared radiation to enter the infrared receiver,
a rotator that rotates the infrared receiver and the lens about a part of the lens, and
a cover member that faces the infrared receiver through the lens and that has translucency,
wherein the lens allows infrared radiation that has passed through the cover member to enter the infrared receiver,
wherein the rotator rotates the infrared receiver and the lens at a first rotational speed while infrared radiation that has passed through the first area is entering the infrared receiver and at a second rotational speed while infrared radiation that has passed through the second area is entering the infrared receiver, the first rotational speed and the second rotational speed being different from each other.

* * * * *